US009002900B2

(12) United States Patent
Feinsmith

(10) Patent No.: US 9,002,900 B2
(45) Date of Patent: Apr. 7, 2015

(54) MACHINE-IMPLEMENTED ACTIVITY MANAGEMENT SYSTEM USING ASYNCHRONOUSLY SHARED ACTIVITY DATA OBJECTS AND JOURNAL DATA ITEMS

(75) Inventor: Jason B. Feinsmith, Sunnyvale, CA (US)

(73) Assignee: Tarabunk Fund Limited Liability Company, Dover, DE (US)

( * ) Notice: Subject to any disclaimer, the term of this patent is extended or adjusted under 35 U.S.C. 154(b) by 481 days.

(21) Appl. No.: 12/624,307

(22) Filed: Nov. 23, 2009

(65) Prior Publication Data

US 2010/0070542 A1 Mar. 18, 2010

Related U.S. Application Data

(63) Continuation of application No. 11/708,106, filed on Feb. 16, 2007, now Pat. No. 7,624,125, which is a continuation of application No. 10/782,414, filed on Feb. 18, 2004, now Pat. No. 7,197,502.

(51) Int. Cl.
*G06F 17/30* (2006.01)
*G06F 7/00* (2006.01)
(Continued)

(52) U.S. Cl.
CPC ................ *G06Q 30/02* (2013.01); *G06Q 10/10* (2013.01); *G06Q 30/06* (2013.01); *Y10S 707/99939* (2013.01); *Y10S 707/99945* (2013.01); *Y10S 707/99948* (2013.01)

(58) Field of Classification Search
USPC ......................................................... 707/802
See application file for complete search history.

(56) References Cited

U.S. PATENT DOCUMENTS 5,077,666 A 12/1991 Brimm et al.
5,530,861 A 6/1996 Diamant et al.
(Continued)

FOREIGN PATENT DOCUMENTS

WO WO-2005/079405 9/2005

OTHER PUBLICATIONS

International Search Report; PCT Application No. PCT/US2005/004785, Applicant: Feinsmith, Jason; Date of Mailing: Jan. 19, 2006, 2 pages.

(Continued)

*Primary Examiner* — Kuen Lu
(74) *Attorney, Agent, or Firm* — Perkins Cole LLP

(57) ABSTRACT

Machine-assisted methods and apparatus are disclosed for allowing individual users to develop and organize respective activity descriptions and supporting journal items according to their respective preferences. Cross-referencing mappings may be created between activity descriptions and journal items in order to find, filter and organize disparate data. Cross-referencing mappings may also be created between the developed activity descriptions of different users so they can better understand each others perspectives and possibly overlapping goals. Different users' activity descriptions can be presented to a user even while the user may be disconnected from communication networks. Hierarchical relationships between activity descriptions may be provided. Machine-assisted means may be provided for creating work-sharing, work-delegating and/or informational sharing agreements between different users. Further machine-implemented means may be provided for automatically and asynchronously updating users on shared activities by other users even though all users are not necessarily connected to one or more respective communication networks at same time.

18 Claims, 41 Drawing Sheets

(51) Int. Cl.

| | |
|---|---|
| ***G06Q 30/02*** | (2012.01) |
| ***G06Q 10/10*** | (2012.01) |
| ***G06Q 30/06*** | (2012.01) |

(56) References Cited

U.S. PATENT DOCUMENTS

| | | | | |
|---|---|---|---|---|
| 5,548,506 | A | 8/1996 | Srinivasan | |
| 5,671,360 | A | 9/1997 | Hambrick et al. | |
| 5,721,913 | A | 2/1998 | Ackroff et al. | |
| 5,745,110 | A | 4/1998 | Ertemalp | |
| 5,799,297 | A | 8/1998 | Goodridge et al. | |
| 5,835,770 | A | 11/1998 | Shum et al. | |
| 5,848,394 | A | 12/1998 | D'Arrigo et al. | |
| 5,890,131 | A | 3/1999 | Ebert et al. | |
| 5,893,074 | A | 4/1999 | Hughes et al. | |
| 5,907,490 | A | 5/1999 | Oliver | |
| 6,006,215 | A | 12/1999 | Retallick | |
| 6,035,278 | A | 3/2000 | Mansour | |
| 6,036,345 | A | 3/2000 | Jannette et al. | |
| 6,073,108 | A | 6/2000 | Peterson | |
| 6,092,048 | A | 7/2000 | Nakaoka | |
| 6,101,481 | A | 8/2000 | Miller | |
| 6,141,412 | A | 10/2000 | Smith et al. | |
| 6,161,146 | A | 12/2000 | Kley et al. | |
| 6,278,999 | B1 | 8/2001 | Knapp | |
| 6,289,317 | B1 | 9/2001 | Peterson | |
| 6,308,164 | B1 | 10/2001 | Nummelin et al. | |
| 6,311,191 | B1 | 10/2001 | Retallick | |
| 6,314,430 | B1 | 11/2001 | Chang | |
| 6,343,275 | B1 | 1/2002 | Wong | |
| 6,370,562 | B2 | 4/2002 | Page et al. | |
| 6,380,959 | B1 | 4/2002 | Wang et al. | |
| 6,401,085 | B1 | 6/2002 | Gershman et al. | |
| 6,408,277 | B1 | 6/2002 | Nelken | |
| 6,445,968 | B1 | 9/2002 | Jalla | |
| 6,446,113 | B1 | 9/2002 | Ozzie et al. | |
| 6,505,162 | B1 | 1/2003 | Wang et al. | |
| 6,507,845 | B1 | 1/2003 | Cohen et al. | |
| 6,510,451 | B2 | 1/2003 | Wu et al. | |
| 6,519,763 | B1 | 2/2003 | Kaufer et al. | |
| 6,567,840 | B1 | 5/2003 | Binns et al. | |
| 6,574,628 | B1 | 6/2003 | Kahn et al. | |
| 6,574,630 | B1 | 6/2003 | Augustine et al. | |
| 6,578,006 | B1 | 6/2003 | Saito et al. | |
| 6,591,278 | B1 | 7/2003 | Ernst | |
| 6,606,613 | B1 | 8/2003 | Altschuler et al. | |
| 6,618,756 | B1 | 9/2003 | Katsurabayashi | |
| 6,625,651 | B1 | 9/2003 | Swartz et al. | |
| 6,640,241 | B1 | 10/2003 | Ozzie et al. | |
| 6,651,063 | B1 | 11/2003 | Vorobiev | |
| 7,020,697 | B1 | 3/2006 | Goodman et al. | |
| 7,027,954 | B2 * | 4/2006 | Mets et al. | 702/187 |
| 7,053,772 | B2 * | 5/2006 | Wagner et al. | 340/539.17 |
| 7,159,178 | B2 * | 1/2007 | Vogt et al. | 715/733 |
| 7,171,448 | B1 * | 1/2007 | Danielsen et al. | 709/205 |
| 7,197,502 | B2 | 3/2007 | Feinsmith | |
| 7,562,367 | B1 * | 7/2009 | Arad | 719/318 |
| 7,624,125 | B2 | 11/2009 | Feinsmith | |
| 2002/0038217 | A1 * | 3/2002 | Young | 705/1 |
| 2002/0165910 | A1 | 11/2002 | Brown et al. | |
| 2003/0120656 | A1 | 6/2003 | Kageyama et al. | |
| 2004/0039630 | A1 * | 2/2004 | Begole et al. | 705/11 |
| 2004/0064478 | A1 | 4/2004 | Canesi | |
| 2004/0102931 | A1 | 5/2004 | Ellis et al. | |
| 2005/0172027 | A1 * | 8/2005 | Castellanos et al. | 709/229 |
| 2007/0219842 | A1 * | 9/2007 | Bansal et al. | 705/9 |

OTHER PUBLICATIONS

International Preliminary Report on Patentability Chapter 1; PCT Application No. PCT/US2005/004785, Applicant: Feinsmith, Jason; Date of Mailing: Aug. 22, 2006, 5 pages.

Written Opinion of the International Search Authority; PCT Application No. PCT/US2005/004785, Applicant: Feinsmith, Jason; Date of Mailing: Aug. 18, 2006, 4 pages.

* cited by examiner

300

400
CHARLIE CHIEF's WORLD 403
MBO: No. 1 in Wholesale Health Foods
431
Shared Organization: INTERNATIONAL FOOD WHOLESALERS CORPORATION
430
WORK
421
ADAM ASSISTANT's WORLD 402
422
HARRY H. RESOURCES' WORLD 404
Professional Organizations
413
WORK
411
HOME
412
OVERLAPS
417
MAX MANAGER's WORLD 401
Party Project 410
FAMILY
414
FRIENDS
415
HOBBIES (GOLF)
416
Expanding New Activities
418
Shrinking Old Activities
419

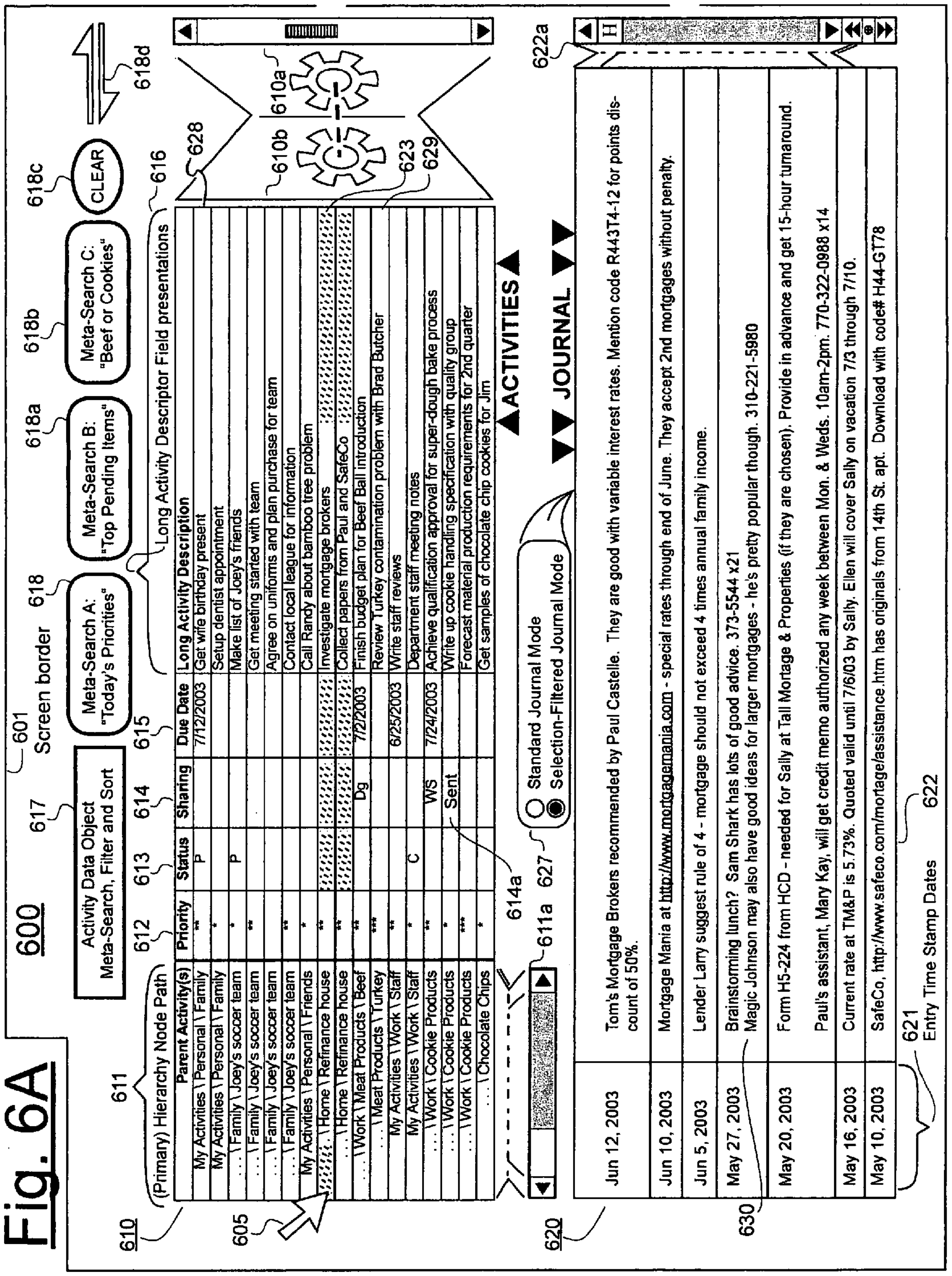
Fig. 6A
600
601 Screen border
Activity Data Object Meta-Search, Filter and Sort
Meta-Search A: "Today's Priorities"
Meta-Search B: "Top Pending Items"
Meta-Search C: "Beef or Cookies"
CLEAR
(Primary) Hierarchy Node Path
Long Activity Descriptor Field presentations
Parent Activity(s)
Priority
Status
Sharing
Due Date
Long Activity Description
My Activities \ Personal \ Family
\ Family \ Joey's soccer team
My Activities \ Personal \ Friends
\ Home \ Refinance house
\ Work \ Meat Products \ Beef
\ Meat Products \ Turkey
My Activities \ Work \ Staff
\ Work \ Cookie Products
\ Chocolate Chips
Get wife birthday present
Setup dentist appointment
Make list of Joey's friends
Get meeting started with team
Agree on uniforms and plan purchase for team
Contact local league for information
Call Randy about bamboo tree problem
Investigate mortgage brokers
Collect papers from Paul and SafeCo
Finish budget plan for Beef Ball introduction
Review Turkey contamination problem with Brad Butcher
Write staff reviews
Department staff meeting notes
Achieve qualification approval for super-dough bake process
Write up cookie handling specification with quality group
Forecast material production requirements for 2nd quarter
Get samples of chocolate chip cookies for Jim
7/12/2003
7/2/2003
6/25/2003
7/24/2003
ACTIVITIES
JOURNAL
Standard Journal Mode
Selection-Filtered Journal Mode
Jun 12, 2003
Tom's Mortgage Brokers recommended by Paul Castelle. They are good with variable interest rates. Mention code R443T4-12 for points discount of 50%.
Jun 10, 2003
Mortgage Mania at http://www.mortgagemania.com - special rates through end of June. They accept 2nd mortgages without penalty.
Jun 5, 2003
Lender Larry suggest rule of 4 - mortgage should not exceed 4 times annual family income.
May 27, 2003
Brainstorming lunch? Sam Shark has lots of good advice. 373-5544 x21
Magic Johnson may also have good ideas for larger mortgages - he's pretty popular though. 310-221-5980
May 20, 2003
Form H5-224 from HCD - needed for Sally at Tall Mortgage & Properties (if they are chosen). Provide in advance and get 15-hour turnaround.
Paul's assistant, Mary Kay, will get credit memo authorized any week between Mon. & Weds. 10am-2pm. 770-322-0988 x14
May 16, 2003
Current rate at TM&P is 5.73%. Quoted valid until 7/6/03 by Sally. Ellen will cover Sally on vacation 7/3 through 7/10.
May 10, 2003
SafeCo, http://www.safeco.com/mortgage/assistance.htm has originals from 14th St. apt. Download with code# H44-GT78
621 Entry Time Stamp Dates
622
622a
605
610
610a
610b
611
611a
612
613
614
614a
615
616
617
618
618a
618b
618c
618d
620
623
627
628
629
630

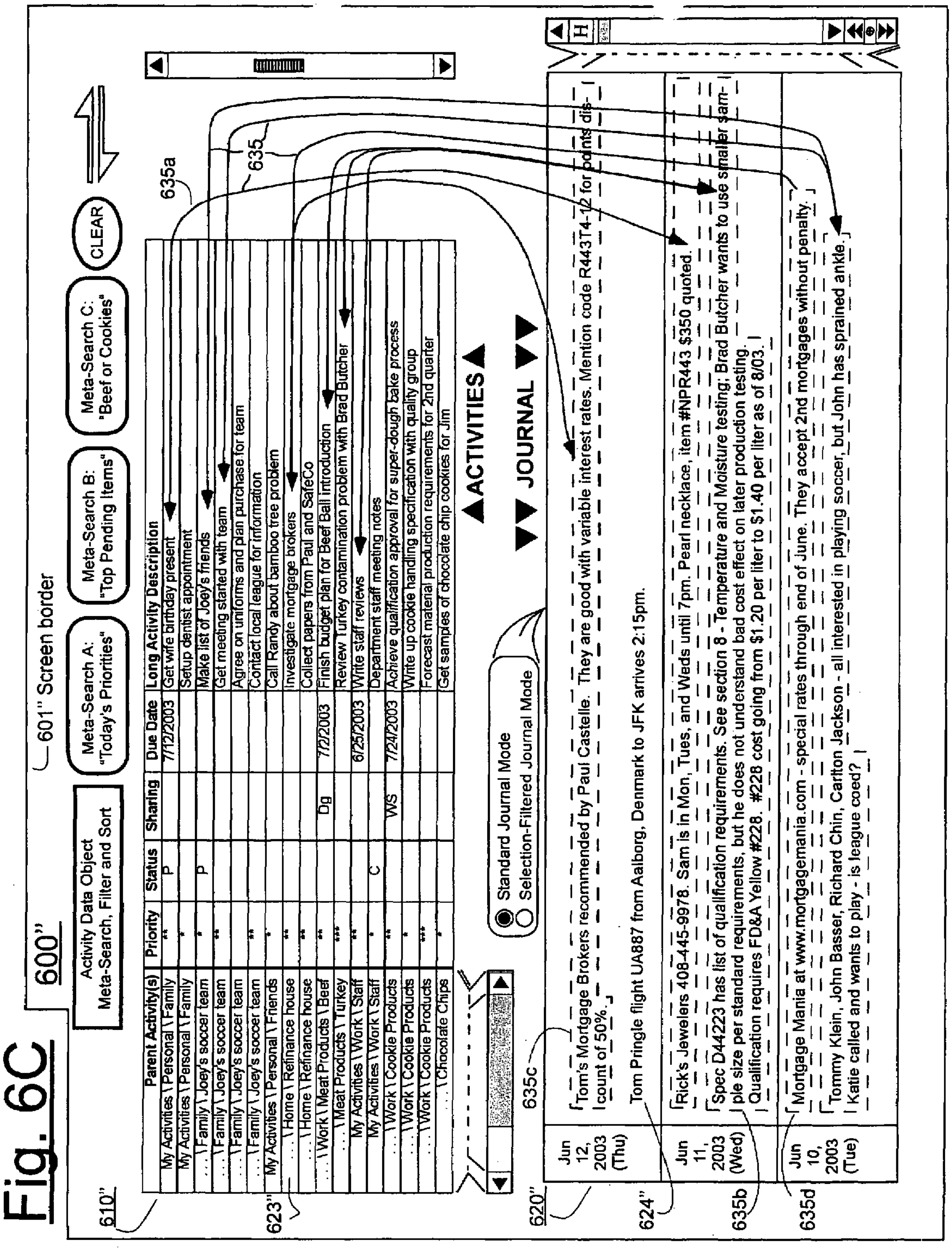
Fig. 6C
600"
601" Screen border
610"
Activity Data Object Meta-Search, Filter and Sort
Meta-Search A: "Today's Priorities"
Meta-Search B: "Top Pending Items"
Meta-Search C: "Beef or Cookies"
CLEAR
Parent Activity(s) | Priority | Status | Sharing | Due Date | Long Activity Description
My Activities \ Personal \ Family | ** | P | | 7/12/2003 | Get wife birthday present
My Activities \ Personal \ Family | * | | | | Setup dentist appointment
. . . \ Family \ Joey's soccer team | * | P | | | Make list of Joey's friends
. . . \ Family \ Joey's soccer team | ** | | | | Get meeting started with team
. . . \ Family \ Joey's soccer team | | | | | Agree on uniforms and plan purchase for team
. . . \ Family \ Joey's soccer team | ** | | | | Contact local league for information
My Activities \ Personal \ Friends | * | | | | Call Randy about bamboo tree problem
. . . \ Home \ Refinance house | ** | | | | Investigate mortgage brokers
. . . \ Home \ Refinance house | ** | | | | Collect papers from Paul and SafeCo
. . . \ Work \ Meat Products \ Beef | ** | | Dg | 7/2/2003 | Finish budget plan for Beef Ball introduction
. . . \ Meat Products \ Turkey | *** | | | | Review Turkey contamination problem with Brad Butcher
My Activities \ Work \ Staff | ** | | | 6/25/2003 | Write staff reviews
My Activities \ Work \ Staff | * | C | | | Department staff meeting notes
. . . \ Work \ Cookie Products | ** | | WS | 7/24/2003 | Achieve qualification approval for super-dough bake process
. . . \ Work \ Cookie Products | * | | | | Write up cookie handling specification with quality group
. . . \ Work \ Cookie Products | *** | | | | Forecast material production requirements for 2nd quarter
. . . \ Chocolate Chips | * | | | | Get samples of chocolate chip cookies for Jim
623"
635
635a
ACTIVITIES
JOURNAL
Standard Journal Mode
Selection-Filtered Journal Mode
H
620"
635c
Jun 12, 2003 (Thu)
Tom's Mortgage Brokers recommended by Paul Castelle. They are good with variable interest rates. Mention code R443T4-12 for points discount of 50%.
Tom Pringle flight UA887 from Aalborg, Denmark to JFK arrives 2:15pm.
624"
Jun 11, 2003 (Wed)
Rick's Jewelers 408-445-9978. Sam is in Mon, Tues, and Weds until 7pm. Pearl necklace, item #NPR443 $350 quoted.
635b
Spec D44223 has list of qualification requirements. See section 8 - Temperature and Moisture testing; Brad Butcher wants to use smaller sample size per standard requirements, but he does not understand bad cost effect on later production testing. Qualification requires FD&A Yellow #228. #228 cost going from $1.20 per liter to $1.40 per liter as of 8/03.
635d
Jun 10, 2003 (Tue)
Mortgage Mania at www.mortgagemania.com - special rates through end of June. They accept 2nd mortgages without penalty.
Tommy Klein, John Basser, Richard Chin, Carlton Jackson - all interested in playing soccer, but John has sprained ankle. Katie called and wants to play - is league coed?

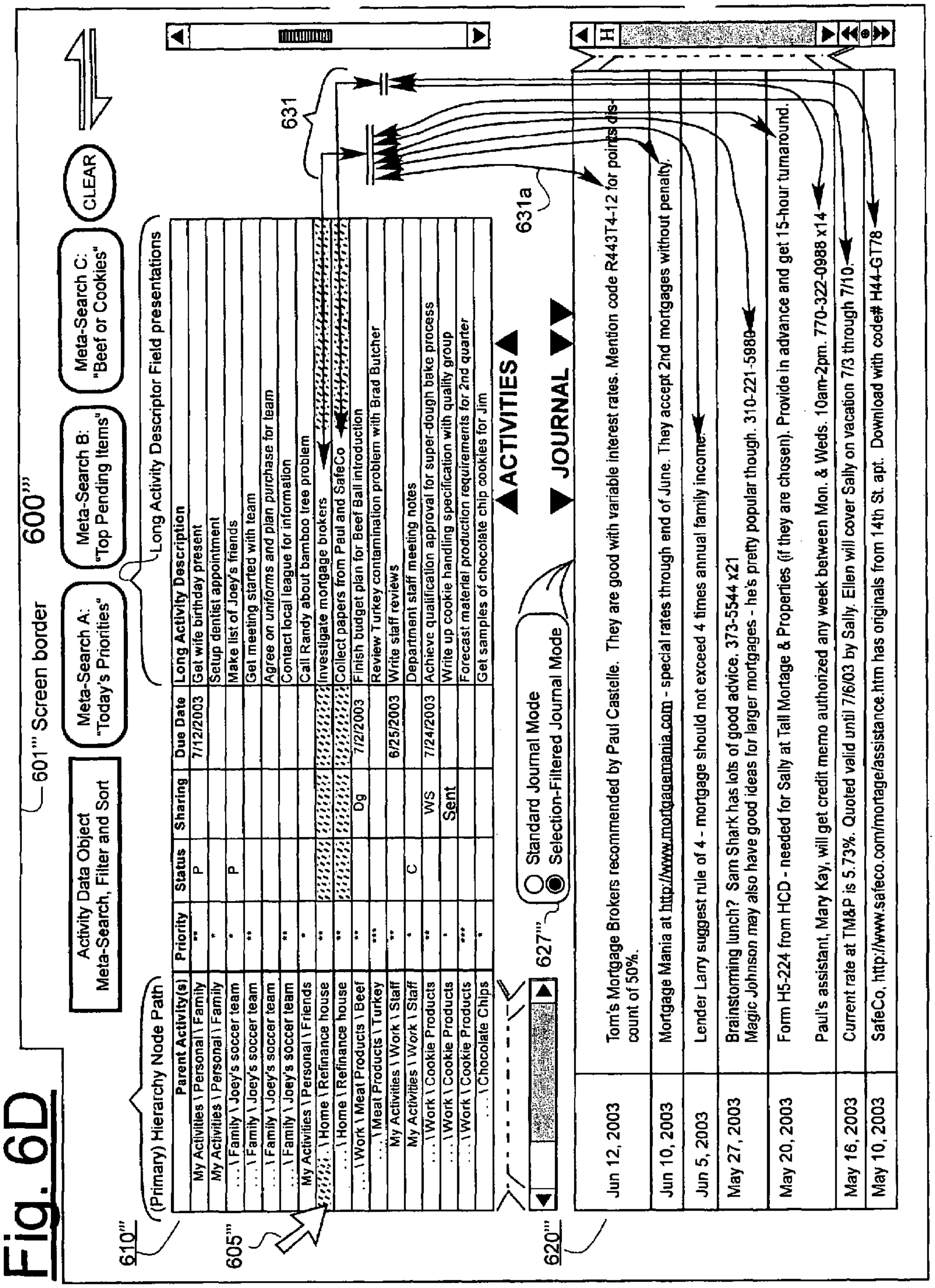

Fig. 6D
601''' Screen border
600'''
Activity Data Object
Meta-Search, Filter and Sort
Meta-Search A: "Today's Priorities"
Meta-Search B: "Top Pending Items"
Meta-Search C: "Beef or Cookies"
CLEAR
(Primary) Hierarchy Node Path
Long Activity Descriptor Field presentations
610'''
605'''
Parent Activity(s) | Priority | Status | Sharing | Due Date | Long Activity Description
My Activities \ Personal \ Family | ** | P | | 7/12/2003 | Get wife birthday present
My Activities \ Personal \ Family | * | | | | Setup dentist appointment
. . . \ Family \ Joey's soccer team | * | P | | | Make list of Joey's friends
. . . \ Family \ Joey's soccer team | ** | | | | Get meeting started with team
. . . \ Family \ Joey's soccer team | | | | | Agree on uniforms and plan purchase for team
. . . \ Family \ Joey's soccer team | ** | | | | Contact local league for information
My Activities \ Personal \ Friends | * | | | | Call Randy about bamboo tree problem
. . . \ Home \ Refinance house | * | | | | Investigate mortgage brokers
. . . \ Home \ Refinance house | ** | | | | Collect papers from Paul and SafeCo
. . . \ Work \ Meat Products \ Beef | ** | | Dg | 7/2/2003 | Finish budget plan for Beef Ball introduction
. . . \ Meat Products \ Turkey | *** | | | | Review Turkey contamination problem with Brad Butcher
My Activities \ Work \ Staff | ** | | | 6/25/2003 | Write staff reviews
My Activities \ Work \ Staff | * | C | | | Department staff meeting notes
. . . \ Work \ Cookie Products | ** | | WS | 7/24/2003 | Achieve qualification approval for super-dough bake process
. . . \ Work \ Cookie Products | * | | Sent | | Write up cookie handling specification with quality group
. . . \ Work \ Cookie Products | *** | | | | Forecast material production requirements for 2nd quarter
. . . \ Chocolate Chips | * | | | | Get samples of chocolate chip cookies for Jim
ACTIVITIES
JOURNAL
627'''
Standard Journal Mode
Selection-Filtered Journal Mode
631
631a
620'''
Jun 12, 2003 Tom's Mortgage Brokers recommended by Paul Castelle. They are good with variable interest rates. Mention code R443T4-12 for points discount of 50%.
Jun 10, 2003 Mortgage Mania at http://www.mortgagemania.com - special rates through end of June. They accept 2nd mortgages without penalty.
Jun 5, 2003 Lender Larry suggest rule of 4 - mortgage should not exceed 4 times annual family income.
May 27, 2003 Brainstorming lunch? Sam Shark has lots of good advice. 373-5544 x21
Magic Johnson may also have good ideas for larger mortgages - he's pretty popular though. 310-221-5980
May 20, 2003 Form H5-224 from HCD - needed for Sally at Tall Mortage & Properties (if they are chosen). Provide in advance and get 15-hour turnaround.
Paul's assistant, Mary Kay, will get credit memo authorized any week between Mon. & Weds. 10am-2pm. 770-322-0988 x14
May 16, 2003 Current rate at TM&P is 5.73%. Quoted valid until 7/6/03 by Sally. Ellen will cover Sally on vacation 7/3 through 7/10.
May 10, 2003 SafeCo, http://www.safeco.com/mortage/assistance.htm has originals from 14th St. apt. Download with code# H44-GT78

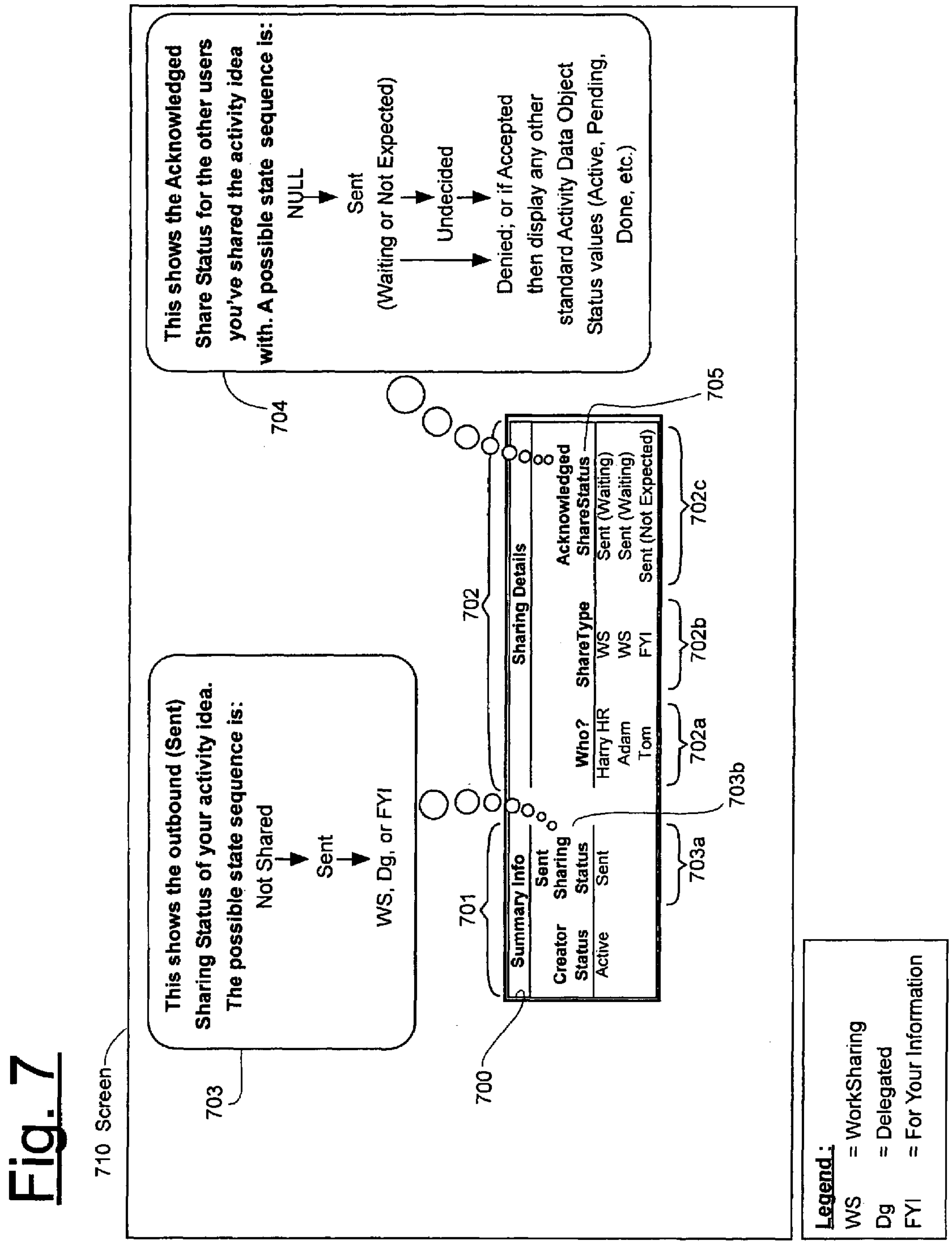

Fig. 7
710 Screen
This shows the outbound (Sent) Sharing Status of your activity idea. The possible state sequence is:
Not Shared
Sent
WS, Dg, or FYI
703
This shows the Acknowledged Share Status for the other users you've shared the activity idea with. A possible state sequence is:
NULL
Sent
(Waiting or Not Expected)
Undecided
Denied; or if Accepted then display any other standard Activity Data Object Status values (Active, Pending, Done, etc.)
704
705
700
701
702
Summary Info
Sharing Details
Creator Status
Sent Sharing Status
Who?
ShareType
Acknowledged ShareStatus
Active
Sent
Harry HR
Adam
Tom
WS
WS
FYI
Sent (Waiting)
Sent (Waiting)
Sent (Not Expected)
703a
703b
702a
702b
702c
Legend:
WS = WorkSharing
Dg = Delegated
FYI = For Your Information

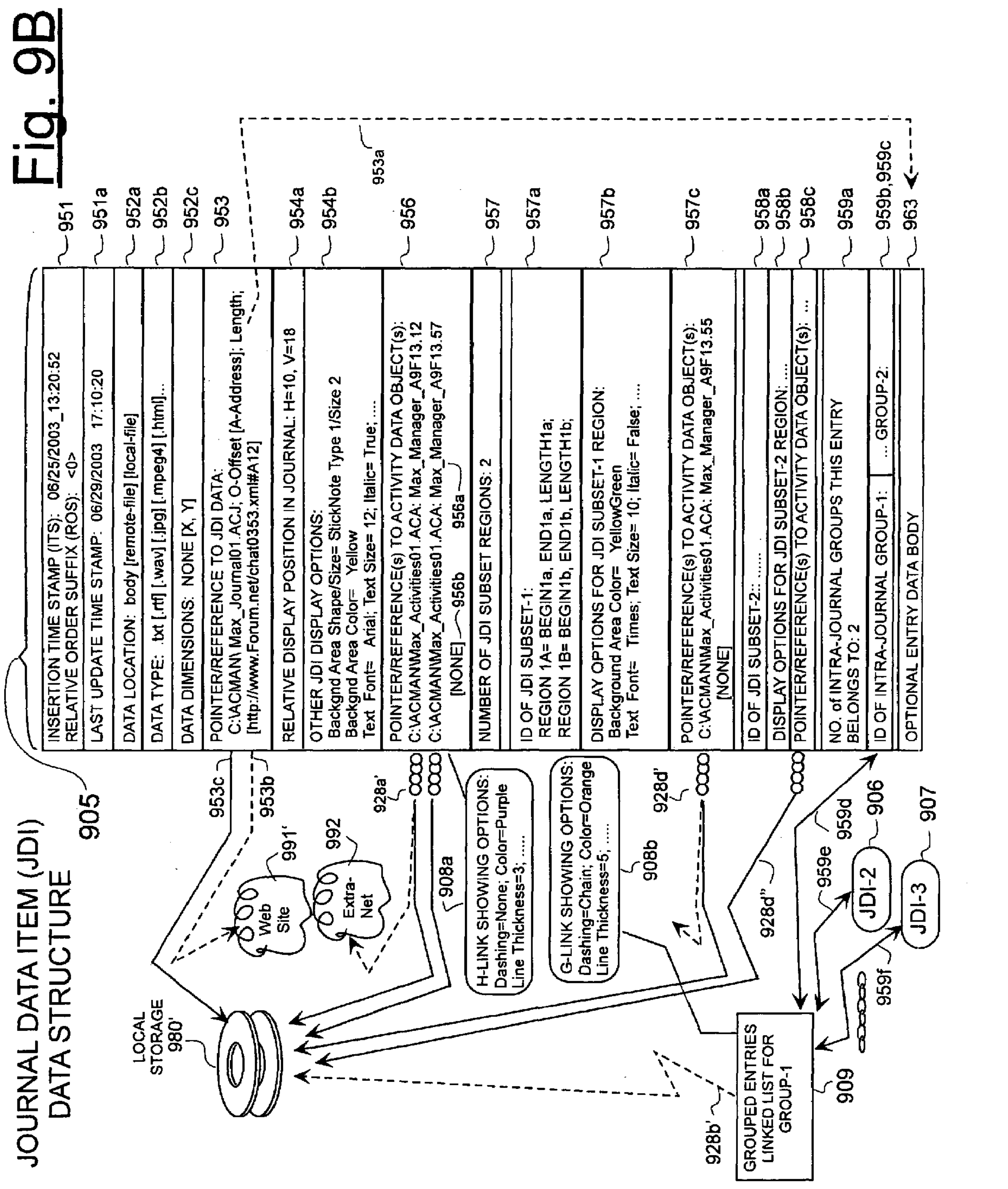
Fig. 9B
JOURNAL DATA ITEM (JDI) DATA STRUCTURE
905
INSERTION TIME STAMP (ITS): 06/25/2003_13:20:52
RELATIVE ORDER SUFFIX (ROS): <0>
LAST UPDATE TIME STAMP: 06/29/2003 17:10:20
DATA LOCATION: body [remote-file] [local-file]
DATA TYPE: .txt [.rtf] [.wav] [.jpg] [.mpeg4] [.html]...
DATA DIMENSIONS: NONE [X, Y]
POINTER/REFERENCE TO JDI DATA:
C:\ACMAN\ Max_Journal01.ACJ; O-Offset [A-Address]; Length;
[http://www.Forum.net/chat0353.xml#A12]
RELATIVE DISPLAY POSITION IN JOURNAL: H=10, V=18
OTHER JDI DISPLAY OPTIONS:
Backgnd Area Shape/Size= StickNote Type 1/Size 2
Backgnd Area Color= Yellow
Text Font= Arial; Text Size= 12; Italic= True; ....
POINTER/REFERENCE(s) TO ACTIVITY DATA OBJECT(s):
C:\ACMAN\Max_Activities01.ACA: Max_Manager_A9F13.12
C:\ACMAN\Max_Activities01.ACA: Max_Manager_A9F13.57
[NONE]
956b
956a
NUMBER OF JDI SUBSET REGIONS: 2
ID OF JDI SUBSET-1:
REGION 1A= BEGIN1a, END1a, LENGTH1a;
REGION 1B= BEGIN1b, END1b, LENGTH1b;
DISPLAY OPTIONS FOR JDI SUBSET-1 REGION:
Background Area Color= YellowGreen
Text Font= Times; Text Size= 10; Italic= False; ....
POINTER/REFERENCE(s) TO ACTIVITY DATA OBJECT(s):
C:\ACMAN\Max_Activities01.ACA: Max_Manager_A9F13.55
[NONE]
ID OF JDI SUBSET-2: .....
DISPLAY OPTIONS FOR JDI SUBSET-2 REGION: .....
POINTER/REFERENCE(s) TO ACTIVITY DATA OBJECT(s): ...
NO. of INTRA-JOURNAL GROUPS THIS ENTRY BELONGS TO: 2
ID OF INTRA-JOURNAL GROUP-1: ... GROUP-2:
OPTIONAL ENTRY DATA BODY
951
951a
952a
952b
952c
953
953a
954a
954b
956
957
957a
957b
957c
958a
958b
958c
959a
959b,959c
963
953c
953b
928a'
991'
Web Site
992
Extra-Net
908a
H-LINK SHOWING OPTIONS:
Dashing=None; Color=Purple
Line Thickness=3; .....
G-LINK SHOWING OPTIONS:
Dashing=Chain; Color=Orange
Line Thickness=5; .....
908b
928d'
928d"
959d
959e
906
JDI-2
907
JDI-3
959f
LOCAL STORAGE
980'
GROUPED ENTRIES LINKED LIST FOR GROUP-1
909
928b'

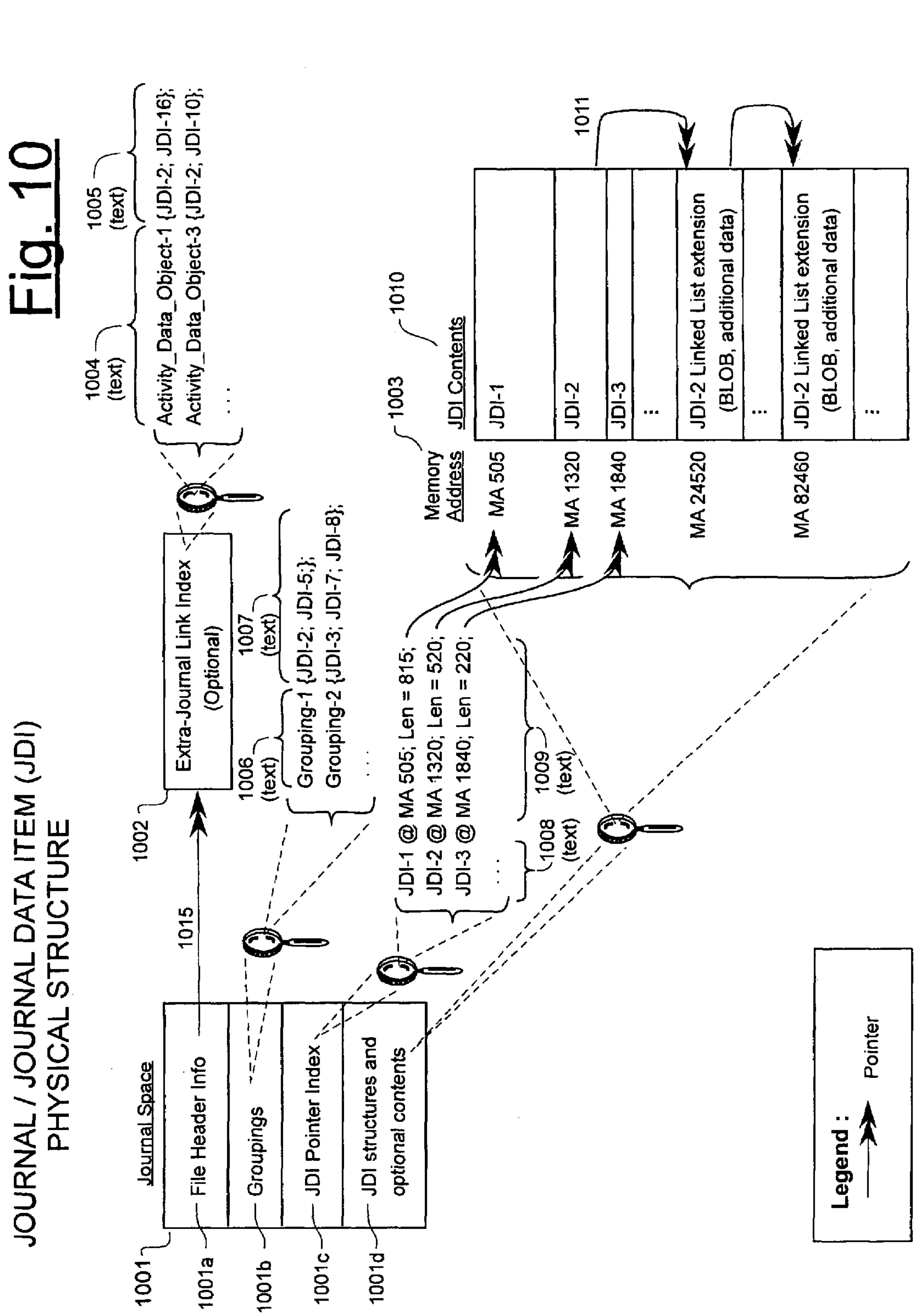
Fig. 10
JOURNAL / JOURNAL DATA ITEM (JDI)
PHYSICAL STRUCTURE
1001
Journal Space
1001a
File Header Info
1001b
Groupings
1001c
JDI Pointer Index
1001d
JDI structures and optional contents
1015
1002
Extra-Journal Link Index
(Optional)
1006
(text)
Grouping-1 {JDI-2; JDI-5;};
Grouping-2 {JDI-3; JDI-7; JDI-8};
1007
(text)
1004
(text)
1005
(text)
Activity_Data_Object-1 {JDI-2; JDI-16};
Activity_Data_Object-3 {JDI-2; JDI-10};
JDI-1 @ MA 505; Len = 815;
JDI-2 @ MA 1320; Len = 520;
JDI-3 @ MA 1840; Len = 220;
1008
(text)
1009
(text)
1003
Memory Address
1010
JDI Contents
MA 505
JDI-1
MA 1320
JDI-2
MA 1840
JDI-3
MA 24520
JDI-2 Linked List extension
(BLOB, additional data)
MA 82460
JDI-2 Linked List extension
(BLOB, additional data)
1011
Legend :
Pointer

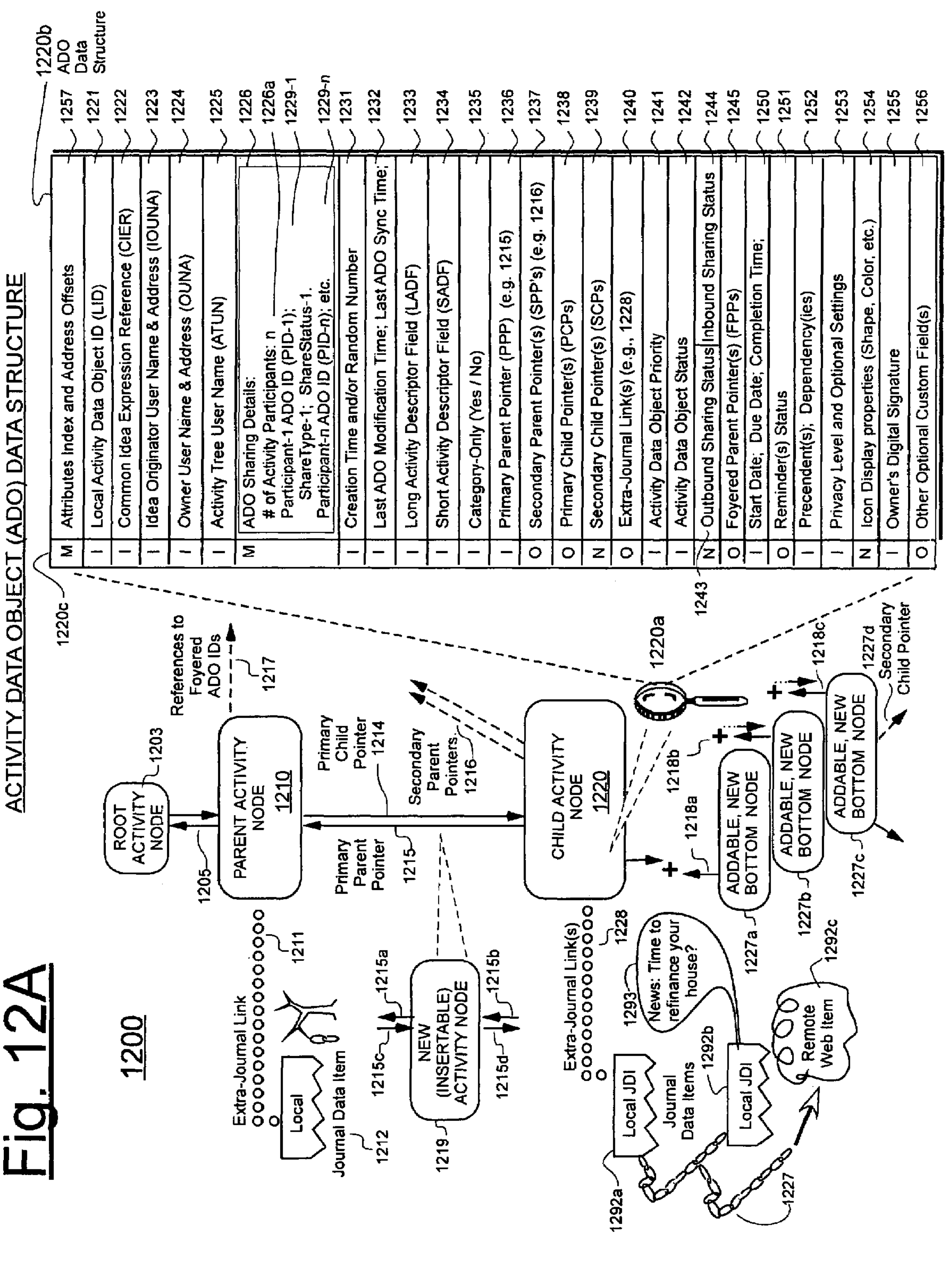
Fig. 12A
1200
ACTIVITY DATA OBJECT (ADO) DATA STRUCTURE
1220b ADO Data Structure
1220c
M Attributes Index and Address Offsets 1257
I Local Activity Data Object ID (LID) 1221
I Common Idea Expression Reference (CIER) 1222
I Idea Originator User Name & Address (IOUNA) 1223
I Owner User Name & Address (OUNA) 1224
I Activity Tree User Name (ATUN) 1225
M ADO Sharing Details: 1226
# of Activity Participants: n 1226a
Participant-1 ADO ID (PID-1); 1229-1
ShareType-1; ShareStatus-1.
Participant-n ADO ID (PID-n); etc. 1229-n
I Creation Time and/or Random Number 1231
I Last ADO Modification Time; Last ADO Sync Time; 1232
I Long Activity Descriptor Field (LADF) 1233
I Short Activity Descriptor Field (SADF) 1234
I Category-Only (Yes / No) 1235
I Primary Parent Pointer (PPP) (e.g. 1215) 1236
O Secondary Parent Pointer(s) (SPP's) (e.g. 1216) 1237
O Primary Child Pointer(s) (PCPs) 1238
N Secondary Child Pointer(s) (SCPs) 1239
O Extra-Journal Link(s) (e.g., 1228) 1240
I Activity Data Object Priority 1241
I Activity Data Object Status 1242
N Outbound Sharing Status | Inbound Sharing Status 1244
1243
O Foyered Parent Pointer(s) (FPPs) 1245
I Start Date; Due Date; Completion Time; 1250
O Reminder(s) Status 1251
I Precendent(s); Dependency(ies) 1252
I Privacy Level and Optional Settings 1253
N Icon Display properties (Shape, Color, etc.) 1254
I Owner's Digital Signature 1255
O Other Optional Custom Field(s) 1256
ROOT ACTIVITY NODE
1203
1205
PARENT ACTIVITY NODE 1210
References to Foyered ADO IDs
1217
Primary Child Pointer 1214
Secondary Parent Pointers 1216
Primary Parent Pointer
1215
CHILD ACTIVITY NODE 1220
1220a
1218a
1218b
1218c
ADDABLE, NEW BOTTOM NODE
1227a
ADDABLE, NEW BOTTOM NODE
1227b
ADDABLE, NEW BOTTOM NODE
1227c
1227d Secondary Child Pointer
Extra-Journal Link
1211
Local
Journal Data Item
1212
1215a
1215c
NEW (INSERTABLE) ACTIVITY NODE
1215b
1215d
1219
Extra-Journal Link(s)
1228
News: Time to refinance your house?
1293
Local JDI
Journal Data Items
1292b
Local JDI
1292a
Remote Web Item
1292c
1227

Illustration of Foyered versus Embedded Activity Data Objects

Associating Embedded Activity Data Objects with Foyered Activity Data Objects

Sharing & Transmitting an ADO and Optional JDI(s)

Sending / Receiving a Translated Copy of an ADO with optional Message Text, JDI(s), etc. as Message Body Text

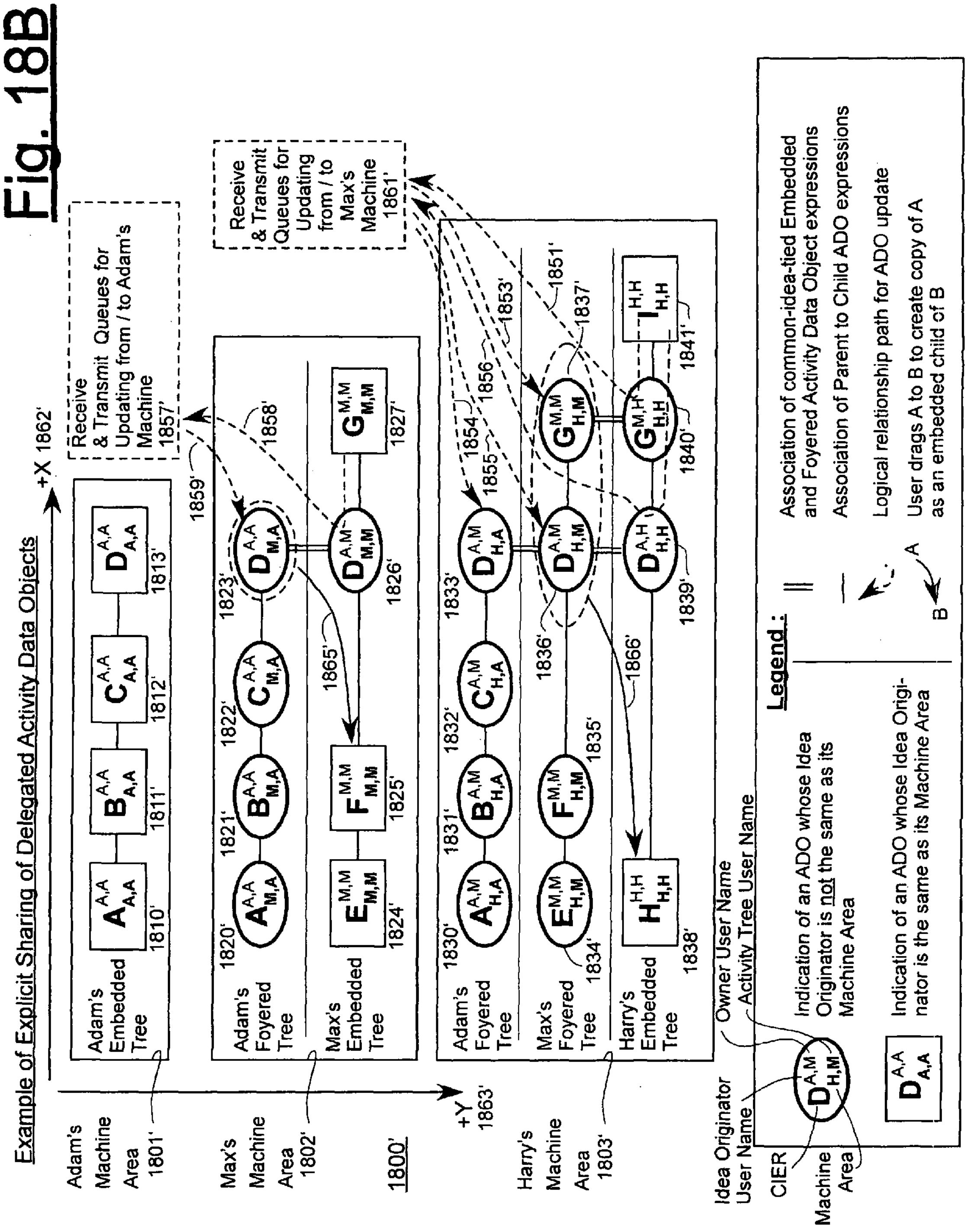
Fig. 18B
Example of Explicit Sharing of Delegated Activity Data Objects
+X 1862'
+Y 1863'
1800'
Adam's Machine Area 1801'
Max's Machine Area 1802'
Harry's Machine Area 1803'
Adam's Embedded Tree
Adam's Foyered Tree
Max's Embedded Tree
Max's Foyered Tree
Harry's Embedded Tree
Receive & Transmit Queues for Updating from / to Adam's Machine 1857'
Receive & Transmit Queues for Updating from / to Max's Machine 1861'
1810' 1811' 1812' 1813'
1820' 1821' 1822' 1823' 1824' 1825' 1826' 1827'
1830' 1831' 1832' 1833' 1834' 1835' 1836' 1837' 1838' 1839' 1840' 1841'
1851' 1853' 1854' 1855' 1856' 1858' 1859' 1865' 1866'
Legend:
Idea Originator User Name
Owner User Name
Activity Tree User Name
CIER
Machine Area
Indication of an ADO whose Idea Originator is not the same as its Machine Area
Indication of an ADO whose Idea Originator is the same as its Machine Area
Association of common-idea-tied Embedded and Foyered Activity Data Object expressions
Association of Parent to Child ADO expressions
Logical relationship path for ADO update
User drags A to B to create copy of A as an embedded child of B

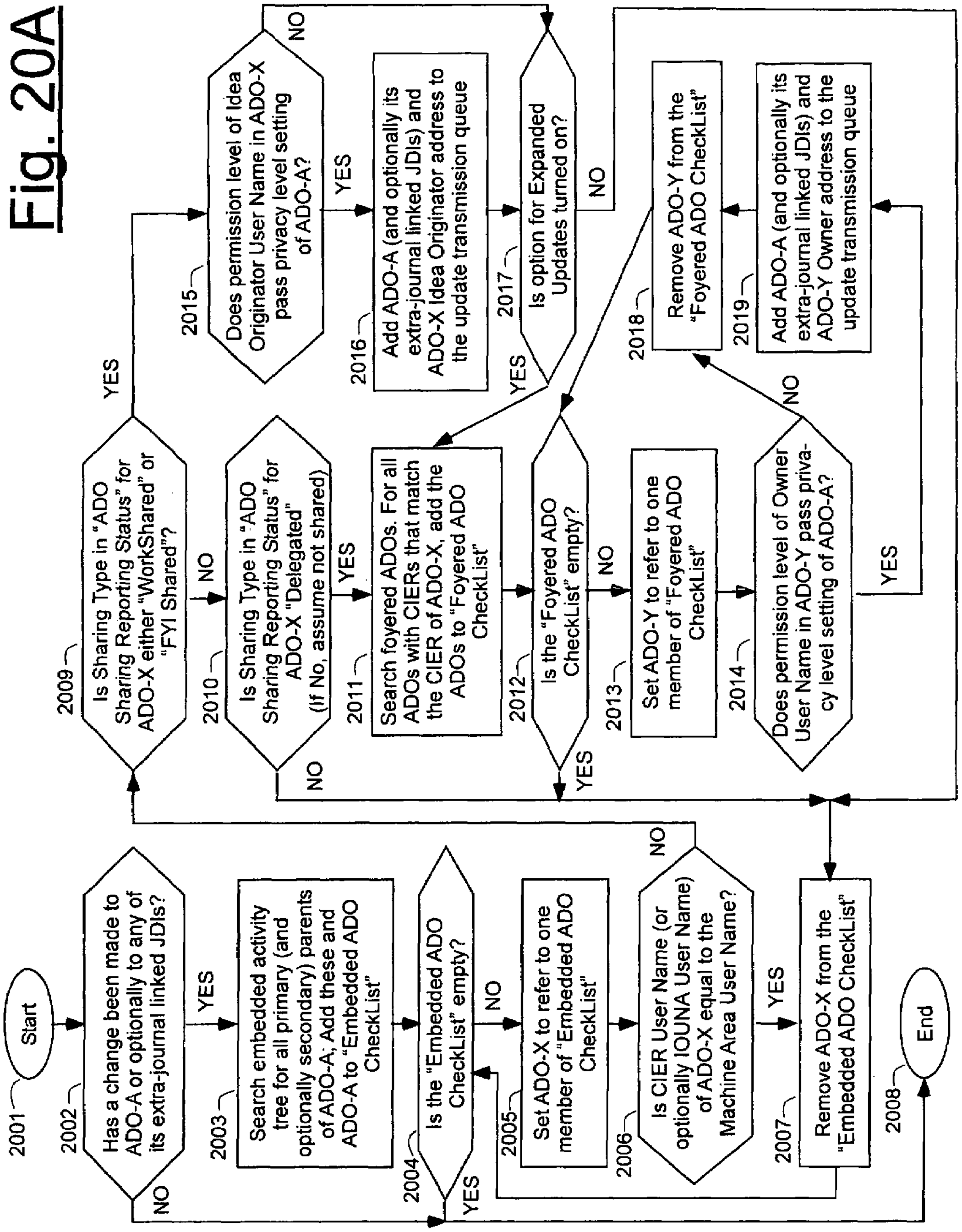
Fig. 20A
2001
Start
2002
Has a change been made to ADO-A or optionally to any of its extra-journal linked JDIs?
YES
NO
2003
Search embedded activity tree for all primary (and optionally secondary) parents of ADO-A; Add these and ADO-A to "Embedded ADO CheckList"
2004
Is the "Embedded ADO CheckList" empty?
NO
YES
2005
Set ADO-X to refer to one member of "Embedded ADO CheckList"
2006
Is CIER User Name (or optionally IOUNA User Name) of ADO-X equal to the Machine Area User Name?
YES
NO
2007
Remove ADO-X from the "Embedded ADO CheckList"
2008
End
2009
Is Sharing Type in "ADO Sharing Reporting Status" for ADO-X either "WorkShared" or "FYI Shared"?
YES
NO
2010
Is Sharing Type in "ADO Sharing Reporting Status" for ADO-X "Delegated" (If No, assume not shared)
YES
NO
2011
Search foyered ADOs. For all ADOs with CIERs that match the CIER of ADO-X, add the ADOs to "Foyered ADO CheckList"
2012
Is the "Foyered ADO CheckList" empty?
NO
YES
2013
Set ADO-Y to refer to one member of "Foyered ADO CheckList"
2014
Does permission level of Owner User Name in ADO-Y pass privacy level setting of ADO-A?
YES
NO
2015
Does permission level of Idea Originator User Name in ADO-X pass privacy level setting of ADO-A?
YES
NO
2016
Add ADO-A (and optionally its extra-journal linked JDIs) and ADO-X Idea Originator address to the update transmission queue
2017
Is option for Expanded Updates turned on?
YES
NO
2018
Remove ADO-Y from the "Foyered ADO CheckList"
2019
Add ADO-A (and optionally its extra-journal linked JDIs) and ADO-Y Owner address to the update transmission queue

2200

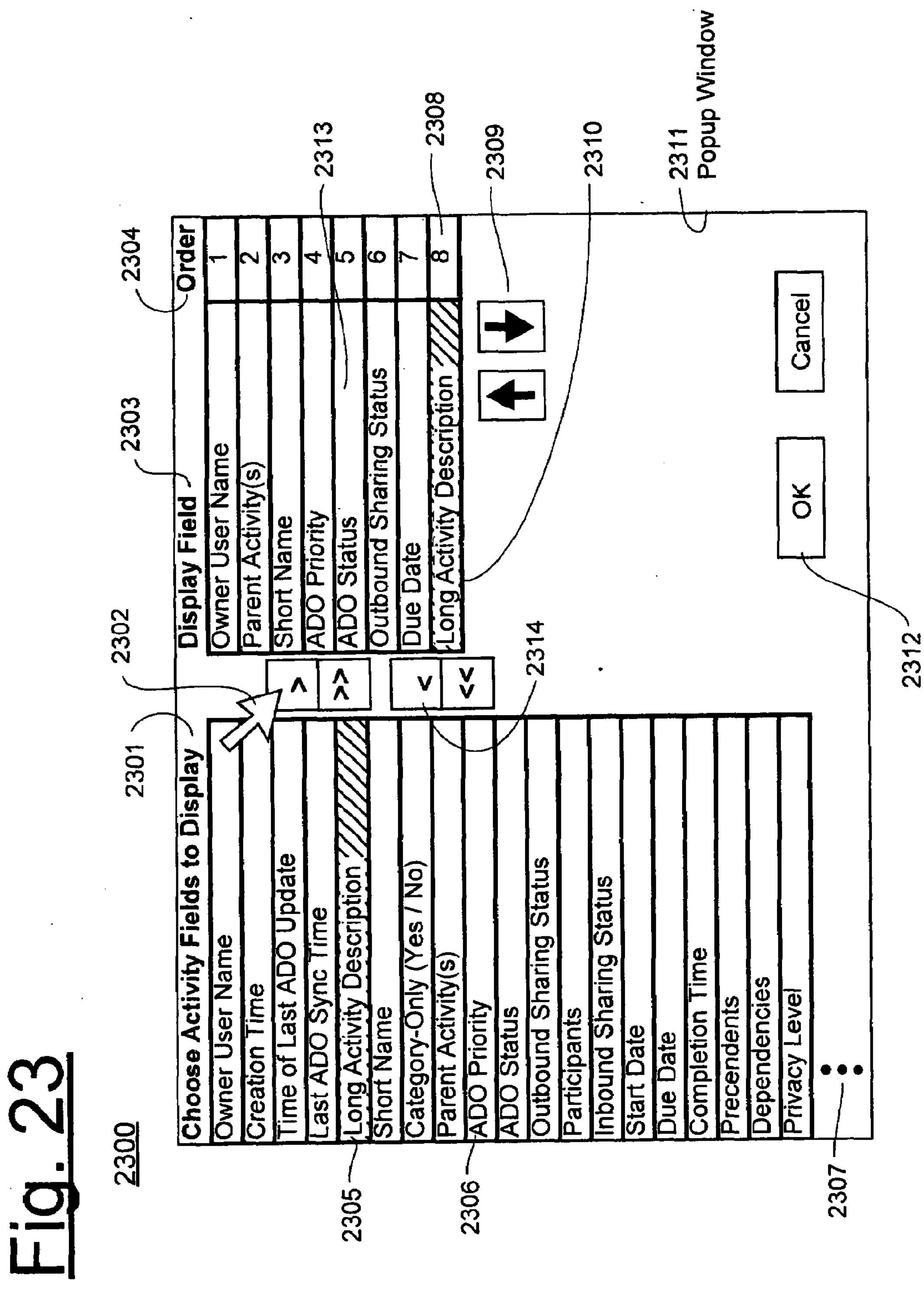
Fig. 23
2300
Choose Activity Fields to Display
Owner User Name
Creation Time
Time of Last ADO Update
Last ADO Sync Time
Long Activity Description
Short Name
Category-Only (Yes / No)
Parent Activity(s)
ADO Priority
ADO Status
Outbound Sharing Status
Participants
Inbound Sharing Status
Start Date
Due Date
Completion Time
Precendents
Dependencies
Privacy Level
Display Field
Owner User Name
Parent Activity(s)
Short Name
ADO Priority
ADO Status
Outbound Sharing Status
Due Date
Long Activity Description
Order
1
2
3
4
5
6
7
8
OK
Cancel
Popup Window
2301
2302
2303
2304
2305
2306
2307
2308
2309
2310
2311
2312
2313
2314

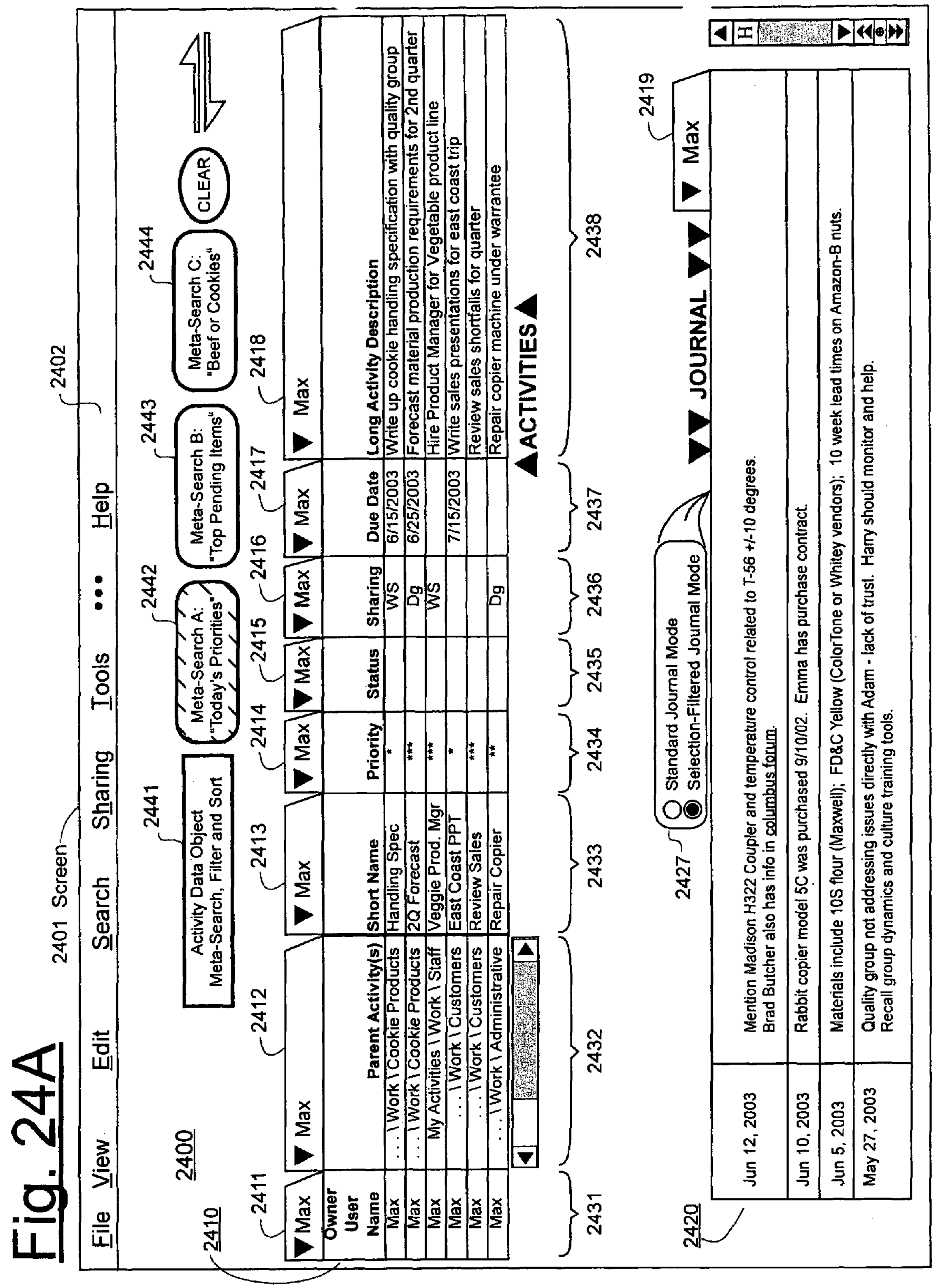

Fig. 24A
2400
2401 Screen
2402
File View Edit Search Sharing Tools ••• Help
2410
Activity Data Object Meta-Search, Filter and Sort
2441
Meta-Search A: "Today's Priorities"
2442
Meta-Search B: "Top Pending Items"
2443
Meta-Search C: "Beef or Cookies"
2444
CLEAR
2411 2412 2413 2414 2415 2416 2417 2418
Max
Owner User Name
Parent Activity(s)
Short Name
Priority
Status
Sharing
Due Date
Long Activity Description
Max ...\Work\Cookie Products Handling Spec * WS 6/15/2003 Write up cookie handling specification with quality group
Max ...\Work\Cookie Products 2Q Forecast *** Dg 6/25/2003 Forecast material production requirements for 2nd quarter
Max My Activities\Work\Staff Veggie Prod. Mgr *** WS Hire Product Manager for Vegetable product line
Max ...\Work\Customers East Coast PPT * 7/15/2003 Write sales presentations for east coast trip
Max ...\Work\Customers Review Sales *** Review sales shortfalls for quarter
Max ...\Work\Administrative Repair Copier ** Dg Repair copier machine under warrantee
ACTIVITIES
2431 2432 2433 2434 2435 2436 2437 2438
2427
Standard Journal Mode
Selection-Filtered Journal Mode
JOURNAL
2419
Max
2420
Jun 12, 2003 Mention Madison H322 Coupler and temperature control related to T-56 +/-10 degrees. Brad Butcher also has info in columbus forum.
Jun 10, 2003 Rabbit copier model 5C was purchased 9/10/02. Emma has purchase contract.
Jun 5, 2003 Materials include 10S flour (Maxwell); FD&C Yellow (ColorTone or Whitey vendors); 10 week lead times on Amazon-B nuts.
May 27, 2003 Quality group not addressing issues directly with Adam - lack of trust. Harry should monitor and help. Recall group dynamics and culture training tools.

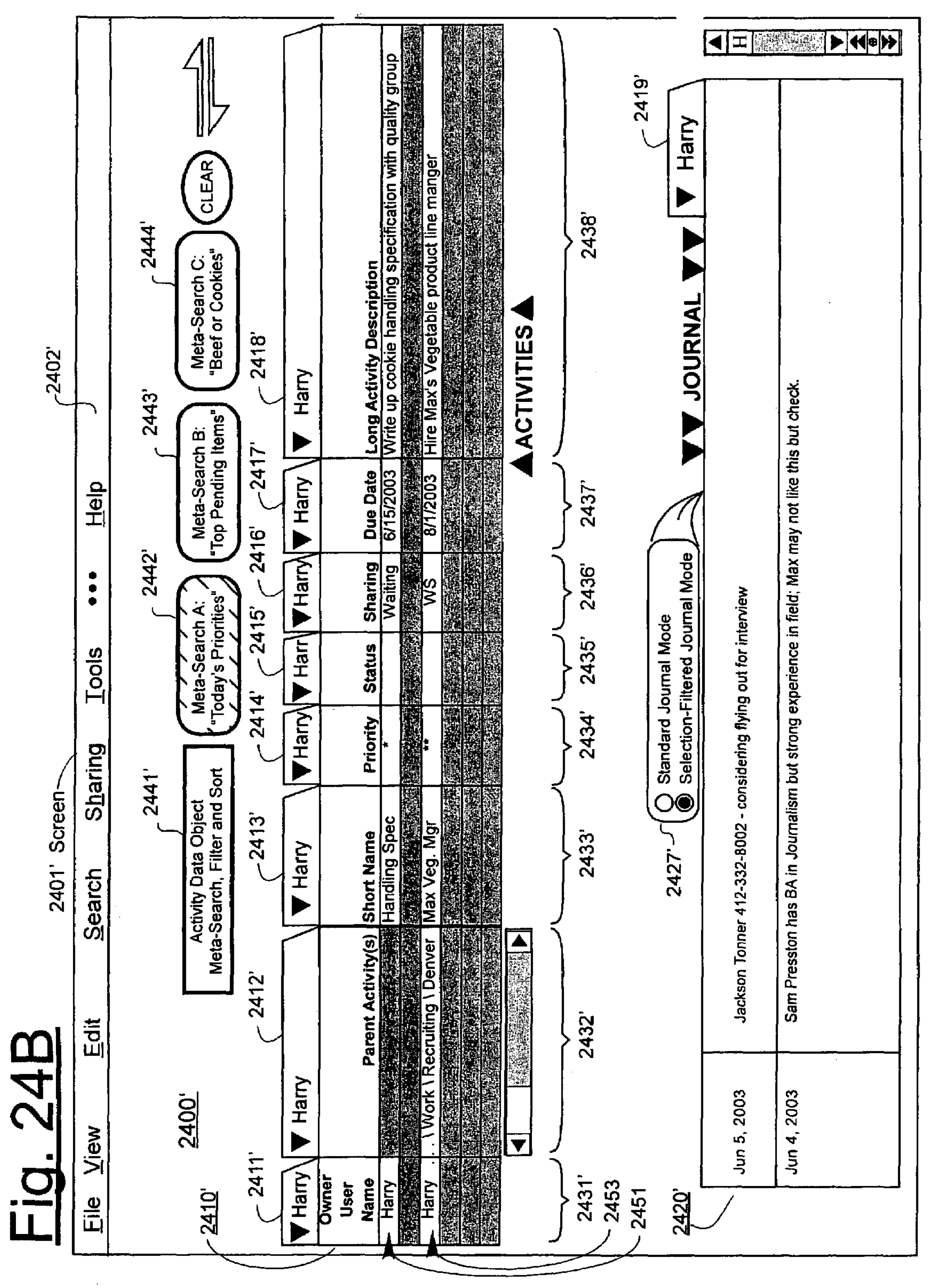
Fig. 24B
2400'
2401' Screen
2402'
File View Edit Search Sharing Tools ••• Help
Activity Data Object Meta-Search, Filter and Sort
2441'
Meta-Search A: "Today's Priorities"
2442'
Meta-Search B: "Top Pending Items"
2443'
Meta-Search C: "Beef or Cookies"
2444'
CLEAR
2410'
2411' 2412' 2413' 2414' 2415' 2416' 2417' 2418'
Harry
Owner User Name
Parent Activity(s)
Short Name
Priority
Status
Sharing
Due Date
Long Activity Description
Harry
Handling Spec
*
Waiting
6/15/2003
Write up cookie handling specification with quality group
Harry
..\Work \ Recruiting \ Denver
Max Veg. Mgr
**
WS
8/1/2003
Hire Max's Vegetable product line manger
2431' 2432' 2433' 2434' 2435' 2436' 2437' 2438'
2453
2451
ACTIVITIES
JOURNAL
2427'
Standard Journal Mode
Selection-Filtered Journal Mode
2419'
2420'
Jun 5, 2003
Jackson Tonner 412-332-8002 - considering flying out for interview
Jun 4, 2003
Sam Presston has BA in Journalism but strong experience in field; Max may not like this but check.

MACHINE-IMPLEMENTED ACTIVITY MANAGEMENT SYSTEM USING ASYNCHRONOUSLY SHARED ACTIVITY DATA OBJECTS AND JOURNAL DATA ITEMS

CROSS REFERENCE TO RELATED APPLICATIONS

This application is a continuation of U.S. application Ser. No. 11/708,106, filed Feb. 16, 2007 (U.S. Pat. No. 7,624,125), which is a continuation of U.S. application Ser. No. 10/782,414, filed Feb. 18, 2004 (U.S. Pat. No. 7,197,502), which are incorporated herein by reference in their entireties.

The disclosures of the following U.S. patents are incorporated herein by reference:

(A) U.S. Pat. No. 6,343,275 issued Jan. 29, 2002 to Charles Wong and entitled "Integrated business-to-business web commerce and business automation system"

In order to avoid front end clutter, this cross referencing section (2) continues as (2a) at the end of the disclosure, slightly prior to recitation of the patent claims.

FIELD OF DISCLOSURE

The present disclosure of invention relates generally to computer-assisted development and tracking of activities and/or activity specifications such as may be used by individuals and/or corporate management when keeping track of projects, activity allocations and activity completions.

The disclosure relates more specifically to an activities development, cataloging and/or organizing system which may be used in stand-alone computers by individual developers as well as being used in network-interconnected machines by activity developers who are sharing ideas and/or work product. The disclosure focuses on systems that may be used by people who have different points of view, different needs, different goals, different actualization options and/or different understandings and where the users may nonetheless agree to cooperate in respective subsets of shared work product, or shared thought product.

DESCRIPTION OF RELATED ART

Countless types of manual and automated tools already exist for helping business managers and/or individuals to organize their own activities and/or the activities of others.

An example of a simple, manual tool is the paper calendar book. Room is provided in it for making daily journal entries so a user can record what the user plans to do on a given future day, or what he/she has done recently. Examples of more complex tools include charting software programs that assist corporate managers in filling out detailed "to-do" lists and in keeping track of their own progress or that of others in accomplishing goals. The automated tools can be in some ways superior to the manual ones because most automated tools provide ways to dynamically adjust information, quickly sort items in some basic manner according to some priority or other sort criteria, and/or efficiently copy over electronic data items from previous days of activity for use in a current period of activity.

Beyond the automated "to-do" lists there are yet more elaborate software systems that try to integrate the disparate operations of many different departments in a large corporate organization. By way of example, U.S. Pat. No. 6,343,275 contains over 100 drawings for describing an elaborate system described as an "Integrated Business-to-Business Web Commerce and Business Automation System". The author of the U.S. Pat. No. 6,343,275 patent acknowledges that in complex business transactions, different groups of people get involved and very often the right hand does not know what the left hand is doing. This is due to failures in communication between one corporate department and the next (between different "domains"). Although the Biblical, Tower of Babel story is an ancient one, it is still something that plagues mankind, especially when international cooperation is attempted.

Each person can think differently. Despite the plethora of available activity-organizing tools and corporate-intercommunication tools, there is no set of automated tools that allow for easy collection of random electronic data items and association of those random electronic data items with structured activities so that the random electronic data items can be easily retrieved at a later time when it might be useful for further developing or implementing a structured activity. There is no set of automated tools that support teamwork yet easily adapt themselves to the unique preferences of each individual user (e.g., to the needs of a particular "sales" person as opposed to the needs of a particular "engineering" or "accounting" department person or to the needs of another, individual sales "person" as opposed to the needs of the first sales person). There is no set of automated tools that support a comprehensive activity management capability yet easily adapt to the unique environments which an individual user may find him or herself in as that individual user moves about, for example from a location that has full network access capabilities (e.g., a WiFi hot spot) and maximal computing power availability to a location that has limited or no network access capabilities and/or which makes available only computing resources of comparably reduced processing capabilities (e.g., the user is limited to using a low-power handheld device as opposed to a full power, engineering workstation on a desktop). There is no set of automated tools that allow for easy entry, development, and sharing of everyday thought product among unique individual users and easy tracking of agreements and accomplishments.

INTRODUCTORY SUMMARY

Structures and methods may be provided in accordance with the present disclosure of invention for improving over the above-summarized shortcomings of prior, automated tools for activities development, organizing and/or tracking.

(A) More specifically, in accordance with one aspect of the present disclosure, techniques are provided for allowing one or more of the following machine-implemented processes to take place:

(A.1) The developing and exchanging of organized expressions of activity ideas between users is made easier, where the developed and shared expressions can be organized relative to one another according to each user's preferences, and where each expression of activity ideas can describe one or more ideas about a corresponding activity according to each user's preferred way of describing that activity. In one embodiment, a so-called Activity Data Object (ADO) is used in an automated machine system to express ideas about a respective activity or subactivity. Each Activity Data Object may identify the corresponding developer/owner of the ADO, indicate an Active or other status for the underlying activity, and/or its development, indicate a work sharing agreement if any was or is being established with other users, indicate a priority given to the described activity, and/or indicate other structured attributes that may be desired by a given user of the system for expressing ideas about the underlying activity and/or its development and/or implementation.

(A.2) The collecting of unorganized or organized data items for supporting development of organized activity descriptions is made easier. In one embodiment, a so-called Journal Data Item (JDI) is used in an automated machine system to indicate ideas that are relatively unstructured and which may or may not be used in support of one or more ADOs. Provisions are made in one embodiment for optionally linking selected ones of the supporting journal data items to corresponding, Activity Data Objects (ADO's). The collected, unorganized and/or organized journal data items may then be conveniently retrieved when a corresponding Activity Data Object is referenced for review or refinement.

(A.3) Mappings are enabled between one user's organized descriptions of a set of given activities and another user's possibly different description and organization of corresponding activities.

(A.4) Sharing of thought-product with others on a For-Your-Information basis is enabled so that voluntary cross pollination can occur.

(B) For one embodiment in accordance with the present disclosure, each organizable Activity Data Object (ADO) includes one or more of: (b.1) a reference to a primary parent Activity Data Object (parent1-ADO); (b.2) One or more references to corresponding, primary child Activity Data Objects (child1-ADO's), if any, of the given ADO; (b.3) a description of a corresponding activity, which description can be according to description preferences of the user who owns the given ADO; (b.4) an identification or reference of some kind regarding the originating idea, or original idea expression, of the given ADO; (b.5) an indication of an Active, or other, status for the given activity or its development; (b.6) an indication of a work sharing agreement, if any, established between the object owner and other users; and (b.6) an indication of a priority given to the described activity by activity data object's owner.

(C) For one embodiment in accordance with the present disclosure, each Journal Data Item (JDI) may include one or more of: (c.1) an entry time indicator that indicates when the journal entry was made; (c.2) an indication of a data type for the correspondingly entered, journal data item such as text or other; (c.3) a reference to the corresponding data item; (c.4) references to one or more associated, Activity Data Objects (ADO's), if any;

Other aspects of the disclosure will become apparent from the below detailed description.

BRIEF DESCRIPTION OF THE DRAWINGS

The below detailed description section makes reference to the accompanying drawings, in which:

FIG. 6A is a schematic diagram showing a user interface presentation in accordance with the disclosure which simultaneously presents to a given user his/her (or someone else's) expressions of hierarchically organized activity nodes and/or associated journal data items, where the illustrated presentation of the journal is provided under an optional, selection-filtered mode;

FIG. 6C is a schematic diagram showing a user interface presentation in accordance with the disclosure which simultaneously presents to a given user his/her (or someone else's) expressions of hierarchically organized activity nodes and/or associated journal data items in an optional unfiltered mode, while also indicating linkages that have been made visible by the machine between displayed parts of structured activity data objects and displayed journal data items;

FIG. 6D is a schematic diagram showing a user interface presentation in accordance with the disclosure which simultaneously presents to a given user his/her (or someone else's) expressions of hierarchically organized activity nodes and/or associated journal data items in an optional selection-filtered mode, while also indicating linkages that have been made visible by the machine between structured activity data objects and journal data items in response to the selection-filtered mode;

FIG. 7 is a diagram showing a possible set of sharing states between 3 users and how such sharing states might be summarized in a presentation of the corresponding, structured activity data objects;

FIG. 9B is a diagram showing a possible data structure for a Journal Data Item (JDI) in accordance with the disclosure;

FIG. 10 is a diagram showing a possible physical data structure for a journal that may include one or more Journal Data Items (JDI's) in accordance with the disclosure;

FIG. 12A is a diagram showing a possible data structure for an Activity Data Object (ADO) in accordance with the disclosure and further showing a simple interrelation between a primary parent Activity Data Object, a corresponding primary child activity data object, and possibly associated, journal data items;

FIG. 18B is a schematic showing how explicitly shared activities and/or associated journal data items can be shared in a possible Delegated mode, and how the different machine areas may contain various representations thereof;

FIG. 20A is a flow chart diagram showing a machine-implemented process for determining which other users should receive update information when an explicitly shared activity data object (ADO) and/or a corresponding JDI has been modified by its owner;

FIG. 23 is a diagram showing a possible user interface for a user to indicate his preferred set and order of activity description attributes, and to thereby cause his system to present a tabular or spreadsheet presentation of activity description expressions accordingly;

FIG. 24A is a schematic diagram showing a user interface presentation in accordance with the disclosure which simultaneously presents to a given user his owned expressions of activity descriptions and/or associated journal data items, where presentation options are provided for presenting rows and/or columns of activity description expression values according to their or others' owned activity description expressions;

FIG. 24B is a schematic diagram showing a user interface presentation in accordance with the disclosure which simultaneously presents to a given user a different user's expressions of activity descriptions and/or associated journal data items, where presentation options are provided for presenting rows and/or columns of activity description expression values according to their or others' owned activity description expressions;

DETAILED DESCRIPTION

Figure 1:
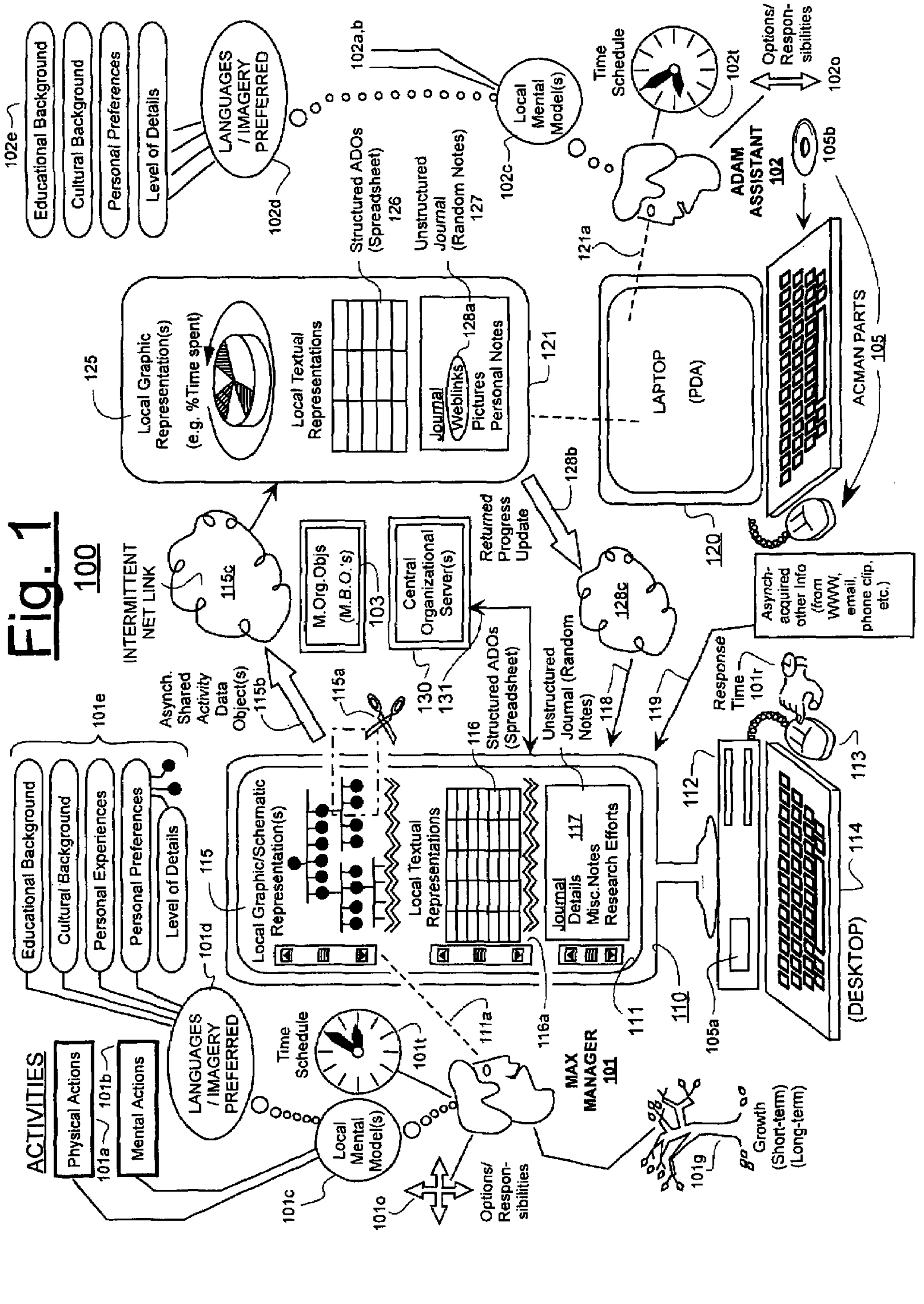
FIG. 1 is a schematic diagram showing an environment in which two unique individuals (users) develop activity plans of their own and optionally share electronic data items about parts of their plans and/or accomplishments with one another.

FIG. 1 is a block diagram of an activities-plan development and sharing environment 100 which may incorporate one or more aspects of the here disclosed invention. For simplicity sake, just two individual users, 101 and 102, are initially shown to be interacting with respective parts 105*a*-105*b* of an Activities Coordinating & Management software system (ACMAN system) 105 that is provided in accordance with the present disclosure in respective machine areas of the users. In the illustrated example, the first and second software parts 105*a*-105*b* are provided at least partially within respective first and second computers 110 and 120 although they could have been provided in different user's accessible machine areas of a same computer or another kind of data processing machine.

A first of the illustrated users, 101 is shown utilizing desktop computer 110 as his respective machine area while the second user, 102 is shown employing laptop computer 120 as part of his respective machine area. (Each user's machine area can include one or both of local and remote storage resources as shall be later seen.) The first and second software parts 105*a*-105*b* may operate independently or they may asynchronously communicate with one another as shall be further detailed below. There can be many more participants beyond 101-102 and many more inter-connectable software parts beyond 105*a*-105*b* as will become apparent shortly. (See briefly, FIG. 4.)

An important aspect of the present disclosure is that of recognizing each human being as being an individual person and not merely a ubiquitous, interchangeable entity (not just as a generic "user"). In order to assist in this recognition, the present disclosure gives the first user, 101 an exemplary name: Max Manager. The second user 102 is also given a name: Adam Assistant. These stereotype-propagating designations (supervising "manager" and subordinate "assistant") are used here merely to provide readers with a quick frame of reference. The manager and assistant designations are just two of an innumerable set of designations that may be given for describing possible human-to-human relationships among participating users of the disclosed ACMAN system 105. Any other designation may be used to describe plural users such as 101 and 102. The users could instead have been described as peers, or as random teammates participating in one or more group activities wherein different participants take on temporary leadership roles for the corresponding group. The users could even be described as persons who have no clearly defined, hierarchical relationship with one another. (E.g.: They could be strangers who just met on the Internet, who happen to have intercommunicative software parts 105*a*-105*b*, and who agreed to exchange some expressed ideas by use of computer-usable data signals that are to be exchanged between software parts 105*a*-105*b* through signal transmissions made over the Internet communications or otherwise.) Incidentally, each of the so-called software parts 105*a*-105*b* may be constituted by manufactured instructing signals and/or manufactured data signals (e.g., code plus data) that is operatively coupled to a corresponding instructable machine (e.g., computer hardware) for carrying out machine-implemented operations described herein. Each user may have his/her own private machine area for storing the user's data and/or machine code, or users may have overlapping access to parts or all of each others machine areas.

Let us focus first on Max 101 and on our growing appreciation that this "user" is actually an individual person who may have unique likes, dislikes and needs. Max may have a certain set of "activities" ongoing or developing within his life. (See briefly FIG. 4.) One example of an activity developing in Max's life can be a new project that Max is working on at his job. More broadly, an activity can be almost any mental or physical action or a combination of both. Breathing is an activity. However the present disclosure will be focusing on voluntary activities (i.e., not breathing), and more particularly on activities which self-justify themselves to Max as being worthy of his spending some time to think about them and to record them in his ACMAN system. Such activities may also self-justify themselves enough to plan them out with some degree of specificity, and perhaps to physically act on such worthwhile activities in some substantial way. (The categorizing of other activities is itself an activity, and as will be seen in the below details, a user may create an activity description where the name of the activity (e.g., All_My_Work_Activities) inherently categorizes the subtasks, or hierarchical children, of that parent activity.)

FIG. 1 indicates that Max's activities may be distributed along a spectrum having at one end, purely physical actions 101*a* and having at an opposed other end, purely mental actions 101*b*. In the context of the present disclosure, most of Max's activities will be a mix of both physical and mental actions, each having some element of precognition and some element of physical actuation (e.g., clicking a keyboard key is physical). Many of Max's pre-cognated activities (101*a*-101*b*) will be "based" on some sort of local, mental model or models 101*c* which Max may have pre-established or may be continuing to develop in his own mind. The models 101*c* are unique to Max. Adam Assistant 102 can have his own unique model(s) 102*c* which are unique to Adam.

Max, incidentally, does not have to be a male person. She 101 could have been a female. The male identity was chosen merely as yet another stereotyping convenience. The same applies to the gender of Adam 102 and/or other players 403-404 (FIG. 4) who will be later introduced.

It should be rapidly becoming apparent from the above that the present disclosure intends to view each player (101, 102, etc.) as a unique individual and as a person who may elect to use the to-be-described, software system 105 (e.g., ACMAN) in a very uniquely personal way. The present disclosure recognizes that each user 101/102 is entitled to have his or her own unique set of local mental model(s) 101*c*/102*c* and ideas about how the world is to be appreciated. One person may choose to see things on an enterprise wide or global scale and to interrelate concepts on such a grand scale. For example, that first person may ask himself: "How does the recent action by my nation's Government affect international trade and how does it affect my local operations and future plans? How does it affect Major Organizational Objectives, also known as Management By Objectives (MBOs) 103 of my organization?" Another person may prefer to think about certain items in a very compartmentalized way. For example, that second person may ask himself: "How does recent local news about the ABC town project affect my job in department DEF of company XYZ?" Neither of the global and local approaches is right or wrong, or more noble than the other. It could be that the first person, i.e. Max, in his managerial role, has a broader set of responsibilities and/or action options 101*o* than the options 102*o* that are presently available to the second person, i.e. Adam in his assistant's role.

Things could change rapidly however. Adam may shift into a position of greater responsibilities and/or wider action options. Max may switch his focus to new areas. The respective software parts 105*a*-105*b* of each user should be able to correspondingly grow and/or change to adapt to the personal needs and/or desires of their corresponding users (101, 102) over time. Each participant should be allowed to develop his/her own perspective about how matters should be organized, prioritized, described, and/or otherwise managed. Personal perspectives can grow, shrink, evolve and/or refocus into new areas over time as shall be detailed below. Environment 100 may be constantly restructured to accommodate the changing options 101_o_-102_o_ available to the respective users, the changing mental models 101_c_-102_c_ of each user, and the hardware/software resources 110-120 available to each respective user 101-102 as that user moves about.

The local, mental model(s) 101_c_/102_c_ of each user may be preferentially formulated under one or more different languages. Max 101, for example, may prefer to read and think in American English (or alternatively in British English). Adam 102 may prefer to read and think in Japanese. In our example, Adam can read and speak in English, but he prefers to work in Japanese. Max does not understand Japanese too well but has a crude working knowledge of that language. If Max Manager (and/or the system 100) were to force Adam to work in English whenever Adam uses an available computer, say laptop 120, Adam could do so. But in doing so, Adam (102) may become frustrated, less efficient and/or less creative than he would have been had he instead been allowed to use his language preference, Japanese. Similarly, if Max were forced to review Adam's work product only in the Japanese language, Max's efficiency and productivity may suffer. The here disclosed system 105 allows each user to work in his/her language(s) of preference—provided that is, that the locally used computer (110 or 120) supports that/those language(s). The here disclosed ACMAN system 105 also allows each user to maintain cross-referencing translations (see briefly 263 of FIG. 2) of a co-worker's work product if that work product is shared. Thus each user is empowered to work in the language environment he/she prefers and each user can create cross-referencing translations of another worker's contributions. As will be seen, a worker who maintains a cross-referencing translation can show that cross-translation to the originator of the work product so that each of sharing users can better verify what the other user understands the work product to be. In other words, Max may allow Adam to look at Max's translations of Adam's terminology so that Adam can provide feedback on how accurate those translations appear to be. Max may then modify his translations in response to Adam's feedback. This helps to cure the Tower of Babel problem.

In one embodiment, Adam may work in Japanese, and a software automated translation of Adam's work product may be optionally presented to Max as shared work product. The original and automatic translated expressions may optionally be incorporated into a cross reference dictionary shared by Max and Adam. If desired, Max can also view the work product in Adam's native language if his computer supports that language font. In this way, Adam can work in his own native language, yet Max can view Adam's activity in Max's language with no manual effort required to translate Adam's work.

Language is just one example of personal work-style preferences. There are many other factors that may affect user productivity, creativity and/or satisfaction. Max may be a verbally-oriented person who likes to see everything in writing and/or who likes to hear about things in spoken form. On the other hand, Adam may be a visually-oriented person who likes to work with complex graphics, such as flowcharts, schematics, and graphs. The here disclosed, ACMAN System 105 allows each user 101/102 to work with the various languages of choice and/or other forms of expression that he/she personally prefers, including graphic expression (visual), auditory expression (sound), kinesthetic expression (e.g., sign language, video, etc.), and so forth. There is of course one proviso, namely, that the respective computer 110/120 being used by the given user supports the personally-preferred one or more modes of expression or imagery 101_d_/102_d_ that the user likes.

New forms of expression are often developed by artisans in the computer arts and thereafter adopted by computer users. There is a broad spectrum of available choices currently and more expected to come in the future. Examples of expression types include the options of expressing ideas as simple text (e.g., .txt files), or as simple graphic bitmaps (e.g., .bmp files), or as combinations of these, or as mark-up language formulations (e.g., .html files or .xml files), or as color animations with sound and/or other sensory inputs (e.g., haptics), and so forth. The present disclosure contemplates a system environment 100 that can grow to accommodate new types of computer-supported expression as such develop. By way of a concrete example, it has been proposed that computers could be used to transfer impressions of touch, smell and/or taste over a network. If Max and Adam were in the food business and they wanted to share certain understandings about a new food products menu they were co-developing, and they where sharing their work ideas via the transmission of computer-usable signals, then the software of system 100 may be expanded to accommodate the handling of expressive signals for such sensory concepts. Incidentally, in the examples given here, it will turn out that Max and Adam are indeed in the food business. They both work for a fictitious company called IFWC (International Food Wholesalers Corp.). See briefly item 430 of FIG. 4.

Referring still to FIG. 1, there can be much more to personal preferences than merely the choice of language(s) and/or of format(s) of expression. Differences can exist between how each person chooses to organize and describe various items, or objects, or objectives, or ideas within his/her personal mental model 101_c_/102_c_ of things. Max (101) may have formal training in financial matters and may prefer to structure his thoughts under a finance-world model, say for example, by ordering items into a balance sheet format which has assets, liabilities and equities as its major sections. Adam (102), on the other hand, may have formal training in the sciences and may prefer to structure his thoughts under a scientist's-world model, say for example, by ordering work projects as belonging either to a food-chemistry category or to a food-packaging category. When Max and Adam start exchanging ideas with one another, it is easy to see how a Tower of Babel problem can easily arise. (Each participant 101/102 may fail to clearly and fully understand how the other is structuring his thoughts.) The here disclosed Activities Coordinating & MANagement software system (ACMAN system) 105 can include mechanisms for helping each user to better understand the other in this regard.

The forms of imagery, expression, model structuring, etc. (101_c_/101_d_, 102_c_/102_d_) which each user may prefer to work with can depend on a complex set of variables beyond language and educational background. The individuality-establishing variables (101_e_) can include the person's cultural background. People from different cultures may have different approaches to how they think about things. The ACMAN software package 105 respects such diversity. A person's personal experiences may affect the local mental models 101_c_/102_c_ which they bring with them to the arena when those people first start to interact. The combination of past personal experiences, original mental models 101_c_/102_c_ and newly-experienced interactions (115_b_, 128_b_) may determine how each person's model(s) 101_c_/102_c_ evolves going forward into the future. The disclosed ACMAN System 105 can include mechanisms for helping each user to learn from others and develop more sophisticated understandings of matters and to incorporate representations of such more sophisticated understandings into their local, computer-held models (e.g., into tree structure 115 of FIG. 1). The disclosed ACMAN system 105 allows each user to determine his/her level of preferred resolution. Max may like to have very detailed expressions of all his ideas (see spreadsheet 116) while Adam prefers less detail. (Compare for example, Adam's spreadsheet at 126 versus Max's at 116.) A single, well chosen word or phrase is sufficient for Adam. The system 105 respects each user's preferences. The system allows for the inclusion of detailed, background or support data in an unstructured, but possibly chronologically-sortable journal (see briefly 820 of FIGS. 8 and 620' of FIG. 6B) to be associated (871) with any structured Activity Data Object(s) (871*b* and 872*b*). (Note Max's journaling of his Research Efforts in box 117). The system at the same time allows for use of short activity descriptors (see briefly 1234 of FIG. 12A) so that tree representations of several hierarchically related Activity Data Objects can be graphically represented (see briefly 810 of FIG. 8).

More to the point, FIG. 1 shows Max 101 viewing (111*a*) an on screen presentation 111 provided by his desktop computer 110. The desktop computer 110 may be configured in accordance with the present disclosure to present, among other things, a structured graphical presentation 115 of projects, tasks or other activities which Max may be working on and how they interrelate to one another on a hierarchical and/or other basis. The display 111 may alternatively or additionally present local textual representations 116-117 of matters which Max 101 is working on. For example, one local text representation may be structured as a spreadsheet 116. Another local textual representation may be items in an unstructured journal 117 that belongs to Max. The illustrated example at 117 indicates that among the unstructured entries made into the Max's journal there can be random and detailed personal notes, details about research efforts, pointers to specific email messages in Max's email application, data copied from the Internet or hyperlinks to Internet locations, or any electronic data items in any data format, not necessarily limited to text, that a user might wish to include in his unstructured daily journal. The journal might be thought of as the electronic equivalent of a notebook or daytimer booklet that many people carry around with them and use on a daily basis. The relatively unstructured nature of the journal data items (117, 127) invites use because the user is not forced to engage in any data-organizing actions at the time the entry is made. The user can type, electronically scribble, copy and paste, or simply drag and drop the electronic data item into the journal area (see briefly 901 of FIG. 9A) and forget about it. The user can freely insert unrelated notes without concern for how they may become useful or how they may relate to one another. The determination as to which may be useful and which relate to what one or more ADOs can occur much later, on an as needed basis. Perhaps the user (Max or Adam) does not have time to do more at the moment than save miscellaneous pieces of found electronic data items into his journal on an as-found basis. Later, the user may revisit the one or more recorded journal data items and develop it/them some more. The user may use one or more journal data items as a foundational basis on which to create new activity data objects or modify existing activity data objects (represented by the darkened circles in 115). The user may use one or more journal data items as supporting information for implementing one or more of his planned activities. FIG. 6A-FIG. 6D, FIG. 24A, FIG. 8, FIG. 9A, and others embellish this concept of the unstructured journal versus the structured ADOs in more detail and will be covered later in this disclosure.

Max's desktop computer 110 is shown to have a full-size keyboard 114 which allows him to easily make text entries into his journal 117. The computer may further include a mouse 113 and/or other graphical user input devices which allow Max to easily select certain areas (e.g. 115*a*) of his local presentation and/or to make changes to graphical objects 115 displayed on that presentation 111. Max may use the mouse (113), the keyboard (114) and/or a microphone and/or other user interface devices (not shown) for inputting electronic data items and/or activity descriptions of various formats and/or data types, as well as for scrolling (e.g., by using bar 116*a*) and/or otherwise navigating through data that can be shown on the screen 111. The possible user interface devices can include other devices not yet in wide use or even invented yet—for instance there are devices that allow a user to write on a paper pad and then automatically translate those physical scribblings into electronic data items on a data processing machine, and such a device, or others, might be incorporated into use as an input device to the ACMAN system. Max may use his user interface devices for activating on-screen drop-down menus and/or other such tools (not shown). Max's, managerial-level computer 110 is understood to have relatively maximal computer processing power and maximal connection availability to the Internet (115*c*) and/or to various extranets and/or to various corporate servers (130). As such, when Max is at his desktop computer 110, Max has relatively fast access to a wide range of computing and data resources. (It is understood that any one or more of the networks may become temporarily inoperable or that MAX may elect to temporarily decouple his machine area from one or more of the networks.)

The total and persistent network access condition is not always true. Max 101 is not always in his office and/or nearby his desktop computer 110. Sometimes Max is traveling on the road with a laptop computer or a handheld computing or another mobile device. At those times Max may not always have full access to the Internet 115*c* and/or to other data resources (130) which Max may be accustomed to. Sometimes, Max may only have an audio tape recorder at his disposal, or a paper napkin on a restaurant table. That does not mean that Max has to then stop thinking (101*c*) of new ideas. That does not mean Max needs to stop recording his thoughts in some fashion so that Max can thereafter gainfully use his recorded expressions. A system is needed wherein Max can easily transfer his on-napkin scribblings or other expressed ideas into computer system 110 and thereafter make gainful use of those recorded expressions. A system is needed wherein Max can manage his short-term and long-term development goals 101*g*. A machine system is needed which accommodates Max's busy time schedule 101*t* and serves him rather than taking away from his time and making him a slave to the machine system. (It is unwise to have a system where response time 101*r* to user actuations is slow because every transaction with the local machine 110 includes a wait for a network transaction e.g., 131 to complete.) A machine system is needed which custom fits Max's uniqueness. At the same instance, a system is needed which custom fits Adam's unique time schedule 102*t* and Adam's modeling preferences 102*d*-102*e*.

More to the point, because each of Max and Adam is a unique individual, there may be correspondingly unique ways in which Max/Adam prefers to express his respective ideas and present them back to himself (111*a*/121*a*) so he can develop them further or pass on some of his self-expressed ideas to others for those others to work on. Due to his personal background (101*e*), Max may prefer to work with a graphical and detailed hierarchical tree structure such as is schematically represented at 115. Adam may prefer a pie-chart 125. Additionally or alternatively, Max may prefer to work with a complex spreadsheet such as is schematically represented at

116. Adam may prefer a simpler table format 126. Additionally or alternatively, Max may prefer to have some of his expressed and evolving ideas (e.g., Research Efforts) strewn randomly, chronologically or in some other organized and searchable fashion within a free-form personal journal 117. Adam may have a similar journal 127 that is organized on a different, free form basis.

The local presentations 111 on computer 110 may suit Max perfectly well. Consider however what happens when Max Manager wishes to transmit at least a small part 115*a* of his expressed ideas (his recorded thought-product) to Adam Assistant (102) so that Adam may understand it and/or further work on the underlying ideas. In one embodiment, the transmission comes in the form of one or more asynchronously shareable signal packets referred to herein as Activity Data Object(s) (ADO(s)) 115*b*. Max may choose to include just one or a group of several such Activity Data Objects to transmit to Adam (or more correctly to a machine storage area that is accessible by Adam). How is Adam to manage with Max's preferred way(s) of expressing activity ideas by way of expression form 115*a*? Adam is a unique individual who may have his own ways of modeling (102*c*) the world. Adam may have a completely different educational background (102*e*) and different personal preferences and use of languages and imagery (102*d*). Adam may prefer to (or may be forced to) use a laptop computer 120 with less computing power and/or less access to corporate internal resources (130) and/or public external resources than those available on Max's computer 110.

Adam may have his own unique preferences for how various ideas about activities or other things are presented (121*a*) from his computer 120 to himself. For example, Adam may prefer to use pie-chart presentations such as shown at 125 (or quickly viewable bar graphs) rather than the complex hierarchical tree structures shown on Max's computer at 115. Perhaps this is so because in Adam's work domain the same type of activities are performed repetitively over and over again at a fast pace and in the sequence expressed by the pie chart. Adam may be mostly interested in knowing what percent of time and/or other resources is/are expended in performing each of those consistently repeated tasks. In such a case, it makes perfect sense for Adam 102 to view those tasks as belonging to a circular pie-chart-like model (125) or bar graph rather than as being part of a more complicated and ever-growing tree format (115). Adam may have a less complex spreadsheet 126 for representing to himself the projects he is working on. The columns and rows of Adam's spreadsheet 126 may have several different labels than those of the more complex spreadsheet 116 used by Max. Adam may also have different ways of expressing things in his local journal 127. Adam's vocabulary may be quite different than Max's.

Figure 15:
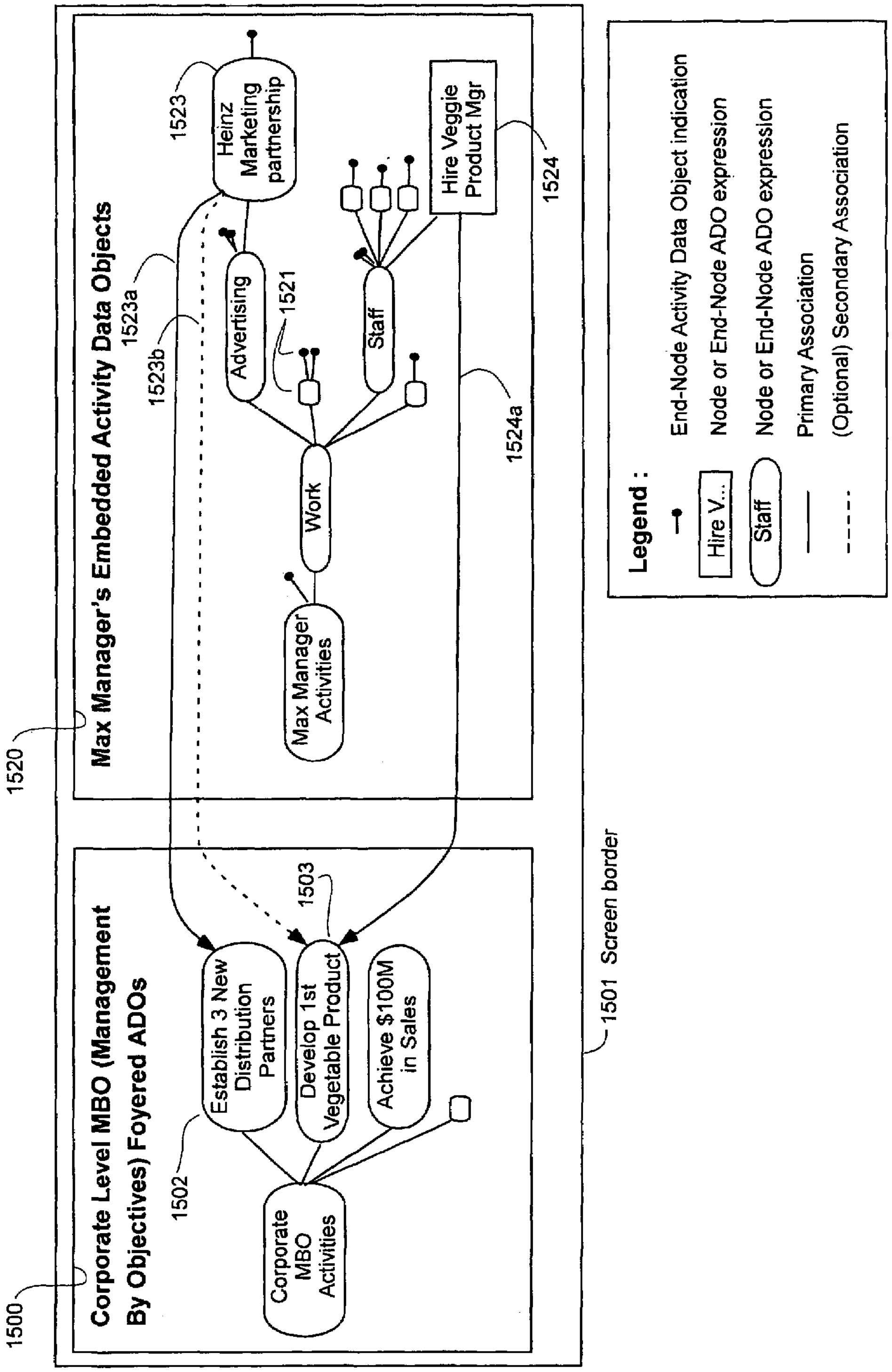
FIG. 15 is a schematic diagram showing how various embedded ADO's in a given user's machine area (Max's) may be logically linked to a set of corporate or other foyered ADO's.

Adam may also have his own unique preferences for how various ideas about work activities or other things are organized or described. Briefly, as shown in FIG. 15, Max may have created an activity-describing expression "Hire Veggie Product Manager" 1524 and may have hierarchically positioned that expression (e.g., as an ADO) within Max's own organized set of other activities, as shown in area 1520. Because of his view of the world, Max may have established his own hierarchy of activities within which this new "Hire Veggie Product Manager" activity fits. He might decide to asynchronously share this activity idea with Harry H. Resources (briefly, see FIG. 16A), who is in the Human Resources department. "Harry HR" as we'll call him, is using an ACMAN system, and the system might automatically record a possibly derived copy 1616' (briefly, see FIG. 16B) of Max's transmitted activity expression into a so-called, foyer region 1651 of his, Harry's machine system. Harry can further elect to participate in the underlying activity by dragging yet a further possibly derived copy (1635) of Max's expression into a so-called, embedded activities region (1650) of Harry's machine area. The embedded copy (1635) may be deemed as being "owned" by Harry. Because he owns it, Harry can position that copied activity expression as he pleases into his own set of organized, activity descriptions (e.g., 1639, 1636, etc.), where Harry's activity descriptions may be organized quite differently from the way Max organizes his, Max's activities (see again, area 1520 of FIG. 15). Furthermore, Harry HR may choose to change the way in which the description (Harry's description 1635) of this underlying activity is expressed. Harry can change some of the words or even the whole language of this activity description (briefly, see the revised description 1635' of FIG. 16C) so that the embedded and modified activity description better fits his (Harry's) understanding of what his participation in the activity means to himself and/or how it may interrelate to other activities Harry is involved with. Harry may choose to expand his definition of the activity by breaking down the activity description to include a top-down flow into one or more child activities (e.g., 1640, 1641, and 1642 of FIG. 16C) where the child activities better describe, or describe in more detail, to Harry what he plans to do as part of his participation in the activity. In one embodiment, Harry's system retains a copy (1651') of Max's ADO's and their organization as originally received into Harry's machine area. Harry's machine (e.g., local computer) allows Harry HR to see how the activity idea was organized from Max's viewpoint. In the same embodiment, after Harry accepts participation in the activity (by embedding a derived copy into his, Harry's tree), Harry's computer might automatically send an update back to Max's computer, showing how the embedded copy is situated in Harry's activities tree. Max may then be able to see how Harry HR incorporated the activity description into Harry's view of the world. FIG. 15 and FIG. 16A through FIG. 16C will be further detailed below.

Referring again to FIG. 1, one problem in the organizing of group activities is how to get fast, efficient and productive cooperation between Max and Adam, so that each better understands what the other is thinking while each is using a respective, and potentially-decoupled computer (110 or 120, and the use is not necessarily at the same time—their work exchanges 115*b*/128*b* can be asynchronous). Simply providing a computer to each is not good enough. It is difficult enough to even "force" a user to gainfully use his computer because of the training involved. It is more difficult to get a user to productively use his/her computer if that computer does not provide presentations (111*a*, 121*a*) that are agreeable to that viewer (101, 102) and if that computer does not provide information management tools that make it easier rather than more frustrating for the given user (person) to manipulate the provided information. The present disclosure shows how to overcome such problems.

There can be different ways in which users cooperate in the development and/or implementation of activity ideas. Suppose that Max 101 wishes to delegate a certain subset 115*a* of his currently-developed plans 115 to Adam Assistant 102 for Adam to carry out and/or further develop. One of the many frustrations which Max Manager 101 may face in doing so is the lack of a real time communications link (115*c*) being consistently present between Max's computer 110 and Adam's computer 120. Even if their common business organization provides a central organizational server 130, this may be insufficient because Max may not always be operatively connected to a network when he wants to plan his own activities and/or share various activities with Adam. It could be that Max is traveling on the road at the time and Max's computer 120 is not connected to a network. Alternatively, the network may be temporarily inoperative (the network is "down"). Even further, it may be that Adam and Max do not work for the same organization and both do not have network access to a central organizational server. Either way, Max may not be able to easily access the central organizational server 130 every time he has a brainstorm of ideas. This can be frustrating. Another possible source of frustration is that Max and Adam may be working in different time zones, 101*t*-102*t*, or that Max and Adam are on different work schedules. Yet another possible source of frustration for both computer users is that each may worry that the other does not fully understand what was intended by a given communication. Max may have a formal education in business management while Adam has a formal education in computer engineering. They may use completely different vocabularies to express their respective ideas. It would be useful to have a system wherein Max 101 can verify that Adam 102 correctly understood what was meant by a shared activity description 115*b* and wherein Adam can verify that Max understood what was meant by a returned progress update report 128*b*. It may be useful for Adam to know what set of other activities Max is additionally or alternatively exploring even though the shared activity description 115*b* does not extend to the domain of all of Max's additional activities (beyond 115*a*). It may also be useful for Adam to know what context or scope the shared activity description(s) 115*a* fits within so that he can better understand what the shared idea involves. In accordance with one aspect of the disclosure, when activity descriptions are shared by way of transmitted Activity Data Objects (ADO's), the context, or hierarchy of so-called, primary parent ADO's (and optionally secondary parent ADOs, to be described later) may be automatically passed along with each explicitly shared ADO. This allows the recipient to see the context in which the sending user views the shared ADO. According to another aspect of the disclosure, Max can send representations of selected work to Adam to be informationally shared with Adam as For-Your-Information (FYI) transmissions, as opposed to activity descriptions that are actively shared with an intention to request active involvement in the expressed activity idea. Such active sharing can be further defined as Delegated (Dg) or WorkSharing (WS). Possible different types of sharing arrangements will be described in more detail later in this disclosure. The FYI option allows for informal and/or informational exchange of activity ideas information while the other options such as WS or Dg allow for more formal and/or active exchanges.

Figure 2:
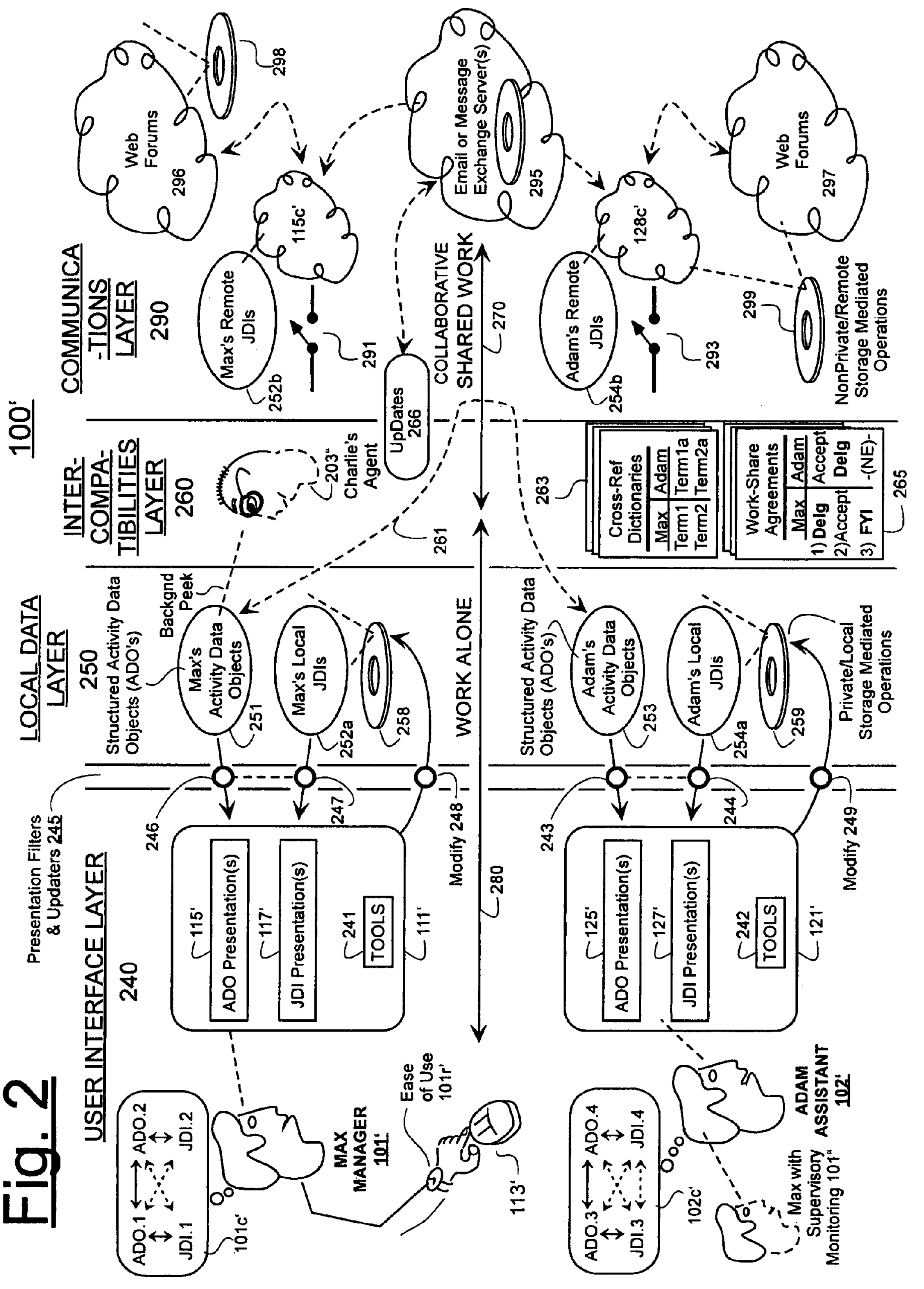
FIG. 2 is a schematic diagram showing a set of layers through which data can migrate as individual users develop and/or track plans on their own or with the assistance of other users and/or of external resources.
Figure 9A:
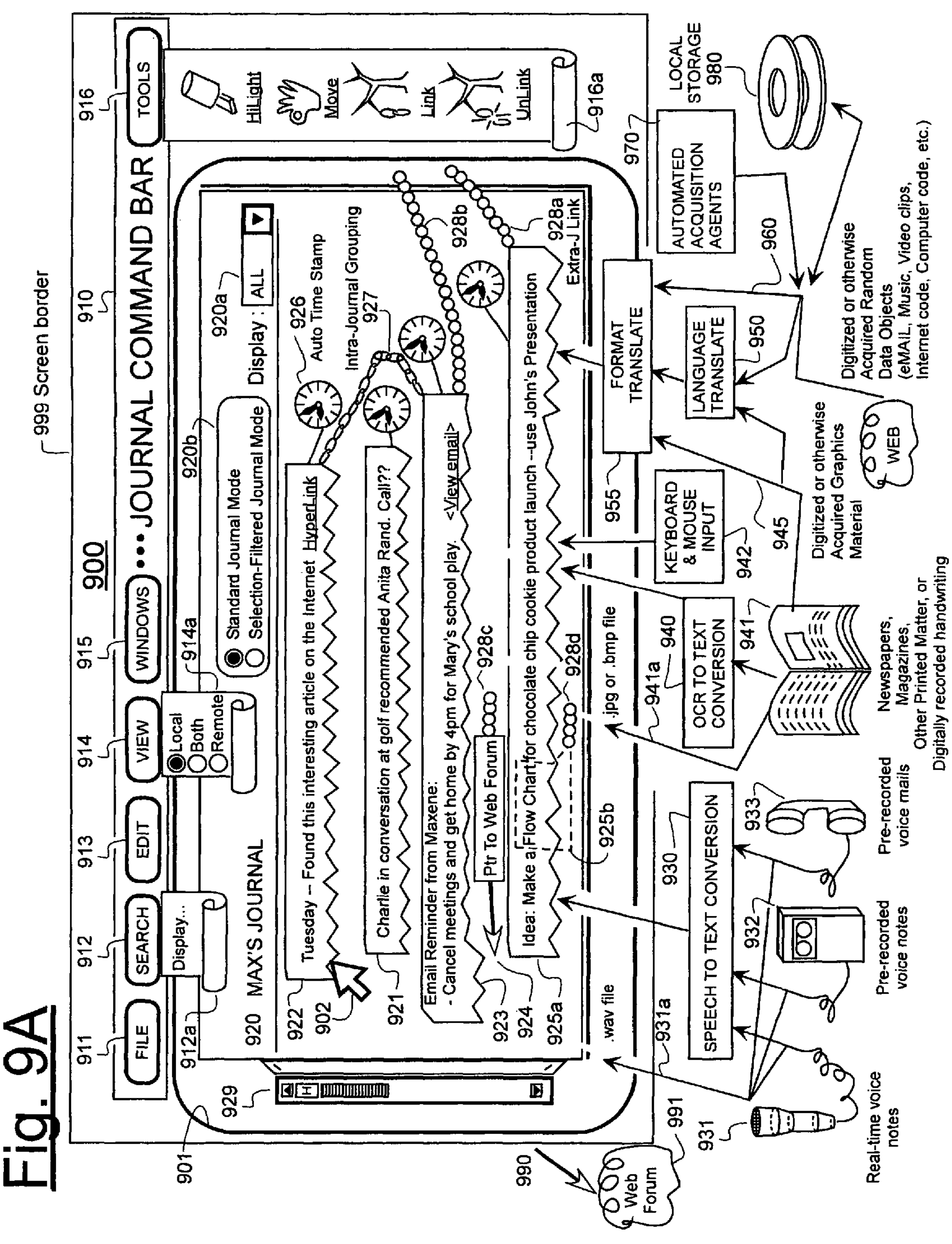
FIG. 9A is a schematic diagram showing a journal entry interface in accordance with the disclosure and showing how items may be entered into the journal (as journal data items) for purposes of chronological tracking and/or for easier manipulation or comprehension and/or for aggregation and/or for linking with extra-journal objects (e.g., with ADO's)

Referring to FIG. 2, a relatively broad overview of a system environment 100' in accordance with the present disclosure is shown and described. (Many of the concepts described for FIG. 2 will be further explicated later in this disclosure. The present disclosure is to be seen as covering both the broader concepts and the detailed embodiments.) In FIG. 2, data can be seen as migrating through a series of layers, moving from storage towards presentation to respective users (101', 102') and moving between storage areas that belong to different users when thought-product sharing occurs. Presentation, incidentally, is not limited to visual presentation of expressed ideas. Expressed ideas may be presented to users in a variety of multimedia ways including by sound, touch and/or otherwise. Each user may deal with his/her individually-tailored part of a user interface layer 240 according to the user's personal likes when that user interfaces with his/her local computer (e.g., in FIG. 1, 110 for Max, 120 for Adam). This user interface layer may include means for enhancing the user's experience in terms of ease of use and speed of responsiveness (101*r*'). More on this when FIG. 9A is explained. Hidden behind the user interface layer 240 (FIG. 2) may be a presentation filtering & updating layer 245 and a local data storage layer 250. For each user, the local data layer 250 can include one or both of Activity Data Objects (e.g. ADO's 251) and unstructured or structured journal data items (e.g., JDI's 252*a*). The local data layer 250 typically might also include a local storage media (e.g. 258, which might be a hard disk, an optical disk drive, a holographic storage media, a tape media, flash memory media, DRAM, SRAM, or any other electronic, magnetic, or other media storage device that might be conceived) which might store most of the given user's structured activity data objects (251) and possibly at least some of his/her not-necessarily-structured electronic data items (252*a*) and/or other electronic data items related to his ACMAN system. Other unstructured data items (252*b*) may be stored remotely (e.g., on media 298 which couples to the user's computer via one or more networks).

More specifically, Max Manager's (101') structured activity data objects are referred to here as Max's Activity Data Objects 251, and alternately as Max's ADOs. His locally-stored, not-necessarily-structured data items are referred to as Max's local Journal Data Items 252*a*. The data of elements 251 and 252*a* may be stored in a same local storage media 258 whose storage area may be directly accessible only to the owning user, Max 101'. (In other words, not directly and/or synchronously shared with others via a network.) Therefore Max may elect to keep personal plans on the media as well as work-related ones without worrying that his privacy might be easily compromised. Similarly, the structured activity data objects of Adam Assistant (102') are referred to here as Adam's Activity Data Objects 253, or Adam's ADOs. His local not-necessarily-structured data items are referred to as Adam's local Journal Data Items 254*a*. These may be stored in a local storage area 259 which only Adam Assistant might have direct access to.

In one embodiment, each user's machine may have installed therein, one or more automated background agents (e.g., Charlie's Agent 203") that belong to other users, where the other users are listed on the machine owner's whitelist as being allowed to have such background agents. The permission-wise installed background agents might automatically crawl through the activity trees as permitted by the owners of the local tree(s) (e.g., Max's tree(s)) in the background mode and they might perform a peek at activity data objects and associated journal data items in a way similar to how the agent's owner (e.g., Charlie Chief 403 of FIG. 4) would be permitted to do it manually and in the foreground if the tree's owner (Max) knew that was going on. For example, the ACMAN system may provide Max with a means to identify ADOs (and/or JDIs) with certain privacy settings (to be discussed later in FIG. 11). Max may allow Charlie's agent to look at only certain, "non-private" areas of Max's full collection of activity data objects and/or journal data items. The background agent might automatically generate an updates list 266 containing updated or new activity data objects and/or associated journal data items and identifying deleted ones, if those changed/deleted items are non-private with respect to the agent's master. The background agent (203") may automatically post the update list 266 for emailing or otherwise asynchronously sending back to its master's machine area (e.g., Charlie's machine area) the update information.

In an alternative or further embodiment, Max's machine area may contain a list identifying a set of supervising users to whom Max is expected to automatically report. Max's machine may automatically send updates of non-private collections of activity data objects and/or journal data items to such supervising users. For each such supervising user, an update list of activity data objects and/or journal data items may be maintained in Max's machine area. When Max causes his machine to modify a corresponding activity data object and/or journal data item, a possible update listing for the each corresponding supervisor may be appended with a pointer back to the activity data object and/or journal data item that was just changed by Max. (This, of course, assumes there is a permissive match of privacy level of the ADO and/or JDI versus the privacy access level of the given supervising user.) At various intervals, as may be determined by Max's machine, copies of the modified ADO's and/or JDI's may be emailed or otherwise asynchronously sent to the machine area of each supervising user who was listed for updating in Max's machine. When a supervisor's machine receives a set of updates, the supervisor's machine may automatically update the corresponding copies (foyered copies) of the revised activity data objects (Max's revised, added or deleted objects) where the corresponding copies logically reside in the supervisor's machine (e.g., Charlie Chiefs machine). The supervisor's machine may optionally present the updated copies in highlighted form so that the supervisor (Charlie Chief 403 of FIG. 4) can visually spot what was changed when he next uses his machine.

For each local user (e.g., Max, Adam, Charlie—last not shown in FIG. 2), a respective presentation filtering, updating and highlighting interface 245 may be interposed between the local data layer 250 of that respective user and the presentation-providing interface layer 240 of that respective user. The presentation filtering & update interface 245 may be used to select certain ones of the user's ADOs and JDIs for presentation on that user's respective display and/or other presentation means 111', 121' in a format desired and specified by that user. Thus a particularly selection-filtered version of some of Max's activity data objects 251, which Max has asked for, may pass through programmed presentation filters (246) of layer 245 to be presented as activity data object presentations 115' in Max Manager's viewing area 111' in a format that Max likes. Similarly a subset of Max's local and/or remote journal data items 252*a*, 252*b*, which Max has asked for, may pass through further, programmed selection filters 247 of the presentation filtering layer 245 to appear as journal data item (JDI) presentations 117' in Max's presentation area 111' in a format that Max likes. Examples of filtering options that Max may ask for from his computer may range from simple to complex, and as an example, might be described in pseudo-terms as, "Show me all my activity descriptions dealing with the category of Refinancing of My House and also show me all my unstructured journal data items that have been associated with the same. At the same time also show me all my structured activity descriptions dealing with the category of Banks that have a due date before Aug. 5, 2003" (see briefly FIG. 6A).

A set of presentation controlling tools and navigating tools may be included in area 241 of presentation area 111' so that Max Manager 111' can control which structured activity presentations appear in area 115' (corresponding to selected ADO's of storage area 251) and which JDI presentations appear in area 117'. In one embodiment most of Max's activity data objects 251 and most of Max's local journal data items 252*a* are stored in a local storage media 258 that is immediately accessible to Max Manager 101'. This means that Max does not require an active connection to an operative network 291. Max Manager can work alone (280) and get quick response time from his part of the system when he is referencing his activity data objects 251 and local JDIs 252*a*. This is so because such referencing does not require an active connection 291 to a network 115*c*' or completion of a network-based transaction (such as with exchange or message server 295). Max could be working alone (280) on a stand-alone laptop computer or handheld personal digital assistant. The quick response time and immediate availability helps to give Max Manager 101' an impression of ease of use 101*r*' and persistent accessibility.

In one embodiment, presentation filters 246-247 of layer 245 have bi-directional cross referencing capabilities. Max can use these capabilities to see all journal data items related to one or more pre-specified activity data objects and/or to see all activity data objects related to one or more pre-specified journal data items (and ask for them to be presented in various ways including chronological, alphabetic or other sorted fashion). Max should be able to simultaneously or alternatively request presentations of items from the ADO category (251) or the JDI category (252*a*, 252*b*) using other filtering and/or sorting specifications, such as asking for all ADO's whose short descriptor (detailed below) includes the string, "finance" and all journal data items whose body content includes the phrase, "interest rate". The asterisk (*) might act as a wild card in this possible example. Max's ability to perform cross-referenced filtering of Max's activity data objects by association to Max's journal data items 252*a* (and/or Max's remote JDIs 252*b*) and vice versa helps to give Max an impression that his organized activity data objects are seamlessly tied to his journal data items and vice versa. Graphical, for example drawn hierarchical tree with icons, presentation (115 of FIG. 1 or 810 of FIG. 8) or tabular, for instance spreadsheet, presentation (see briefly 610 of FIG. 6A) may be used to help Max clearly see how certain ones of his activity data objects may be logically associated to one another and/or to journal data items (JDI's). Various linking icons and/or color codings (see briefly 927 of FIG. 9A) can be used by the presentation layer 245 to help Max perceive his JDIs (252*a*, 252*b*) as being logically associated to one another and/or to his ADOs 251 (see briefly 631 of FIG. 6D). These filter-enhanced perceptions allow Max 101' to build mental models in his mind of relationships between the presented activity data objects 115' and the presented JDIs 117'. More specifically, Max 101' can use the simultaneous presentations on display 111' of selected activity data objects 115' and selected unstructured data items 117' to reinforce in his mind (within his mental models 101*c*') some earlier recognized and recorded linkages between certain ones of the structured activity ideas (say, those described by objects ADO.1 and ADO.2). The earlier recognized and recorded linkages (represented as solid, double ended arrow lines in area 101*c*') may also be between certain ones of the unstructured data items and the structured ones (say, between the ideas underlying the expressions of JDI.1 and ADO.1). Max may use the presented ADOs (115') and JDIs (117') of screen view 111' to recognize in his mind (101*c*') new associations such as say, between the ideas of ADO.1 and JDI.2 (the new mental linkages are represented as dashed, double ended arrow lines in area 101*c*'). More particularly, suppose that ADO.1 represents an expressed idea for a work related activity. Suppose that ADO.2 represents an expressed idea for a leisure-related activity, for example taking a vacation in the Bahamas. In viewing the associated journal data items (JDI.1 and JDI.2) of ADO.1 and ADO.2, Max suddenly realizes that concepts expressed by unstructured data item, JDI.2 might usefully contribute to further development of the structured activity described by data object ADO.1. Max then might use editing/navigating tools 241 to modify the activity data object (in storage 251) of ADO.1 so that the modified activity data object will be logically linked (in computer 110 of FIG. 1) to the underlying JDI (in storage 252*a*) represented by JDI.2. The next time that Max reviews a presentation of his organized activities tree, the presentation for JDI.2 will be shown as being logically linked to the presentation for ADO.1. (See briefly linkage 631 of FIG. 6D). Max may then take further action accordingly, such as by adding new child-activities to the ADO.1 parent or such as by searching for and entering into his journal, new journal data items.

In contrast to the presentation filtering options described above, the modifications that Max may elect to make to the content, properties or attributes of activity data objects 251 and/or journal data items 252*a*, 252*b* that Max owns are schematically represented by modification element 248, which for convenience sake is shown to also be in the presentation filtering & updates layer 245. In performing a modifying action via element 248, Max may alter his computer-recorded version of his structured activity data objects and/or unstructured journal data items. He can allow his machine to immediately transmit representations of these modifications as updates to other workers (e.g., Adam) or he can continue to review and revise his own work product by himself while delaying the updating operation. If a given modification (248) is made only to locally stored ADOs and/or JDIs of local storage media 258, the response time should be relatively short. There need not be any reliance on an active and operative connection 291 to external networks and servers. Thus Max gets a sense that his own activity descriptions (defined by ADO's) and supporting data (defined by JDI's) are available on a relatively immediate and persistent basis. There need not be any waiting for network-mediated transactions to complete.

The same advantages might apply to how Adam Assistant 102' interacts with his local computer 120 (in FIG. 1). Adam may use his own, individually crafted filters 243-244 to present to himself filtered versions of his respective and individually-crafted activity descriptions 253 and of his locally journaled data items 254*a* and/or his remotely journal data items 254*b* in formats of his choosing. Adam may use the generated and viewed presentations 125', 127' to build his own local mental model(s) 102*c'* of associations between various interrelated activity ideas (represented by data objects ADO.3, ADO.4) and/or unstructured data items (e.g. JDI.3, JDI.4). Adam may use his tools 242 to modify, refine or update any of his local or remote activity data objects and journal data items and how they are presented back to himself. Adam can work alone (280) during this phase of the process. His filtering, analyzing, and refining operations (243, 244, 249) do not necessarily rely on their being an active connection 293 between his computer and the network (128*c'*) or on there being an active connection 291 between Max Manager's computer and a network. Of course, for Adam to access his remote journal data items 254*b*, Adam's network connection 293 should be active at the time of access. It may be left to Adam's discretion to decide which journal data items are important enough to preserve as locally-maintained ones 254*a* on the local storage media 259 and which may be relegated to remote storage such as on remote media 299. Privacy issues and accessibility by himself and/or others may of course be used in making such determinations.

In one embodiment, the ACMAN system also stores its users' structured activity descriptions and, optionally, its users' journal items onto a centralized storage means via a centralized network when user's local machine is actively and persistently connected to the centralized network. In this embodiment, Max and/or a system administrator can give permissions to outside persons (e.g., Charlie) to come in as ghost viewers via a network and to see for themselves, the presentations 111 (in FIG. 1) that Max is, was, or could have been seeing on his machine (110) when using his, Max's, underlying data (251, 252*a*, 252*b*) and optionally his filters 246-247. Parts of Max's filters 246-247 can be pre-programmed by Max and stored in his machine area (110). Visiting ghost viewers (e.g., Charlie, represented by 203") can retrieve and present expressions of the underlying ADOs and/or JDIs, and optionally use Max's pre-configured and stored filter specifications, for use in quickly seeing what Max was (may have been) seeing. The ghost view presentations may be automatically limited, or filtered, based on privacy level settings per ADO versus the privacy access level that may be granted to each ghost viewer. If a JDI has extra-journal links to more than one ADO that have different privacy level settings, that JDI may also be filtered according to the most restricting privacy level setting. In addition, Max may entirely turn off ghost viewing access to his journal presentation area. In one variation, Max or Adam can also control which ghost viewers have retrieval access to which of their pre-configured filter specifications. Because a ghost viewer like Charlie 203" may be able to come virtually into Max's machine area and see essentially what Max was seeing (view 111'), that ghost viewer (203") has better opportunity to understand what Max is thinking about. The ghost visitor can start to see things from Max's perspective. This live, real-time ghost viewing capability may require an active network connection from Charlie's machine (not shown) to Max's machine 110 (in FIG. 1).

Such a ghost viewing capability may alternatively be emulated (without requiring a live and continuous connection) on an ACMAN system user's local machine by using foyered copies as shall be better detailed below. Briefly, this may be achieved through asynchronous updates 266 messaged, or transmitted, from Max's machine area to Adam's machine area and/or asynchronous updates from Adam's machine area to Max's machine area. Such updates may be determined with supervisory relationships that Adam can indicate on Adam's ACMAN system, or through explicit and/or passive activity sharing wherein a given ADO contains its own information about other users that may be sharing involvement in the activity represented by that same ADO. Such explicit activity sharing may be of one of several possible types, including Dg (Delegated), WS (WorkShare), and/or FYI (For Your Information) sharing types. These will be further described below. Briefly, Delegated sharing may be understood as expression-sharing where accountability is passed on to another participant. WorkShare (or sometimes called WorkSharing) may be understood as expression-sharing where accountability is mutually shared by two or more people. FYI may be understood as expression-sharing where accountability is at least initially, not be shared at all, but rather where information about one's activity(ies) is being relayed to other users merely so they can become aware of it. In the case of supervisory relationships, Adam may identify in his system whitelist which other supervising users should be updated for his Activity Data Objects and/or JDIs, provided the changed ADO's or JDI's meet the privacy access level for each respective supervisor. This can be done without necessarily needing to identify the supervisory users on a per activity data object basis. In the case of explicit activity sharing, ADOs on Adam's ACMAN system might respectively list other user(s) that may happen to be participants in the activity represented by the ADO. If Adam did not originate the idea for the activity, then one of the other participants is actually the master, or originator of the activity idea. If Adam himself originated and shared the activity idea with other users, those other users can be considered as being regular participants. Copies of ADOs and/or extra-journal linked JDIs that are modified, added or deleted by Adam may be sent as updates to corresponding participants by transmitted updates as will be detailed later below. Briefly, if Adam modifies a specific ADO, the ACMAN system may look up all of the participants specified within that ADO's data structure and may add them to a temporary update list, and then it may add further users listed in the "supervisors" whitelist to this temporary update list. Then Adam's ACMAN system can send updates to the machines of the users identified in this temporary update list, providing of course, that each so-identified user further meets the privacy/access level setting(s) stored in the ADO data structure.

Regardless of whether asynchronous updates occur due to supervisory relationships or due to explicit activity sharing, such asynchronous updates may be messaged indirectly through an email exchange server, through an instant messaging service, ftp, or any other direct or indirect messaging scheme that might be available. As a result of the messaging exchanges, users that receive update messages then may have in their own machines, local, updated copies of the respective updated activity data objects and/or JDIs owned by other users. Both the live (or synchronous) and the asynchronous embodiments described above are improvements over systems that do not allow users to persistently see things from the perspective of other users.

As implied already, as Max and Adam work alone on their respective projects, there will generally come a time when Max and/or Adam decides it is worthwhile to collaborate on part or all of his respective project. This can be done by sending out Delegation, WorkSharing, or FYI updates, supervisory updates, or ghost agent information to selected recipients, or by otherwise invoking cooperation on the refinement and carrying out of various activity ideas and their corresponding activity descriptions. When this collaboration stage (270) is reached, various parts of the communications layer 290 should be operatively coupled to the computers of respective participants at the time of use by each. The participants do not need to be online all at the same time. A data exchange server 295 such as an email exchanger or other internet server may be used for transferring data between Max's local domain and Adam's local domain. (While email is a highly convenient means of transferring Activity Data Objects because most users have email exchange capabilities, other exchange methods may be additionally or alternatively used, including instant messaging, ftp based transmission, etc.)

When a thought-product exchange occurs, all the problems about use of different language, etc. can come into play. Suppose Max Manager 101' wishes to transfer (261) to Adam Assistant 102' a selected subset of Max's activity describing objects 251. Adam may additionally or alternatively wish to transfer to Max a selected subset of Adam's activity describing objects 253. (They may also elect to exchange copies of their pre-configured presentation filters 246-247, 243-244.) Such collaborative, unidirectional or bi-directional transmissions are represented by dashed path 261 in FIG. 2. Adam and Max may use different terms for representing similar concepts and neither may realize that this is what is happening. A cross-referencing dictionary means such as shown at 263 may be provided to help each of Adam and Max to better understand one another. Max may use a specific Term1 for representing a certain concept while Adam uses a slightly different Term1a for representing the same or a slightly different concept. (E.g., Max may say "tubers" while Adam may prefer to say "potatoes".) This cross referencing may just as easily be used for mapping different languages, say between Japanese and English. However, a problem with having unabridged cross-referencing dictionaries is that the participation group may expand may expand to include more players than just Max and Adam (see briefly FIG. 4). Storage for many such dictionaries can become a problem.

In one embodiment, shared activity ideas may have both an "embedded" representation and one or more "foyered" representations, both of which may be stored locally on each activity participant's machine area (or an associated storage). For example, the embedded representations may be a user's own activity data object that are embedded within his own personal activity data object tree. Each activity participating user can edit his own embedded version of an Activity Data Object because he owns that embedded object. At the same time, each activity participating user can also view the locally stored, and sporadically-updated, copies of the other participants' ADO's where those other ADO's correspond to the same activity idea, even if they describe the activity idea differently. The locally stored, and sporadically-updated, copies of the other participants' ADO's are referred to herein as a "foyered" activity data objects. As each participant modifies his own embedded activity descriptions, updates representing these modified activity data objects may be messaged, or transmitted, asynchronously to the other activity participants so that their foyered versions of these activity descriptions can present the latest version, with the appropriate updates, as soon as the messaging takes place. In this manner, there can be a persistently-updated cross referencing scheme developed between the differently worded and/or differently organized activity descriptions of different users. This cross referencing scheme may allow for the viewing of other participants hierarchy trees as well as some or all internals of their respective activity data objects. (This will be described in further detail later in this disclosure.) So, if Adam sees the differently structured linkages which Max has established between respective activity data objects 251 in Max's tree (see briefly also item 1460*b* of FIG. 14), Adam should be able to better understand how Max's plans may interrelate or not with corresponding activity data objects in Adam's tree 253. The mapped cross-linkages between embedded ADO's and foyered ADO's allow each user to create a very different hierarchical structure for his/her activities and to, at the same time, see how one or more other users are structuring their own activity descriptions. More specifically, in FIG. 1 it is seen that Max Manager 101 may have an elaborate tree structure 115 representing his various structured activity data objects. On the other hand, Adam Assistant 102 may have a relatively simpler representation of the interrelations between his activity data objects 125 (or 126). It is often helpful therefore to have some means of cross-mapping organizational structure in addition to or instead of just a terminology cross-referencing dictionary 263. The tree-to-tree, organizational cross-mapping and terminology cross-referencing can help Max to better understand how Adam uses his, Adam's terminologies in various contexts and it allows Adam to similarly understand how Max uses his terminologies in various contexts. (See briefly FIG. 16B 1635 and 1616' for a similar example, where Max is sharing an activity with Harry HR and their activity trees can be compared within their respective work-focused contexts 1650 and 1651.)

Another of the problems that has been mentioned above is that of establishing work sharing agreements. Without agreements, the left hand may quickly lose sight of what the right hand is doing in a project that involves many people. A rudimentary schematic for the concept of making and recording agreements is shown at 265 (in layer 260 of FIG. 2). In a case where Max wishes to delegate to Adam the completion of a particular, structured activity (or of a group of activities), Max may send a copy 115*a* (FIG. 1) of the activity description to Adam's computer. If the communications layer 290 is working and Adam receives the delegation request, Adam may have the option of accepting the delegated task or rejecting it. (In some environments Adam might not have a choice.) Max may need to know which option Adam has chosen. If Adam has declined the delegated work, then Max 101' may have the option of asking another worker, say Bob (not shown) to instead accept the proposed delegation of work. It could be that Adam's network connection 293 is inactive at the time and that is why Adam is not responding to the request. Max Manager may need to know what the situation is so that he can efficiently distribute collaborative work. By the same token, Adam Assistant 102' may request that Max Manager accept delegation of some other structured activity as indicated by activity sharing agreement #2 in table 265. Max Manager may also send so-called For Your Information (FYI) structured activity data objects to Adam, as indicated by agreement #3 in table 265. Adam may not need to reply, and Adam's system may or may not respond; accordingly, the response may be recorded as "Not Expected" ("NE") in Max's system since it was only FYI. Or Adam may reply by saying thanks but no thanks (i.e., "Denied" as in 704 in FIG. 7, which will be embellished later). Alternatively Adam may volunteer to join the collaborative effort so that it becomes an "Active" ADO (see 704) for Adam, although it was not initially "Delegated" to Adam or offered as a "WorkSharing" activity. In one embodiment, machine-recorded indications may be provided for each structured activity data object in Max's pool 251 and Adam's pool 253 for what activity sharing agreements are being negotiated, what the state of negotiations is, and what specific compacts may have been made between the various participants. This is shown for instance in 614*a* (FIG. 6A) at a summary level and expanded by Max in 700 (FIG. 7) at a detailed level. Activity sharing agreements are not limited to the Dg, WS and FYI types described here. The system may be simplified with fewer arrangement options, or expanded to handle more complex activity sharing type arrangements. Such more complex arrangements may be defined by programmable templates that have Dg, WS and FYI as some of their elemental components. Much of this disclosure describes the system as having four sharetypes: Not Shared, so called Dg (Delegated), so called WS (WorkShared), and so called FYI (For Your Information). But that does not necessarily have to be the case for the ACMAN system. For instance, there could be no distinct sharing types. The system could alternatively have any number of sharing types (two, three, four, or more) with different sharing properties and/or meanings. Such sharetype sets could include one or more of:

a) one sharetype (i.e., no distinction of shared or not); or b) two sharetypes {no sharing, sharing} or equivalents; or c) three sharetypes {no sharing; active involvement sharing; awareness sharing but no active involvement (for your information)} or equivalents; or d) four sharetypes {no sharing; multiple-participant involved sharing; delegated involved sharing; awareness but no involvement sharing (for your information)} or equivalents; or e) any number of more granular states of sharing.

Yet another example of a more complex arrangement could be, contingent cross-delegation: "I'll take over responsibility for your tasks A and B only if you agree to take over responsibility for my tasks C and D."

The schematically illustrated communications layer 290 of FIG. 2 is simpler than that which may actually exist between Max and Adam. There can be one or more private servers which provide data exchange communication between Max Manager and Adam Assistant in addition to the Internet-based data exchange server shown at 295 (e.g. email server). The intent here is to allow circumvention of the private organization servers (e.g. 130 of FIG. 1) so that any two or more persons can use the public Internet or an alike communications media for more freely exchanging activity ideas (as represented by data objects 251, 253) and to more freely exchange activity sharing proposals and agreements. Aside from exchanging (261) structured activity data objects, each of Max Manager and Adam Assistant may use their respective connections 291, 293 to the Internet (115*c*', 128*c*') for mining for various journal data items from web forums 296-297 or from other parts of the Internet. The web forums 296-297 may be seen as providing slightly-less availability due to possible server or client network decoupling, but would be and collaborative sharing of relatively unstructured data items, useable as externally stored journal data items that might otherwise have been local to each user's machine area. So ACMAN system users may have attributes of their ADOs that point to one or more specific web forums, and those web forums might act as a shared journal for the given ADOs. In one embodiment, the web-forums may be organized as threads of conversation about a particular activity idea or activity data object. Presentation filtering and update layer 245 can be used to limit or otherwise control the presentation of these web-forum items to each respective user. For instance, such web-forums may be presented in place of the local journal data items presentations, in such a way that threads of discussions related to a given selected ADO may be shown in one place. Alternatively, the user may instruct the presentation filtering layer 245 to show only the local JDIs (i.e. the JDIs stored in the user's local journal) associated with a selected ADO. Or, the user may even instruct the presentation filtering layer 245 to integrate into the ACMAN journal presentation area a presentation of both the local JDIs and the non-local data items from the web-forum. This scheme will be described further, later in the disclosure.

Figure 3:
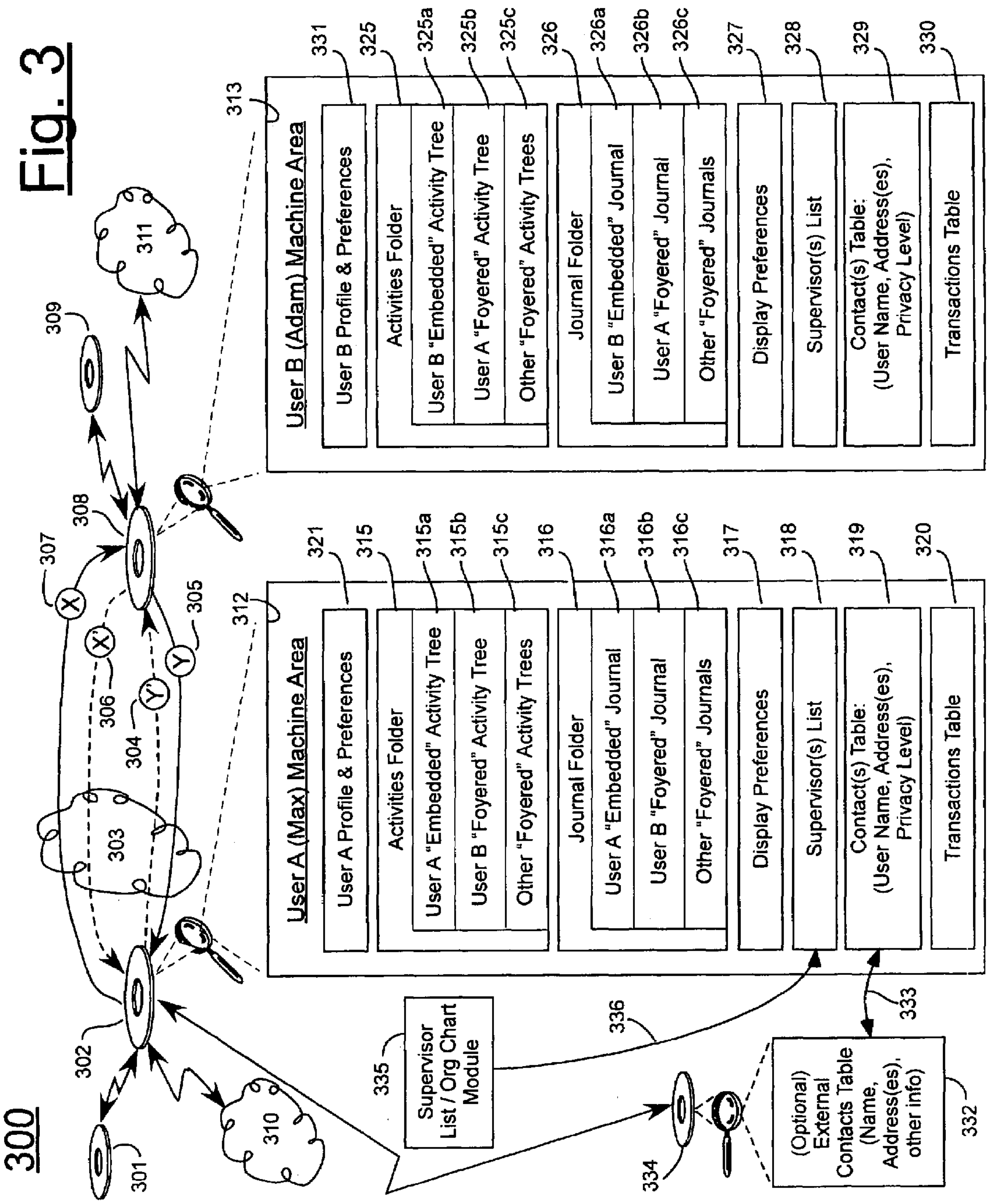
FIG. 3 is a schematic diagram showing a possible structuring of a plurality of machine storage components for use by two independent users in accordance with the disclosure.

FIG. 3 is an overview diagram of one embodiment 300 where separate machine area storage components for two independent users, User A and User B, are shown. User A may have a machine area 312 provided on media 302 upon which several aspects of his/her electronic data items or other data items pertaining to his ACMAN system may be stored. One possible structuring of the data items that User A's machine area might include is shown in the expanded view of area 312. Media 302 may be a single physical storage device or a set of multiple physical storage devices. Media 302 may be located in the same physical hardware system as User A's CPU, or it may be located elsewhere on a local or other network or even at an internet-accessed location. Media 302 may correspond to the local storage media 258 (described in FIG. 2). In one embodiment, User A has at least read and/or write access, and/or he maintains general ownership of the data stored in machine area 312, and as needed, he can establish limited network-access and/or other security measures (e.g., encryption) over machine area 312 so that other users will not be able to intelligently read, write and/or execute to this machine area of storage. Occasionally, User A may wish to archive or backup some aspects of his work product, and the ACMAN system might support such archiving or backups of data items onto a backup storage device 301 that may be separately located from media 302. Optionally, items 301 and 302 may be either the same physical storage device (hard disk drive, etc.) or separate storage devices.

User A and User B may typically be different individuals. In one embodiment it is possible that User A and User B could represent the same individual person, but as that person has logically separate identities with separate work product and separate User Names. In either case, from the perspective of the storage components and network inter-relationships described in FIG. 3, User B might have correspondingly similar properties and description as that of User A above, except of course that as shown in FIG. 3, User B has a machine area indicated by 313 on media 308 instead of machine area 312 on media 302. Moreover, User B may have archive storage area 309 instead of 301. In one embodiment, User A and User B machines may be peers in a network with possibly similar physical storage components and or other physical resources.

As such, this following description of the possible components in machine area 312 for User A may apply in a corresponding manner for User B with respect to machine area 313. We may occasionally refer to User A as "Max" just for the sake of an example, and similarly, we may refer to User B as "Adam", again, just for convenience. Machine area A may contain a Profile and Preferences section 321, that may indicate Max's User Name, his contact address(es), his ACMAN system setting preferences, and other overall user & system related indicators. Machine area A may also contain an Activities Folder area 315 for storing structured Activity Data Object items as well as other Activity Data Object management header information. For instance, the ACMAN system may create various database indexes referencing the various ADOs in folder 315. Such management header information might improve the ACMAN system performance or provide other benefits. Within the Activities Folder 315, there may be a first storage area 315*a* that includes ADOs, if any, for Max's embedded activity tree. There can be yet a second storage area 315*b* that is used for storing "foyered" ones, if any, of Adam's ADOs. There can be yet a third or more storage areas 315*c* that are used for storing "foyered" ones of ADO's belonging to yet other respective users, if any. These embedded and foyered ADOs might be arranged in storage in no particular order, but the distinction of the possible three or more tree areas indicated in 315 is intended as a logical distinction, whose ramifications will become more apparent later in the disclosure. Journal Folder 316 area might store unstructured Journal Data Items and other journal related information as later explained in FIG. 10. Similar to section 315, the Journal Folder might contain a first storage area 316*a* for Max's embedded journal data items, if any. There can be yet a second storage area 316*b* that is used for storing "foyered" ones, if any, of Adam's journal data items. There can be yet a third or more storage areas 316*c* that are used for storing "foyered" ones of JDI's belonging to yet other respective users, if any. Section 317 might include current display preference settings as well as current display settings that might be reset when Max re-activates his ACMAN system software application. This section might also include Max's customized meta-search criteria, which will be described later in this disclosure. Section 318 might include an optional Supervisor(s) List. This might include a list of User Names and/or possibly their contact address(es), representing people that Max may want his ACMAN system to automatically transmit to and/or update regarding his ADOs and optionally his JDIs, without Max having to manually cause each ADO update to occur. In one embodiment, the supervisor indications in the Supervisor's List 318 might be derived from a corporate organization chart or supervisor module 335 that might exist in an organization's pre-existing human resources or other systems. The ACMAN system might include tools to import 336 such a pre-existing org-chart or supervisor list 335 into the local Supervisor List 318, or alternatively, such a pre-existing list 335 might be used instead of the local Supervisor List 318. Section 319 might include a Contact Table, which might include references to other ACMAN system users and/or other people Max might interact with. Such a table might include User Names, their respective real world names, their contact address(es), and/or the level of privacy/access level that Max or a system administrator might want to indicate for other such users. Note that a contact table 332 from a different software application and/or storage location 334 might be modularly socketted in and used in lieu of or in addition to this local one 319. Additionally or alternatively, modular plug-ins from different software applications and/or storage locations might be used in conjunction with data sections 317, 318, and/or 319. The local, non-socketted data may contain data required by ACMAN but not provided by the external source(s). (Such possible arrangements in conjunction with section 319 are indicated by the logical connection line 333 in the diagram.) For instance, there may be some fields unique to ACMAN, such as User Name or possibly privacy level, that may not exist in such other contact tables. So a common identifier between the local table 319 and an external table 332, such as possibly a user's real world user name or alternatively their email address, could be used as a query joining variable to tie them together. Although it is not shown in the diagram, a separate external contact table similar to 332 as described above could similarly replace or coexist with User B's contact table 329. This external contact table could be specific to User B or it could be a shared contact table, such that many users' machines, including User A and User B, might utilize the shared contact table. Lastly, a transactions table 320 might optionally be included. This table might historically record one or more types of transactions including the actions Max performs on his ADO's, JDI's or other work product, and the data items his machine transmits to and/or receives from other alike machines (as well as possibly data items his machine transmits to other unalike machines, described later in FIG. 17). Transactions table 320 can therefore provide a listing of modified and updated ADOs and/or JDIs and the times that they were last modified, updated, and so on. A transactions table 320 for recording database transactions and/or user-to-machine instructions should be familiar to those skilled in the art. It should be readily apparent that such a transaction table might enable the ACMAN system to provide its users with a means to cause their machine to undo and optionally and subsequently redo one or more machine instructions. Such instructions could include ADO and/or JDI record modifications and/or different requested screen presentations (similar to a web browser's "go back" or "go forward" button). By maintaining a record of ADOs and/or JDIs that have been modified by Max, and which therefore may need to be transmitted to other users as updates when Max's machine is coupled to a communications network, the corresponding update messages can be more efficiently generated since Max's ACMAN system would only need to access the ADOs and/or JDIs listed in the transactions table as recently modified. Without such a transactions table, the ACMAN system might need to access and check each ADO and/or JDI on Max's machine area to determine if an update transmission might be required.

Machine Area A 312 may well include further or alternate storage components. For instance, not shown are any temporary buffer memory areas, or any review areas for temporary storage of incoming ADOs, JDIs, and/or other electronic messages. So, FIG. 3 illustrates only a possible set of components described in other parts of this disclosure.

FIG. 3 is intended to also indicate that Max and Adam might instruct their machines to manually or automatically transmit and receive messages to/from each other across the internet or any other network 303. Max and Adam may not be the only users that may communicate in the context of this ACMAN system. There may be many other participants in other parts of the internet or other networks, 310 or 311 who are communicating with one another, and/or with Max and Adam regarding shared activity ideas. However, focusing for now only on Max and Adam's machine areas, it can be seen that Max's machine may transmit first electronic or other energy signals 307 to Adam's machine area regarding an activity idea represented by expression "X". That expressed activity idea "X" may be represented by a copy or derived copy of an ADO obtained from Max's embedded tree area 315*a*. (Note at times within this description, the word copying is used loosely to indicate that a portion rather than all of a given data structure is being replicated. For example, when a derived copy of an owner's ADO is processed so that it can be transmitted as an outbound ADO, certain attributes or attribute values from the original ADO may be left out and/or others may be respectively appended or modified for a given purpose.) The first signal may include this ADO copy as well derived copies of other ADOs from Max's system (for instance, as illustrated in area 1604 of FIG. 16A and/or as in 115*b* in FIG. 1). The expressed activity idea "X" may optionally be supplemented by transmitted copies of JDIs from Max's embedded journal area 316*a*. The initially transmitted expression "X" may be further supplemented by other signaled data items.

If and when Adam receives the initially transmitted expression "X" 307 from Max, Adam's ACMAN system may record a derived copy of the expression into Max's foyered area 325*b* on Adam's machine area. Adam may review a presentation of that expression. Adam may choose to integrate an expression of that initially transmitted expression "X" 307 into his embedded activities tree. Adam may also modify this derivative workproduct that is in his embedded activities tree according to his own preferences and perspective. Adam's modifications to his owned, derivative workproduct might generally be stored in Adam's embedded data areas, 325*a* and 326*a*. In order to inform Max of the modifications, Adam's machine may transmit update messages 306 back to Max's machine area. The modified, derivative workproduct 306 is now designated as X' (prime), because X' (prime) represents Adam's rather than Max's owned expression of Max's initially shared activity idea X. If and when Max receives X' (prime) 306, Max's ACMAN system may record a derived copy of X' (prime) in Adam's foyered activity tree on Max's machine area 315*b* (and optionally 316*b* if JDIs are also being shared). As can now be understood, both Max and Adam can access on their local machine areas their respectively owned (embedded) and possibly derived copies of the initial, or original, activity idea expression. They both also can access on their local machine areas the respective others' foyered expressions derived from the initial, or original, activity idea expression. (This might be possible even if now both Max and Adam have temporarily decoupled their machines from any communication networks.) They may continue this back and forth updating process 306 and 307 as they continue to work together and modify their respective work products. Conversely, Adam may initiate his own activity idea Y, and share its expression 305 with Max. Max, as the invited participant of activity idea Y, may then update Adam 304 with his current version of the original activity idea; Max's current version is represented by expression Y' (prime). In such a manner, Max and Adam may exchange their own respective views of activities they are both interested in.

Figure 4:
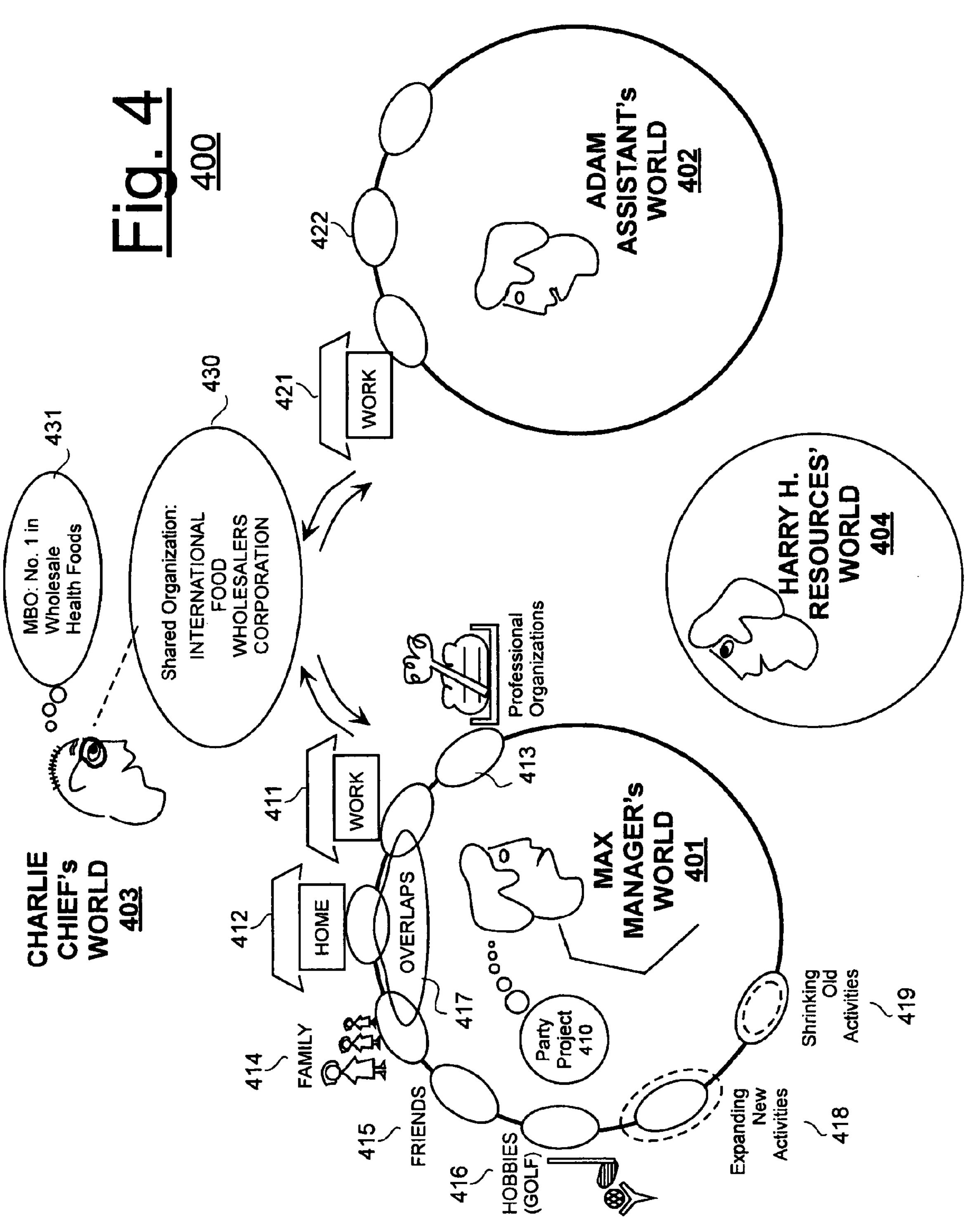
FIG. 4 is a schematic diagram showing how each individual user might relate to his or her own individual world and interrelate to the personal domains and/or organizational domains of others.

FIG. 4 is a schematic diagram for introducing a working example. It is assumed that Max Manager 401 works for a fictitious company, referred to herein as the International Food Wholesalers Corporation (IFWC). Adam Assistant 402 also works for the same corporate organization 430. Note that Adam, throughout this fictitious example, could just as easily be described as a person outside of the IFWC organization, for instance an outside consultant who does not work as an employee within the same organization as does Max. The organization is headed by Charlie Chief 403. Charlie Chief 403 has a Management By Objective (MBO) description (431) for his organization, namely, to become the number 1 wholesale distributor of health foods in the world. Harry H. Resources 404 is another worker for the common organization 430 (IFWC). Harry's job is to oversee human resource needs of the corporation within its North American operations.

Although Max, Adam, Charlie and Harry all share the commonality of being associated with a same food organization 430, each person should be viewed as a unique individual who may have his own surrounding world with intertwined pulls and pushes on that person's (Max's) time, energies and/or other resources. More specifically, aside from that portion of his life which focuses on paid-for work 411, Max Manager may have a house 412 and a family 414. There may be overlapping issues of conflict or cooperation 417 between work (411), family (414) and house (412). For example, Max may wish to schedule a party for co-workers of his organization 430 in his home 412. The planning and implementation of this party is referenced as "Party Project" 410. Max realizes his party project 410 will require cooperation from family members 414. Each of Max's family members 414 may have his or her own set of scheduled activities and objectives. Max Manager 401 may need to seek the collaborative assistance of family members 414, co-workers 402 through 404, friends 415 or others in seeing the party project 410 to successful fruition. The party project 410 can be sufficiently complex to warrant the use of computerized scheduling and collaboration for planning and carrying it out. (By way of example, Max may be inviting many people. He will need a food caterer, an entertainment manager, a valet parking crew, etc. It can be fairly involved.)

Beyond home, family and work, Max's interests may include memberships in various professional organizations 413. Max may have hobbies 416, such as playing golf. The golf game or other hobby 416 may call for collaborative organization with friends 415 or co-workers 402 through 404. Certain events may occur at the golf game 416 which impact Max Manager's world 401 in many subdomains. For example, during a friendly golf game Charlie Chief 403 suggests to Max that Max is up for a promotion if Max agrees to transfer to a different geographic location (e.g. to a different city). This decision, of course, will likely have major impacts on Max's other interrelations with family 414, friends 415 and home 412. It can therefore be seen that Max lives in a complex world and he may benefit from help in organizing his various "activities" 410-416. A sudden tug in one subdomain (e.g. golf with Charlie at 416) can have drastic consequences in other subdomains (e.g. family 414 and friends 415). The here disclosed Activities Coordinating & MANagement software system (ACMAN system, FIG. 1, 105) allows Max to better coordinate all of his activities if he so chooses.

More generally speaking, Max Manager's World 401 may be seen as being constituted by different sets of constantly evolving areas of activity. Some areas of Max's activities like 418 may be newly adapted ones which are undergoing expansion. Other areas of activity like 419 may be old ones that are shrinking and taking on a less prominent role in Max Manager's World 401. For a busy person like Max, it may be important to organize all of his activities in a structured manner so that Max can prioritize, plan, and execute his activities in order to achieve his top-level goals as well as his tactical responsibilities. It is understood from FIG. 4 that Adam's World 402 can be equally complex and can have many different facets 421, 422, etc. which call for structured organization and in some cases, collaboration with others. The same can be true for Harry HR 404 and Charlie Chief 403, as well as people outside of the IFWC organization (not shown). In particular, Charlie Chief 403 may wish to maintain oversight over many of the activities being undertaken by employees or affiliates of his organization (IFWC) 430. Without the help of automated tools, this can be quite a daunting challenge.

Figure 5:
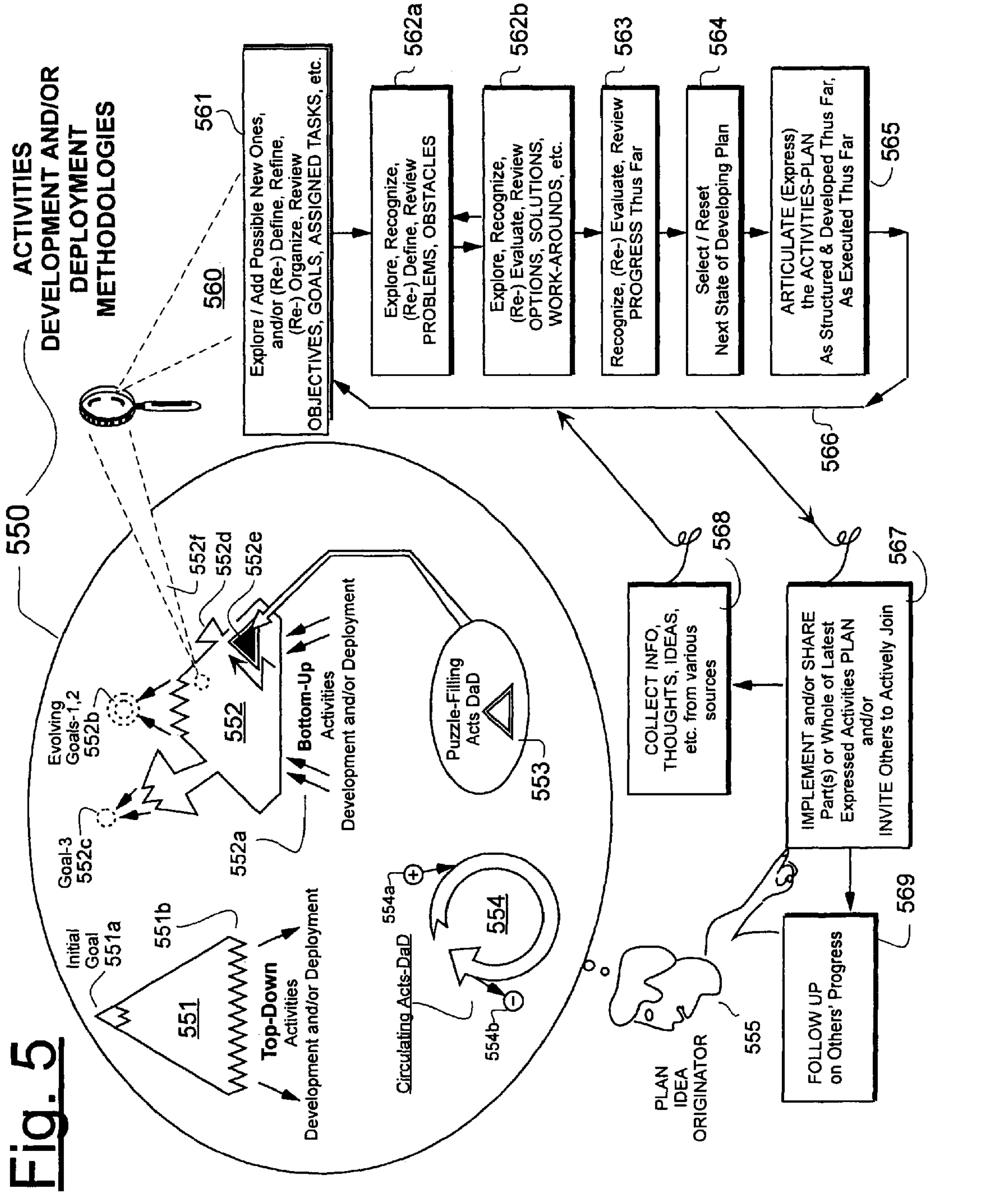
FIG. 5 is a combined schematic and flow chart for illustrating how activity ideas might be originated and how corresponding activity plans may be creatively expressed, modified and/or shared.

It is worthwhile to understand how activities often come into being, and evolve and become increasingly complex. This understanding will aid in better appreciating how the here disclosed Activity Data Objects (ADO's; see briefly FIG. 12A) and journal data items (see briefly FIG. 9A and FIG. 9B) can combine to better support activity development and tracking. FIG. 5 is a combined schematic and flowchart which illustrates a number of different ways in which activities can be planned and/or implemented. Bubble 550 shows four development and/or deployment methodologies. These methodologies are not mutually exclusive per se, and in many cases, they are complementary.

A commonly recognized management and planning methodology is called Management By Objectives. This is a process that typically comprises setting specific goals participatively, often in a Top-Down 551 as well as a Bottom-Up 552 approach. In carrying out a Top-Down planning method 551, a relatively generalized (abstract), and high level objective 551*a* is defined and hierarchically positioned at the peak of a mountain-like organizational structure. By way of example, the uppermost objective 551*a* might initially be described as: "Increase IFWC's market share in soy bean based products to 50%". This top tier objective 551*a* may then be expanded into a wider next level tier where more details are spelled out. For example, one of the implementation details may be to increase IFWC's advertising budget for certain soy-based products. Another implementation detail might be to hire more sales personnel in various cities. Yet another implementation detail may be to establish new contracts with more suppliers of raw soy beans. Each of these second tier activity data objectives can then be further expanded and refined so that an ever widening base 551*b* of the mountain-like structure 551 evolves. The downwardly-advancing base 551*b* of the Top-Down pyramid-like structure can include both refinement in planning and in the deployment of planned activities.

Another method for developing and deploying plans is that of Bottom-Up planning. This activity development and/or deployment methodology is schematically shown at 552. Usually, in Bottom-Up planning, a subset 552*a* of initially unrelated activities and/or activity ideas are found to be supporting of a previously unrecognized peak 552*b*. As time goes on, certain parts of the grass roots level of activities and ideas 552*a* are allowed to continue to grow while others are weeded out. Sometimes an unexpected new top goal 552*c* emerges to replace or exist alongside the initial top goal 552*b*. Sometimes, certain paths taken end up as dead ends 552*d*. Sometimes, certain holes 552*e* develop in the progression of development. These holes 552*e* may not be immediately filled with solutions. Later on, a puzzle filling methodology 553 may be successfully used for plugging the hole(s) 552*e* in the Bottom-Up planning structure 552. The puzzle filling activity 553 may itself have a Top-Down structure (551) or a Bottom-Up structure (552) or some other solution form.

Besides the more traditionally-acknowledged, Top-Down and Bottom-Up approaches, 551 and 552, it is also common to find circular forms of activity development and deployment 554. More specifically, a same general set of tasks may be consistently carried out over and over again. However, as time progresses, some parts of the tasks are improved on 554*a* or added to while other parts of the task are reduced or removed 554*b* because they are found to be inefficient. Thus, like biological creatures, circular types (554) of activity development and deployment methods can grow, change, and evolve into different creatures as time progresses. The here disclosed Activities Coordinating & MANagement software system (ACMAN system) can accommodate the different creatures in the development zoo 550 and can allow them to peacefully coexist.

Flowchart 560 takes a more detailed look at some of the activities that may occur during development and/or deployment (551-554) of activity ideas and activity descriptions. At step 561, an idea developer or "originator" 555 (say Max) starts to explore, define, review or redefine and re-review objectives of assigned tasks, or not-yet-expressed task ideas, within an overall hierarchy of activity expressions (e.g., ADO's) and idea-initiating data (e.g., JDI's) that the user 555 may have on his ACMAN system. For example, if Max (555) finds that a top-level objective 551*a* of his local pyramid structure 551 is too narrow in scope, he may decide that yet a higher level tier should go on top of original peak 551*a*. In essence, he is switching from a Top-Down approach 551 to a Bottom-Up approach 552. The here disclosed ACMAN system (e.g., FIG. 1, 105) can accommodate such switches of scope and approach.

In step 562*a* the developer (Max) may recognize new problems and/or obstacles or review earlier recognized ones. The developer may change and/or add to his definitions of the problems and obstacles that he faces as he continues a particular development trend. These uncovered or refined expressions of problems can be thought of as new activity descriptions to be added to a plan tree or refined within the tree. The here disclosed ACMAN system 105 can conveniently accommodate such changes.

In step 562*b*, the developer focuses on solutions or workarounds. The developer explores or recognizes or evaluates and reevaluates ideas for different types of solutions or workarounds that are possible for problems and obstacles recognized in step 562*a*. For example, if hole 552*e* is recognized to exist within structure 552, the developer 555 may find a way of working around this hole and avoiding it in order to reach the currently-defined-as-ultimate goal 552*b*. Additionally or alternatively one or more hole-filling solutions 553 may be found and then the developer will have to decide whether to use a hole work-around solution or a puzzle-filling solution 553 or both in order to reach the ultimate goal 552*b*. The here disclosed ACMAN system 105 can accommodate such hunts for solutions, and the expressing of these solutions, and the incorporation of expressed solutions into a hierarchical activity tree.

In step 563, the developer looks at the progress made thus far in developing and/or deploying the overall project. The developer may recognize that he needs to redefine and/or reevaluate his description of the progress made thus far. In a follow-up step 564, the developer may select or change the next state of planning, development and/or deployment. The developer may decide to give up on a path that appears to be a dead end 552*d*. The developer may decide to change the main objective from say, one expressed as 552*b* to another main objective that is expressed as 552*c* by for example, re-prioritizing activity descriptions—this occurring after the developer has recognized and reevaluated the progress made thus far (step 563). The here disclosed ACMAN system 105 can conveniently support re-prioritizing and re-organizing of activity descriptions.

Activities 561-564 might be carried out in an initial one or more go arounds by a single individual 555 (e.g., Max) and some parts may be carried out entirely within his mind. However, as with most substantive projects, the development of ideas reaches a point of sufficient complexity to induce Max (555) to articulate or otherwise express the activity ideas he has partially or fully planned and/or executed thus far and to record this articulation or expression in a medium of expression (e.g., on paper or on audio tape or on computer-readable media). In accordance with the present disclosure, that step of expressing activity ideas can be conveniently carried out within the framework of the ACMAN system 105. The ACMAN system can record unstructured data items (e.g., JDI's) that may be used to support further development of activity ideas or deployment of expressed ideas and ACMAN system can also record more formally-defined activity descriptions (e.g., ADO's) as hierarchically organized data structures. The ACMAN system can link the structured and unstructured data items to one another (e.g., JDI with ADO) and/or to others of their own kind (e.g., JDI-to-JDI and ADO-to-ADO). Repetition loop 566 contemplates a repeated carrying outs of steps 561-565 as may be desired by the developer. During the repetitions 566, Max may collect (568) additional information and/or expressions of new thoughts, ideas, etc. from various sources including from interactions with various people, databases, emails, and/or the internet, etc. As various random snippets of information and/or idea expressions come into and gel in Max's mind, he may realize that he should formally define new activities and integrate the formal expressions (e.g., ADO's) into his developing plan structure(s) 551-554. He may realize that some of the earlier collected pieces of information (e.g., JDI's) may be useful in helping to implement certain parts of his planned activities. The ACMAN system provides a presentation system (see briefly FIG. 6A) that allows for convenient gathering of and searching for journal data (see briefly FIG. 9A) and for the integrated manipulation and linking of journaled data with more formally-structured activity descriptions (e.g., ADO's). The integrated presentation and manipulation tools allow a project or task developer 555 to conveniently collect random snippets of electronic or other data items over time, group the collected data items in various ways, and use them for defining new activities (i.e., per Bottom-Up methodology 552). The collection of random snippets of data items (e.g., JDI's) may additionally or alternatively be used for assisting in the implementation of pre-existing activity plans (i.e., per Top-Down methodology 551).

At some point, the developer (555, e.g., Max) may wish to share (567) part or all of the work involved in the implementation and/or further development of parts or the whole of his individually authored and expressed activity plans 551-554. He may wish to invite others (e.g., Adam, Harry, etc.) to join in, actively or passively, in the review and/or further development and/or implementation of his expressed plans. He (Max) may wish to receive (568) information, expressed thoughts, ideas and so forth from the other people in the form of either, formally-defined activity plans, or activity descriptions (e.g., with ADOs containing structured fields, and in one embodiment, ADOs that are hierarchically linked) or in the form of less-formally coalesced journal data items. He may wish to integrate selected ones of the activity plans and/or journal data items he received from others (e.g., Adam, Harry, etc.) into his own collection of formal or informal expressions (e.g., ADO's and JDI's) as he carries out one or more of process steps 561-565. He (Max) may wish to modify selected ones of the activity descriptions and/or journal data items he received from others so as to create his own, derivative workproducts that better suit his personal working style. By sharing his own workproduct with others, and by receiving copies of workproduct (e.g., ADO's, JDI's) from other people, and by integrating the externally-sourced workproducts with his own, Max may arrive at a more refined and improved project description.

As various people (e.g., Max 555, Adam etc.) start sending and/or receiving copies of shared thought product, or work product, (e.g., ADO's, JDI's) from one another, they may want to enter into more formalized working relationships and to record their negotiated agreements regarding who is responsible for doing what and when. More specifically, Max Manager may ask Adam Assistant to accept delegated responsibility for completing development and/or deployment of an identified part of activity structure 551. Max Manager will want to know if Adam has received the delegation request and accepted the responsibility. If not, Max may elect to send a delegated task message to someone else. Assuming that Max Manager has successfully delegated responsibility for completing one part of activity structure 551 to Adam, and another part to Harry, Max may still want to keep track (569) of the progress being made by the others in implementing or further developing their respective parts or wholes of the various, and potentially growing or evolving activity sub-plans (e.g., 553). The ACMAN system provides means for readily doing these things as shall be seen from the below and yet more detailed description.

FIG. 6A shows one possible visual presentation 600 that may be provided in accordance with the present disclosure on a computer screen 601 or elsewhere. A structured activities displaying pane is presented at 610 while a journaled-items displaying pane is presented at 620. The formalized, activity-descriptions presenting pane 610 is here displayed in a spreadsheet mode. The user may be provided with a presentation toggling means for switching the format of the activity-descriptions presenting pane to instead express the underlying activity-descriptions (e.g., ADO's) in a vertically-oriented graphic depiction of a nodes and branches tree (see briefly FIG. 8) or a horizontally-oriented such graphic depiction (see briefly FIG. 15). In the spreadsheet-presentation format (610 of FIG. 6A) various attributes of respective Activity Data Objects (ADO's) may be displayed on one row per ADO basis, or on a plural-rows per ADO basis, or on a plural-ADO's per row basis. As for the plural-ADO's per row basis, corresponding attributes from the ADO's of different owners (Mine and Harry's) may be displayed on a same line and/or attributes from the parent-child ADO's of same owner may be displayed on a same line. The names of the attributes may be provided at the top of each respective, attribute-containing column.

In the specific example of FIG. 6A, presentation is on a one ADO per row basis. In one embodiment, the left-most column 611 has been programmed to display a primary hierarchical path representation; an ADO does not necessarily have to include hierarchical structure, but in this illustrated embodiment, the ADOs include hierarchy. This primary hierarchical path might be constructed from a possible primary parent attribute from each ADO and then concatenating their respective primary parent ADOs all the way up to a root node ADO. In the illustrated embodiment, this path is presented using short activity descriptors of nodes. The meaning of this will become clearer further below. Consider for now the top most ADO row in area 610 where the short activity descriptor field representation of that node is "Get wife birthday present" (displayed in the rightmost column, 616). The primary parents and grandparents of that node ("Get wife birthday present") can be identified by the root-to-primary parent pathname: "My_Activities\Personal\-Family". In one embodiment, each Activity Data Object (ADO) except the topmost, or root, ADO must have one and only one primary parent branch (\) linking the ADO back along a hierarchical tree to a primary parent node (where the topmost primary parent node in the tree can be a root node with no primary parent). Therefore, one possible way of identifying a given ADO is by following a primary hierarchical path from the root of its hierarchical tree (e.g., "My-Activities") and through its primary grandparents if any (e.g., "Personal"), and through its immediate primary parent (e.g., "Family") and along the primary path pointer that points from the primary parent (e.g., "Family") to the target activity node ("Get wife birthday present"). In one embodiment, ADO's can be uniquely identified by other means as well (e.g., ADO identifier codes), as shall become clear later below. The ADO's of one embodiment can additionally have one or more Secondary Parent ADOs, but each such ADO (except for the root) should still have exactly one Primary Parent node. The sequence of Primary Parent ADOs leading to a given ADO will be referred to herein as the given ADO's "primary hierarchy path". The expression of this primary hierarchy path may be made analogous to the pathname of a directory structure in a computer file system. Column 611 displays the primary hierarchy path in such a manner for each displayed row in pane 610, where each row represents another ADO.

A user can programmably instruct the spreadsheet presentation program to show all primary hierarchy paths in column 611 for his ADO's and to sort the rows by, for example, progressively drilling deeper down along each main branch and sub-branch of the hierarchical tree, as is shown in column 611 or by sorting alphabetically or by sorting while using a variety of sequential sorting keys as may be appropriate. The user is not pigeon holed into generating lists only according to primary hierarchy paths. The user can additionally or alternatively instruct the spreadsheet presentation program to show all secondary hierarchy paths in column 611 for his ADO's and to sort the displayed rows according to an appropriate sorting criteria. By enabling the presentation of ADO's both according to Primary Parents and according to their optional Secondary Parents, a user can view each ADO in a broader context of being not only a primary child of one parent activity but also as being the secondary child of one or more other activity descriptions (other ADOs). In practice, people might create categories or hierarchies of activities that are not truly mutually exclusive or merely top-down, i.e. they can have some relational overlap and/or some connective circularity. In one embodiment, wherein secondary parent-child relationships are not strictly hierarchical, i.e. successive secondary parent paths do not necessarily continue up to a root node, a given parent to child directionality might not be automatically determinable between two secondarily connected nodes. Therefore in such an embodiment, a user indication of directionality might also be requested. So secondary hierarchy paths might allow for such overlap and/or connective circularity (e.g., a secondary child can point to its secondary parent as being a child of the child). Moreover, in certain circumstances, one centrally-vital child activity may be needed to support or may be related to a variety of other activity descriptions in a multitude of other hierarchies or categories of activities. For instance, in FIG. 6A, the ADO 629 whose long description (616) is "Review Turkey contamination problem with Brad Butcher" is shown categorized under the primary hierarchy path "My Activities\Work\Meat Products\Turkey". However, Max Manager may have created another line of activity ideas for reviewing subordinate performance. Brad's performance in resolving the turkey contamination problem may be appropriately connected to his performance review under the path, i.e. "My Activities\Work\Staff\Write Staff Reviews\Brad Butcher". The amount of money spent in resolving the turkey contamination problem may also be secondarily related to the activity path of "My Activities\Work\Budget" (not shown). Therefore there can be many circumstances in which Max Manager instructs the spreadsheet presentation program to show not only all the primary hierarchy paths in column 611 for his ADO's but also the all the secondary hierarchy paths in column 611 for his ADO's. Additionally or alternatively may instruct the spreadsheet presentation program to filter out and thereby not list all the primary and secondary hierarchy paths down along column 611, but to instead show only a query-defined subset of these items. The advantages of allowing for secondary associations between activity descriptions will become more evident as further examples are provided later below. For now, it can at least be seen that the definition of a Primary hierarchy path enables the ACMAN system to display a corresponding one hierarchy path in column 611 for each ADO stored in the user's hierarchical tree. (A given human user can own more than one independent hierarchical tree, but typically that user will provide a different user name for each such tree.)

In spreadsheet mode, several other attributes of each displayed ADO may be simultaneously displayed and/or used as a basis (as keys) for filtered presentation and/or positional sorting. A few such other attributes are displayed in columns 612 through 615. A user may uniquely program the spreadsheet presentation software to display desired ones of ADO attributes in desired ones of the spreadsheet columns (see briefly FIG. 23) or the user may pick one of a set of pre-programmed display templates for use. In the example of FIG. 6A, a pre-programmed display template has been selected where the template shows the primary hierarchy path in the leftmost column 611, listed with long activity/node descriptors and where the template further shows the corresponding, long activity/node descriptor of the row's ADO in the rightmost column 616. The same spreadsheet display template shows the corresponding "Priority" state of the given row's ADO in the second column 612. For the illustrated embodiment, highest priority is indicated by three stars (*) while lowest is indicated by no star ( ) A user may double-left-click on the heading cell ("My Priority") of the second column 612** and thereby instruct the spreadsheet presentation software to re-sort the on-display rows according to priority (highest on top or vice versa by toggling a second time).

The same spreadsheet display template shows the corresponding "Status" state of the given row's ADO in the third column 613. For the illustrated embodiment, the letter P indicates that the underlying activity is still Pending, D (not shown) might indicate that the ADO-defined activity is Done, and X (not shown) might indicate that the underlying activity has been cancelled. Other letters may be used to indicate other activity status states, etc. In one embodiment, floating the cursor 605 over a status symbol for a predetermined time automatically invokes a pop-up help bubble which tells the user in long hand what the status symbol means. As is in the case of the priority display column, mouse or pointer clicking on the heading cell ("My Status") of the third column 613 instructs the spreadsheet presentation software to re-sort the on-display rows according to status (for example in alphabetically ascending order or vice versa if the top cell is clicked a second time). It may be beneficial if the user-defined set of activity status states are mutually exclusive of each other as well as representative of a complete and intuitive set of possible states, so that respective users can each clearly decide what status state is most applicable for each given one of their owned ADO's and they can therefore assign the correct activity status state to each of their owned ADO's. (In one embodiment, users are not permitted to modify ADO's that are "owned" by other people. Instead they can make a copy of their "own", possibly by a drag-and-drop operation that integrates a derived copy into an "embedded" portion of their machine area. Then they can modify their "own" embedded copy. This will be explicated later below.)

The same spreadsheet display template shows the corresponding "Sharing" state of the given row's ADO in the fourth column 614. For the illustrated embodiment, the abbreviated indicator, "Dg" indicates that responsibility for the underlying activity has been delegated to someone else. The abbreviated indicator, "WS" indicates that responsibility for the underlying activity is being co-shared (work shared) by the owner of the row's ADO and by one or more other users. If a cell in the fourth column 614 is blank, that may mean that no sharing agreement has been proposed or accepted. "Sent" means that an outbound Sharing proposal has been transmitted out but not yet responded to. These concepts will be explicated later below.

The same spreadsheet display template shows the corresponding "Due Date" state of the given row's ADO in the fifth column 615. If there is no due date assigned by the ADO owner for the underlying activity, the due date cell may remain blank. As is the case with other spreadsheet columns, a user may mouse or pointer-click on the heading cell ("Due Date") of the fifth column 615 and thereby instruct the spreadsheet presentation software to re-sort the on-display rows according to due date (closest one on top or vice versa by double-clicking a second time).

Figure 16A:
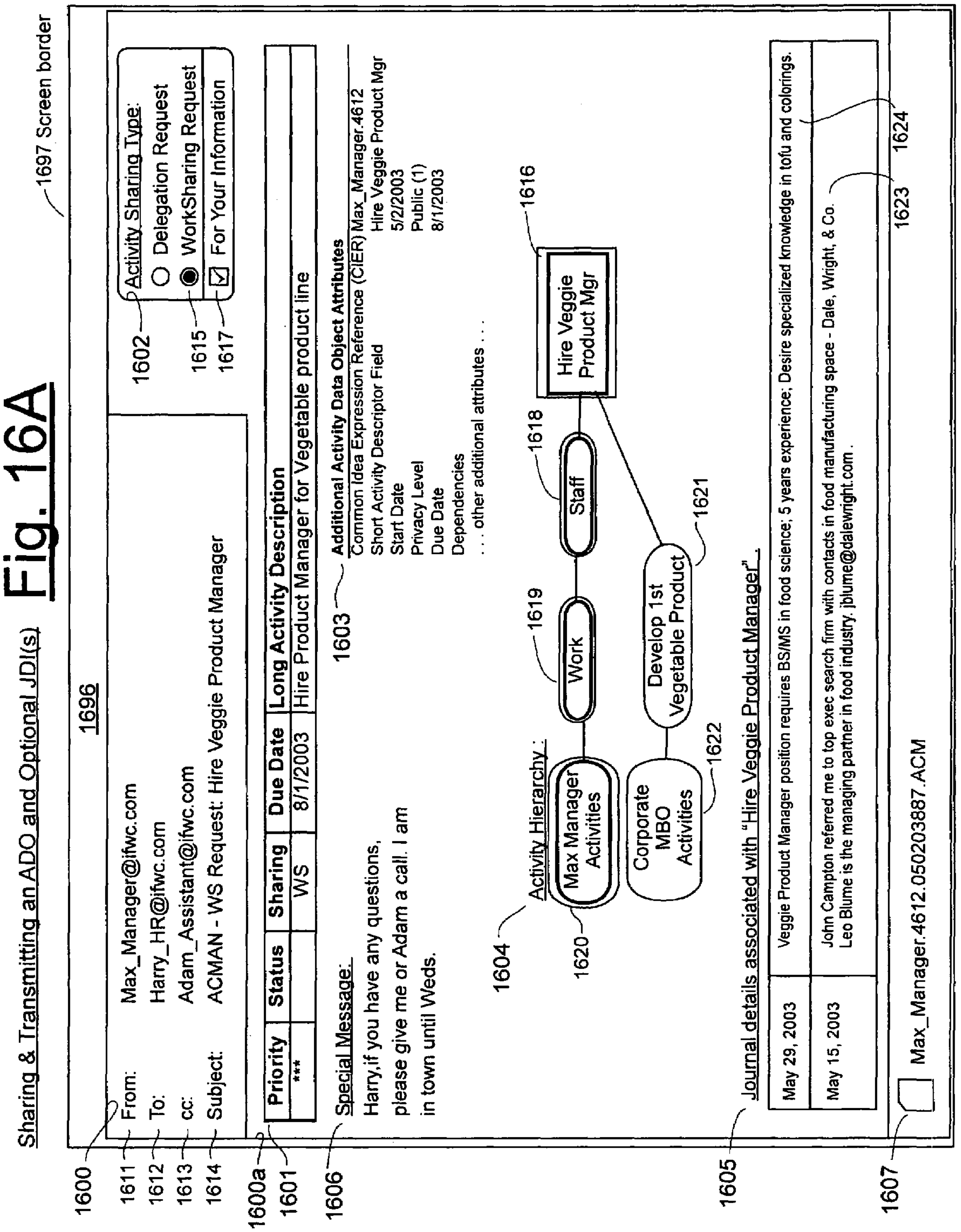
FIG. 16A is a diagram showing an email or other messaging container that may be used for transmitting one or more derived copies of activity data objects, and optionally derived copies of their associated journal data item(s), to other users.

As explained above, the sixth column 616 displays the long activity descriptor for the activity defined by the given row's ADO, where the primary hierarchy path for that same ADO is listed in column 611. In the illustrated example, Max can select any ADO line item shown and open it up with a mouse or pointer-click or another such GUI input so that the machine will provide Max with a more detailed presentation of the ADO's attributes. For instance, there may be other, less important ADO attributes which are not immediately displayed in the spreadsheet listing. There may be Sharing Status agreement details (contract details) that cannot easily be displayed in a simple spreadsheet view. There may be secondary parent hierarchies, or even relationships to other ACMAN user activities that are not displayed in the simple spreadsheet view but that may be useful to see and/or edit. See for example FIG. 16A (further detailed below), where Max is sending to Harry a copied subset of some ADO's owned by Max, and of some owned by the company (e.g., by Charlie Chief) for Harry to preview and consider. The illustrated email of FIG. 16A shows some of the additional ADO attributes 1603 and foyered parent relationships 1621-1622 that may be presented in a display when a given line-item is opened for closer inspection. In one embodiment, an owning user (e.g., Max) can edit many or most of the attributes of an ADO owned by that user (e.g., Max).

As just noted, the fourth column 614 shows a simple summary of the sharing status of the given ADO covered by the respective spreadsheet line item. In one embodiment, an ADO can be shared with different people under at least any of the following three sharing arrangements: Delegated (Dg), WorkShared (WS), or For-Your-Information (FYI). "Delegated" indicates that the owner of the transmitted Activity Data Object is requesting that the recipient accept sole completion responsibility for the underlying activity. If the targeted recipient receives and accepts (acknowledges) the delegated ADO, the delegating owner (e.g., Max) can assume that he (Max) is not going to further engage actively in the activity or be directly accountable for completing the activity. However, the delegating owner may chose to monitor the progress of the activity by checking on status updates received from time to time regarding the derived ADO which the delagatee machine automatically created when the Dg assignment was accepted.

The WorkShared (WS) arrangement similarly indicates that the owner of the transmitted Activity Data Object is requesting that the recipient accept responsibility for the underlying activity. If the targeted recipient receives and accepts (acknowledges) the Work-Shared ADO, the sharing owner (e.g., Max Manager) can assume that the recipient (e.g., Adam Assistant) will be assisting in the development and/or deployment of the underlying activity. Unlike Delegated work, in Work-Sharing the requestor (Max) is also expected to be engaged in the doing and/or completing all or some part of the underlying activity. In one embodiment, Delegated work is limited to being accepted by only one person at a time so that a clear chain of accountability can be maintained. In an alternate embodiment, if a Delegated (Dg) activity data object may be sent to multiple people and Delegated to each of them, and in this case, the ACMAN system optionally stores in the sender's version of the ADO, a different member Activity status for each receiving member. One person may be "Done" with her delegated activity, and another person may still be actively working on his instance of the multiple-wise delegated activity. So in effect, the originally sent activity description (ADO) may be treated as two or more separate Activity Data Objects, each with its own Activity Status. For a WorkShared ADO on the other hand, responsibility may be shared among several members, for instance Max, Joe and Sally, all working toward the same objective. If one person, Sally, completes the activity, it may be considered "Done" by all the participants. Optionally, even though Sally updated the WorkShared Activity Status as "Done", the original creator of the activity idea, Max, may review Sally's update information and realize that the overall activity in fact is still not totally "Done". So a WorkShared activity data object may have different individual participant statuses, but the originating author of the activity idea may share out to all participants, one collective or overall Activity Status.

The third share type, "FYI" (For Your Information) is a passive sharing type. Its purpose is to explicitly allow another person to become aware of the activity idea, and/or its activity status, and/or updates to the originating owner's Activity Data Object, but not to necessarily to invite the FYI sharee member to actively participate in the underlying activity. In one embodiment, FYI sharing may not necessarily exclude the FYI sharee from choosing to nonetheless actively participate in the activity. Benefits of the FYI sharing type will become more clear as it is further explained below in the context of a distributed communication environment that the ACMAN system can supports. Briefly, one advantage is that FYI sharing allows people not explicitly involved in the pursuit of an objective to be made aware that other people are contemplating that activity idea. In one embodiment, recipients (e.g., Charlie Chief) of FYI shared activity reports can instruct their ACMAN system to automatically filter out such FYI types of received ADO's from their Activity Presentation area (e.g., 610 of FIG. 6*a*) so that only activities they are actively involved in will be presented to them.

As has been observed, there may be further details associated with the sharing status of a given ADO. In one possible example, Max may have just sent a WS-type ADO bearing the description: "Write up cookie handling specification with quality group", to Harry HR, Adam, and Tom. So the Sharing Status 614*a* of that spreadsheet line item may indicate "Sent" as is illustrated. Max may want to see the more details about the sharing status. To do so, in one embodiment, he holds his selection pointer (e.g., cursor 605) over the Sharing Status cell at 614*a* to see more details, and the spreadsheet software responds by popping up an informational bubble that provides more detailed information about for example, who has acknowledged receipt of the transmitted request and who has accepted the invitation to join in the development and/or deployment of the underlying activity. In an alternate embodiment, Max may instead double click his pointer on cell 614*a*, or he may choose from any other of a plurality of input means for indicating the desired command to the ACMAN system to display more sharing details.

One possible example of a responsive presentation by the system to a request for sharing details (a double-click on cell 614*a*) is illustrated in FIG. 7 in screen area 710. FIG. 7 illustrates one embodiment in which outbound sharing status details are presented. In other words, if Max initiates an activity idea and transmits his expression of that owned activity description to Adam, then for Max, his owned ADO has been outbound shared to Adam. Adam's ACMAN system may receive the derived ADO copy, and Adam's ACMAN system may record a foyered and derived copy of the received ADO, as well as optionally an embedded derived copy that is owned by Adam. But unless Adam further shares the activity description to a third user, Adam's ADO copy(ies) might indicate an inbound sharing status but no specific outbound sharing information. This inbound sharing status may or may not include details about who else Max shared the activity description with, or the sharing status of those other possible participants. FIG. 7 does not necessarily illustrate an embodiment inbound sharing details. The circles and boxes as illustrated at 703 and 704 show an embodiment of underlying methods and highlight and/or describe how certain areas in the diagram may operate. Not all parts of FIG. 7 may be displayed. In one embodiment, only solid material inside boxed region 700 appears in the pop-up window. In another embodiment, help boxes as in 703, 704 which include the smaller circle chains leading up to these boxes, might also be displayed, either automatically or for instance when a user's mouse or pointer rests above a specific area of the presentation. These help boxes might help the user understand the meaning and purpose of the various presented information.

The box provided in FIG. 7. region 703 of the illustrated example shows that Max's ADO's Sharing Status summary presentation might have one of five possible summary states. At first, the Activity Sharing Status might have the value: "Not Shared" if the corresponding ADO has not been sent out as a shared activity data object. Later the state may change to "Sent" if the corresponding ADO has been sent out to others, but no acknowledgement has yet been received. Yet later, the Activity Sharing Status might take on one of the values: WS, Dg, or FYI (WorkShared, Delegated, or For-Your-Information) depending on what request was sent out and how the recipient(s) responded. In one possible example, Max may have just sent an ADO copy, "Write up cookie handling specification with quality group", to Harry HR, Adam, and Tom. So the Sharing Status presentation 614*a* might indicate "Sent". Note that if a sharing agreement offer for the activity data object has not yet been accepted by anyone else, it may not yet be considered to be WorkShared, FYI, or even Delegated. It might only be shown as "Sent". In the detail view of Share Status 703*a*, the same simple, or summary, "Sent" Sharing Status is also presented. The details can also be shown in area 702. Area 702*a* may indicate who the Activity Data Object has been explicitly shared to by Max (where Max's machine is the source of the shared activity data object transmission). Area 702*b* (Sent Share Type) may indicate what type of sharing agreement was proposed for each participant. For instance, Max may have sent this activity description "To" Harry HR and Adam to be WorkShared, but he only sent it "cc" Tom as an FYI. Maybe Tom had been waiting for this activity to get started, so Max just wanted to let him know about the new WorkShared status of the activity. Lastly in FIG. 7, the acknowledged sharing status per each member on the participants list 702*a* is shown at 702*c*. Flowchart 704 shows a possible sequence for participant member states. The first and initial state is "NULL"—Max may have already expressed (created) the Activity Data Object which he intends to share, but he has not yet sent it. Next, if Max has "sent" out the Activity Data Object with the proposed share type that was sent being Dg or WS (Delegated or WorkShared, respectively), Max may be "Waiting" for a returned acceptance from Harry and Adam. In the case of Tom who is an FYI sharee, Max has Sent the sharing request but Max is "Not Expecting" a response. (Although maybe not likely, it is possible in one embodiment that Tom might still choose to get involved in the activity in some unforeseen way, so it is also possible that Tom could at some point, drag a copy of the sent ADO into his owned (embedded) activity list, then Tom and/or his machine may send an update back to Max indicating that Tom has accepted active participation in the task.) Next, any of the receiving member participants can respond to the activity sharing request by transmitting a recipient's status update such as "Undecided" if they have read the request but have still not decided. Each given recipient may alternatively accept the request and re-designate it as "Active", or the recipient may "Deny" or reject participation in the activity. If initially "Undecided", participants may later choose to "Deny" or "Accept" the sharing request. If the participant chooses to "Accept" participation in the sharing request, then the invited participant's actual ADO status (Active, Pending, Done, etc.), rather than just the sharing response status, may optionally be displayed back to the originator in the acknowledged Member ShareStatus area 702*c*.

Figure 8:
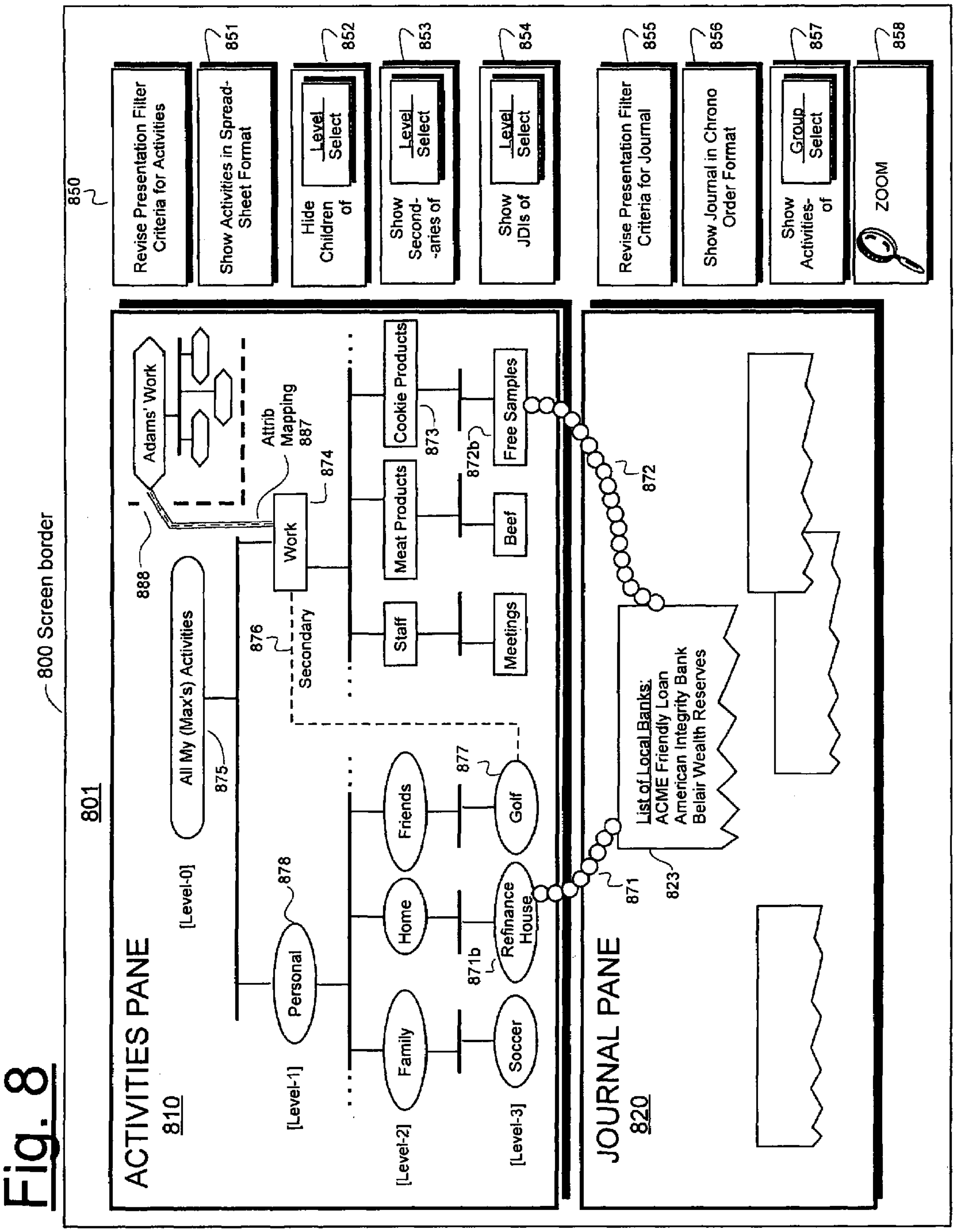
FIG. 8 is a schematic diagram showing another user interface presentation in accordance with the disclosure which simultaneously presents to a given user his/her (and someone else's) expressions of hierarchically organized activity nodes in graphical tree presentation mode and/or associated journal data items in sticky-note mode, while also indicating that logical linkages have been made visible by the machine between certain ones of the structured activity data objects and corresponding journal data items.

As should be apparent from the above, systems in accordance with one embodiment of the disclosure may support hierarchical categorization of Activity Data Objects by use of one or more relationship structures (e.g., primary parent/child and secondary parent/child relationships). As mentioned, Secondary Parents and Secondary Children are possible enhancements to a basic tree structure. Just to better illustrate some of the terminology used herein, FIG. 8 shows a screen shot 800 where iconic representations of various Activity Data Objects are displayed in graphical form, for example drawn hierarchical tree with icons, in an Activities Pane 810. It can be seen that under the category, "All My Activities"\"Work"\-"Cookie Products", Max has defined a subtask 872*b* which he chose to call "Free Samples". For the tree structure shown in FIG. 8, subtask 872*b* is an End Node in the tree. Subtask 872*b* is also a primary child of the "Cookie Products" node 873. The "Cookie Products" icon 873 is in turn displayed as being a primary child of Max's "Work" node 874. The latter node 874 is in turn displayed as being a primary child of Max's top-most node 875. This top-most node can be the Root Node of Max's embedded ADO tree. In one embodiment, if Max wishes, he can insert a new, top-most node above node 875. In the state shown, node 875 is the primary parent of nodes 874 and 878.

Referring again to FIG. 6A, a journal data items displaying pane 620 is presented below the activity objects displaying pane 610. Logical links may have been already established within Max's machine between some or much of the content within the Journal pane 620 and various ADO's in the structured Activities pane 610. Spreadsheet line items in Activities pane 610 may be used to call out (e.g., select and/or display) certain journal data items expressions in Journal pane 620 or vice versa. It is briefly explained now how the Journal pane may be structured, although a more thorough description will follow below.

Figure 6B:
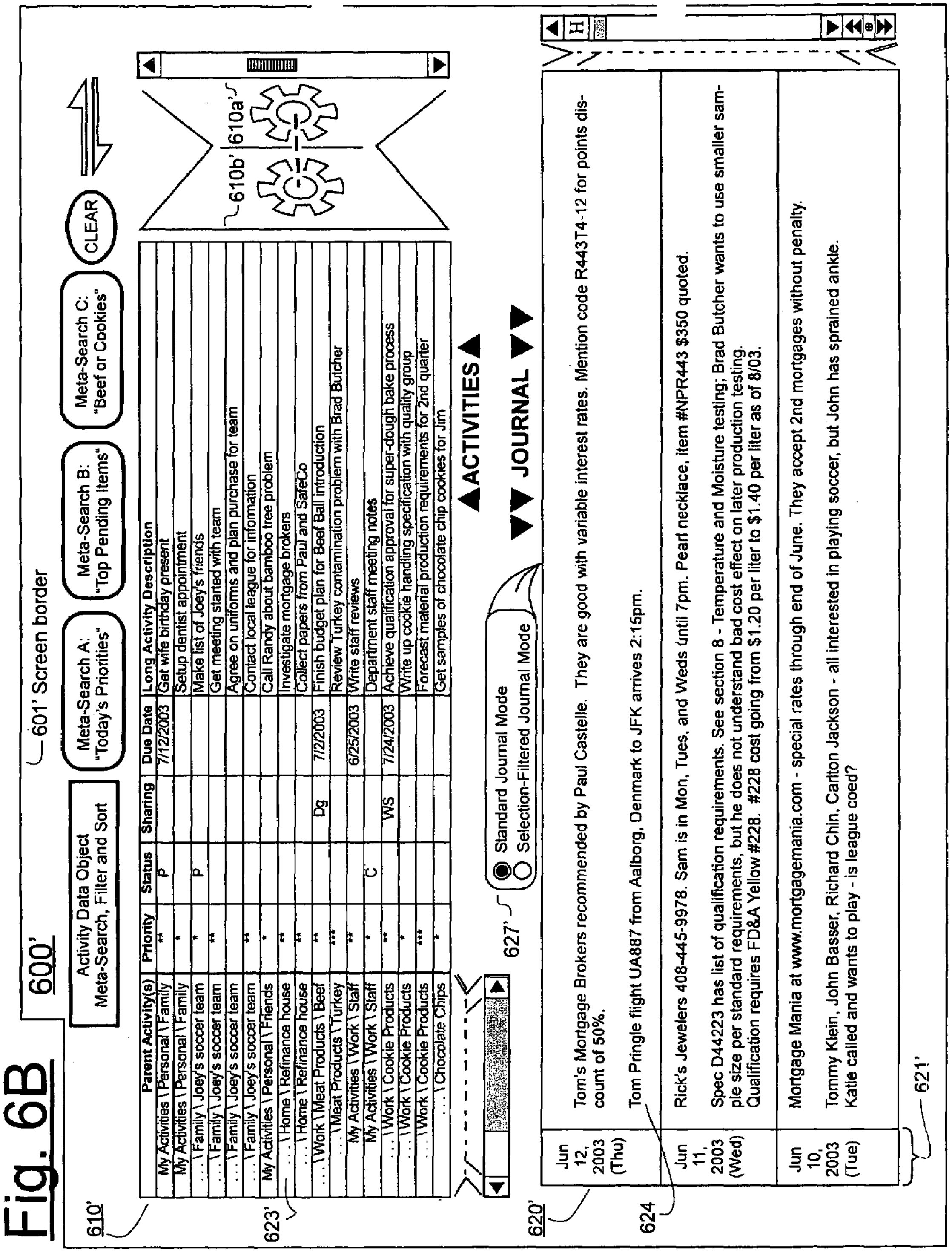
FIG. 6B is a schematic diagram showing a user interface presentation in accordance with the disclosure which simultaneously presents to a given user his/her (or someone else's) expressions of hierarchically organized activity nodes and/or associated journal data items, where the illustrated presentation of the journal is provided under an optional, unfiltered mode.

Assume that in FIG. 6A, the user (e.g., Max) has just single-clicked his cursor 605 on the spreadsheet line item for "Investigate mortgage brokers" 623. In the given embodiment, such a single-click selects the corresponding ADO (not directly shown) and all its on-display children. Therefore, in the illustrated example, child line "Collect papers from Paul and SafeCo" is automatically selected as well. The Journal pane 620 automatically responds by displaying journal items that are logically linked to the line items selected in the Activities pane 610. To better understand how this works, consider briefly FIG. 6B which shows a slightly different presentation mode. The Journal pane 620' of FIG. 6B is in Standard Journal Mode instead of in Selection-Filtered Journal Mode. Standard Journal Mode shows all journal items, typically in chronologically backwards order according to when the respective journal data item was captured into the user's journal space. In Standard Journal Mode, Max can enter any Journal Data Items into the journal in a completely carefree and unstructured manner, and the ACMAN system may present the JDIs in the order that they may have been entered in by Max. Note that in this mode all of a user's non-archived Journal Data Items might be presented. In one embodiment, the ACMAN system automatically timestamps each entry with a date and/or time so that a chronologically sorted presentation of such entries can be displayed and browsed through. In one embodiment, journal entries may be displayed as being grouped into daily-entry segments, as is done in column 621' of FIG. 6B. Alternatively, weekly or hourly, or other segment options could be used. In this example, Max can view all of his journaled data items as captured over the last few days, and if desired, he can scroll or search down to a specific date. In FIG. 6B, logical links (if any) between the displayed journal items and displayed activity objects are in invisible mode. FIG. 6C shows what happens if a one or more of such logical links are switched into visible mode. Displayed connection lines 635 indicate on the presentation screen 601" various associations that Max created between one or more of Max's activities and a given one or more journal data items. The data structures which support such cross-pane connection lines 635 can be referred to as "extra-journal links" because in one embodiment, as illustrated in FIG. 6C, they logically extend out of the Journal pane 620" and into another display area (e.g., pane 610"), or vice versa. The illustrated connection lines 635 might be toggled to display or not to display, in different or same colors, and/or momentarily (flashing or one-shot) or persistently as may be selected by the user. FIGS. 6A and 6B show them as being off altogether. In the example of FIG. 6C, a first extra-journal link 635*a* is shown extending between the first journal data item of Jun. 11, 2003 and Max's activity data object of "Get wife birthday present". This extra journal link 635*a* may have been created by Max in any of a number of ways. For example, it may have been created with a mouse drag operation where the drag either started from the journal area 620" and continued up to the desired associated activity data object ("Get wife birthday present") or the drag started in the activity pane area 610" at the desired activity data object ("Get wife birthday present") and continued down to the journal data item ("Rick's Jewelers . . . ") at which point Max released the mouse button to thereby end the drag operation. (Some other ways of creating the extra-journal link are briefly illustrated in 2651 of FIG. 26.) Max may use various tools to hide or show or create the different logical linkages between spreadsheet lines of journal areas or icons that respectively represent the different activity nodes and journal data items. The linkage symbols such as shown at 635 might have different colors or iconic shapes and so forth to distinguish them from one another and may be activated or deactivated as if they exist in different levels. Multiple extra-journal link associations can be made on a one to many and/or many to one basis between the journal data items and the activity data objects. (This may also include a many to many capability, not shown, but for instance wherein these extra-journal links might be created: ADO-1 with JDI-1 and with JDI-2; ADO-2 with JDI-2; etc.) For instance, Max may have caused the spreadsheet line item: " . . . \Home\Refinance house\Investigate mortgage brokers" 623" to be coupled to the first journal data item representation of June 12 635*c* as well as to the first journal data item representation of June 10 635*d*. Conversely, the second journal data item on June 11 635*b* is shown to have been logically linked to 3 different activities of the upper pane 610'". Those 3 activities might have seemed completely unrelated previously, but later Max realized there was some relationship between all of these activities and he created a set of logical links to remind himself of that at yet a later date. Max's ability to create linkages between random journal data items and arbitrarily selected activity descriptions provides Max with a powerful tool for finding journal data items that Max has previously deemed as being related to activity data objects or vice versa. In other words, as Max is reviewing one of these, he calls up its counterpart for simultaneous display. Depending on what is being displayed at a given time, Max can conjure up and record all sorts of unique logical linkages between any two or more of a displayed set of journal items and/or formalized activity descriptions.

Although the illustrated examples show visible connection lines (e.g., 635) as the means for visually indicating logical linkage, it is within the contemplation of the disclosure to additionally or alternatively use other methods including the color-coding of counterpart activity objects and journal items. By way of example, if a first ADO is logically linked to a counterpart first JDI (e.g., as represented by line 635*a* in FIG. 6C), the presentation software can assign a first of different, highlighting colors to that first set of counterpart ADO and JDI expression, say yellow. Then, if a second set of one or more ADO's is logically linked to a counterpart second set of one or more JDI's, the presentation software can assign a second one of the different highlighting colors (say green, and say on a round-robin assignment basis) to that second group of counterpart ADO's and JDI's. The presentation software may then shade the displayed expressions of the counterpart ADO's and JDI's with their respective, linkage-indicating colors (e.g., yellow highlighting for the first group and green highlighting for the second group). A user may then quickly perceive the logical linkage between members of the first and second groups. This can be done without obstructive, cross-over lines. If a given object or item belongs to several groups, its display region may be filled proportionally with the colorations of the several groups. Coloration is just one example of a visual marking system. All sorts of other visual marking systems may be used, including but not limited to: texturing, bolding, change of text font, change of background/foreground color combinations, common reference numbering, etc. To explain the common reference numbering further, the presentation software might assign reference numbers or other symbolic reference indicators, unique among each of the on-display ADOs, respectively to each of the ADOs that are logically linked to one or more JDIs. The presentation software could then present the respective reference indicators alongside or near each presented ADO as well as alongside or near each extra-journal linked and presented JDI. A user may then quickly perceive the logical linkage between members of the first and second groups.

Returning to FIG. 6A and contrasting its presentation to that of FIG. 6B and FIG. 6C, one can see that FIG. 6A displays the Journal Pane in a Selection-Filtered Journal Mode instead of in an unfiltered, or Standard Journal Mode. Max may have selected specific ADOs that he might be interested in. The selection may have been carried out by using a mouse and/or another input device (e.g., keyboard) to invoke the selection of one or more activity descriptions (ADO's). The selection action may have identified a parent ADO and the ACMAN system may have been in a mode where selection of the parent ADO also implicitly instructs the system to select all primary (and optionally secondary) child ADO's of the selected parent ADO, and/or all further, primary (and optionally secondary) progeny of the selected parent ADO. The selection action may have been carried out in conjunction with an expressed selection instruction that causes the ACMAN system to select all ADOs that meet certain text, string or value search criteria in certain, specified ADO attribute fields. Only some of the JDIs in the journal storage area might have logical links to the selected ADOs. The presentation software may then respond by selecting only the logically linked JDIs in the journal pane so that they can be further manipulated (e.g., presented by themselves as in FIG. 6D and FIG. 6A, or copied as a collective group for attachment to a further data structure). Additionally or alternatively, Max may have provided his ACMAN system with certain text, string, or value search criteria by which to automatically further or alternatively select matching JDIs in the journal storage area. In one embodiment, while the system is in Selection-Filtered Journal Mode, Max's ACMAN system will present only the JDIs that are logically linked to selected Activity Data Objects whose expressions are currently on-display in the Activity Pane. (On-display does not necessarily mean currently showing. Each pane can have a scroll mechanism e.g., 622*a* wherein only a subset of the on-display results actually appears and the remainder show up in response to a scrolling action.) In an alternative embodiment, when in the system is in Selection-Filtered Journal Mode, the ACMAN system might only present the Journal Data Items that were recently selected by means of logical linkage with ADO's or in other ways. Such filtering of the Journal presentation can remove clutter and allow Max to quickly see all journaled data items that are associated in some particular way with a given one or more Activity Data Objects.

The shading in FIG. 6A on the spreadsheet line item " . . . \Home \Refinance house" indicates that Max has selected this Activity Data Object Node. He may do this by clicking or double clicking his mouse while a display pointer (cursor) is pointing to this node. Or he might type in the pathname of that node to make such a selection. Additionally in this example, Max is using an optional capability of the ACMAN system that automatically selects all Child Activity Data Objects. (Primary or primary and secondary children might be automatically selected). Thus in column 616 it can be seen that two underlying Activity Data Objects might have been automatically selected as a result of his selecting just one parent Activity Data Object, or node. Comparing FIG. 6D with FIG. 6A, it may be seen that in FIG. 6D, Max has toggled visibility to "on" for showing the extra-journal links 631 between his selected Activity Data Objects and their associated Journal Data Items. Thus, in a Selection-Filtered Journal Mode, only the journaled items that match ADO and/or other selection criteria (including optionally only those which have been time-stamped within a pre-specified date range of the journal) might be presented.

In this immediate example, Max manually selected an Activity Data Object expression that happened to be already displayed in the Activities Pane. However, the system may provide Max with a wide variety of tools for locating various activity nodes and sorting the results. In one embodiment, as shown in FIG. 6A, Max may move pointer 605 and click it on the heading for Parent Activities to re-sort the rows alphabetically according to parent activity path names. Alternatively, Max might click pointer 605 on the priority heading of column 612 to re-sort the rows according to priority with most important priority on top, or next on the bottom, by toggling the order with alternating mouse clicks. Max may alternatively sort according to status by clicking on the heading of column 613 or on the basis of work-sharing agreement by clicking on the heading of column 614. Similarly, Max may find the activities which have the soonest due dates by clicking on the heading of column 612. Additionally, Max may sort alphabetically by long activity descriptor by clicking on the heading of column 616. Max may then select a subset of the so-sorted spreadsheet line items and then cause the machine to automatically call up the logically linked journal items of the selected ADO's.

The search engine capabilities of the system (examples indicated in FIG. 6A) may also allow Max to search and/or select (617) Activity Data Objects matching various comparative criteria conditions including text string (with or without wild card) matching, fuzzy logic matching algorithms, rich media matching, etc. Such searching might utilize a logical query condition in order to select and/or then selection-filter the Activity Pane and/or the corresponding Journal Pane with the results of that search, and to sort the Activity Data Objects in a certain order. There may be many possible variants of these selection and/or filtering capabilities. For instance, such searching may be set to select query matching activity descriptions, yet present both the selected and the not-selected activity descriptions in the on-display area 610. The searching may instead be set to select query matching activity descriptions and only present in the on-display area those resulting selected activity descriptions. Additionally, the journal could be set (see briefly FIG. 22 2224) to indicate logical links 635 to the JDI expressions that are extra journal linked to the now selected activity descriptions and/or hide those JDI expressions 620''' that are not extra-journal linked to the now selected activity descriptions, using the Selection-Filtered Journal Mode option 627'''.

The "Meta-Search" capability 617 also may allow Max to perform Boolean sum of product searches and/or selection-filters of his activities. For instance, Max may use button 617 to open a search and sort options tool menu. With this tool menu, he might choose to find Activity Data Objects meeting the following Boolean condition set for example: Select all ADO's (having a Priority attribute setting of "Highest") OR (having a due date within the next 2 days AND that are primary child activities of "My Activities\Work"). Alternatively, Max might simply search for ADOs whose (short and/or long) activity descriptor fields, or attributes, include the text “staff”. Additionally or alternatively, Max might use any of a number of search criteria in combination, including those that use wildcards. Max may choose to search and selection-wise highlight only the Activity Data Objects expressions that meet these criteria, or he may choose to search and selection-filter the Activity display pane to show only the ADO expressions that meet these criteria. If he chooses the activity selection-filter option, he may wish to sort and/or group the displayed Activity Data Objects in some fashion. For instance, he may wish to sort by due date first and then secondarily by priority in descending order. All of these options can be useful to Max Manager, since he may have a great number of activities of varying importance or urgency. Max may find that this particular meta-filter and sort criteria is one that he will want to use possibly every day to help him prioritize his activities each morning when he gets in to the office. So he may save a criteria definition originally created under the first button 617 as a frequently used search criteria that can be called up by activation of second button 618. He might give this earlier-defined search a name, to make it easy to remember, for example, “Today’s Priorities”. This name can appear as the top of an expandable menu that rolls out from second button 618. He may have other saved meta-search criteria displayed on top for other searches that he often uses; for instance “Top Pending Items” 618*a*, or his pet projects “Beef or Cookies” 618*b*. Finally, Max may run a certain meta-search, which might result in a certain display. After that, he can then clear 618*c* all meta-search or selection-filter settings currently in effect to thereby re-display all of his activities. He might also click on a “Go Back” arrow 618*d* to go back to a previous view state. Later, he might use a “Go Forward” button above that to go forward to a view state that he had gone back from (similar to a web browser’s forward and back buttons). Of course, aside form all these more powerful search and sort tools, the presentation software provides the user with more mundane capabilities, including for example, dragging a spreadsheet’s row data to any desired new row within the spreadsheet, or performing a positional change with row-cut and row-paste options, or popping a selected one or more rows up to the top of the spreadsheet list, or pushing a selected one or more rows down to the bottom of the spreadsheet list (thereby implementing a manual bubble sort if desired). Also, the user can copy any spreadsheet’s row data to any desired new row and thereby create a new activity node. (The presentation software might create a new underlying ADO and prompt the user to provide appropriate input for identifying the hierarchy path of that new ADO.) Also, the user can copy data from any spreadsheet cell and paste it to a corresponding other cell in the spreadsheet if permission exists for modifying the destination cell’s contents. Therefore, the spreadsheet presentation format provides the user with powerful, yet easy ways of modifying the contents of formal activity description objects (ADO’s) and/or of controlling the way the corresponding ADO attributes are presented back to the user in search-filtered or unfiltered modes.

Often the result of a database search or query is larger than can fit within the finite area of the activities pane 610 and/or of the journaled items pane 620. Accordingly, a scrolling mechanism such as 610*a*-610*b* may be used for scrolling through the, theoretically on-display results, moving the viewing scope up and down or sideways within the corresponding pane (e.g., 610). Intra-column scrolling may also be enabled as is indicated by scroll bar 611*a* which might scroll the material inside of nodal hierarchy path column 611. If the activities pane 610 is programmed to present a representation of the long activity descriptor fields of the corresponding activity nodes, that column too may have an intra-column scrolling means (not shown).

As seen from FIG. 6A, the journal data items displayed in pane 620 are chronologically ordered with the more recently journaled items being on top. Max might click on a heading for column 621 (a time stamp column) to flip the ordering the other way. (Additionally or alternatively, Max might use row dragging and/or cut & paste operations to reorganize the way in which the journaled items are presented to him. The presentation software can remember the last relative positions of displayed items and re-present them in the same way as before if desired.) In the illustrated example, display column 622 provides a text view of the journal data items. Scroll bar mechanism 622*a* may be used for scrolling items up and down in the journal data items pane 620 as appropriate.

Max does not have to be limited to viewing his formalized activity descriptions in spreadsheet format. FIG. 8 shows alternate display modes for each of the Activities pane and the Journal pane. In the illustrated example of FIG. 8, the user (Max) has elected to show his Activity Data Objects in a graphical tree format. He has also elected to show his journal data items in a sticky note format. As is the case with the spreadsheet-like displayed, activity descriptions and journaled items of FIG. 6A, the presentation software can remember the last relative positions of displayed graphical items in FIG. 8 and re-present them in the same way as before if desired. Thus journal items and/or iconically represented activity nodes can have a sticky-note characteristic of remaining in the relative positions where they were last left by the user. (The presentation software also provides auto-rearrange options so that the user can clean up a messy desktop and reposition the items according to date, hierarchy path or other attributes.) Although FIG. 6A showed the activity pane in spreadsheet format with the journal pane in chronological format, and FIG. 8 shows the activity pane in graphical format and the journal pane in sticky note format, the two respective activity pane formats and the two respective journal pane formats can be mixed and matched. For instance, the activity pane could be presented in graphical mode while the journal pane is presented in chronological format.

One advantage in using a graphical tree format (e.g., FIG. 8) is that if hierarchical relationships are included in the system, Max can easily see his activities and their hierarchical relationships, and he can easily rearrange their position in the hierarchy with drag and drop operations or the like. (When dragging a parent node, all its children and their progeny may optionally be displayed as moving also. Additionally, the user may elect to hide items that are below or above a certain hierarchical level in the displayed tree.) The graphically-displayed tree structure allows Max to easily insert new activities into the graphically presented tree in visually cued locations. Max can establish both primary and secondary parent/child activity data object relationships as desired. In order to make the graphical tree structure more viewable, each Activity Data Object may contain an optional Short Activity Descriptor Field (see briefly FIG. 12A, item 1234), also referred to here as a Short Name (or Simple Name, or Abbreviated Name) attribute, which in one mode, is displayed in or near the respective graphical icon that represents the respective activity node. The Short Activity Descriptor field might be provided in addition to a Long Activity Descriptor field (see briefly 1233), where the latter might be displayed continuously or only when the user dwells his cursor over the corresponding graphical icon.

In the illustrated example of FIG. 8, Max has realized that one of the journal data item expressions (a sticky note which provides a list of local banks) 823 should be logically linked not only to his home refinance project 871*b* but also to his project for distributing free samples 872*b* of the new cookie product in local commercial establishments. (He can distribute the free samples at those banks.) The graphical display modes of the activities pane and the journaled items pane allow Max to easily record the new mental association he just made by correspondingly creating visible linkages between the subject journaled item (a list of local banks) 823 the respective graphical icons that represent the home refinance project 871*b* and the free samples project 872*b*. In one embodiment, Max can do so by clicking on the subject journaled item 823 and dragging from that journal data item expression to each of the corresponding graphical nodes, 871*b* and 872*b*. Alternatively, Max can do so by selecting the journal data item expression and thereafter using the application command-entry menu (not shown) to type in the node name or node and path name of the node to which a logical link is to be established. Max might alternatively have a list of identifications for respective ADO's stored in his system clipboard and he may paste those into the application command-entry menu so as to create the desired, logical linkages. The list of ADO identifications may have been created by one of the selection operations described herein for FIGS. 6A-6D plus a copy-to-clipboard user instruction.

In further working with the presentation 800 of FIG. 8, Max may realize that his Golf activity 877 should be secondarily associated with his Work activity 874. Max can use a line-drawing drag operation or another operation for creating the secondary association between the Golf icon and the Work icon. Since Golf is already a primary child of "Friends", his system might automatically infer that Golf is a secondary child of Work, or give Max the option to switch the parent/child relationships to make Golf a primary child activity to Work instead and a secondary child to "Friends".

A number of display-control and element modifying buttons are shown to the right of panes 810 and 820. In one embodiment, the user can programmably change which tool buttons are shown immediately to the right of work panes 810 and 820, versus which are docked away elsewhere, possibly in the user menu command structures illustrated in FIG. 22, FIG. 26, and FIG. 27. In the illustrated example, tool button 850 might allow the user to cause his ACMAN system to select and/or filter the on-display activity descriptions shown in 810, similar to the capabilities explained in FIG. 6A 617. Tool button 851 might allow the user to cause his system to switch the activities pane to spreadsheet format. Tool button 852 might allow the user to cause his system to selectively hide (or on alternative pointer clicks, unhide) child nodes below a certain level or below an icon the user may select. Tool button 853 might allow the user to cause his system to selectively display (or on alternative pointer clicks, show) secondary child nodes below a certain level or below an icon the user may select. Tool button 855 might allow the user to cause his system to selection-filter the journal according to a set of query conditions indicated by the user. Tool button 856 might allow the user to cause his system to toggle the journal pane presentation to a selection-filter chronological, instead of sticky note, format. Note that a sticky note journal presentation format for the journal pane 820 is an optional embodiment. Other journal presentation formats, such as in 620 (FIG. 6A) are possible and in one embodiment, a sticky note format may not be provided to a system user. Tool button 857 might allow the user to cause his system to selection-filter the activities pane icons to present only the expressions of ADOs that are extra-journal linked to user selected JDI expressions. Alternatively, the tool could cause the system to selection-filter the activities pane to display the expressions of ADOs that are extra-journal linked to any of a group made of a plurality of JDIs. Tool button 858 might provide the user with a convenient way to cause his system to zoom in or zoom out the magnification size of the presentation.

FIG. 9A schematically illustrates a journal presentation interface 900 that may be used for entering, editing or reviewing journal data items in accordance with the present disclosure. The Activities Pane might be selectively shown or hidden away from the user, and in this illustration, it is not presented in display area 999. A command bar 910 may be visually presented at the top or elsewhere, nearby to a journal viewing pane 901. The viewing pane 901 may include one or more scroll bars such as shown at 929 for scrolling through a found set of already-journaled data items. Often the size of the found set is larger than that which can be easily displayed in the viewing pane 901 under a current zoom setting. The viewing pane 901 may further include a title bar 920 such as the one shown in FIG. 9A. The illustrated example 920 indicates that the items presented below it constitute part of Max's personal journal (which is owned by Max) of collected and recorded information. The presentation might be filtered by a particular search keyword. In the illustrated example, scrollable-revisable box 920*a* indicates that the illustrated items relate to anything (to "ALL"). This box 920*a* could instead be indicated to display only journaled items that are logically linked with specific Activity Data Objects, or specific ADOs and child ADOs that are part of the drop down list of the scrollable-revisable box 920*a*. Alternatively, Max can type in 920*a* a search string like "Maxene", and then only journaled items containing that search string might be displayed. Note that the "Activity Data Object Meta-Search, Filter, and Sort" function described in FIG. 6A (617) may be used in addition to this simple journal selection-filter 920*a*. For instance, if a Meta-Search option 617 (in FIG. 6A) is used but the journal is in Standard Journal Mode 920*b*, only the Activities in the Activities Pane might be selection-filtered. Journal selection-filter 920*a* could be used to implicitly select and present just the Journal Pane JDIs expressions using the separate criteria in 920*a*. Alternatively, if the Journal is in Selection-Filtered Journal Mode 920*b*, then the scrollable-revisable box 920*a* criteria might be 'AND'ed with the Meta-Search filter, so that the Journal presentation might display a, further subset of Journal Data Item expressions.

The journal data items under the heading bar 920 may be displayed according to Max's preferences. Here, Max has chosen to display his journal data items as if they were scraps of sticky note paper attached to the scrollable background. Each sticky scrap note may be positioned on the background according to Max's preferences and later moved about to a new location as desired. In an alternative display mode, journal data items may be displayed in a chronologically ordered table format with date and time of entry noted to the left or the right. That was shown in FIG. 6A for example. The already-recorded journal data items (JDI's) could come from a variety of sources and appear as different data types. Journal data item 921, for example, illustrates a short piece of text which Max typed directly into the computer using a notepad or other quick entry program. Its data "type" may therefore be dot-text (e.g., it could have a .txt extension at the end of its respective filename if it is stored as a separate file). In scrap note 921 Max may have noted to himself that his friend Charlie suggested he contact Anita Rand about yesterday's conversation at the golf game. If the sticky note 921 was filled in and dragged from elsewhere into pane 901, the journal entry software can automatically attach a time stamp 926 to it at the time it is recorded into Max's journal space. This automatic time stamp 926 may be constantly displayed and/or it may be displayed at the user's request or when, for example, the user lets the cursor 902 dwell for a predefined amount of time on top of the scrap item 921. The automatic time stamping allows the user (e.g., Max) to later sort and review his entries by time of entry into his journal. He may additionally or alternatively filter and/or sort by data type (e.g., .txt, .bmp, .wav, .html, etc.) and/or by content found inside the respective journal data items.

The data types of entered journal data items need not be limited to mere text. In one embodiment, even a given JDI may contain more than one data type. Example 922 shows such a sticky note expression of a JDI that includes both text and a user activated hyperlink to a URL, such as to a web site on the Internet. If the user moves the cursor 902 to the hyperlink text and single or double clicks on it, that can automatically launch a browser view of the referenced URL (for example, either in a separate browser window, or in the same journal presentation with the help of a Dynamic-Link Library viewer). Thus, entered journal data items such as 922 can provide a convenient way of bookmarking to Internet locations which the user had previously found and had made notes about and entered those notes into his journal. The notes can be more extensive than that shown at 922 or they can be more terse. Example 924 is another hyperlink to a URL; and in this case, it displays as a mere icon that might take the user to a Web Forum page 991 when clicked on and allow the user to begin participating in a corresponding web chat session. The user may later copy some of the chat results into his journal, at which point they will be time-stamped with the time of pasting. (See auto-time-stamp 926 as an example.)

Scrap item 923 shows an example of an interplay between work and family related activities. Max's wife had sent him an email reminder that he needs to go home early to see their daughter's school play. Max copied of portion of the text of this reminder to journal data item 923 and the modified or new journal item got auto-time-stamped. He then copied to his computer's clip board a dynamic link to the actual email itself so that he can quickly view the email or reply to it later if he needs. This might have been done by dragging the email-showing, application window into the journal area of ACMAN, or by executing a Paste Special command while the pointer or mouse was in the journal area, and selecting an option to paste a dynamic link, or shortcut, to the source of the clipboard object. The journal data item might then contain and display a pointer ("View email") to the index location of that email within Max's email application, as well as an indication of the application program associated with that pointer. Thus if Max clicks on the "View email" pointer displayed in journal data item 923, his email application might automatically become activated (if it is not already running) and the specific email message might then be automatically opened for Max to see, for example adjacent to his journaled item 923.

As mentioned earlier in the description of FIG. 6C, Max can create so-called extra journal links (see 928*a*, or alternatively 635*a* of FIG. 6C) between a given, journaled scrap item like 925*a* and one or more Activity Data Object expressions that reside outside the journal pane. The created extra-journal link indicates a logical association between the journaled data item and the extra-journal object (e.g., ADO). Max can choose to display the Activities Pane in spreadsheet format or in graphical tree format and to have activity descriptions that are logically linked to a given journal item show up in filtered mode. Extra-journal links may be created in a variety of ways, including by clicking on a specific Activity Data Object shown in the Activities Pane, shifted-clicking on a Journal Data Item shown in the Journal Pane (so both the JDI and ADO are simultaneously selected) and then activating the "link" tool under unfurled menu 916. Another way that an association link might be created is by dragging the cursor to define a path between Journal Data Item expression 925*a* and the target object (e.g., an Activity Data Object expression), where the latter is located elsewhere on the screen (see briefly FIG. 6C). At a later time, after he created the logical link, Max can locate the associated objects (e.g., ADO's) of a given journal item by using the extra-journal link(s) to call up (select and/or display) the associated objects. By way of example, Max can select one or more Journal Data Items and then choose a command menu item to display only the Activity Data Objects that are logically linked with the Journal Data Item(s) he has selected.

Max may also create intra-journal groups such as represented by intra-journal link 927. He might do this by selecting a first Journal Data Item, selecting the Link tool of drop-down menu 916, and then selecting another Journal Data Item to group the first one with. Alternatively, Max might select two Journal Data Items and then select the Link tool of drop-down menu 916. Such an intra-journal grouping can be useful in cases, for example, where Max may have several ideas in his journal that he is just thinking about, but that he may or may not have yet associated some or all of them with respective ones of all the Activity Data Objects in his activities tree. The intra-journal grouping capability gives Max the flexibility to jot down disparate ideas in different areas in his journal like 922 and 923 yet recall related journal data items later on, long after he may have forgotten some of them or their associations with one another. By way of example, suppose that Max had not yet associated (928*b*) any Activity Data Object with the illustrated JDI reminder about his daughter's school play 923. He might search his journal for JDI expressions containing the text string "school", and find JDI expression 923. Then by using a possible ACMAN menu command to show grouped JDI expressions (i.e. hide all the non-grouped journal data items), he could locate the interesting article 922 he had earlier found and that he wanted to print and give to his daughter Mary, but then he forgot about it. In another similar example, if Max had already created the extra-journal link 928*b* to some Activity Data Object expression, "X" (not shown), he could just selection-filter the Journal Pane to show the JDI expressions associated with Activity Data Object expression X. By enabling the optional display of JDI's that are intra-journal-wise grouped to the primary JDI's called-up by the selection-filtered journal presentation, he would see JDI expression 923 ("Mary's school play . . . ") and also find in the same journal presentation, the intra-journal-wise linked JDI expression 922 (" . . . interesting article . . . ").

Scrap item 925*a* provides an example of how different parts (e.g., JDI expression area linked to 928*d*) or the whole (925*a*) of a journaled item can be linked to different objects (e.g., extra-journal ADO's). The overall journal data item 925*a* ("Idea: Make Flow Chart for . . . ") relates to a product launch Max is working on. Max has created a first extra-journal link 928*a* to an activity data object (not shown) which relate to this overall product launch entry 925*a*. However, Max has also recognized that a selected subportion 925*b* of the overall journal data item expression 925*a* might be associated with yet a different activity data object. In response, Max has selected that subportion 925*b* and he has caused his machine to create a separate link 928*d* to that other activity data object (not shown). The other object at the not-shown other end of link 928*d* might be a dummy object or a mostly-blank, space-holding ADO. From the formed links (928*a*, 928*d*), it may be deduced that Max has reviewed the whole of the given journal data item 925*a*, and upon reflection, Max has recognized that there may be different associations between the whole or parts of this journal data item and various structured activity data objects which may have already been created or need to be created or filled in (dummy objects) sometime in the future. A separate set of tools (for instance, see briefly FIG. 27 2717) near the activities pane (see briefly 610 of FIG. 6A) might allow Max to create new activity nodes and possibly place them as desired (see briefly FIG. 27 2720) within his activity hierarchy, if any.

As has already been seen, tools (916) within the journal command bar 910 might let Max create extra-journal links such as 928*d* either from small, lasso encircled, highlighted, or otherwise selected portions 925*b* of given journal data items to the outside objects (e.g., ADO's), or between the wholes of a selected one or more journal data items and a correspondingly selected one or more activity data objects. Max may also create various intra-journal groupings 927 between two or more journal data items.

Inserting a copied portion of an email message and/or a hyperlink pointer to an email message into the journal, such as is exemplified by journal data item 923, is but one of many ways that data might be recorded or referenced (directly or indirectly) by way of journaled items collected in the user's journal pane 920. The user can copy and paste the whole of an email message into pane area 920. Alternatively or additionally, the user may establish an easy-to-remember hot-key combination by way of which depression of a special keyboard sequence and/or combination (e.g., Control-Shift J for "Journalizing" selected data) and/or a specially reserved mouse click action and/or other such user input, causes the user's machine to automatically record selected data into his/her journal space and to time stamp the data to indicate its time and/or date of recordation. If the user (e.g., Max) is visiting a web page and he actuates the hot-key pattern, then the URL of the page can automatically be inserted into his journal. This may have been the way that the URL pointer item illustrated at 924 was inserted. Alternatively the user could have used a clipboard copy-and-paste operation or a like alternative for moving or copying data into his journal space. The intent is to make journalizing of data as easy as possible so that the user is encouraged to journalize much of the data that he/she creates or copies on a frequent basis rather than to be discouraged from keeping a free-running journal due to some cumbersome and/or distracting set of operations required by less user-friendly software.

There should be virtually no restriction on the kinds of data that the user can record into his/her journal space. Aside from plain text (.txt) or rich text format (rtf) and hyperlinking reference data (e.g., http://www . . . com), all sorts of data in many other computer-recognized formats should be easily insertable into the user's journal, even if it does not originate in machine-acceptable form. For example, a microphone 931 may be used to make digitized real-time voice notes and to record those into the user's journal area as actual voice signals, for example, in a .wav or other sound data type recording file. In one embodiment, anytime the user activates a wired or wireless microphone that is operatively coupled (931*a*) to his computer (FIG. 1, 110); the correspondingly digitized signals are automatically stored with a JDI insertion timestamp (e.g., 926) into his journal space. An icon for the corresponding .wav file may be presented by itself in the journal pane area 901, with a computer assigned named attached below it. The user (Max) may alternatively generate a special identification for that digitized audio file. Additionally or alternatively, a speech to text conversion program 930 may be automatically invoked in the background or manually activated to convert the digitized audio (or analog recorded audio) into digitized text afterwards or even simultaneously as Max speaks, for example into a dictation machine. In the latter case, Max may elect to keep both the original, sound-recording file and the computer-made transcription in his journal. He or an assistant may later compare the two and edit the journalized transcription in order to assure that the transcription faithfully represents the original.

Aside from making immediate dictations via microphone 931 into his journal, Max may prerecord one or more voice notes on a tape recorder 932 or other non-volatile memory device, and he may later transfer the corresponding pre-recorded signals (e.g., wirelessly or by way of a cable) into his journal as digitized representations of the original sound (e.g., as a .wav file like the one shown at 931*a*) and/or through the speech-to-text conversion program 930 to thereby form a digitized transcription of his sound track. If Max is musically/audio-wise inclined, conversion module 930 may optionally tag his transcribed lyrics with corresponding musical notes and/or voice inflection indicators. The concept here is to make capture of free-form expression into the user's journal space as easy and as inviting for the user as possible. Because the technology of nonvolatile data storage is continuously making it less expensive to store larger amounts of data (e.g., on high capacity magnetic or optical disks), it is practical to have a persistently running, recordation process that records virtually every piece of internalized data or, link to external data, that a user causes to come into his/her data processing machine and to journalize all such recorded data. (An automated filter may be used to weed out data that clearly does not to be journalized, such as spam emails, etc.) Later, after such persistently journalized data ages beyond a predefined age limit, an automated garbage collecting process can be used to delete parts of the journalized data to which logical links have not yet been made (meaning that the user probably did not recognize any useful association between that persistently journalized data and the user's current activity plans).

The journalizing process can be started at virtually any time. Max does not have to be operatively coupled to a computer or to a network at the time that he thinks of and records his voiced ideas, for example into a cassette recorder 932. He could have been at a meeting and could have made some quick notes to himself about matters to follow up on when he gets back to the office. A digitizer can convert analog sound recordings into digital ones and store them as journalized data in Max's journal space. A scanner (not explicitly shown) can capture scribblings, for instance, from a paper notepad and store them 941*a* as graphic data (e.g., dot-bmp format or otherwise) that is journalized into Max's journal space. Digital Ink or other formats of digitally recorded handwriting might be included directly into the journal 941*a* via some electronic or wireless means, and/or converted 941 into ASCII or Unicode characters or other structured character sets appropriate to the journal formats supported. Sound-based entries (e.g., .wav files) that are stored in Max's journal area 901 need not have come only from Max. They could have originated as pre-recorded voice mails such as indicated by telephone symbol 933. Someone may have called Max's telephone while he was away from the office and left a voice mail. The voice mail may have included some ideas or matters which Max wants to follow up on. So Max copied or moved those voice mail items from his telephone voicemail storage device, via a network and into the journal area 901 of his computer. The move could have been actuated through the telephone system or through a request sent from the user's computer to the telephone system. The move could include automatic creation of a text counterpart by use of the voiceto-text conversion module 930. Alternatively, a persistent journalizing process could have copied the voicemail and its optional transcription into Max's journal space. Max might see it (and/or hear it) later when he causes the presentation software of his data processing machine (e.g., a possibly wireless network device) to filter and present to him, information that has been journalized during a prespecified time duration (e.g., the last few hours while Max was in a meeting). The point is that the automated journalizing methods contemplated herein make it easy and thus inviting for the user (e.g., Max) to record virtually everything of possible interest into his journal space.

Not all of the entries (e.g., 921-925*a*) that were inserted into the user's journal may be worth keeping. Upon review, Max can use conventional operating system and user interface operations to select and delete journal data items that he thinks are not worth keeping. Additionally or alternatively, an automated garbage collector might be activated to scour through old journal data items (those with modification timestamps older than a specified date and/or time) and to automatically archive or delete them if they have no extra-journal links or intra-journal links or other associations to currently active data objects.

Journal data items may include scanned or digitally converted graphic objects such as indicated by path 941*a* leading to a stored .bmp or .jpg or other type file, which could include vector based handwriting encoding file formats. The scanned and journalized image 941*a* may have come from newspaper magazines or other printed or written matter (including Max's above-implied lunch-time napkin or other paper scribblings). Alternatively or additionally, a module 940 which performs optical character recognition to text conversion may be used to store more compressed versions of the material in the journal. The graphics material may be digitized (945) or otherwise acquired in a digitized form and stored directly or through a format translator 955 into the users journal space. In some cases the original source material may be in a different language and an automated language translating program 950 may be used to convert it into Max's preferred language before it is directly stored in Max's journal. After translation (950) to a preferred language, the acquired data may further have its format translated by program 955 into a format that Max prefers (e.g., inserted into a data-holding template that Max may prefer such a boilerplate spreadsheet form, a boilerplate customer-contact form, etc.). The source material may additionally come from the Internet as randomly acquired email clips or music clips or video clips or Internet code or computer code or other such data items. Automated data acquisition agents 970 may be used to crawl through the Internet web space to find items of possible interest and to store them into journal area for later review by Max (or garbage collection if Max doesn't have time to review it). Much of this acquired data may be stored directly on Max's local disk drive 980 or other local data storage media.

It is possible, however, for the data of some of Max's journal data items to be stored remotely relative to Max's in-use computer. For example, some journal data items may have their contents partly or wholly defined by data contained in web forums 990 where the remote data is pointed to by pointers embedded in Max's journal area 901 rather than being actually stored on a storage media possessed by Max. One example of such pointer 924 to an external web item 991 has already been mentioned. Note that pointer 924 is also logically linked by extra-journal link 928*c* to an extra-journal object (e.g., an ADO, which is not shown). In this manner, journal data items that might really be stored on a web server on a network can be presented to the user within journal pane area 901 as if they are integrated as part of Max's journal. The hyperlinked JDI might be given a time stamp and be given extra-journal links to an ADO. Furthermore, tool or menu bar item 914 might provide Max with options to cause his ACMAN system to provide in the on-display presentation only Max's local (stored on his local machine area) JDI expressions, or only integrated presentations of his pointed to remotely stored (e.g. possible web forum) JDIs, or both local and remote JDI expressions together 914*a*. Note that the illustrated journal area 901 shows a possible presentation with the local JDI option selected. Here, there may be presented a pointer to an external JDI content 924, rather than a presentation of that actual content. (In one embodiment, if a "Local" option of 914 is chosen, even external reference indicators such as 924 might be hidden from the on-display presentation.) By clicking his mouse or pointer on that hyperlink presentation, a separate web browser window might popup to present that web forum information. In contrast, had the "Both" or "Remote" options of tool 914 been selected, the journal presentation 901 might present, within the integrated journal pane presentation area, an expression of the content of the remotely stored information, rather than just a pointer 924 to it.

If Max's computer is currently connected to an appropriate network, then Max may click on the embedded pointer 924 to launch a browser view of the referenced remote data item 991. Incidentally, Max's automated data acquisition agents 970 are not to be confused with ACMAN peeking agents such as 203" in FIG. 2. Depending on machine configuration, the peeking agents (Max's) are another way that data may be automatically brought into Max's journal space or into his foyered activity plans space. But the peeking agents (e.g., 203") might require installation permission from the owners (e.g., Adam) of the machine area(s) of the ADO's 253 and JDI's 254*a*, 254*b* which they are peeking in on, and the peeked and updated (266) JDI's might have to be associated with non-private activity data objects.

Figure 22:
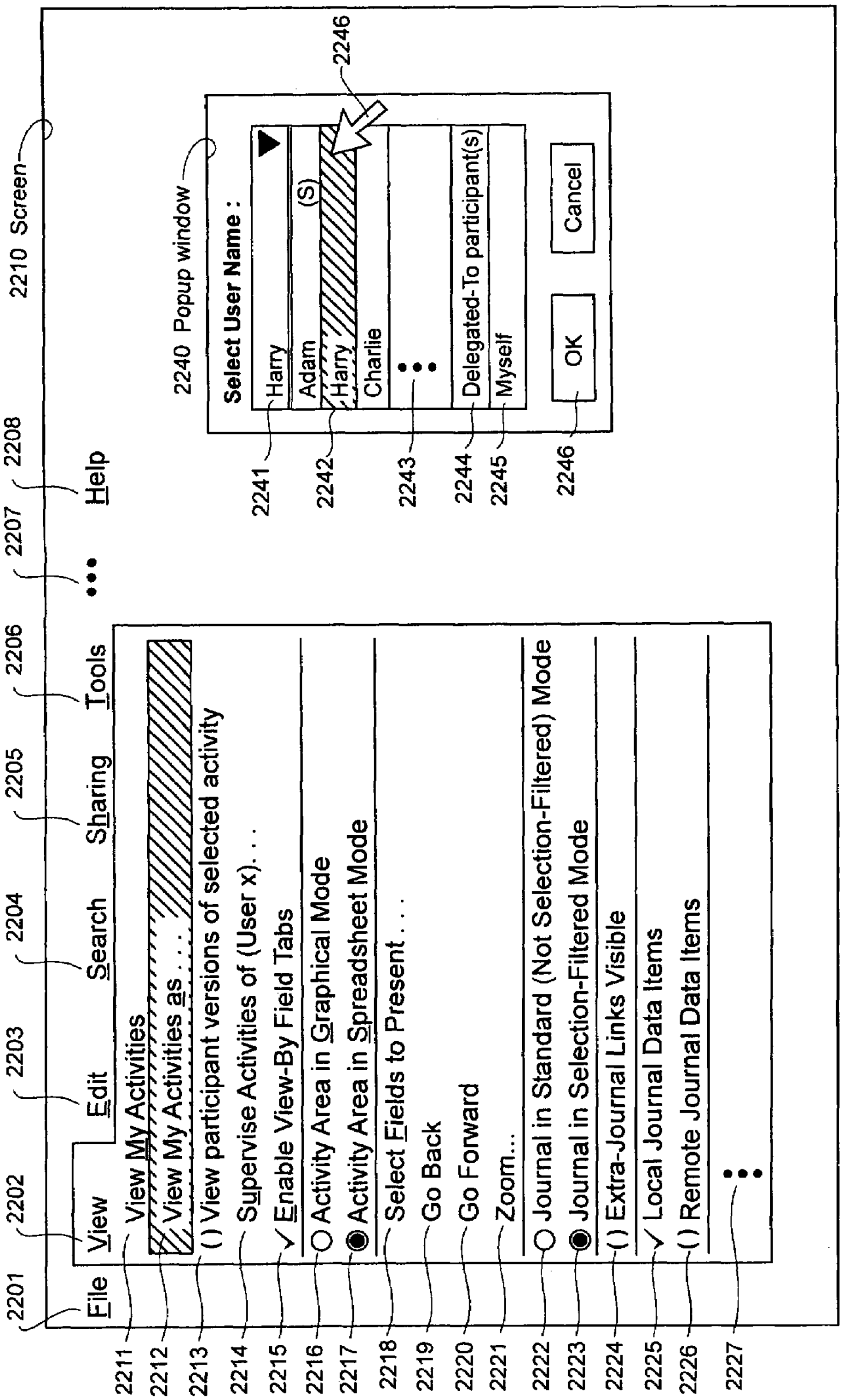
FIG. 22 is a diagram showing a possible set of presented menu items, including a possible set of View related items, that a user may be able to select in order to cause his system to execute various instructions.
Figure 26:
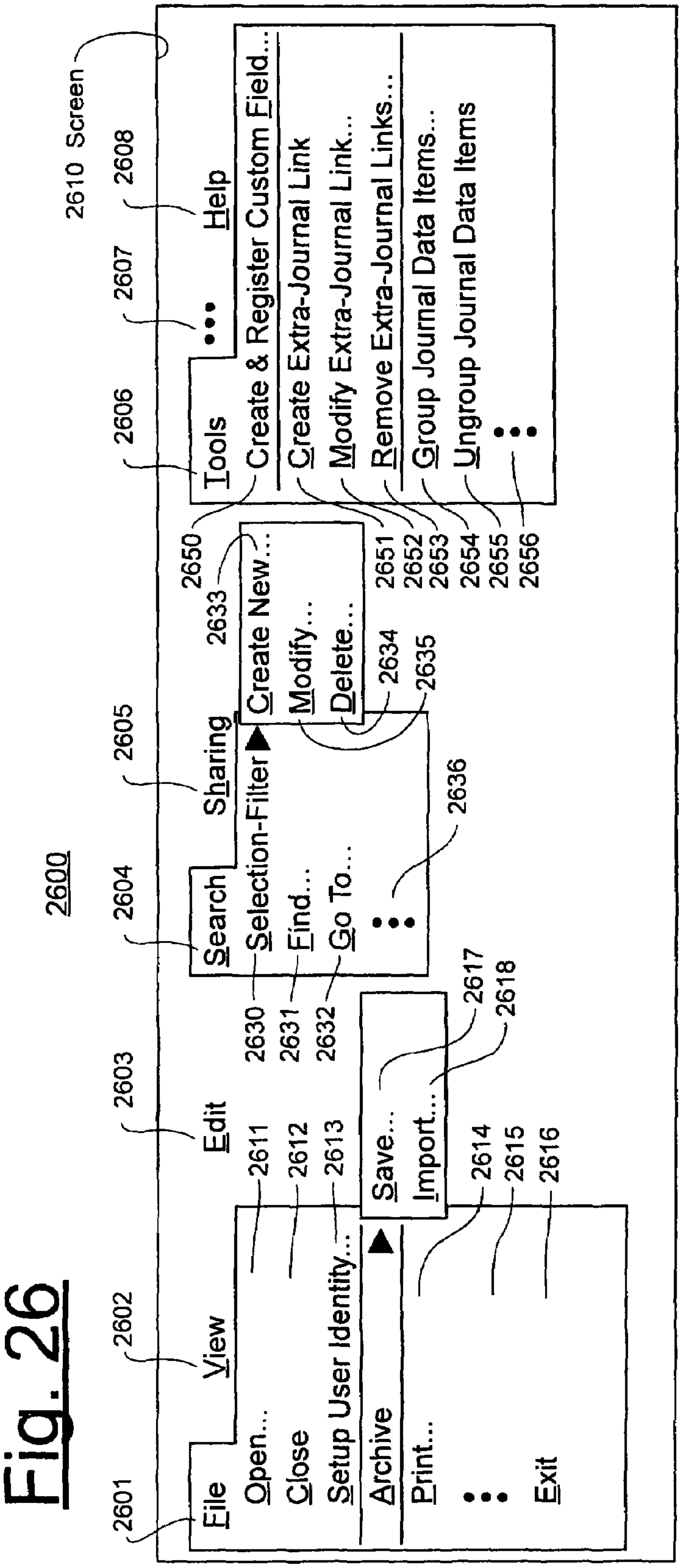
FIG. 26 is a diagram showing a possible set of presented menu items, including a possible set of File management, Search and Filtering, and other Tools related items, that a user may be able to select in order to cause his system to execute various instructions.
Figure 27:
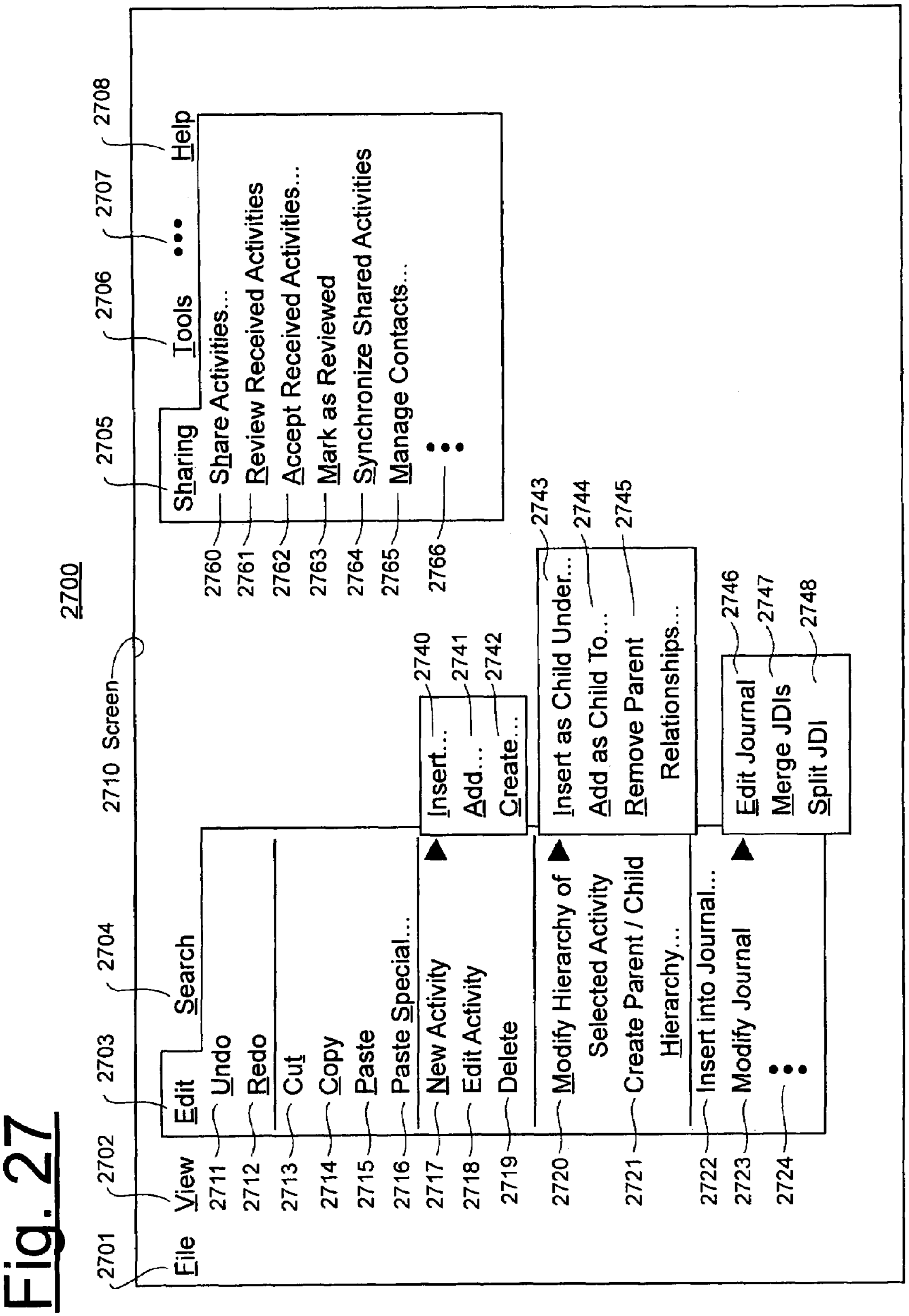
FIG. 27 is a diagram showing a possible set of presented menu items, including a possible set of Editing and Sharing related items, that a user may be able to select in order to cause his system to execute various instructions.

Referring to command bar 910 of FIG. 9A, Max may be provided with a variety of journal manipulating options including the tools 916*a* unfurled under tools drop down menu bottom 916. The illustrated tool options 916*a* may include the ability to highlight or de-highlight with different colors various journal data items or selected parts of such journal data items shown in journal area 901. The color highlighting may be later used for sort or find operations or even creating logical links. The illustrated tool options 916*a* also may include the ability to move different journal data items next to each other to show certain spatial relationships between the various journal data items. The tool options may also include the ability to create intra-journal groupings or extra-journal links between display journal data items and/or activity data objects in another window pane which is not shown in FIG. 9A (see briefly area 610 of FIG. 6A). Max may also freely undo linkages formed between various journal data items and extra-journal data items as indicated by the Unlink tool in 916. These tools 916 may not be the only way to do these operations, but simply are representative of various means by which Max might issue various commands to his machine. Right or left side single-click and/or double-click command generating is possible, as are mouse or other dragging actions, alone or in combination with control keys, or by any other useful means of indicating a command instruction to the in-use data processing machine. (FIG. 22, FIG. 26 and FIG. 27 show other possible command issuing tools, as well.)

The command bar 910 may further include the typical kinds of command bar tabs found in conventional software for performing File manipulation (911), Searching (912), Editing (913) and Viewing control (914). Although not explicitly shown, the File tab 911 may unfurl a drop down menu which may allow for the storage or exporting of the journal-held JDIs in uniquely named files and/or for the storage or export of selected subsets of displayed items into uniquely named files. In other words, Max could select desired parts of journal data items 921-925*a* and append the selected parts into a pre-designated collection file that is to be kept and/or transmitted elsewhere. The Search tab 912 may allow for the usual types of searches for journal items having specific text content, data type, or otherwise. One of the unfurled options, 912*a* might define another means of accessing the command menu for invoking the search capabilities described for area 920*a*, i.e., it can be used for searching for JDIs with extra-journal links to specific Activity Data Objects or for JDIs matching specific search string patterns. The EDIT tab 913 may allow for editing of text to different fonts, colors, and/or the editing of graphic objects as appropriate. The VIEW tab 914 may allow for viewing journal data items from different perspectives, including radio boxes for viewing only locally stored journal data items (e.g., only those in storage 258 of FIG. 2) or only remotely stored journal data items (e.g., those in storage 298) or both local and remotely stored journal data items.

FIG. 9B shows a possible data structure 905 that may be used for defining a Journal Data Item (JDI). The data structure 905 might include a first field 951 for storing the initial JDI insertion time stamp (e.g., the first time that data of the JDI was stored into the user's journal space). Field 951 may be used to chronologically sort and display journal data items according to such sorting as indicated in display pane area 621 of FIG. 6A. Sometimes users may want to force the presentation of some JDIs into prior date locations in their journal. For instance, a month after Max entered JDI 630 (in FIG. 6A); he might add a picture (.JPG) of Magic Johnson. It might not make sense to Max to have that picture displayed somewhere far away in the chronological journal presentation just because Max entered the picture later—Max may still want this journal data item displayed close to the initial JDI even though his JDI modifications may occur later. The Relative Order Suffix of 951 may be used for that purpose. Max can position his pointer near the initial JDI expression, possibly double click his pointer to indicate that he wishes to further edit or insert data into his journal for that prior time period, and then add the picture. That newly inserted and recorded JDI can be forced to be displayed in the May 27, 2003 display segment within the journal, even though he might have added it sometime in June, 2003. The newly recorded JDI might still be given the exact same JDI insertion time stamp as 630, but it might also get a relative order suffix of "1", indicating it should follow the original JDI 630, which might have a relative order suffix of "0". The JDI structure 905 optionally includes a second field 951*a* to indicate the time of last modification to the corresponding JDI. This JDI modification timestamp might be later modified to reflect a later time if additional data is appended to an earlier started journal data item, or if a JDI is modified or updated in any way. The insertion timestamp (coupled with the relative order suffix if provided) can be used to display JDI expressions in a chronological order, while the modification timestamps can be used for archiving stale journal data items or for garbage collection purposes. For instance, if Max wants to archive his old parts of his journal, he may want to archive and remove only JDIs that have a last modification time of more than one year ago and that have no extra-journal links to any active Activity Data Objects. With a last modification timestamp, even JDIs with no extra-journal links that were initiated two years ago, but were modified in the last year might still be left in his current journal space.

The JDI structure 905 optionally includes a third field 952*a* indicating where the underlying journalized data is stored, which might not be directly in the body of data structure 905. For example, while a lot of the journal data items displayed in the journal presentation may be contained within the local journal file itself, the ACMAN journal might have the capability to integrate and display data from disparate sources, including internet hosted data as well as data on the user's local machine area or local network but using dynamic links (e.g. embedded object linking) to point to that data. So 952*a* might indicate whether the JDI data is located inside the body (963) of the JDI structure 905 itself, or as a section of data on a web forum storage unit (e.g., 298, FIG. 2), or as a separate file on a local storage unit (258). A fourth optional field 952*b* indicates what type (or in one embodiment, types) of data the journal data item is so that an appropriate HTML, JPEG, or other display translator may be used for correctly viewing the data and/or so that JDI data may be sorted and/or presented by data type. For example, if the type is .txt indicating text, then that data might be transformed into a viewable presentation with the journal presentation software using predefined text or word processing rules according to type. If the indicated data type is .jpg, then a predefined JPEG viewer or a DLL (Dynamic Link Library) might be used to display that underlying data within the journal presentation pane or adjacent to it. If the indicated data type is .wav or another such audio format then an appropriate audio playing and/or video displaying program may be automatically invoked for playing and/or displaying the contents of the journal data item. In any of these cases, if the data type is not directly supported by the journal presentation software, an outside application such as a browser (for .HTML) or JPEG viewer may be called by the ACMAN system to display the information separately or to embed it within the journal display pane. The function of field 952*b* may additionally or alternatively be provided by the operating system registry. However, if field 952*b* is used, the user may hide the correct data-type from being shown in the disk directory or registry. Also, the user may elect to utilize a file-opening program (e.g., browser) other than the one indicated in the Operating System registry for that file type, or to integrate the presentation of that data type within the journal presentation area. Also, the user may elect to hide the content in optional body storage area 963, in which case the OS will typically not know what the data type is. An optional additional field 952*c* can be used to indicate the X and Y dimensions of a JDI data structure within the presentation. Although for text this may not be necessary, for other data types such as graphics, it can be helpful to properly display a data object to the users' size preference.

Field 953 represents a pointer to the primary data content of the corresponding JDI. The primary data content may be stored as a file anywhere on the local storage disk 980' inside 963 or outside of the body of JDI structure 905 or remotely in a web-based storage area (e.g., 298, FIG. 2). Pointer 953 may simply be an offset or address location 953*a* within the ACMAN journal file that points to a lower body portion 963 of the journal data structure 905 where the lower body portion contains the actual, primary journal data content as text or otherwise. Or pointer 953 may be a pointer 953*b* to a remote storage location such as a website 991', or it may be a pointer to a separate but local file 953*c* on local storage disk 980', or not shown a separate file on a local area network. Where used herein, it is understood that pointers may be indirect pointers to other pointers or to offset tables or the like rather than being just immediate pointers to the referenced data.

Field 954a can indicate a relative or absolute position within the journal presentation (e.g., FIG. 9A, 901) where the current journal data item is to be displayed. This is specifically useful for viewing the journal in a sticky note format. The user can therefore move sticky notes to where he likes and they will still be there the next time he visits in sticky-note viewing mode. Additionally or alternatively, other data structures within the user's data processing machine may keep track of the last relative display position of a given journal item and these other data structures may be used to control the current display position of the given journal item JDI field 954b may provide various parameters for indicating how to display the current journal data item. For example, it might be displayed as a yellow colored sticky note of a predefined size and shape with lettering that is italicized. A various assortment of other display options (such as Background Area Texture, Foreground Text Color, or others not shown) may be defined in field 954b.

As already explained, the whole (outer boundary) of a given journal data item might be logically associated to one or more Activity Data Objects (ADOs). Field 956 might identify the activity data object(s) that is/are associated with the whole of the journal data item if there is such a one or more activity data objects. Typically the activity data object(s) will be on local storage 980' but it/they may alternatively be on a remote storage media such as on a private networked server (130, FIG. 1) or on the Internet (298, FIG. 2). The latter options are represented by symbol 992 in FIG. 9B.

As already explained (as shown by 928d in FIG. 9A), an inner one or more subsets of the whole (outer boundary) of a given journal data item can be logically associated to one or more Activity Data Objects. Field 957 might indicate whether there are any such subset regions within the JDI body data. There could be zero such subset regions. The example of FIG. 9B shows that there are two sets of such selected regions. Each set might have certain of its own unique attributes. Field 957a identifies the subset region #1, or subset-1. This subset region can be identified as having one or more beginning points, end points, and/or a data lengths. Thus 957a might identify the regions of its set accordingly. Field 957b indicates possible display options for the subset-1. In the illustrated example, each of the subset regions may be identified as having a slightly different background color, in this example yellow green. The selected regions may also have different textures or different text colors or other such attributes. The example shows field 957b indicating such further display options for the subset-1 region(s). Field 957c might contain pointers, or extra-journal links, from the subset-1 to any associated Activity Data Object if there is such a one or more. (Even if there are none, the user (Max) can pre-select one or more different parts of the journal data item and establish them (957a) as constituting a selected-subset region, and he may set the display options (957b) for the set well before drawing links between the established set or sets and a corresponding one or more ADO's.)

Symbol 928d' corresponds to 928d of FIG. 9A. The link represented by reference 928d' may alternatively point to an extra-net or Internet target (e.g. 992) just as was the case with reference 928a' (field 956).

Fields 958a, 958b and 958c may be directed to the respective attributes of the selected region or regions in a possible subset-2. Because in the figure, these are generally the same as those indicated for fields 957a,957b,957c; the details of corresponding fields 958a,958b,958c are not shown. Symbol 928d" is understood to represent the reference to the activity data object(s) of the subset-2 regions if there may be extra-journal links(s) to an activity data object.

The illustrated Journal Data Item structure 905 may belong to one or more groups of other journal data item structures. (See briefly 927 of FIG. 9A.) Each such group is referred to here as an "intra-journal group". Field 959a indicates how many intra-journal groups the current journal data item (as a whole) belongs to. In the example there are two such groups. It could have been none. Field 959b may identify the first of the intra-journal groups that the underlying entry item of JDI 905 belongs to. Link 959d may be a unidirectional or bi-directional link to a linked list for group number 1, where the latter might be identified at 909. Link 959e indicates that there is another journal data item 906 belonging to Group-1. Link 959f indicates that there is yet a third journal data item 907 which also belongs to Group-1. It is understood that each of journal data items 906 and 907 may be structured in the same way as the first JDI 905. Possible field 959c might be similar to 959b but may contain the identification for intra-journal Group-2.

Optional body-holding region 963 may contain the optional, actual entry data of the current entry item represented by JDI 905. If field 952a had indicated that the entry data is located in the body of the journal data item 905 rather than elsewhere, then the entry data may be so located in region 963.

Referring back to FIG. 9A, when a user is viewing his journal data item within a respective viewing pane (e.g., 901), the viewer may choose to show or hide various types of links that exist between JDIs or grouped JDIs that are linked to activity data objects. Similarly, the viewer may choose to show or hide links that exist between JDIs that are part of an intra-journal group. For example, by using viewing controls (not shown) under view tab 914, the user may elect to cause his system to present intra-journal group links, such as the paper clip symbol linkage 927 illustrated on the display. These respective linking indicators may have different attributes including different colors and/or different shapes, such as a chain link, a line, dashed line, paper clip symbols, etc. The show and hide attributes of the respective links may be determined on a JDI by JDI basis or they may be determined for groups of journal items or globally. Returning back to FIG. 9B, item 908a is an extra-journal link presentation control which is provided in an embodiment where each link with a hierarchical activity data object may be shown or hidden according to a per entry item set of options. The link can be presented to a user with different kinds of dashing attributes including chain-link or paper-clip-link symbol-fill for the link paths and the link may have different path-thicknesses or flash rates. Item 908b shows a similar, possible set of attributes for the grouping links (e.g. see briefly FIG. 9A, 927). The group's display attributes 908b are logically connected in one embodiment to the corresponding group listing of the grouped entries 909 rather than to a single JDI 905. Each intra-journal group may be identified with its own unique color, flash rate, dashing pattern, etc. Accordingly a user will be able to distinguish between different links even if many of them (e.g., 5 or more) are simultaneously presented within a same window.

Figure 9C:
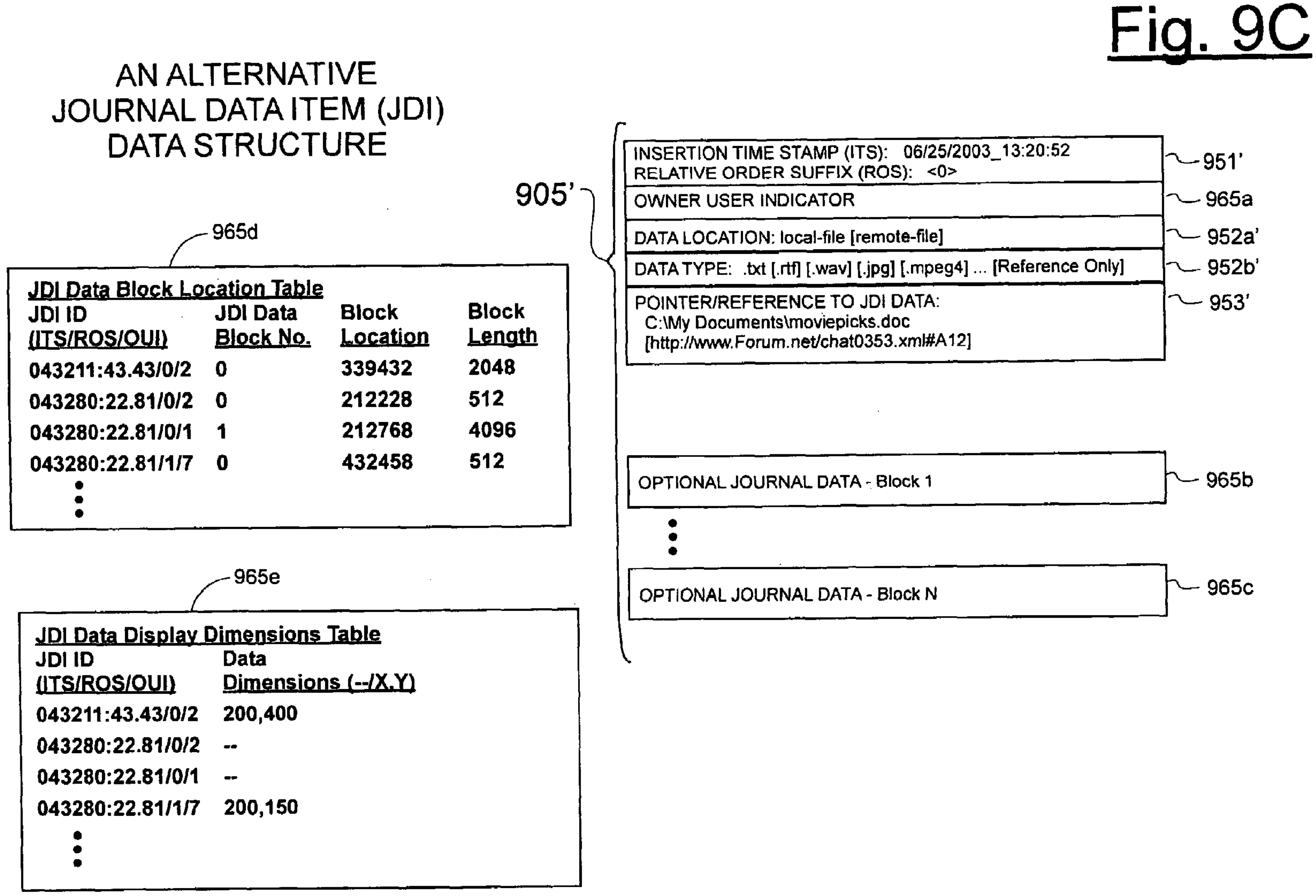
FIG. 9C is a diagram showing an alternative to the possible data structure for a Journal Data Item (JDI) in FIG. 9B.

FIG. 9C is a diagram showing an alternative to the possible data structure for a Journal Data Item (JDI) in FIG. 9B, in order to show just one example of some possible differences in design structure that could be possible in accordance with this disclosure. The structure elements stored for a given JDI are shown in area 905' of the diagram. 951' includes an insertion time stamp indicator as well as a relative order suffix, similar to as in FIG. 9B. Note that a "last update time stamp"

(951a of FIG. 9B) is not included in this embodiment, as this information could be maintained by an operating system on which a user's ACMAN system is installed. Next, an owner user indicator 965a might be included to indicate who has write ownership of the JDI and/or which journal folder sub-area this might belong to, for instance, in case this might be a shareable JDI embodiment. 952a' indicates whether the content of the JDI is local to the user's machine area or external, for instance on a web forum or networked location. 952b' indicates the data type of the JDI data. If this is indicated as "Reference Only", then the JDI data might be contained in a separate file or reference indicated in section 953', instead of in optional journal data blocks 1 though N (965b-965c). If a JDI data type is indicated in section 952b', there may still be a valid Pointer/Reference 953' as well as journal data block 1 through N (965b-965c), as the journal data may itself be hyperlinked to another reference. Pointer/Reference 953' may include a possible pointer or reference to a machine area file, external file, or other reference. Optional journal data blocks 1 though N 965b-965c might include journal contained data. Note that in the embodiment in FIG. 9C, there are no ADO pointers. This extra-journal link information could be fully contained within the ADO data structures, although it might not be as efficient from a system performance standpoint. Note that in one embodiment, the JDI sections of 905' except for the optional journal data blocks, might be fixed length fields, so that a simple JDI referencing database could be maintained. However, to support the optional data blocks file referencing, which may require variable length data blocks, a separate table supporting a plurality of JDIs might be maintained on the users' local machine area as in 965d. This might replace a linked list logical data structure indicated in FIG. 9B (and also indicated in FIG. 10). A data display dimensions table such as 965e might support graphical size information for a plurality of JDIs, although in another embodiment, that information if maintained, could be stored within each JDI data structure. Note that tables 965d and 965e reference each JDI by way of a JDI identifier. In this embodiment illustrated in FIG. 9C, the insertion time stamp and relative order suffix 951' together with an owner user indicator 965a are used to uniquely identify each JDI. As will be described later, there are other possible ways to uniquely identify each referenceable JDI.

While FIG. 9B and FIG. 9C illustrate a possible organizations for a Journal Data Item structure, FIG. 10 illustrates a possible organization and composition of an overall journal space that contains a plurality of journal items. Area 1001 provides a summarizing overview of the major journal space components, or sections. This may include a file header section 1001a, an intra-journal groupings section 1001b, an index of pointers to the actual Journal Data Item structures 1001c, and the JDI structures and optional contents 1001d. The header section 1001a may include information about Activity Data Object File(s) that the journal space correlates to. In one embodiment, there is only one activity data object file per journal space file, but this does not have to be the case. The header section may also include a pointer 1015 to an optional extra-journal link index 1002. This may index the extra-journal links by including a listing of all of a user's ADOs (whose identifiers may be listed as illustrated at 1004) that have extra journal links to JDIs as well as the respective JDI identifiers 1005 that are linked to those ADOs. The contents of 1001b might contain a listing of intra-journal group reference indications 1006 cross listed with the respective JDI identifiers 1007 of members of each intra-journal group. The JDI Pointer Index 1001c might contain a listing of JDI identifiers 1008 cross listed against the starting memory address location of the identified JDI. Note that JDI identifiers such as 1008 might comprise the JDI Insertion Time Stamp plus Relative Order Suffix data of field 951 (FIG. 9B), and possibly additionally data, particularly in an embodiment in which JDIs are shared with other users, such as one or more of a unique indication of JDI owner user name, a unique user contact or email address, and a journal folder sub-section indicator. Other ways of providing JDI identifications are possible, so long as each JDI can be uniquely identified among all other JDIs referenceable by a given data processing machine.

Optional runlength indicators 1009 may indicate the storage size of the main body of each given JDI if that information is not contained within the JDI structures themselves. Note that a JDI, including its associated data content, may vary greatly in size. Therefore, it may be useful to optionally store some sections of fixed length data and/or relatively small sections of JDI content within a top area of storage. However, if there are very large portions of content including Binary Large Objects (BLOBs), or if a user further modifies a recorded JDI to add a significant amount of data, it may be necessary to store the remaining or newly added portions of data in a linked list extension area, as indicated by linked list pointer 1011.

If an extra-journal link index 1002 is provided together with the JDI Pointer Index 1001c, the ACMAN journal pane can be rendered and displayed much more efficiently during journal selection-filtered mode. For instance, if Max has selected a first Activity Data Object (e.g., the one pointed to by cursor 605''' in FIG. 6D) and, implicitly, all its child ADOs, Max may be doing so in order to quickly view all his journal data items associated with the selected ADOs (i.e. journal in selection-filtered mode), as displayed in pane 620'''. Using the optional extra journal link index 1002, ACMAN can quickly lookup all the JDI identifiers linked to the set of ADOs of interest. Then ACMAN can retrieve from local storage (or web forums or other locations) only those JDIs that are needed for display. Then, by using the JDI Pointer Index 1001c, ACMAN can know what memory address or location 1003 each of the needed JDI contents is at and can save time by retrieving and displaying the relevant content for only those JDIs that are logically linked to the "Refinance house" ADO and its children since only those JDIs are needed for this particular selection-filtered presentation.

The intra-journal groupings section 1001b might provide a listing of each journal group identifier and their respective sets of JDIs. This may allow ACMAN to process the JDIs in a group very quickly. Instead of having to access every JDI and find which one or more group(s) it belongs to, ACMAN can simply look up the JDI identifiers in the intra-journal groupings section 1001b and get the information that way. Then ACMAN can retrieve from local storage (or web forums or other locations) only those JDIs that are part of a given group using the JDI pointer index 1001c. The previous "Refinance house" example above can also be extended. Max might select Activity Data Object 605''' (in FIG. 6D) and its child ADOs, and wish to view the associated JDIs in the journal pane while in selection-filtered mode. But one or more of the JDI's that result from the implicit query of the extra-journal link index 1002 may also be part of an intra journal grouping. To help visualize this, notice in FIG. 9A how extra-journal link 928b may be associated with JDI 923, which due to its intra-journal grouping 927 may then be associated to JDI 922. In a similar manner, the intra journal groupings section 1001b can be queried to find the grouping IDs that contain any of the JDIs resulting from the query of the extra-journal link index section 1002. Then the JDIs that are part of those intra-journal groupings can be included in the display of the selection-filtered JDIs that are directly associated with the selected set of ADOs.

Now that possible structures for the Activity Data Objects and the Journal Data Items have been detailed, it is possible to return to FIG. 1 and better appreciate a few more concepts that are implied by it. Aside from just managing his own activities (e.g., sorting and filtering through displayed activity descriptions and associated journaled items, and editing these), Max Manager may often want to share on a timely basis his computer-stored expressions regarding his activity plans with other people, such as Adam Assistant. This could be a problem if Adam is out on the road, say visiting clients in China and Max is in Washington D.C., jumping between meetings. It is unlikely that Max and Adam will be on-line at the same time or that they will easily be able to communicate by telephone (e.g., because of time zone differences). Max may not be sure of what kind network connection Adam can establish for his laptop computer 120. In one embodiment, Max and Adam use email or other messaging means (e.g. ftp, instant messaging, or others), to carry the back and forth transmissions used for sharing offers/requests (e.g., Dg, WS, FYI), receipt acknowledgements, offer-acceptances and/or update messages that relay ADO and/or JDI modifications. Such messaged exchanges can be sent through one or more email or other message exchange servers (see 295 of FIG. 2), such as those that use POPS, Microsoft Exchange, or SMTP protocols. Max and Adam's email servers 295 (in FIG. 2) can be separate machines in separate locations and even hosted by different companies. The exchanges of information 115*c* and 128*c* between the respective data processing machines 110 and 120 used by Max and Adam can therefore be asynchronous and need not rely on a central corporate organizational server such as 130. Adam does not have to be operatively coupled to a network 115*c* at the same time that Max sends activity sharing requests 115*b* or other activity-related transmissions. Max does not have to be operatively coupled to a network 128*c* at the time that Adam sends an update message 128*b* or other activity-related transmissions. As a result, neither Max nor Adam is time bound to the machine system environment 100. Neither has to be operatively coupled to an organizational server 130 at the time he comes up with brainstorming ideas, records them, or tries to schedule a machine instruction to send expressions of such ideas to one or more possible collaborators. None of the possible collaborators (e.g., Harry, Charlie) has to be operatively coupled to an organizational server 130 at the time he reviews and tries understand the expressed ideas of a sender. The activity supporting transmissions 115*b* and 128*b* can fully circumvent the organizational server(s) 130. Each of Max and Adam can be on the road and without access to server link 131 and yet they can continue to see what the other person last sent (if received) and they can each continue to individually refine and evolve their own respective, expressions (116, 126) of activity plans.

There are a number of subtle benefits to such an asynchronously coupled, collaboration system. In many corporations and other organizations, the setting up of collaboration systems that use a central organizational server 130 requires a lot of setup effort and support. In addition, the organizational server computers 130 occasionally must be shutdown for maintenance purposes. Since at least some embodiments of the ACMAN system 105 can circumvent the use of organizational servers 130, activity co-developers such as Max and Adam can continue to exchange ideas productively and/or work alone even when the organizational servers 130 or organizational networks of their shared or respective organizations are temporarily shutdown.

Many organizations provide expressions of major organizational objectives 103, sometimes referred to in the corporate world as MBOs (Management By Objective). It would be useful if one or both of Max and Adam can see how their local activities overlap with the major organizational objectives of the one or more organizations to which they each respectively belong or want to associate with. Each of Max and Adam can send FYI copies of their respective communications to Charlie Chief (403 in FIG. 4) and/or other members of relevant organizations. In response, Charlie Chief may then mentor one or both of Max and Adam on the MBO's of his organization by sending back FYI snippets from his, Charlie's, activity plans. In this way Max and/or Adam can become educated over time about the contexts from which Charlie Chief (or another organizational head) views the world. Additionally or alternatively, after receiving an FYI communication from Max or Adam, Charlie Chief may volunteer to join in on one of their activities even though he had not been formally asked to do so. The FYI copying and sharing mechanism allows upper management (e.g., Charlie Chief 403) to keep an eye on what is happening in the trenches, even though the respective FYI Shared activity expression recipients are not required to be actively involved in the said activity. The FYI sharing mechanism also allows persons in lower parts of a hierarchical organization to understand what is developing on the big picture front—provided, that is, that upper management (e.g., Charlie Chief 403) is willing to share such information. In addition, by sharing activity descriptions as FYI shared, ACMAN users can at their choosing cause their systems to present such FYI shared activity descriptions, or to hide (filter) them from their on-display presentations. This kind of automatic visibility control allows individuals to alternatively focus on the things they need to do, or take a moment to monitor or observe things that others are doing that they may want to be aware of or help out with.

As already indicated, each activity developing and/or implementing person (Max or Adam) may prefer to express his activities model to himself or to others in one or both of a formally structured format (e.g., ADO expressions presented as spreadsheet line items and/or as graphical icons) and a less structured format (e.g., JDI expressions presented as randomly attached sticky notes). In accordance with one aspect of the present disclosure, the ACMAN system can be configurably tailored to suit the presentation preferences of individuals such as Max Manager 101 and/or Adam Assistant 102 so that each is given the opportunity to see his local presentations (e.g. 111, 121) in a form that fits his way of thinking, where the local presentation can simultaneously include both structured information (e.g. 116, 126) and less structured information (e.g. 117, 127). One viewer (102) may like graphical presentations (125) for representing his organized activities and/or unstructured notes while another (101) may prefer to have the underlying data presented in tabular form (e.g., 116) or another format. In one embodiment, a user's display (see briefly FIG. 6A) simultaneously shows a selection-filtered presentation of the user's ADO's (Activity Data Objects) and a selection-filtered presentation of the user's journal data item (JDI) expressions with each of the simultaneously shown presentations being respectively in tabular or graphical or another format per the user's choice of preferences.

In accordance with a further aspect of the disclosure, much of the activity-planning and/or activity-description refinement work that a user performs can occur while using only local storage media (see 259 of FIG. 2). This may be done so that there will be no frustration with slow system response time (101*r*) and no detriment to usability in times when centralized organizational servers 130 are down or operative connection to whole or parts of the Internet 115*c* or of other such networks is unavailable. Packet-based communication and/or exchange servers may be used (e.g. email) for transmitting activity sharing requests 115*b* and returning progress updates 128*b* on an asynchronous basis so that intermittent downtime for network links does not become a major obstacle to usability. This will become clearer as further aspects are detailed.

In one embodiment, ACMAN system users (e.g. Max, Adam, etc.) may be given the ability to apply specific levels of access security, or privacy, to one or more parts of their respectively-owned activity plan hierarchies. Max might wish to share information about some of his activities and yet retain privacy for information about other activities. Accordingly, he would like to have a system that establishes and enforces privacy levels quickly, easily and intuitively. When Max is sharing an activity description with others (say his plans for "Free Samples"—see item 1172*b* of FIG. 11), it may make sense for Max to also share information about parent activities (e.g., "Max's Activities\Work\Cookie Products") that encompass that subactivity, so that the other people will better understand the context from which Max is expressing his plans for the subactivity. On the other hand, Max may not want to reveal information about other child activities which may fall under the same parents in his hierarchical tree or under the activity expression Max wants to share (e.g., the surprise birthday party he is planning for his boss 1172*d*). One effective way to support both needs could be to allow the assignment of equal or increasing levels of privacy to be applied to primary child Activity Data Objects of respective parent Activity Data Objects. This would enable people to plan and work on activities yet retain similar or additional levels of privacy for details (child ADOs) when needed. This also might provides ACMAN with a simple rule set by which to automatically privatize child activity data objects without time consuming intervention from the user, Max. Such an approach enables people to simultaneously work on a multitude of activities and yet retain privacy over parts of their work they do not want others to see (others with only low-level access privileges). Lastly, since Journal Data Items can be associated via extra-journal links to the various, privacy-assigned activity data objects; ACMAN can easily determine privacy levels of the journal data items by association. In one embodiment, if one JDI has extra-journal links to multiple ADOs with different privacy levels, then the JDI would be shareable according to the most private (highest level) of those different privacy levels. Another embodiment might provide for privacy level settings to be included within each JDI structure, and/or furthermore wherein the privacy level recorded within the JDI structure can be optionally and/or automatically increased if a given JDI is extra-journal linked with an ADO with a higher level of privacy than the initial JDI setting.

There might be any number of privacy levels, but let's use an example where there are 5 levels. Level 0 is the lowest and most public level. Level 1 might be slightly less "public", allowing access to almost anyone. Level 2 might be "Company Confidential", meaning that only people who are trusted associates of Max's company or of their business partners (e.g. members of companies with a confidentiality or Non-Disclosure Agreement) have read access. Level 3 might be "Company Internal Only", meaning only trusted, full-time employees of Max's company have access. Level 4 might be totally private, meaning for example that only Max has access to a given activity data object with such a totally private setting. These are not the only privacy levels possible nor are these the only number of privacy levels possible. Note that it will become more evident later in this disclosure how access by others to Max's Activity Data Objects and JDI's might be achieved.

Figure 11:
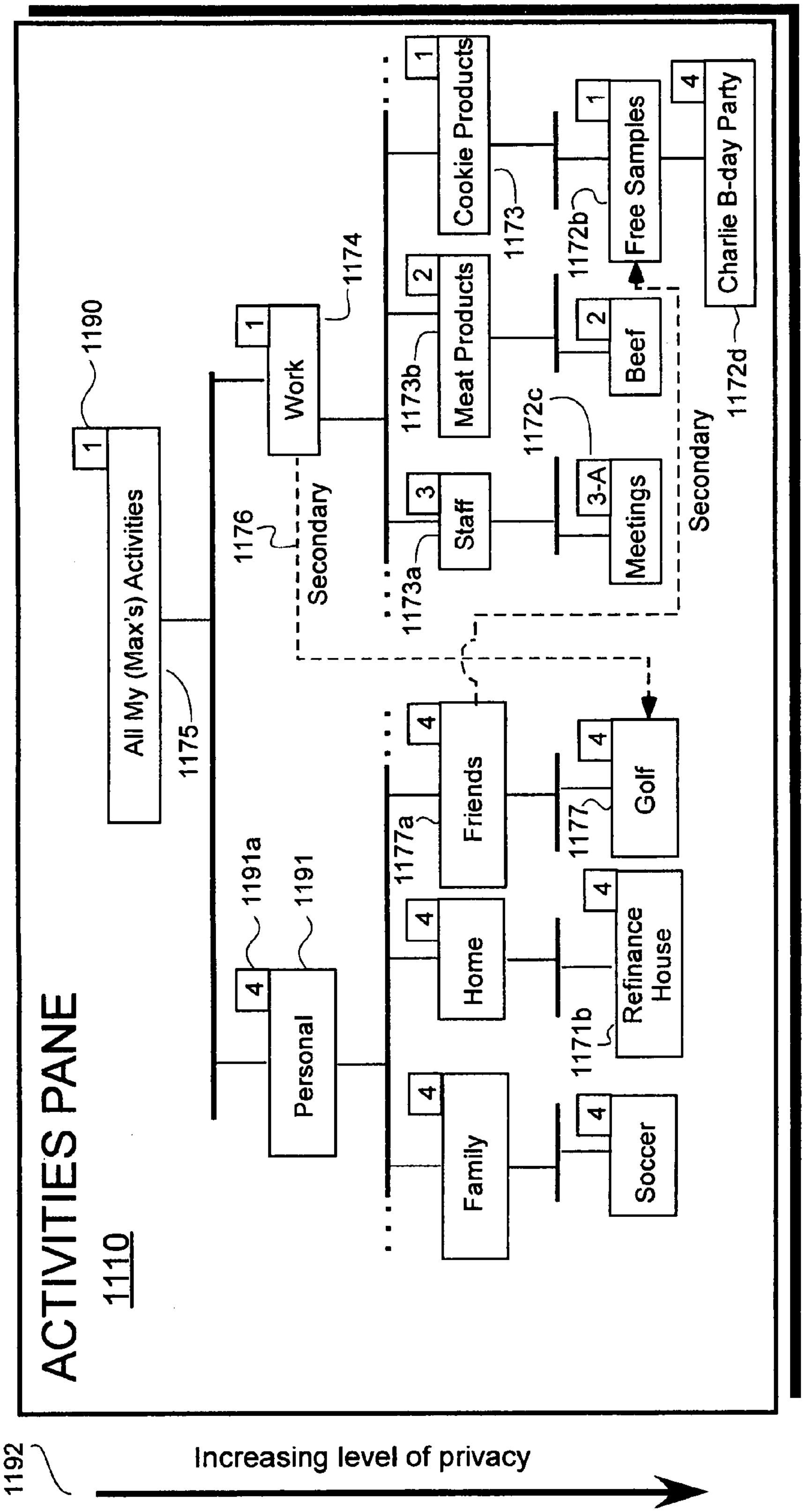
FIG. 11 is a diagram showing a possible schema of privacy settings for activity data objects in relation to privacy settings for their respective parent and child activity data objects.

FIG. 11 illustrates the above-introduced privacy scheme. In this example, Max's top level, or root Activity Data Object 1175 has been assigned a relatively minimal privacy value (1=fairly public) as indicated by the tab 1190 above the rectangle representing that ADO 1175. Possibly by default, if Max inserts any new Activity Data Object under ADO 1175, the assigned privacy level of that new child ADO might by default be set to 1 as well. But it might be allowable for Max to set a more secure level of privacy for any ADO below ADO 1175, as indicated roughly by the downwardly pointing axis arrow 1192 to the left of pane 1110. For instance, Max might not want anyone to be able to view or access any activity planning expressions of his "Personal" ADOs, so he sets the privacy level of ADO 1191 to 4, or "Most Private" as is indicated at tab 1191*a*. In response, Max's data processing machine might automatically assign an equal privacy value (4) to every pre-existing and primary Child of the "Personal" Activity Data Object node 1191. Note that this downward propagation of increasing privacy settings does not need to apply to secondary child ADOs of node 1191. By way of example, Max was thinking about giving free samples of his new cookie to his friends. He created a secondary link between activity nodes 1172*b* and 1177*a*. Although the "Free Samples" node 1172*b* is now a secondary child of the "Friends" node 1177*a*, the downward propagation of 4's along the primary progeny of the "Personal" node 1191 might not change the privacy setting for secondary child node 1172*b*. The privacy level for the "Free Samples" node 1172*b* remains at 1, or "relatively Public". This example shows one advantage of having primary and secondary hierarchies—the setting of privacy levels does not have to get overly complicated, and yet at the same time it is still possible to freely associate different activities with other activities without constraints.

In another example of how this works, Max has pre-assigned to his "Meat Products" activity node 1173*b* a privacy level of 2, or "Company Confidential" possibly. Since everything related to this activity data object is confidential and can be shared only within Max's company or with members of partner companies that are identified as having a confidentiality agreement, the primary child activity of developing a new Beef product might receive a propagated down, "2" value and therefore also remains appropriately secure. Trusted as the people who work on the new Beef product may be, not all of them are trusted to receive shared information about Staff activities. Activity Data Object 1173*a* and all its primary children (e.g., Meetings) might therefore be assigned a higher level of 3, or "Company Internal Only" possibly, due to automatic downward propagation. Finally, Max may want meeting activities with his staff to be accessible only to a customized subset of privacy level 3. Thus tab 1172*c* might indicate that privacy level 3 has propagated down to this ADO, but that afterwards, Max modified it by indicating that only a certain subset "A" of people having level 3 clearance are to receive shared information about the " . . . \Staff\Meetings" and possibly below activity node(s). More specifically, Max may choose to restrict access from everyone except his specific staff members, his boss Charlie 403 (FIG. 4), and Harry HR 404. If Max were to create new primary child ADO's below the "Meetings" ADO, the same 3-A privacy settings 1172*c* might automatically propagate down. However, Max can later change the inherited privacy settings of those lower down, primary children (not shown).

In one embodiment, it is possible that although the privacy level of the "Golf" ADO 1177 might be inherited automatically as a "4" from the primary parent "Friends" ADO 1177*a*, the user/owner could still manually decrease the privacy level of "Golf" down to a lower level, say "1" so that many other people can access that activity description. If Max were to share a derived copy of "Golf" 1177 to other users who have only a "1" access privilege, his transmission might include parent ADOs in order to provide contextual reference, but the parent hierarchy that might be transmitted might leave out the ADOs that are more private than a "1". Thus, the ACMAN system might automatically transmit activity plans including "All My (Max's) Activities\Golf" instead of "All My (Max's) Activities\Personal\Friends\Golf".

The privacy settings scheme as discussed above may apply not only in the basic sense of giving other persons read-access, but as may already be and will become more apparent below, also applies to transmissions of shared copies and of updates. If a person with low-level clearance is blocked from having high-privacy level messages being sent to him (where the messages can contain new ADOs, new JDIs and/or updates to older ADOs and/or JDIs), then in effect that person is being blocked from seeing the higher-privacy content. Accordingly, privacy values may be used in accordance with the disclosure for determining whether to selectively block various messages from being transmitted to recipients of varying clearance levels. In one embodiment, each user/owner is empowered to assign whatever clearance level he/she wants for any of the recipients that that user/owner's machine will be potentially sending update messages to and the same user/owner is empowered to assign whatever privacy level he/she wants to any of his/her owned ADO's and/or JDI's. In another embodiment, clearance levels of recipients are established in a secured database download or other such file that the user/owner is not free to easily change (e.g., there could be digital signature checks and/or encryption to prevent alteration of the clearance-assigning list) and corporate management may control how that clearance-assigning list is configured.

Full details about how an activity data object (ADO) might be structured have not yet been given. FIG. 12A shows one possible embodiment of an ADO structure 1220*b* wherein that ADO might be included in a hierarchically organizable tree. Magnification symbol 1220*a* indicates that the detailed ADO 1220*b* is typically one of a plurality of alike ADO's that can link together to define a hierarchical tree composed of activity nodes and primary and/or optional secondary branches. (For example ADO 1220*b* represents a first child activity node 1220 that has as its primary parent, node 1210.) FIG. 12A shows a few simple parts of an overall tree structures 1200 in which instances of different ADOs have been embedded into the user's owned tree. (As already indicated, ownership often implies herein that the owner generally has the right to modify the components of what he or she owns—although certain attributes such as creation date, owner's digital signature, etc. might be blocked from being changed in some embodiments. A first user may receive a copy of part or all of another tree which is owned by another user. In such case, the first user might generally not be permitted to modify the received copy of that other user's tree. However, the first user could drag a copy of the received copy into his own tree—the first user's embedded tree—and thereby make that dragged, derivative copy his own. More on this later.) Max's "own" tree is typically comprised of ADO's that express activities he is (or has been) actively involved in and his own ADO's typically express those activities in the way that Max chooses to express them.

In one embodiment, an embedded (i.e. owned by a given user) activity description such as 1220 might represent some child activity node that supports or is categorized under a bigger or more general embedded parent activity. (Of course, an ACMAN system user is free to organize activity nodes as respective parent and child nodes, or vice versa, for whatever purpose they deem appropriate, but a typical use might be as just described.) A primary hierarchical organization 1200 (or more simply, a primary tree) may be structured to imply or explicitly declare one node as being the root node 1203 of the user's embedded tree. Such a root node could be defined by an ADO or by other means. This node may be visible to the user or hidden as a dummy node, to act as a root of his owned tree. The illustrated second node 1210 below root node 1203 is a "primary child" of the root node 1203. Although not shown, the root node may have more than one primary child node. Second node 1210 is also the "primary parent" of the magnified third activity node 1220. Every node including the root node (1203, 1210, 1220, etc.) can have one or more primary children, if any. However, every node in the primary tree structure, except for the root node, should have one and only one primary parent. The root node of the primary tree, being the topmost node, generally has no parent node(s). In one embodiment, any node regardless of whether it has any primary child nodes (e.g. 1203, 1210 or 1220) can have one or more "secondary" children, if any. (Note for example, the secondary child pointer 1227*d* of addable new node 1227*c*, discussed below.) In this embodiment, every primary child activity node (i.e. not including the root node) is allowed to have one or more "secondary" parents (e.g., as implied by pointers 1216); but no activity node is allowed to have a secondary parent unless it already has had its primary parent node defined. Each primary child activity node (except the root node) will generally have a single, primary parent pointer (e.g., 1205, 1215) pointing up to its single primary parent. Accordingly, a simple, unambiguous and invariant hierarchy path may be defined from each primary activity node up to the root node. This primary hierarchy path may be used to unambiguously locate what primary parent each ADO resides under. In FIG. 6A, the leftmost column 611 revealed the primary hierarchy path for each respective ADO that was covered by the corresponding spreadsheet line item. In FIG. 11 the primary hierarchy paths were used to automatically propagate down privacy level assignments. These are but two examples of why it is advantageous to define a simple and clear, primary hierarchy path for each activity node. The primary hierarchy path can be valuable for managing various other operations as shall be seen including determining which ADO(s) to include when transmitting a "shared" activities bundle (see briefly 1460*b* of FIG. 14 and/or 1604 of FIG. 16A) to one or more recipients, and when automatically determining where to transmit update messages regarding modifications made to one's own activity plans. In terms of privacy control, a user like Adam can clearly define a first of his activity nodes as "private", and then all primary children (all progeny) below that first node, including newly added ones, can be automatically designated as also being private by inheriting the "private" designation down the primary tree. Afterwards, if Adam modifies any of those lower-down ADOs or adds new ones to primary tree branches below the private first node, Adam's ACMAN system can automatically disallow Max or others to have access or updates for those private ADOs. Thus privacy can be assured without users always having to remember to manually set a privacy level.

(In an alternative embodiment, if an ADO has any secondary parent ADOs with more restrictive privacy levels than its primary parent ADO, then the more restrictive privacy level may be asserted to the child ADO.) Additionally, because each activity node (other than the root node) may have only one primary parent, the singular hierarchy of activity scope helps to establish the framework in which the activity idea may be described. Max could have two activity representations both with the phrase, "pick up from airport" in their Short or Long Activity Descriptor Fields. But one of the activities might primarily belong to a "Personal\Friends" hierarchy (see briefly FIG. 8) while the other might primarily belong to a "Work\Staff" hierarchy. The fact that the primary chain is different can alter in Max's mind what the phrase, "pick up from airport" means in each instance.

As mentioned earlier, the topmost activity data object 1203 of FIG. 12A is the "root" node of Max's activity hierarchy tree. We can think of instances of ADOs that are embedded within Max's ADO hierarchy tree as activities that are part of Max's world 401 (FIG. 4). More specifically, for one set of embodiments, an "embedded" Activity Data Object is any ADO whose primary parent hierarchy path includes the root node (e.g. 1203) of a given user's activity tree.

As already indicated for FIG. 12A, each of Max's embedded ADOs may belong to a single "primary" tree with a single root node. But in one embodiment, a given user such as Max, typically using only one user name, could possibly own more than one "primary" tree wherein additional trees each have their own distinct root node, whether explicit or implicit. (Max could designate one of his plural primary trees as for instance "A", while he could ascribe other names "B", "C", etc. for other primary trees he might own.) FIG. 6A shows an example where the user has elected to have just one principal primary tree with a root node called "(All) My Activities". (The "All" is implied.) Max could have instead generated separate principal trees for "(All) My Personal Activities", "(All) My Work Activities", etc.; but that may have made the organizing of overlapping activities (see 417 of FIG. 4) more cumbersome, and it would have made it more difficult to plan his time and activities, since he may then have to reference two separate activity trees, possibly in separate computer presentations. The approach of having just one primary tree for each user name is preferred because otherwise the complexity of multiple activity trees is too much to effectively manage one's activities and associated information, or to assure that important activities do not slip through the "cracks" of forgotten trees. That is the value of having just one primary tree with responsibility for all activities flowing back to a centralized top node.

There are advantages to further having secondary parent-child relationships however, in addition to the more structurally restrictive primary tree structure. While a primary tree structure that allows exactly one primary parent per node (except possibly for the root node), can easily support Top-Down development of ideas, plans and deployment (see 551 of FIG. 5), this structure does not lend itself well to Bottom-Up development (552) or to flexible and creative planning. Frequently, an activity description may relate to or support more than one higher level activity. Planning can be overly restricted and unnatural if a user is forced to relate an activity as a child to only one parent activity. In the simplistic, primary tree structures that may be found in the prior art, great activity ideas can become pigeon holed under a detailed hierarchical structure, and users can lose track of them or lose focus on important activities that happen to be pigeon holed in a remote branch. Secondary parent-child relationships allow users to "perceive" the possibility of inter-connection between two or more disparate activity nodes, and that may not happen if the two disparate activity nodes are never presented in a same display, near to one another. Furthermore, secondary children can provide a powerful means of progeny-based activity selection and presentation. By selecting a node that has both primary and secondary children, and causing the ACMAN system to present only the progeny (primary and secondary) activity expressions, a user can quickly see important yet secondary child activity descriptions that would have otherwise been lost under a disparate node.

The illustrated hierarchy structure 1200 of FIG. 12A is structured to conveniently support not only Top-Down development (551 of FIG. 5), but also Bottom-Up development (552), puzzle filling development (553), circular evolution (554) or other such variations of how different individuals choose to manage their respective activities. For the case of Top-Down development, any node (e.g. 1220) can have additional new child nodes (e.g. 1227*a*, 1227*b*, 1227*c*) added to it. By way of example, suppose that Max has already recorded child activity node 1220 and has expressed its short name (see field 1234 in detailed structure 1220*b*) as "Refinance house". Later on, Max may decide to refine this broad activity specification by adding to node 1220 a first new, primary child node 1227*a* whose activity is described by the short name: "Investigate mortgage brokers" because Max wants to find one who is honest and can give him a good deal. Max at the same time realizes that he will have to give to the mortgage broker he chooses some financial documentation about his income and assets. Max knows that such documentation should come from Paul Payroll in his company's accounting group and also from his personal bank, SafeCo. As a result, Max may add a second new primary node 1227*b* and he may give it the short name: "Paul and SafeCo papers". Max may later remember that he owns some shares in the stock market. He may add a third new child activity node 1227*c* which he chooses to designate as "Collect Stock Documents". Later on, Max may recollect that, besides all this, he has several savings accounts at different banks, and pension plans held at different brokerage houses. He may choose to use new bottom node 1227*c* to spawn additional newer bottom nodes for these additional activities. This is an example of a hierarchical Top-Down development methodology and how it may be handled with a primary tree.

Bottom-Up development usually starts with an unstructured seed idea. It often does not appear within the formalized activity plans of a user. Suppose for example that journal data item 1292*a* in Max's journal is an electronic clip from the following news flash alert: "March 22nd Announcement: Government expected to cut prime interest rate late next month". If Max is a good business manager, this news flash should alert him to several opportunities in the future. It could alert him to start changing his business plans. It could make him realize he has an opportunity to reduce his monthly, home mortgage payments by refinancing. If not, Max may be later spurred by a magazine article 1292*b* which he subsequently finds and pastes into his journal. That magazine article 1292*b* is entitled, "Is Now the Time to Refinance Your House?". The next day, in an online newspaper article, Max finds an article 1292*c* entitled "Warning: Not All Mortgage Brokers May Be The Same!". While browsing by the three journal data items (1292*a*, 1292*b*, 1292*c*), Max realizes that they should be grouped together. So he quickly creates an intra-journal grouping 1227. Max may use a filtered journal presentation tool to call them up on the same screen, perhaps with other related journal items whose text contents satisfy the query: "mortgage" OR "interest rate" OR "Federal Reserve". Max may further realize that he should initiate one or more, formalized "To-Do" activities for himself in view of the mental connections he has been making. One of them will become the "Refinance house" node 1220 which originally did not have primary child nodes 1227*a*-1227*c*. Because of the mind-set he is in at that moment, Max decides to position node 1220 as a primary child under a pre-established parent node 1210 entitled "Home". Upon adding new node 1220, Max may set a due date for himself for when to finish the "Refinance house" activity 1220. Because they are being simultaneously presented to him in adjacent activity and journal panes (see FIG. 6C) Max may remember to created an extra-journal link 1228 between the just created activity node 1220 and the associated journal data item 1292*a* that had spurred him into action. Optionally, his ACMAN system may automatically remind him (e.g., by highlighting the JDI expression he last selected and the ADO he just created and by popping up a dialog box: "Link these? ( ) Yes ( ) No ( ) Don't suggest any more"). In his hurry, Max did not think about creating further logical links to journaled items he read earlier, such as perhaps 1292*b* and 1292*c*. But luckily, he had already grouped JDI 1292*a* with JDIs 1292*b* and 1292*c* at the time he created intra-journal grouping 1227. So when he later creates extra-journal link 1228 between the just created activity node 1220 and the associated journal data item 1292*a* he is also (perhaps unknowingly) creating a recorded implicit association between the new ADO 1220 and the JDI grouping that includes 1292*b* and 1292*c*. Alternatively (not shown), Max could have created three extra-journal links, between ADO 1220 and each of JDIs 1292*a*, 1292*b*, and 1292*c*.

It is worthwhile to note here some of the differences that may be present between journaled data items and the more-formally structured activity descriptions in the user's hierarchical activity plans. Journal Data Items such as 1292*a*, 1292*a*, and 1292*c* are often just quickly-captured, electronic representations of random pieces of information which are not necessarily categorized under a formal classifying system. Therefore such JDI's do not typically direct themselves toward fitting in within a hierarchically structured set of activity plans. JDI's do not necessarily have due dates or other attributes (see briefly details of 1220*b*) which might be required of more-structured expressions of activity plans. The logical linkages created between JDI's and ADO's can, however, indirectly associate due dates or other attributes to the JDI's. Suppose for example, that a later time Max reviews his list of recorded activity descriptions, looking for activities with close due dates. The activity of node 1220 is spotted. Max can then trace back along extra-journal link 1228 to find the underlying support material of grouped journal items 1292*a*, 1292*b*, and 1292*c*. He can mentally link the due date assigned to ADO 1220 (and/or other attributes of that ADO) with the less-formalized information provided by the grouped journal data items 1292*a*, 1292*b*, and 1292*c*. Perhaps Max forgot about Web link 1292*c*, but now, upon revisiting that site, it leads Max to yet further valuable information. Max uses the newly found information to spawn new ideas and add expressions of those to his more-formalized activity plans or he simply saves the newly found information in his journal for later action. These are examples of the different kinds of idea development methodologies introduced in FIG. 5. Back and forth (and possibly circular) synergisms may evolve from the linkages established between journaled items and/or recorded activity descriptions (e.g., ADO's). The above example showed how a few random newspaper clippings, etc. led Max to record a formalized activity plan for "Refinance house" 1220 and to expand on that project and how the backward association from ADO 1220 to JDI 1292*c* led Max to collecting new information and perhaps spawning new activity plans. See again loop 566 of FIG. 5. The ACMAN system can help fan the flames of opportunity.

The use of journaled data items such as 1292*a*-1292*c* to spawn the creation of new child activity descriptions such as those in node 1220 is but one example of Bottom-Up and Circular development. In looking at a presentation (e.g., FIG. 8) of his current work and personal activity plans, Max may subsequently recognize that he should have a higher goal above that of merely refinancing his house (1220). Max may decide to insert between nodes 1210 and 1220 (FIG. 12A), a new intermediate and primary activity node 1219 having the short name: "Reduce Household Expenses". The to-be-inserted node 1219 would become a primary child of node 1210 ("Home") and a primary parent of the earlier-recorded activity node 1220 ("Refinance house"). Upon insertion of this intermediate activity node 1219, primary parent pointer 1215 would be replaced by pointer 1215*b* pointing from node 1220 to node 1219 and by pointer 1215*a* pointing from node 1219 to parent node 1210. Similarly, the primary child pointer 1214 from node 1210 to 1220 would be replaced by the primary child pointers 1215*c* and 1215*d*. Thus the clear hierarchy of activity data object relationships is preserved in the primary tree.

Not everything can necessarily be neatly categorized within a single primary tree. In accordance with the disclosure, Max may also choose at any time to create secondary parent-child links between various activity nodes where those secondary links (e.g., 1216) define more ambiguous, less direct, or just additional parent/child relationships between formalized activity plans. In one embodiment, the secondary links are unaffected by the insertion of new primary nodes (e.g., 1219). They continue to point to whatever, still existing nodes they pointed to before.

Child node 1220 of FIG. 12A is shown as having secondary parent pointers 1216. Such secondary parent pointers are optional. Max may decide that the child activity of "Refinance house" 1220 should further belong as a secondary child of other activities (say, "Work"-related activities) rather than just under primary parent node 1210. The secondary parent pointers 1216 may point to these other nodes. As already explained, one advantage of having just one primary parent hierarchy is that it allows for clear navigation between embedded nodes of the primary tree. Navigation is also possible along the branches of the secondary trees. However, this form of navigation may be more complex because each child activity node may be allowed to have multiple secondary parents. On the other hand, secondary parent/child relationships enable activity data objects that support several higher level activities to be associated with a plurality of these higher level activities. As a result, secondary parent/child relationships make it easy to search for or select all activity data objects related to a high level activity node, as well as all of their respective extra journal linked journal data items.

Node 1210 of FIG. 12A is shown to have an optional pointer 1217 to a foyered parent activity data object. This pointer, or link, 1217 can point to an activity data object that is not "owned" by Max and is therefore outside of Max's own hierarchy tree, but which Max's activity description of 1220 might support. Max may want to carry around on his machine, copies of other peoples' ADO's so that when Max is on the road, and not connected to a network, he can still study how those other people have expressed their activity plans and have hierarchically organized their ADO's relative to one another. Also, in keeping copies of other peoples' ADO's on his machine, Max can receive "updates" of changes those other people have made to their plans. Max's machine might also automatically alert Max to the fact that one or more of the other people have changed their plans. It is too early in this description to begin to fully describe all the purposes that a foyered parent activity data object pointer 1217 can be used for. Suffice to say that it can be used for providing valuable functions such as cross-referencing and cross-translating between the plans of different people, for example as is suggested by element 263 of FIG. 2, and as is suggested by the association 1523*a* in FIG. 15. These aspects will be revisited again when ADO attribute 1245 is explained.

In one embodiment, Max can, at any time, edit or modify the content or attributes of any of his "owned" Activity Data Objects that are embedded in his own activity tree, such as ADO's 1210, 1220, 1219, and possibly even 1203. He can change his recorded expressions of the underlying activity that each of his activity nodes represents. He can move any of his ADOs to new positions in his hierarchical tree. He can even delete ADOs from his tree as he pleases. But it is possible that before Max makes any such free-willed modifications to his "own" activity descriptions, that Max has already transmitted out copies of one or more of his pre-modification ADO's to other people (e.g., Adam) for sharing purposes. It may be wise for Max to let those other people know about his changed activity descriptions. One possibility would be for Max to cause his machine to send out the whole of Max's activity tree (including primary and secondary pointers) to everyone whom he has shared with before. That would be highly inefficient. It would waste bandwidth. It may make it difficult for the recipients to figure out exactly what changes Max made and how that may affect their plans. It may also breach certain privacy restrictions. Max may not want everyone to know everything about all his activity descriptions. The better approach may be to send out selective updates to selected ones of the other users. Those other users will already have copies of Max's older activity descriptions (or at least those portions which Max has decided to share with them) and all they need to receive is the activity descriptions that Max has recently modified. Such information will enable other users them to be aware of what is being modified and, with the help of cross-foyer pointers and/or other idea-tying references, how Max's latest modifications may affect their own plans. Additionally, transmission of only the modified ADOs will often consume less transmission bandwidth than would transmission of Max's full activity tree.

By the same token, if Adam and/or other participants have shared their activity descriptions with Max, it would be advantageous for Max's machine to store local copies of those other participants' latest activity descriptions and to receive updates from them. It would be advantageous to prevent Max from altering the stored, local copies of activity descriptions owned by those other participants so that, when update messages do arrive, Max's machine will be able to create faithful reproductions of the latest version of those other participants' activity descriptions. When Max looks at those reproductions, he will get an accurate view of their latest plans (accurate to the time of last update transmission and subsequent receipt). When an ADO that belongs to (is owned by) a second user is stored in the machine area of a first user, that other person's ADO, as stored in the first user's machine area, is referred to herein as a "foyered" ADO. For instance, going back to FIG. 2 and looking at sharing agreement #2 in area 265, such an agreement state may indicate that Adam has delegated an activity, whose description Adam originally devised and owned, to Max so that Max can take-over the task. (This can happen even though Max is Adam's boss.) The sharing agreement #2 in area 265 further indicates that Max has Accepted the delegation. Does that mean that Adam has erased the corresponding ADO from his (Adam's) machine and his machine sent a derived copy of the original to Max's machine? Generally, the answer is no. Referring to FIG. 3, in that embodiment Adam would typically keep his original, activity describing, ADO embedded in his own activity tree 325*a* and initially mark its state to indicate that a delegation (Dg) request has been sent to Max's machine. Adam's machine would make a derived copy of Adam's original ADO and transmit that copy to Max's machine area. If and when it arrives in Max's machine area 312, Max's machine may alert Max that a new request has arrived. Max may preview the request and decide whether to respond to it now or think about it before responding. Assuming that Max decides to immediately accept the delegated (Dg) responsibility, one of the things that Max's machine might automatically do is to move the received copy of Adam's ADO from a preview area (not shown in FIG. 3, see instead 1313 of FIG. 13) into Adam's foyered-tree area 315*b* created within Max's machine area. (In another embodiment, the derived copy of Adam's ADO might be recorded as a foyered, but unreviewed, ADO in Max's machine area and not necessarily stored in a separate review area before Max reviews it, and after review, Max's ACMAN system might just indicate this slight change in state.) Regardless, this foyered copy (in area 315*b*) cannot generally be changed by Max. At substantially the same time, if Max indicates acceptance of involvement in the underlying activity, Max's machine may automatically create yet another copy (a derived copy) of Adam's transmitted ADO and record that derived copy into the embedded area 315*a* of Max's machine area, in an appropriate position within Max's possibly hierarchical tree that Max might indicate. The derived and embedded copy is owned by Max, and he can modify it as he wants. (In an alternate embodiment, Max's machine may temporarily store the derived copy in a stack holding other derived copies and later remind Max that he agreed to insert it into his own activity tree (315*a*) because he had accepted the delegation.) Adam's machine may be sent a receipt acknowledgement either when the transmitted ADO arrives in Max's machine area or when Max actually opens the message (see FIG. 16A). Adam's machine may be sent a derived copy of Max's embedded ADO that indicates delegation acceptance either when Max clicks an acceptance button (or other such means) or when Max actually drags and drops the derived ADO into Max's primary tree. Other variations are also possible. These are just a few ways in which detailed parts of the delegation transaction may take place. In addition, all of the transmissions back and forth might occur quickly if the machines are coupled to an appropriate network, or any of these transmissions may be queued and later sent if the respective machines are uncoupled to an appropriate network but later coupled.

Figure 12B:
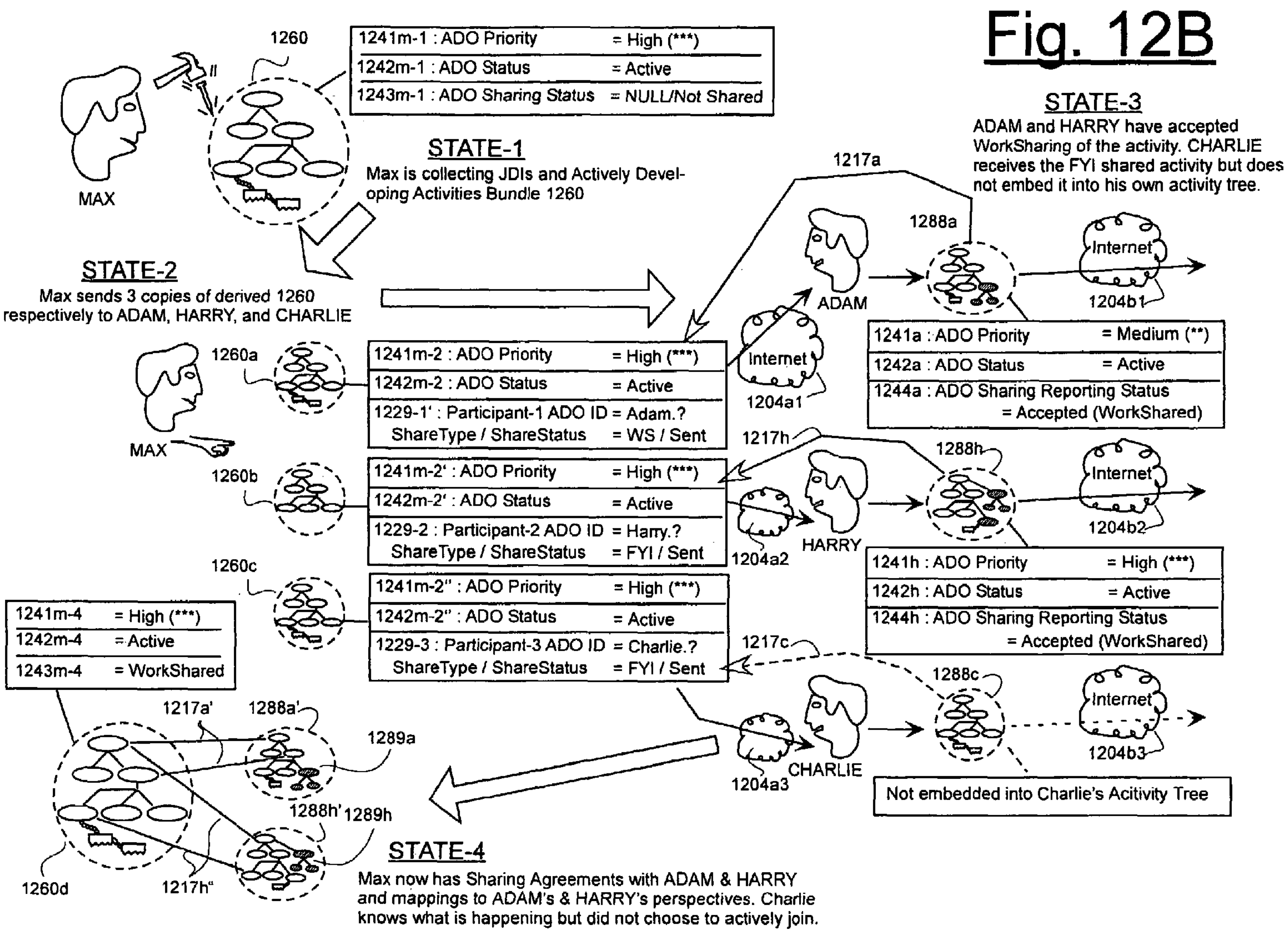
FIG. 12B is a state diagram showing how Activity Data Objects, or bundles of ADO's (with or without attached JDI's), may be transmitted for sharing with other users; and for further showing how acknowledgements and/or sharing agreements may be developed and how the other users can further develop or transform their own organized activity descriptions and share those.
Figure 13:
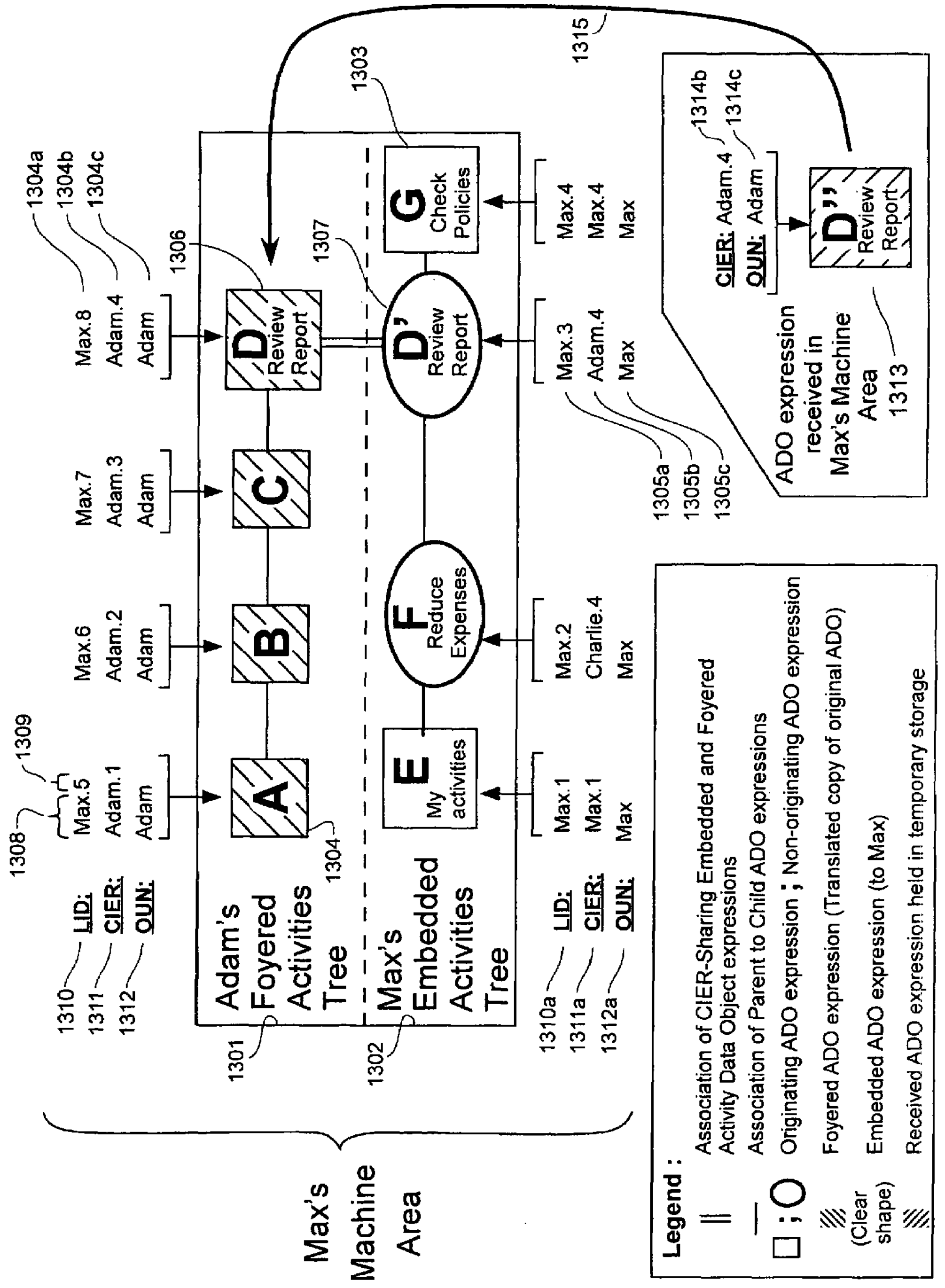
FIG. 13 is a schematic diagram which introduces some differences and interrelationships which may exist between Foyered ADO's and Embedded Activity Data Objects of a given user's machine area.

Referring to FIG. 13, we will briefly digress away from FIG. 12A to take a more detailed look at how ownership of ADO's changes and is tracked as copies move from foyered area to each owner's inner sanctum, the so-called, embedded region. FIG. 13 shows a partial representation of a set of embedded and foyered activity data objects residing within Max's machine area. Max's machine area can be constituted exclusively by storage means within Max's local machine, or exclusively by storage means located elsewhere, or by data that is distributively stored over a number of different places. Square boxes are used to represent ADO's that store an original or initial expression of a given shared activity description. The embedded activity data objects, represented by symbols E, F, D' (note specifically the primed version D' indicated by box 1307), and G are embedded into Max's embedded activity tree and are hierarchically organized relative to one another as shown. Accordingly, the primary hierarchy path for Max's own ADO G may be denoted as E-F-D' where E is Max's root activity node ("All My Activities").

Further in FIG. 13, hashed containers, such as 1306, are used to represent ADO's that are owned by Adam but are nonetheless stored in Adam's foyered region 1301 of Max's machine area. More specifically, the foyered activity data objects represented by symbols A, B, C, D (note specifically the unprimed version D indicated by box 1306) are not part of Max's activity tree 1302. The foyered activity data objects, A, B, C, and D are transmitted copies of further ADO's (not shown) that originated in Adam's activity tree on Adam's machine area. As is indicated, the original hierarchy path for Adam's owned ADO D may be denoted as A-B-C where A might be Adam's root activity node ("All My (Adam's) Activities") as last transmitted from Adam's machine area. In this example, when Adam sent a delegation request to Max, where the actual delegation request is expressed only in the ADO represented by oval D (1306), Max might better understand the importance of Adam's proposal if Max saw where that proposal D (1306) was hierarchically positioned in Adam's tree. So when Adam caused his machine to transmit Activity D to Max, in One embodiment, Adam's machine might also automatically include the tree fragment A-B-C in that or a closely related set of transmissions sent to Max. Maybe Activity D represents the real life activity of "review and reimburse Adam's trip expense report", and Adam is asking Max to do this on Max's own, i.e. with full accountability. So Adam sends ADO 1306 to Max as a delegation request. When Max receives this activity data object 1306 (along with primary progenitor activity data objects A, B, and C) from Adam, Max's ACMAN software stores the received activity data object(s) on Max's machine as "foyered" activity data objects. Then if Max accepts the delegation request, a derived ADO copy, D' (prime) of this activity data object is created and embedded by the ACMAN software into Max's activity tree at position 1307. Note that the respective activity descriptions D and D' (prime) (1306 and 1307 respectively) correspond to the same original activity idea, even though one copy might be foyered and another respective copy might be embedded. When Max previews Adam's proposal of A-B-C-D, as shown in foyered region 1301, Max may decide that the activity hierarchy represented by containers A-B-C are not acceptable for Max. Max may have his own hierarchical structure in mind, so he may choose to embed only a derived copy D' (1307) of Adam's transmitted D (1306, "Review Report") into his, Max's own activity tree. Max could instead have elected to embed the full fragment: A-B-C-D; or various permutated subsets of it such as B-C-D; or C-D directly into his own activity tree if the implied hierarchy happened to fit Max's view of the world and Max was ready to adopt one of those permutations as his own. But in this case, Max decided that for Max, the activity of "Review Report" 1307 would fit best as a child under his existing activity data object, F, of "Reduce Expenses". After embedding the derived copy D' (1307) into his own activity tree, Max notices an unusual expense item in the attached report (perhaps attached as a JDI or perhaps contained in the ADO D' itself). Max decides that he needs to contact someone in accounting to check the company policies to see if that item should be reimbursed under the company's new expense policies. So Max adds a new activity data object G (1303) to his activity tree as a child of D' (1307).

This modular structure of locally stored foyered and embedded activity data objects provides substantial benefits. It allows Max to view some portion (and possibly all) of Adam's activity representations even while Max is disconnected from all computer networks. It also allows Max or Adam to modify and edit their owned activity descriptions while disconnected from all computer networks, even though their activity idea expressions have been shared with others. This also establishes a data structure that enables Adam to send activity data object updates to Max, and Max to send corresponding updates to Adam, asynchronously, i.e. whenever they each happen to be able to attach briefly to a network connection. Lastly, this enables Max to view Adam's activity expressions from Adam's view of the world, and vice versa; or even to view both Max's and Adam's related activity trees within the same presentation so that a comparison and better understanding of their different activity trees (i.e., different views of the world) can be understood.

Now we'll turn our attention back to FIG. 12A to describe the illustrated Activity Data Object data structure, and we'll refer back to FIG. 13 occasionally for specific examples. Magnification 1220*a* shows one possible internal structuring for the Activity Data Object (ADO) of primary child activity node 1220. It may be appreciated from the description thus far that activity data objects, such as 1210 and 1220, have certain common attributes. The common attributes can include any or all of the data fields magnified by 1220*a* as well as: (a) the possession, in one embodiment, of one and only one primary parent pointer (e.g., 1215) (except for the root node) and (b) the possession of one or more types of unique Activity Data Object Identifiers. (e.g., 1221 and/or 1222). The common attributes of all the activity nodes allow them to be modeled under an object-oriented approach.

The first ADO field described in the ADO data structure 1220*b* of FIG. 12A is the Attributes Index and Attributes Offsets section 1257. This might be a header section of the ADO that includes information about the structure of the ADO. Some of the fields in 1220*b* may be fixed length fields, while others may be variable length fields. In one embodiment, standard and fixed length ADO fields might be organized physically at the top of the data structure so that indexing of ADOs can be more efficiently achieved, and then variable length and possibly optional custom fields might be included after the fixed length fields section. The Attributes Index and Address Offsets section 1257 might serve two key purposes, among others. One is that it might provide address offset information and/or other ADO section logical and/or physical address information so that given an ADO starting address, the various other data fields can be located and recognized according to their appropriate field definition, by a data processing machine. This might be especially helpful regarding variable length fields, since the starting point of ensuing fields might not be easily determined. A second key purpose is that if ACMAN system users ever define optional custom fields 1256, this section 1257 might include the respective custom field type identifiers so that the data processing machine would be able to identify the type of field and data processing rules for which the respective custom field data should be processed. A third possible purpose of field 1257 is that if different versions of the ACMAN systems might be used by different users who wish to share ADOs with each other, if those respectively shared ADOs have different ADO structures or relative orderings of ADO field, yet they still have some of the same ADO field types (e.g. 1222, 1233, etc.), Attributes Index and Address Offsets field 1257 can provide each user's data processing machine with the necessary information to interpret the respectively shared ADOs.

In the magnified view (1220*a*) of ADO 1220, there may be two types of activity data object identifiers (ADO IDs): a Local Activity Data Object ID (LID) 1221 and a Common Idea Expression Reference (CIER) 1222. The LID may provide an ADO reference identifier that is unique among the LIDs of other ADOs stored on a given user's machine area. The CIER, on the other hand, may provide a reference identifier that identifies an ADO as belonging to an exclusive group of ADOs that describe an originally expressed activity idea, uniquely tying those ADO's together for a pool of sharing ADO users. A CIER of the same value in two or more ADOs might indicate that these ADOs correspond to the same original activity idea expression, even though these ADOs may be foyered and/or embedded.

Digressing briefly back to FIG. 13, this can be seen more clearly. Each ADO ID (whether LID or CIER type) may be made up of a user name plus an Activity Data Object reference code. For instance, corresponding to the ADO instance 1304, the first portion of the LID reference code, 1308, indicates a unique user name "Max", while the reference code section 1309 indicates a value of "5". Possibly this section 1309 may be a serial reference code, and for convenience, it will be referred to herein as a serial reference code, although it does not necessarily need to be serial. Furthermore, note that among the LIDs of ADOs in Max's Machine Area, each of the eight ADOs shown (A, B, C, D, E, F, and G) has a unique LID ("Max.5", "Max.6", etc.). For users of ACMAN software, each user typically may have one (or possibly more than one) user name. Each LID's ADO serial reference code might be unique among all the other serial numbers created for a given user name by an ACMAN system. In one embodiment, the user names of ACMAN system users are unique among themselves, and can be established as an individual's email or internet contact address, or in an alternative embodiment, by providing a centrally issued user name, unique among other such centrally issued user names, when a user registers their ACMAN software with a centralized registration service (e.g., APEX center 1470 of FIG. 14). As mentioned above, each Local ADO ID (LID) serial reference code might be unique among the other LID serial numbers created for a given user name by an ACMAN system. Per each user name, a unique ADO serial number can be guaranteed if the licensed and installed ACMAN software maintains a list of it's previously created ADO serial reference codes. By combining a unique user name and a unique ADO reference code into an ADO ID object, each LID in the universe can therefore be unique, regardless of whether the LID refers to an ADO that is embedded, foyered, shared, or whose machine area its ADO may be stored on. Of course, an ADO ID, such as a Local ADO ID 1221 does not have to consist of a user name or unique user name indicator. That is just one embodiment. Another identifier means that can uniquely identify an ADO among all the referenceable ADOs for an ACMAN system and/or specifiable pool of ACMAN systems that may share activity information together, would be sufficient.

The CIER 1222 may provide one or more ADOs with a unique reference identifier corresponding to one originally shared activity idea, regardless of which embedded or foyered activity tree(s) the ADO(s) reside on or what machine area they reside on. A CIER-tied group of ADOs is an example of a common-idea-tied group of ADOs. "Common" in this context implies an exclusive grouping of the ADOs to the one common idea. There may be other idea-tied groups that are not mutually exclusive. There may be other ways for tying ADOs to respective ideas such as by using pointers and/or cross referencing tables.

Notice that in FIG. 13, there is a foyered ADO 1306 representing activity description expression D as well as an ADO 1307 representing activity description expression D'. Note further that the respective LIDs (1304*a* and 1305*a*) are different, while the CIERs (1304*b* and 1305*b*) are identical, indicated as "Adam.4". The user name that might be included as part of the CIER indication might be set to the user name of the Idea Originator of the shared activity data object (in this example "Adam"), regardless of in whose machine area or in which activity tree the various Activity Data Object copies, or instances, may be stored.

Returning back to FIG. 12A, the CIER 1222 may contain the user name of the originator of the activity idea. In one embodiment, this user name would be that of the one who created the initial instance of the possibly shared activity data object; later, derived copies of a given activity data object, referring to the same original activity idea, may be created, but the Idea Originator User Name for the various ADO copies would remain the same. The CIER is needed so that activity objects referring to the same original activity idea can be identified as such, and also in many cases, so that a machine can automatically transmit ADO updates to the Idea Originator of an activity description that has been shared. For derived copies of ADOs corresponding to the same given activity idea, regardless of whose machine area the copy or copies are stored on, the CIER might be identical. The LID on the other hand is unique for every instance of an ADO stored on a user's local machine area. So copies or different instances of activity data objects on a single user's machine area might have the same CIER but each such ADO may have a different LID. Each ADO also might have an "Idea Originator User Name & Address" (IOUNA) field 1223, an "Owner User Name & Address" (OUNA) field 1224, and/or an "Activity Tree User Name" (ATUN) field 1225. The IOUNA field 1223 may be used to store the user name of the originating author of an expressed activity idea as well as some form of contact address(es) for this user. In practice, the user name component of the IOUNA field may not be strictly required, since that information might typically be redundant to the user name component in the CIER 1222. However, this redundancy may be beneficial in ACMAN system development or debugging, and especially in cases where a user changes his contact address. One main benefit of the address component of the IOUNA field 1223 however, is that recipients of a shared activity data object could get the transmitted ADO(s) secondhand rather than directly from the Idea Originator. If they want to participate in the activity, they can use the IOUNA of section 1223 to learn more about who the originator of the proposal might be (say, "Adam") and to contact the originator (Adam). Even if an activity data object is created by Adam, then shared from Adam to Max and then again shared from Max to Harry, the IOUNA for each copy of the ADO should still be Adam.

The Owner User Name and Address (OUNA) field 1224 may be used to indicate the ADO owner user name and optionally the ADO owner's contact address. The ADO owner is the ACMAN user who has write permission to modify a specific instance of an ADO stored in his or another user's machine area. It is important to note that the ADO owner user name might not be the same user name as the Activity Idea Originator's user name. This will be seen in later examples in this disclosure. It is not necessary that the OUNA field 1224 contain either or both of a user name and an address of that user. Only a reference or pointer to indicate the owner user name might be needed. For instance, the owner user name might be stored in some other storage location, and only a reference to that storage location might be needed. Similarly, the owner's contact address might be referenced to a different storage location. In one embodiment, even an indication of the ADO owner's contact address is not included in field 1224, as long as an ACMAN system has a means of obtaining the ADO owner's contact address as a function of the ADO owner user name, for when transmissions of that ADO's common-idea-tied, embedded, and updated ADO might be needed. Then the ACMAN system can lookup the contact address of the user name owner of the foyered ADO, and can send an updated copy of the embedded common-idea-tied ADO to that contact address. This will be described more later.

Note that an ACMAN system might maintain a contact address table that maps user names to their respective contact address(es). Anytime the ACMAN system encounters a new user name, it may attempt to update this user name to contact address(es) table. Such an address may be an email address or addresses, an ftp address, an instant messenger address, or any other type of internet or network address(es) that would allow one participant to successfully message another participant. In this manner, the user name component of ADO ID's together with this contact table can provide the sufficient information to communicate and identify how and where to update or share any Activity Data Object.

The "Activity Tree User Name" (ATUN) field 1225 indicates the user name of the activity tree that an ADO is part of. If an ADO is embedded in a given user's activity tree, then the ATUN indicates a user name equal to that of the ACMAN system user. If the ADO is a foyered ADO (i.e. owned by someone else) rather than an embedded AO, then the ATUN might indicate some user name other than the user name of the given ACMAN system machine area. In one embodiment, this ATUN field 1225 may not be necessary since the OUNA field (1224) might indicate the same information. However, in other embodiments, which will be described later, this ATUN field 1225 might be useful a) if direct write access is provided to another user even for one's embedded ADO or b) in certain situations where 3 or more users may be involved in a Delegated shared activity.

In one embodiment, the combination of the CIER 1222 field and the "Owner User Name" (OUN) component of the OUNA 1224 field are sufficient to distinctly identify ADOs in order to share and/or update ADOs; the LID, ATUN, and IOUNA fields are only optional since they may not provide new information about an ADO that cannot be inferred as a function of CIER and OUN. For instance, if the Common Idea Expression Reference (CIER) contains the same Idea Originator User Name that might also be in the IOUNA field 1223, then a separate IOUNA field may not be required. Furthermore, if the user name indicated in the OUNA field 1224 is not the same user name as the licensed user of a given runtime license of the ACMAN system, then it can be inferred by the machine that the ADO might be a foyered ADO, and not embedded in the user's activity tree. In this example, the OUNA field could indicate which user's activity tree in one's local machine area the ADO instance resides within. Since the CIER already indicates a reference of an original activity idea expression, and the OUNA indicates the specific activity tree within one's local machine area, the LID provides no further unique identification and is therefore not required. On the other hand, it will be seen later that in embodiments exhibiting more advanced capabilities and/or faster system query performance, the LID, ATUN, and IOUNA are helpful, and sometimes the CIER plus OUNA fields alone would be insufficient to achieve certain security and/or ADO sharing features.

In one embodiment, for Activity Data Objects that a user has shared with other participants (as opposed to just being the recipient of a sharing request), there is a section within the ADO data structure that can contain the summary Outbound Sharing Status 1243, as well as a typically larger section 1226 containing the corresponding Participant Sharing Details. Section 1226 may include information about who an ADO has been shared to by the owning user, as previously described in FIG. 7. This Participant Sharing Details section 1226 might include identifications of all participants Max might have shared an ADO with, including people to whom he may have delegated (Dg), WorkShared (WS), or even just FYI Shared (FYI) an activity data object. If another receiving participant did not yet respond to an ADO he received from Max, an entry corresponding to the target recipient, such as 1229-1 might exist in this Participant Sharing Details section 1226 of Max's embedded ADO, and it might indicate a ShareStatus value of "Waiting". In this manner, Max's system could continue to automatically provide updates to all participants of his shared activity data object, regardless of whether they have accepted it yet. This section 1226 might include a variable indicating how many other participants 1226*a* Max invited to share in his original activity idea expression. For the n invited participants, the respective data fields 1229-1 through 1229-*n* might include the respective Participants' Local ADO IDs (PIDs) (or if not fully known, at least the PID might contain the participants' user name(s)), the ShareType established with each such other participant, and the Sharing Status for each such other participant (as explained in FIG. 7). The PIDs in the respective data fields 1229-1 through 1229-*n* might indicate each respective invited participant's User Name within the Participant Local ADO ID. Coupled with a contact address table (as in 319 of FIG. 3), such information might be sufficient for an ACMAN system to be able to transmit data containing signals to the contact address(es) of the respective ADO participants. Additionally or alternatively, although not shown in FIG. 12A, each of the data fields 1229-1 through 1229-*n* might directly include their respective participant's contact address. This might reduce the need for a possible contact table in this case.

Referring briefly back to FIG. 13, 1304*a* and 1304*b* illustrate possible examples of a LID and a CIER, respectively, for the Activity Data Object represented by 1306. This diagram illustrates foyered ADOs and embedded ADOs on Max's machine area. This diagram also indicates, for each illustrated ADO, possible contents of some of the ADO data structure fields from FIG. 12A. For instance, 1310 and 1310*a* indicate "LID", which corresponds to the Local ADO ID field 1221 from FIG. 12A. Likewise, 1311 and 1311*a* indicate "CIER", which corresponds to the Common Idea Expression Reference field 1222 from FIG. 12A; 1312 and 1312*a* indicate "OUN", or the Owner User Name which corresponds to part of the Owner User Name & Address field 1224 from FIG. 12A. In this embodiment shown in FIG. 13, 1304*a* is the LID for ADO 1306. 1304*a* includes user name "Max" plus ADO serial reference code "8", while CIER 1304*b* includes user name "Adam" plus ADO serial number "4". Max's ACMAN system logically can determine that when it receives an ADO 1313 from some outside machine, possibly on the internet, that the ADO indicates a Common Idea Expression Reference (CIER) of "Adam.4" (1314*b*), that it corresponds to both ADO 1306 and ADO 1307, since they are the only ADOs in Max's Machine Area containing that CIER value. Because the Owner User Name 1314*c* contained in the Owner User Name & Address (OUNA) field (1224 from FIG. 12A) is "Adam", Max's ACMAN system can determine that it should automatically update 1315 ADO 1306, which is in Adam's activity tree 1301 on Max's Machine Area, with the contents of this received, updated ADO D" 1313. The Activity Data Object 1306 can be updated accordingly. In one embodiment, Max's ACMAN system also can logically determine that if Max has made a change to his embedded and shared ADO 1307, that it should transmit an update message to the user indicated in the CIER reference 1305*b*.

In addition or instead, if Max had also previously shared this ADO 1307 to some other participant(s), Max's ACMAN system could, in one embodiment, use information contained within ADO 1307 from the Participant Sharing Details section 1226 of the ADO data structure (shown in FIG. 12A) to determine what user(s) to transmit ADO updates to. If Max had shared this ADO to other participants and they had already responded, then Max might have ADO entries for the common-idea-tied foyered ADOs that were stored in local copies of these participants' activity tree(s) in Max's machine area. In an alternative embodiment, Max's ACMAN system could look up the user name references in those foyered ADO instances on Max's local system to determine who to send updates to.

In any case, given a set of user names, Max's ACMAN system might in one embodiment lookup the internet or network address for each such participant user name, such as "Adam", in the contact address table (such as illustrated in FIG. 3 in 319 and/or 332), and transmit the updated Activity Data Object to each such address. When Adam's machine receives this ADO update, it could determine that it should update its foyered ADO in Max's activity tree in Adam's machine area whose CIER matches "Adam.4", as implied in CIER 1305*b*.

Referring back to FIG. 12A, there may be variations to the sharing schemes and ADO data structure above that may make it desirable to include an LID (Local ADO ID) 1221, an ATUN (Activity Tree User Name) indicator 1225, and/or an IOUNA (Idea Originator User Name & Address) 1223 field, in addition to the CIER (Common Idea Expression Reference) 1222 field and the OUN portion of the OUNA (Owner User Name & Address) 1224 field. For example, for security purposes, another level of authenticity can be enjoyed if a user's system, say Max's system, can access the LID of a participant's transmitted ADO, rather than just the CIER. For instance, let's suppose that Max's system already possessed a foyered copy of an ADO that had been already shared by Adam to Max. If sometime later a hacker pretending to be Adam tried to send an update to Max corresponding to the activity idea expression of this ADO (i.e. with a matching CIER), that hacker or intruder would not necessarily be able to know the LID of Adam's originally sent ADO. If Max's system automatically compared the LID 1221 value of its local ADO copy versus the LID value of the incoming ADO from the hacker, Max's system could decide to quarantine or delete the incoming ADO since it could see that the two LID's did not match. In addition, system performance may be enhanced by using LIDs. Since, in one embodiment, all ADOs on a user's system have LIDs containing that user's user name coupled with a unique local ADO serial reference code, any database indexes of ADOs only really need to contain the ADO serial reference code portion of the LID (or at least just the LID). On the other hand, without an LID, a complete CIER plus an OUN (from field 1224) might be required in a database index to identify a specific ADO instance on a user's local system. Without an LID, there may be larger memory requirements as well as more complexity in the database structural implementation and in system testing.

Regarding the value of the IOUNA field 1223, consider a possible example in which an ADO is created by Adam through his ACMAN system, then shared from Adam to Max, and then again shared from Max to Harry. In one embodiment, if Harry then modifies his embedded ADO, an update ADO copy is automatically sent to the machine area indicated by the OUNA 1224 of the common-idea-tied foyered ADO(s) (i.e. foyered ADOs with the same CIER) on Harry's machine area. In this embodiment, this OUNA would indicate Max by default. In an alternative embodiment, however, Harry's system may update either or both of the original activity idea author, Adam, and the user who immediately shared the ADO with him, Max. Furthermore, it might be Max and/or Adam who should have authority to update their foyered common-idea-tied ADOs on Harry's local machine area. Here, the Owner User Name and the Idea Originator User Name (contained in the OUNA 1224 and IOUNA 1223 fields respectively) should be distinct variables—the OUNA is Max and is not the same as the IOUNA, Adam. Here an IOUNA, which indicates Adam and Adam's contact address, may be needed in addition to the OUNA in order to ensure the creator of the original activity idea expression, Adam, is updated in addition to the immediate sharer of the activity data object, Max. In an alternative to this embodiment, Harry's ACMAN system might create 2 foyered copies of the ADO he received from Max—one indicating Max as the OUN, and the other indicating Adam as the OUN. In such an alternative, Harry's machine area might possess 3 common-idea-tied ADOs on his local machine, instead of just 2: (1) his embedded ADO, (2) his foyered ADO with Max as the OUNA, and possibly (3) his foyered ADO with Adam as the OUNA. But without some indication within Max's transmitted ADO that Adam was the Idea Originator of the shared activity idea expression, and without some knowledge of Adam's contact address, Harry's ACMAN system would not be able to conceive of the 3$^{rd}$ ADO, and Harry's system might not have knowledge of a machine area address for which to directly transmit updates to Adam's machine area. (These concepts will be described further in FIG. 18A and FIG. 18B.)

In another embodiment, Max may share an ADO with Harry, Harry may cause his system to create a derived and embedded copy on his machine, and Harry may further cause his system allow Max to update even this embedded ADO on Harry's system. For instance, Max may share some ADO to Harry. Harry may give permission to Max to have priority write control over even Harry's embedded copy of the ADO, so that Max could for instance increment Harry's priority or change the due date for the ADO on Harry's system, despite the changes Harry may have chosen already. Here, the OUNA for the embedded ADO on Harry's system might actually be Max, instead of the default of the local machine user, Harry. In this case, the Activity Tree User Name 1225 field might be needed since otherwise the ACMAN system might not be able to tell which ADOs are embedded in the ACMAN system user's tree by just checking to see if the OUNA is the same as the local user's user name. An LID 1221 might also be very helpful in this scenario for database efficiency and ACMAN software testing simplicity. In order to identify the specific ADO among the plurality of ADOs on the machine area, since both the embedded and the foyered instances of such common-idea-tied ADOs here might have the same CIER, the same IOUNA, and the same OUNA, the only practical way (other than storage address) to identify the uniqueness of locally stored ADOs might be the combination of CIER and ATUN. As mentioned earlier, database queries and indexing can be made simpler and more efficient by storing a unique LID field 1221 to uniquely identify each ADO on a given local machine area.

Figure 14:
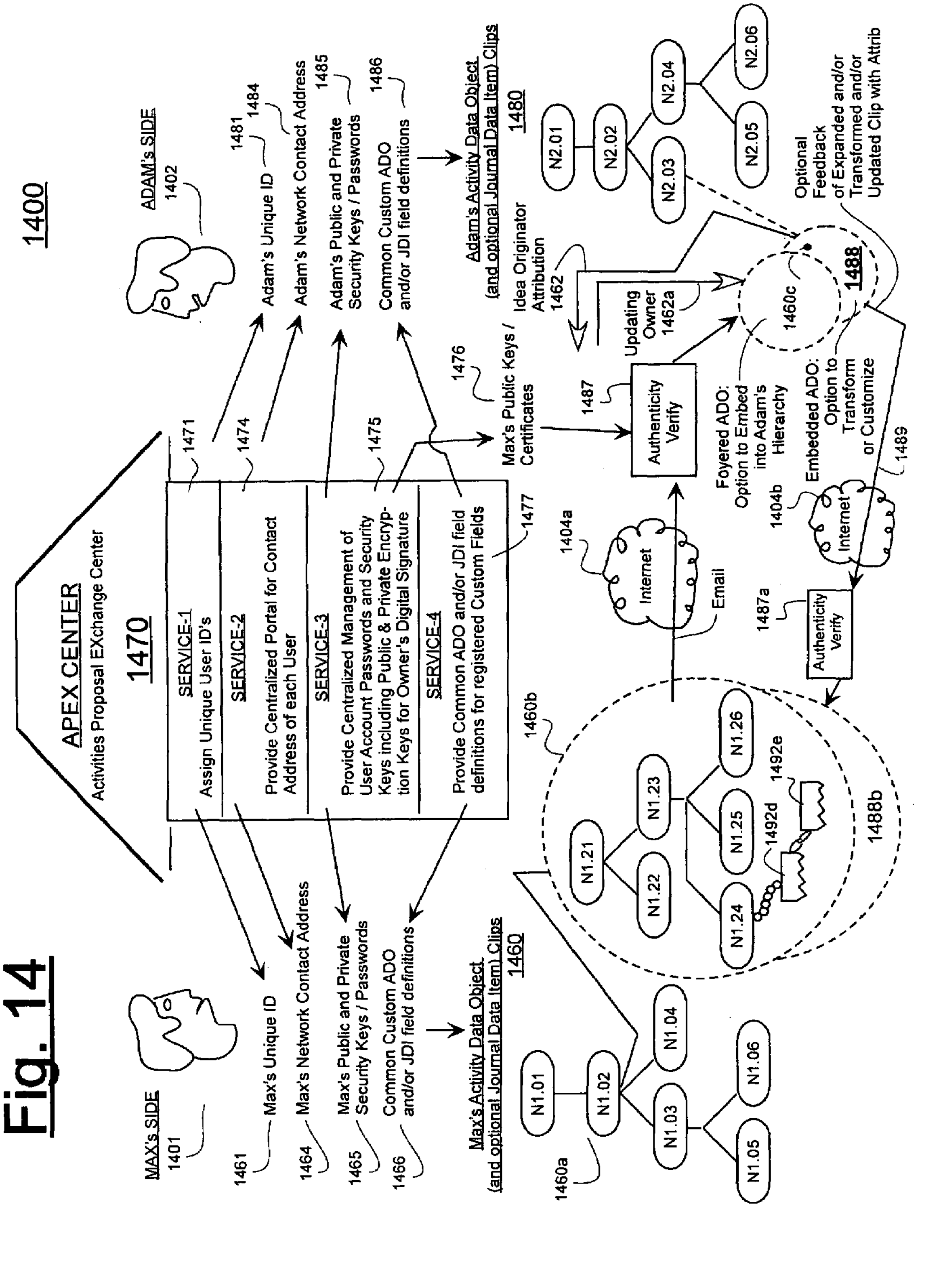
FIG. 14 shows how an activities exchange center can be structured to assist users with the exchanging of activity descriptions and/or journal data items.

Continuing on with our description of the ADO data structure 1220*b* of FIG. 12A, ADO attribute section 1231 may contain an object creation time indicator and/or a random or pseudo-random number since. It is possible for a non-uniqueness to occur in the ADO's Idea Originator User Name 1223 or in the ADO's Owner User Name 1224 and the resulting activity data object identifications because users may fail to utilize a uniqueness guaranteeing service such as APEX 1470 (FIG. 14). The optional random number of attribute section 1231 increases the likelihood that ADO's from different users will nonetheless be uniquely identifiable. Such an optional random number can also be useful for validating the integrity of the ADO 1220*b* when the ADO is transmitted over an unsecured network. For example, an owner's digital signature 1255 may include an encryption of 1231 and therefore the randomness of field 1231 may be used to better validate the integrity of a transmitted object. ADO attribute section 1232 may contain a timestamp indicating when the content or any attributes of the ADO were last modified, as well as optionally a timestamp of when the ADO was last transmitted to other participants. In an alternative embodiment, the "Last ADO Modification Time" of 1232 would only reflect such modifications to the ADO that would require updates to be sent to other participants. In another embodiment, rather than just a single record contained in 1232, there may be multiple distinct records of "Last ADO Sync Time" pertaining to each of the ADO participants, so that ADO transmissions would not need to be sent unnecessarily to every participant at every synchronization (a.k.a. transmission sending) event. As just one example, Charlie might share an activity description with Adam, and his ACMAN system may have transmitted that ADO to Adam's machine area address. Later, Charlie might choose to also share that same Activity Description with Max, although he might have changed nothing else about the ADO except new ADO Sharing Details pertaining to Max in section 1226. It might be unnecessary for Charlie's system to retransmit the ADO to Adam, even though a transmission to Max would be necessary. If this ADO (or Charlie's ACMAN system) maintained a recording of "Last ADO Sync Time" per each participant of the ADO, then Charlie's ACMAN system could more efficiently transmit an update to Max instead of to both Max and Adam.

In one embodiment, each ADO 1220*b* is stored as a separate file or database record under an operating system (OS) of the computer. In such a case, the OS may provide in one of its directories, the file creation time 1231 and/or last file modification time 1232 and the OS may guarantee a unique file identification 1221 for the ADO file as may be appropriate. Accordingly, a generic Activity Data Object does not need to necessarily contain within itself some of the attributes listed here. Another entity can provide those attributes as long as they logically attach in some way to the Activity Data Object.

Attribute section 1233 may contain a Long Activity Descriptor Field. "Long" is a relative term, but the basic idea in one embodiment, is that in the structured activities presentation area (recall FIG. 6A) the Long Activity Descriptor field 1233 corresponds to the many examples shown in 616. Ideally, a user may want try to keep Long Activity Descriptor fields brief enough to fit on one line, although that is not required. Further details about an ADO can easily be included in the journal presentation area, and extra-journal links between the ADO and a Journal Data Item (JDI) can be easily created. The Short Activity Descriptor Field (SADF) 1234, may be just an abbreviated or shorter version of the longer describing expression of the activity represented by ADO 1220*b*. The corresponding activity description of node 1220 may be presented to a user in one or both of a shorter form 1234 and a comparatively longer description form 1233. The short form (1233) would typically be used when the nodes are shown in a graphic presentation mode (see FIG. 8) rather than in tabular or spreadsheet mode (see FIG. 6A). Each ADO owner may decide for him or herself what constitutes a useful short description of the nodal activity data object and what constitutes a long description. In one embodiment, at least one of the long activity descriptor field or the SADF section (1233 or 1234) must be filled in, and the ACMAN system may then automatically generate the contents of the other section. For example, if only the long description is initially filled in (e.g., by the user), the computer program may select the first few words of the long activity descriptor as constituting the short activity descriptor. Or the software may look for and parse out certain grammatical constructs within the long description to fill in the short activity data object name. For example, many long descriptions include a verb and a direct object, such as "Collect papers from Paul and SafeCo". By pulling out just these elements (verb and direct object), a short name of "Collect papers" can be automatically generated. In the other direction, if the user has generated short symbols for various concepts in a local dictionary, the system may automatically expand those abbreviated symbols into long descriptions in section 1233. The concept here is to make it as easy and as inviting as possible for users to fill in the activity describing portions of the Activity Data Object.

Section 1235 is a Boolean variable, "Category-Only" indicating whether or not the given Activity Data Object is actually to be used as a description of a specific activity idea or just a placeholder of a category of activity ideas. Consider that this here disclosed ACMAN system may be based on a hierarchical structure of activities, in which activities may have supporting sub-activities, or child activities, that support their parent activities. This can be implemented with an object oriented programming methodology. This creates a scalable system that reflects the nature of both individual and group thought and activity planning. But consider also that some activities can be thought of as things that one would "do", while others can really be categories of activities or groupings. In one embodiment, category-only activities can be automatically excluded from todo list presentations of activity descriptions. For example, the activity data object shown with a Short Activity Data Object Name of "Personal" in FIG. 8 (878) is not something one would do. It really is a description or category of other child activities that is useful for organizing a set of activities and/or plans. On the other hand, "Refinance House" 871*b* is something one might actually go and "do" in the real world outside of one's computer. That activity data object also may have child ADOs. Although those child ADOs are not illustrated in FIG. 8, they are shown in FIG. 6A. For instance, "Investigate mortgage brokers" 623 in FIG. 6A is indicated as a child activity of "Refinance house" (as shown on the same row within the parent hierarchy section 611). So any activity data object may be created for the sole purpose of organizing, or categorizing, child ADOs. When the activities pane is displayed in graphical mode, as in FIG. 8, it is useful to display expressions of activity data objects whether or not they are categories. But when the activities pane is displayed in spreadsheet mode, as in FIG. 6A, it may be useful to optionally remove "Category-Only" type activity data objects from the Activity Description presentation listing 610. For instance, as can be seen in the example of FIG. 6A, "Investigate mortgage brokers" 623 is presented in column 616, but "Personal", which might only be a category, might not be displayed in this column 616 presentation area. Of course, category ADOs such as "Personal" may still be included in the Primary Hierarchy Node Path 611, as illustrated in the parent hierarchy section 611 of the line 628. Furthermore, (returning back to FIG. 12A) Category-Only ADOs contain the same attributes 1220*b* that any other activity data object might contain. This "Category-Only" field 1235 is simply an optional field that a user may optionally choose to take advantage of.

Sections 1236, 1237, 1238, and 1239 may contain pointers or other references to Activity Data Objects within a user's embedded activity tree. (Additionally, section 1245, which will be described more later, may be used to provide pointers to foyered ADOs, some of which are described as foyered parent ADOs.) Section 1236 may contain the pointer to the primary parent ADO (Activity Data Object) of the current ADO. Such references to other ADOs may in one embodiment be in the form of either the Local ADO ID (LID) or the Common Idea Expression Reference (CIER), of the pointed to Activity Data Object. For example, pointer 1215 is the reference from node 1220 to its primary parent node 1210. Section 1237 may contain one or more pointers or other references to secondary parents such as represented at 1216. Section 1237 may also be headed by an indicator indicating the number of secondary parents. This number can be zero or greater. Section 1238 may contain pointers or other references to the primary child(ren) of the current node 1220. For instance, 1214 may be a primary child pointer from ADO 1210 to 1220. This section 1238 can include an indicator (not shown) indicating the number of primary children. This number can be zero or greater. Section 1239 in a similar vein may contain pointers or other references to secondary children of the current node. This section also may be preceded by an indicator indicating how many such secondary children exist. There may be zero, one or more such secondary children. Note that in one embodiment, the ACMAN system would not include hierarchical relationships and therefore sections 1236 through 1239 would not be included in the ADO structure. Note also that in an embodiment that does include hierarchical relationships, ADO trees and/or other hierarchical ADO relationships can be sufficiently constructed with only one of the parent pointer fields (1236 and/or 1237) and the child pointer fields (1238 and/or 1239).

Attribute section 1240 may contain an indication of how many extra-journal links there are between the current activity node and journal data items (e.g., 1228). This number may be zero or greater. Section 1240 may further contain pointers or other references which identify the individual journal data items to which extra-journal links are made. In the case of activity node 1220, extra-journal link 1228 may link with the journal data item 1292*a* which in turn is grouped with two other JDIs. Alternatively (and not shown in this example), 1240 could have indicated that there were three extra journal links, and 1228 could have instead had three extra journal links to 1292*a*, 1292*b*, and 1292*c* respectively, whether or not there was an intra-journal grouping list 1227.

Section 1241 may contain an indication of what the owner (e.g., Max) of the activity data object believes is his or her priority for the activity data object. In one embodiment, illustrated in column 612 (FIG. 6A), this is graphically indicated by using different numbers of dots or asterisks, depending on the priority level. Such graphical representations are more rapidly perceived and processed by the eye and human brain than are numerals. In one embodiment, Max could type the number "3", and 3 dots may be presented, or alternatively he could type "***" (3 asterisks) and the same 3 dots may appear, regardless of the form or format such information is stored in on Max's local machine area.

Section 1242 contains an indication of the Activity Data Object Status, i.e., what the ADO owner (e.g., Max) considers to be the status of the underlying activity represented by the ADO 1220. Different participants of a shared activity idea expression may have different perceptions, and thus different ADOs on a user's local machine may indicate different ADO Statuses even though they may indicate the same CIER. Max may believe the job is "Done" while Adam designates the job as still "Active". The respective embedded versus foyered copies of ADOs on Max's machine would then contain different values in their respective ADO Status sections 1242. An automated program may be used to spot common-ideatied foyered vs. embedded ADO's (two or more ADO's whose CIERs, e.g. sections 1222, are the same, indicating that they refer to the same shared activity idea) that have different status designations, and to report the difference to the corresponding owners. Max may find it useful to understand why Adam considers the job to be still Active when Max thought it was Done. In one embodiment, each ADO Status section 1242 may contain one state value from a defined set of mutually exclusive state values that can describe an activity's status. A nonlimiting set of examples of what ADO Status indications may be used includes:

(a) "Active" (optionally shown as "A" or just left blank in FIG. 6A, 613) to indicate that the ADO owner thinks the represented activity is currently active;

(b) "Tentative" (optionally shown as "T") to indicate that the represented activity is not yet being carried out and is not cancelled but that the ADO owner is still thinking about how to describe or plan the activity (c) "Cancelled" (optionally shown as "X") to indicate that the plans for the represented activity have been abandoned by the ADO owner;

(d) "Pending" (optionally shown as "P") to indicate that the engagement in or the completion of the represented activity is pending something beyond the ADO owner's direct control, i.e. pending some action by someone or something else;

(e) "Forwarded" (optionally shown as "F") to indicate that the engagement in or the completion of the represented activity is forwarded, or deferred, to a later time;

(f) "Continuous" (optionally shown as "○") to indicate that the represented activity is not expected to have a completion, but rather that the activity is a continuous, or ongoing, activity that is repeated or has no completion milestone. (This may be an activity like "Maintain the coffee machine".)

(g) "Done" (optionally shown as "D") to indicate that the action has already been performed as far as the ADO owner is concerned.

Section 1243 contains an indication of the "Outbound Sharing Status" and section 1244 contains an indication of the "Inbound Sharing Status". The "Outbound Sharing Status" section 1243 may be displayed in column 614 (FIG. 6A) in the structured spreadsheet ADO presentation area. The "Outbound Sharing Status" is an outbound summary indication for the given ADO related to explicit sharing from the owning user to other users to whom he has shared an expression of the ADO. As described in 703*a* (FIG. 7), the "Outbound Sharing Status" summarizes the type of sharing that might exist among the receiving participant(s) that Max has explicitly transmitted and shared his ADOs to. The displayed status summary may be one of several descriptive states, possibly including Not Shared (possibly presented as a blank field), Sent, WorkShared (WS), Delegated (Dg), or For Your Information (FYI).

The "Inbound Sharing Status" section 1244 indicates inbound sharing information. Relative to the machine area owned by a first user, this section is typically relevant for ADOs corresponding to activity idea expressions received from a second user and wherein the second user is the author of the original activity idea expression, and wherein the ADO is recorded on the first user's machine area. Section 1244 might indicate a) the type of sharing (None, Delegated, WorkShared, FYI; or supervisor sharing) that the immediate sharing user requested (i.e., explicitly, or implicitly in the case of supervisor sharing) as well as b) the type of acceptance response that Max's machine has reported back to the user who immediately shared the given ADO with him (and/or to the Idea Originator of the Activity Idea). A nonlimiting set of examples of what "Inbound Sharing Status" acceptance response indications might be used includes:

(a) "No Reply" to indicate that if a request for sharing has been received, that no reply to the sharer has been transmitted.

(b) "Undecided" to indicate that acceptance of participation in the represented activity is undecided or is just not definite yet (c) "Denied" to indicate the acceptance of participation in the represented activity has been denied by the recipient.

(d) "Accepted" to indicate that the recipient has sent acceptance of participation in the represented activity to the sender of the request.

As an example, refer briefly back to Activity Data Object expressions D and D' (1306 and 1307) of FIG. 13, where Adam sent Max a request to review Adam's expense report, and Max accepted the delegated sharing request. The "Inbound Sharing Status" section 1244 for Max's foyered D (1306) might indicate a sharing type of "Delegated". For Max's embedded D', the "Inbound Sharing Status" section 1244 might also indicate a sharing type of "Delegated", and Max's acceptance response indication of "Accepted".

Referring back to FIG. 6A, for the typical case in which Max may share his activity data object with one or more participants, column 614 might indicate an "Outbound Sharing Status" summary pertaining to the participants that Max has shared the ADO expression to. In one embodiment, column 614 may instead display the Sharing Type indicator of the "Inbound Sharing Status" section (1244 in FIG. 12A) for ADOs that have been shared from others to Max (inbound) and not shared from Max to others (outbound). Column 614 might indicate that the activity data object is a received, or inbound, ADO, possibly by a color coding, or additionally or alternatively by a symbol such as an upward pointing arrow, followed by the "Inbound Sharing Status" Sharing Type. (This is not shown in FIG. 6A.) In an alternative embodiment, column 614 only displays a sharing status of any kind for outbound shared ADOs; but Max can in any number of other ways view the current "Inbound Sharing Status" indications, for instance by right clicking on the Sharing Status cell, or clicking on the Sharing Status for a popup window showing such details, etc.

Returning to FIG. 12A, the Foyered Parent Pointer(s) (FPP) section 1245 is similar to the Primary Parent Pointer attribute 1236, except that instead of referencing a parent ADO within the Max's embedded activity tree, it may be a reference to one or more ADOs that are part of a foyered activity tree (stored on the Max's local machine area), indicating that the ADO of 1220 supports or should be considered a child activity of a foyered ADO. The FPP is typically most useful for FYI shared ADOs. In the possible example of FIG. 13, Adam sent Max a WorkSharing request. Max then accepted it, and as a result, his machine held two common-idea-tied ADOs: 1306, the foyered ADO, and 1307, the embedded ADO. In contrast, if Charlie sent Max, as well as 100 other company employees, an FYI shared activity data object, such as an activity data object expressing a Corporate MBO, Max very likely might not accept or deny it. Rather he might leave the copy of the shared object on his machine as a foyered Activity Data Object for future reference, but there would be no common-idea-tied ADO in Max's embedded activity tree. If Max were later to create some activity data object of his own (in some part of his embedded activity tree) that might to support (whether intentionally or not) Charlie's FYI shared Corporate MBO, then Max could create a Foyered Parent Pointer association between his activity data object and Charlie's activity data object.

In one embodiment, an embedded activity data object can have one or more FPPs. In an alternative embodiment, an ADO can have one primary FPP; and if there is one primary FPP, there may be any number of secondary FPPs.

In a another embodiment, in addition to or instead of one or more Foyered Parent Pointer field(s) 1245 within ADO structure 1220*b*, there may also be a very similar Foyered Child Pointer(s) (FCP) section. This is not shown in FIG. 12A. But just as a FPP may include one or more references to Foyered Parent ADOs, an FCP region may include one or more references to Foyered Child ADOs. This can be useful for database style queries of embedded ADOs (say, for Charlie's machine area, FYI shared Corporate MBOs in the example above) to more quickly determine what foyered child ADOs may exist for a given embedded ADO than might be possible if only FPP data structures were stored.

Another set of attributes common to activity data objects is that of the represented activity's time schedule(s) 1250. This can include when a represented activity was started ("Start Date"); when it might be due ("Due Date"); and when it might have actually been completed ("Completion Time"). When an ADO is created, the ADO "Creation Time" 1231 may be set automatically to that time (e.g. a time mark might include the date, hour, minute, and second). Concurrently, the "Start Date" value in 1250 may be set to the creation date. A user may if desired directly modify the recorded Start Date however. This is particularly useful for Max if he is planning out activities into the future, but does not want to clutter his activities list (616 in FIG. 6A) with activities he intentionally does not want to start until a later date. By Max's setting the Activity Data Object Status 1242 to "Forward", Max's ACMAN system might, as a default, hide the activity data object representation from the selection-filtered activity list presentation area. If the start date 1250 is set for a date in the future, then when that future date is passed, ACMAN can automatically change the ADO Status 1242 from "Forward" to "Active", and it may be displayed in the default selection-filtered presentations of Max's regular activities list again. If a user wishes to specify a Due Date for completion of the represented activity, he may do so, but this may not be a requirement. Lastly, when a user completes a represented activity, he or she would change the ADO Status 1242 (which is displayed in FIG. 6A, column 613) to "Done", or some value that indicates completion of the activity. A timestamp may then be automatically written to the "Completion Time" variable of 1250. Note that in order to encourage productivity and "jazz up" the atmosphere for the user, whenever a user changes an ADO Status 1242 to "Done", a celebratory cartoon or video and/or an upbeat and entertaining sound or audio clip might play briefly.

Occasionally, different people have to be sent reminders about implementation or further development of a given activity or related activities. Section 1251 may include reminders to oneself and/or to others about an activity, as well as reminder times upon which ACMAN should issue such a reminder. For instance, an embedded ADO on Max's machine, 1251 may include a reminder to Max as well as to all the participants of that ADO so that on Sep. 5, 2003 at 10:00 am, Max's ACMAN system issues a reminder to check the weather forecast and prepare appropriately for the offsite meeting scheduled for that afternoon. This reminder may be in the form of an email, an Instant Messenger message, a net send message, a voice mail if the system has such capabilities, or any other form of automated communication possible from one machine to another. In one embodiment, 1251 may also include a historical record of indicators of which reminders had been sent to whom and what the status is of each such reminder. Alternatively section 1251 may reference a table that contains such information.

There may be times when the implementation or another aspect of one or more other activities must precede implementation of the current represented activity (1220). There are times when the current represented activity has subsequent dependencies which are waiting for implementation or other development of the current activity of current node 1220. Attribute section 1252 is optional and it contains pointers or references to ADOs of the precedent and/or subsequent dependency activity nodes that relate to the current activity node, as well as the type of precedent and/or subsequent dependency. For instance, there may be four dependency types: sometimes activity B cannot begin until activity A is done (a.k.a. finished), sometimes activity B cannot finish until activity A is done, sometimes activity B cannot start until activity A has started, sometimes activity B cannot finish until activity A has started. A user may access expressions of this ADO section 1252 to discover what other nodes of his hierarchy tree and/or another user's hierarchy tree (i.e. foyered ADOs) constitute precedent or subsequent dependencies to the present node 1220.

The owner (e.g., Max) of the Activity Data Object 1220*b* may want to keep specific activities or branches of activities private from everyone else, or from a set of people. Such a scheme was described in detail earlier in FIG. 11. Max may be willing to permit agent visitation (see briefly 203" of FIG. 2) and/or supervisory monitoring (see briefly 101" of FIG. 2) by a select group of people identified in corresponding white lists for such activities. The ADO owner may alternatively be willing to let anyone who wants, to see this activity data object 1220*b*. Attribute section 1253 contains privacy level indicators, and in cases when desired, optional privacy level exception settings, for managing such privacy issues for ADOs, as illustrated in FIG. 11, as in 1191*a* or 1172*c*. The optional settings may include respective pointers or other references to white lists that identify which external users can have their peeking agents (e.g., 203" in FIG. 2) peeking in on this node and all its parents, grandparents, etc. and which users have supervisory monitoring privileges for getting automatic transmissions of this node and optionally its parents, grandparents, etc. and/or associated journal data items.

There are also security issues which may be managed from parameters inside attribute section 1253. When an derived copy of an ADO (e.g., 1220*b*) is transmitted from its owner's machine area to the machine areas of other persons, the contents within the transmitted ADO could possibly be spied on by third parties and/or deceptively altered by such third parties. It may be desirable to encrypt some of the ADO information (e.g., fields 1225, 1226, 1240 to 1252, or virtually any attribute or content of an ADO). All these selectable options may be handled by security and/or privacy attributes contained within section 1253.

Attribute section 1254 contains presentation control indicators for managing how a graphical icon for the activity node may be presented in a graphical tree presentation (e.g., see FIG. 8). Additionally or alternatively, the ADO owner may have personal preferences regarding various attributes including what shape, color, etc. should be imparted to the icon used for schematically representing the node. By way of example, the node could be presented as a 2D circle, square, rectangle, hexagon or other 2D geometric shape or as a planarized projection of a 3D object such as sphere, cube, etc. The node-representing icon may have the short activity descriptor field representation positioned inside the icon or just outside the icon (e.g., just below it). The text for each activity node icon may have its own background or foreground color. The user may also have, preferences for the relative location of certain activity-node representing icons. While the activity tree is displayed in a fully expanded mode, the system may leave the icon in a relative position offset from the primary parent icon as last established by the user, or if no such preference is indicated, the system may automatically arrange the relative location of icons to be in an orderly grid or otherwise. These preferences may be specified in attribute section 1254.

It is possible that a transmitted ADO (1220*b*) may be intercepted and tampered with while in transit from an owner's machine area to a recipient's machine area. Some activity data objects or attributes of some activity data objects may convey very important information that the owner does not want to be changed or spied upon. Therefore the owner may wish to apply his private digital signature over the activity data object or over critical sections (e.g. encrypted sections) of the activity data object. As is known in the security art, a digital signature may be formed by hashing the covered fields and then encrypting them using the signors' private encryption key. The owner's public encryption key may then be used to uncover the hash and compare it against the hash of the received message. In one embodiment, the ADO owner's digital signature 1255 covers at least sections 1221 to 1234. To understand why this is important, consider the case where long descriptor section 1233 contains a message such as (in plaintext form) "buy 25 units of product X531 at a price of $150.00 per unit." The creator would not want this message to be corrupted and changed with respect to material items such price, quantity and identity of the goods. A digital signature would help to guard against such tampering. The digital signature does not have to be embedded in the ADO 1220*b* itself. Activity data objects may sometimes be transmitted in groups rather than singularly. Therefore, the owner's digital signature 1255 may be located outside of a group of activity data objects and may cover the collective sections 1221 to 1234 of all of the transmitted objects in the group. Tampering with any one of those objects will usually result in a mismatch between the uncovered hash and the received hash.

In one embodiment, users might specify their own custom ADO fields. For instance, while standard ADO fields might include an ADO priority 1241 of a specific standard definition, some users might prefer to define their own types of priorities. Max might prefer to maintain information about activity importance as well as activity urgency, while Adam might prefer to have a simple priority level as in 1241. Another user, Harry, might prefer to use his own set of controlled field types that differs from a standard implementation. For instance, a standard implementation of the ADO priority field 1241 might include 3 levels. Harry might prefer to use a 5 point scale instead. The range of possible other custom fields might be infinite, but some examples of fields that some users might want to create could include budget amount, estimated time to complete, percent complete, custom flag fields, resources required, a field using a custom set of activity statuses, etc. If a user, Max, wanted to create a given custom field just for his own use, he could define it in his ACMAN system and cause his system to record that on his machine area and to present that indicated information to Max as appropriate. If Max then shared a given ADO with another user, that custom field he created for his own machine area use, might not be included in the derived copy that Max's ACMAN system might transmit to the other user. However, if Max wanted to create a custom field type and share it with one or more other users, those other users' systems would need to have knowledge about the definition and processing (including presentation) rules pertaining to that custom field. In one embodiment, described in FIG. 14, a central service (1477) might provide a custom field registration service, which might include provision of shared custom field definition information with a pool of sharing users, as well as a registered field identifier code for that custom field definition. In such an embodiment, if a custom field is registered, then if Max causes his system to share an ADO with one or more other users, that field might be included even in the derived transmitted copy (and that field identifier code might also be included in the section 1257 of that transmitted ADO). If Max happened to share that ADO with a user, say Harry, whose ACMAN system was not participating in the central registration service (1477), then Harry's machine might ignore the respective portion of his received ADO that includes the custom field, but might record and appropriately process the rest of the ADO data. On the other hand, if Max shared the activity description with another registered participant of the service 1477 (FIG. 14), then that other user's machine could appropriately receive, record, and process (including display and cause further modifications) that field in the received ADO.

Figure 12C:
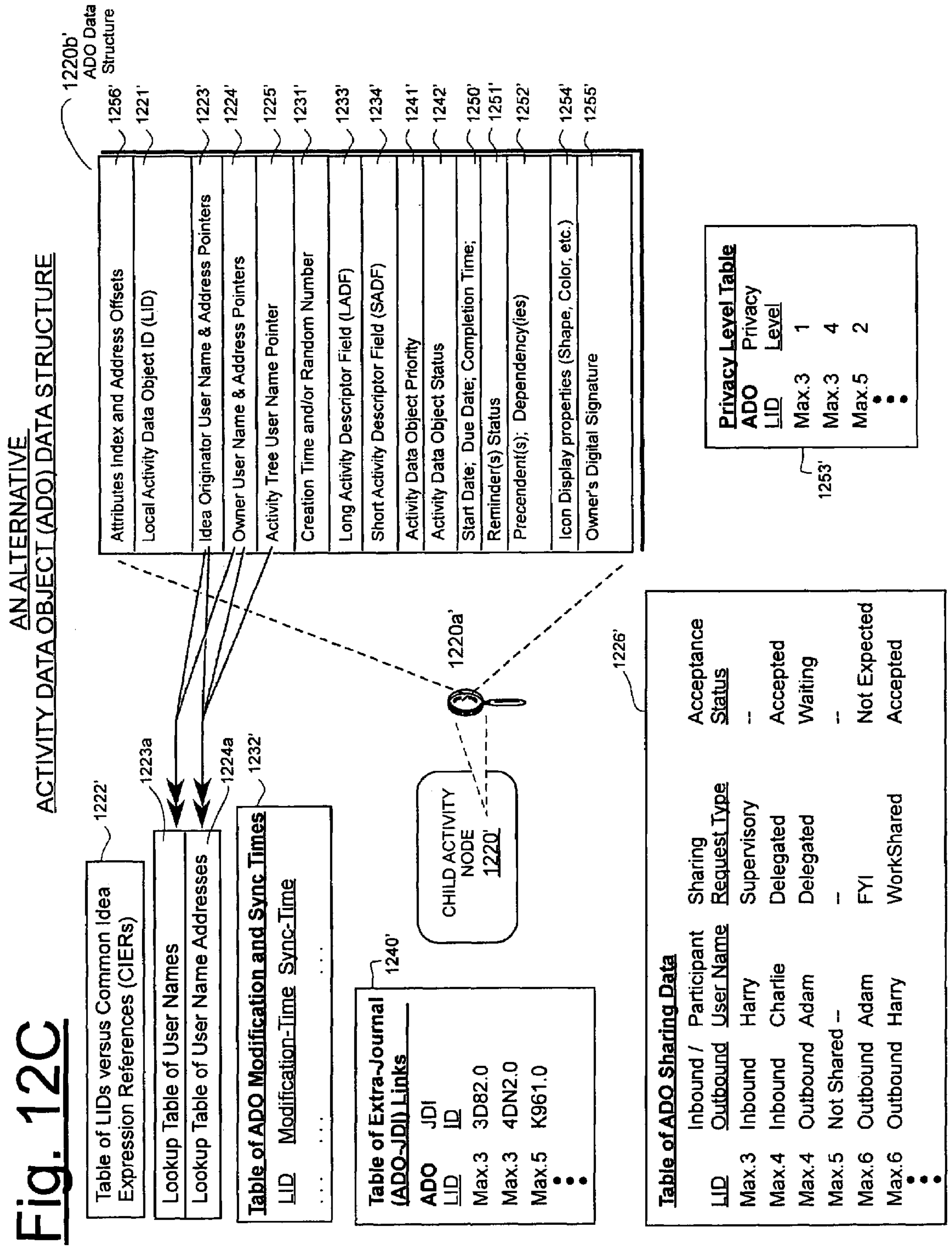
FIG. 12C is a diagram showing an alternative to the possible data structure for an Activity Data Object (ADO) in FIG. 12A.

FIG. 12C is a diagram showing an alternative embodiment to the previously described embodiment of FIG. 12A. It is intended to illustrate just one other possible data structure for an activity data object, as well as to illustrate some examples of differences in ACMAN system design that would be in accordance with this disclosure. For instance, instead of each ADO including a Common Idea Expression Reference field as in FIG. 12A (1222), a table 1222' of Local ADO IDs 1221' versus Common Idea Expression References might be stored in somewhere on a given user's machine area, e.g. in the Activities Folder 315 of FIG. 3. One table could include lookup values for all or a portion of the ADOs stored on a given user's machine area. An Idea Originator User Name and Address Pointer field could reference a location in a table of user names 1223*a* and/or a table of User Name Addresses 1224*a*, or a cross referenced set of both. These tables 1223*a* and 1224*a* could be stored separately, as part(s) of one or more machine area stored contact tables 319 (FIG. 3), or as part(s) of one or more external contact tables 332 (FIG. 3). These look up tables 1223*a* and 1224*a* could serve as lookup tables for other pointer fields as well, including an "Owner User Name & Address Pointers" pointer field and/or an optional "Activity Tree User Name Pointer" pointer field. Note that for embedded ADOs, it might not even be necessary to include an owner user name or pointer, since the machine area location itself and/or lack of a stored value could imply that a given ADO might be the machine area's, say Max's, owned ADO. Additionally, instead of storing sharing information for each ADO in each ADO's structure, an ADO sharing table 1226' could include this information for a portion or all of the ADOs stored on a given user's machine area. Such a table might replace the possible fields in FIG. 12A of 1226 (and it's subcomponents) typically used for outbound sharing details, 1243 for outbound summary status information, as well as 1244 for inbound sharing information storage. This ADO Sharing table might include for each LID 1221', one or more line items of inbound and/or outbound sharing information, for one or more participants. It could be argued that such a table, if indexed appropriately, could even improve sharing query performance significantly over the sharing information recording approach in FIG. 12A. However, when transmitting and received a given derived ADO copy, some of the information from this ADO Sharing table 1226' would need to be appended to the transmission. Various other fields could similarly be stored in lookup tables or reference tables, such as 1231' (Creation Time and/or Random Number), 1233' (Long Activity Descriptor Field (LADF)), 1234' (Short Activity Descriptor Field (SADF)), 1241' (Activity Data Object Priority), 1242' (Activity Data Object Status), 1250' (Start Date; Due Date; Completion Time;), 1251' (Reminder(s) Status), 1252' (Precedent(s); Dependency(ies)), and 1254' (Icon Display properties). Note that in one embodiment, as is shown in FIG. 12C, activity descriptions might not include a hierarchical structure. So there are no ADO attributes for parent or child pointers. However, FIG. 12C does include extra-journal linkage information from the given ADO to zero, one or more JDIs. Even this is not required, since that logical information could be included in the JDIs alone. However, from a system performance standpoint, a typical ACMAN system would perform very slowly if a large number of JDIs had to be accessed simply to perform basic presentation filtering operations between the activities presentation area and the journal presentation area; so it would be beneficial to at include a lookup table as indicated at 1240', or possibly in the journal holding area (316 of FIG. 3) of a given user's (Max's) machine area, as illustrated in FIG. 10 1002. FIG. 12C also illustrates a table for of ADO Modification Times and Synchronization Times 1232, listing ADO LIDs (1221') and their corresponding last Modification and last Synchronization (transmission and/or receive) times. FIG. 12C finally illustrates a privacy settings table 1253', identifying for each ADO a level of privacy or possibly other privacy option setting information.

FIG. 14 illustrates an embodiment 1400 which can make use of a so-called, Activity's Proposal EXchange center (a so-called APEX center) 1470. The APEX center 1470 may function as a trusted intermediary between Max and Adam when they send transmissions back and forth to each other. It is important that Max (1401) and Adam (1402) each have a respectively unique user name or equivalent ID (1461, 1481, respectively) for inclusion as part of the CIER possibly in section 1222 and/or as part of the OUNA in section 1224 indicated in FIG. 12A. This allows activity data objects of both users to be mixed together while still being able to identify different objects as distinctly different activity ideas from each other and also for uniquely identifying who the owner is of each activity data object. The APEX center 1470 may provide a first online or otherwise dispensed service 1471 which hands out unique user identification sequences to each of respective users such as Max and Adam. If a central exchange such as 1470 is not used, it is possible that two or more random users may end up with same user identification sequences. (In that case, the creation time and/or random number of field of FIG. 12A, 1231 might be used to distinguish the two.)

Users of the system 1400 may move from job to job or simply decide to change their network contact addresses at random times due to individual preferences. Adam (1402) may decide one day that he is not happy with ISP-A (Internet Service Provider A) and that he wishes to instead use the internet services of ISP-B. Max (1401) does not know that Adam has changed his main email or otherwise used contacting address, so it may become difficult for Max to quickly transmit activity descriptions or activity bundles (e.g. 1460*b*) to Adam until Max updates his machine area with Adam's new contact address. Moreover, if Max decides to change his network contact address 1464, it would be difficult for Adam to quickly reply (1404*b*) concerning a just received activity description or activity bundle 1460*b*. More specifically, Adam may usually rely on the contact addresses in his ACMAN system's contact address table to transmit ADOs and/or JIDIs to related ADO owners. If the information in this contact address table is dated (stale), then Adam's computer (120, FIG. 1) may be sending reply information to a wrong destination. On the other hand, if Max and Adam obtain respectively unique and relatively constant exchange addresses at an APEX center 1470, then the APEX center 1470 may act as a portal for providing the current network contact addresses for each such APEX center subscriber. Such a service could fulfill the functions of the optional external contacts table 332 in FIG. 3. Contact addresses maintaining services 1474 may be provided by one or more exchange centers while the unique user ID providing service 1471 may be provided by one second center 1470. On the other hand, both of services 1471 and 1474 may be bundled through a same APEX center 1470. Additionally, the contact address maintaining service could also serve as a portal for forwarding received activity descriptions and optional JDIs, although such a data forwarding service 1474 is optional. For example, the APEX center 1470 could be used to maintain current contact addresses of each subscribing user, and if a user happens to change his contact address, his ACMAN system could notify the APEX center of his new contact address and possibly even of all the contact addresses he has in his contact address table. APEX could then automatically notify all other of these contacts with the user's new contact address, and upon receipt of the contact update, each recipient user's system could automatically update their respective contact address table.

Another service that may be provided by the same APEX center 1470 or a separate and alike center is the service 1475 of providing centralized management of user account passwords and management of security keys including public and private encryption keys for processing the owner's digital signature. This password and security management service 1475 may be bundled within the same exchange center 1470 that provides one or both of services 1471 and 1474. Alternatively it may be provided by a separate security managing service center and/or company.

Yet another service that may be provided by the same APEX center 1470 or a separate and alike center is the service 1477 of providing common ADO and/or JDI field definitions for registered custom fields, such as the other fields illustrated by 1256 in FIG. 12. For instance, while the ACMAN system may be installed to support a predefined group of ADO fields, a group of ACMAN users may wish to add new customized fields, or attributes, to their ADO definitions. In order to effectively share among the group of users activity descriptions that include such custom attributes (as described with FIG. 12A), each receiving group user's ACMAN system would need to possess defining information about the custom attribute(s). This would be necessary for the ACMAN system to present such attributes as part of the activity description (possibly as additional columns like 612-616 as illustrated in FIG. 6A), to enable the given user to record modifications to the custom field(s) of their owned activity descriptions, and/or other purposes. Rather than each transmitted and received ADO or activities bundle having to include a full definition for any custom field(s), which could very inefficiently inflate the size of the transmitted or received signals, a centralized service such as 1477 could provide such definitions to ACMAN systems belonging to any user(s) among a group of such service subscribing users, when needed. If a user among the group wanted to create a custom field and share such activity descriptions with other users among the group, he could register that ADO field definition with the APEX center service 1477, which could reserve and issue a custom field identifier that is unique among all other custom field identifiers of subscribing users. In this manner, a transmitted or received ADO can simply include the custom field identifier and the custom field information, and the receiving user's ACMAN system can then know how to present, record modifications, and otherwise utilize that custom field of information. Furthermore, a user's ACMAN system might only need to exchange that custom field definition information just once from the APEX service 1477, since that definition file can be recorded permanently on his machine area for later reference. This custom field definition and registry service 1477 may be bundled within the same exchange center 1470 that provides one or many of services 1471, 1474, and 1475. Alternatively it may be provided by a separate service center.

A portion of Max's activity descriptions hierarchy tree is shown at 1460. It includes a first subsection 1460*a* and a second subsection 1460*b*. Suppose that Max wishes to transmit to Adam the contents of at least activity data object nodes N1.21, . . . , N1.26 within subsection 1460*b*. Max may optionally further want to include in this transmission the contents of journal data items 1492*d* and 1492*e*. Max may do so by instructing his ACMAN software to transmit section 1460*b* by way of email (or other transport means and through Internet connection 1404*a*) to Adam's network contact address as specified by service 1474 or otherwise.

When the transmitted version of subsection 1460*b* arrives at Adam's side 1402, Adam cannot be sure that it actually came from Max's side 1401 and/or that the transmission has not been tampered with. Accordingly, the ACMAN software on Adam's side (1402) should perform an authenticity verification step 1487. The authenticating step 1487 may include the substep 1476 of fetching Max's public keys and/or certificates from a security management service such as 1475. The fetched public encryption key of Max may be used along with the private key in section 1255 (of FIG. 12A) for unencrypting the ADOs in the received bundle 1460*c*. If the received bundle is authenticated, then Adam may safely view the received bundle 1460*c* through his ACMAN system (otherwise the ACMAN system will flag it as suspect or unreadable).

Adam may then decide that the foyered ADO copies within bundle 1460*c* that he has received (corresponding to the bundle 1460*b* on Max's machine) should be embedded into his, Adam's, tree under Adam's node N2.03, as new embedded bundle 1488. While user interface controls may allow Adam to indicate such activity tree insertions, or bundle modifications, or bundle sharing acceptances, etc. in a single operation on the bundle of ADOs, the ACMAN software may, in practice, execute a single user instruction directed toward this bundle as several duplicate execution steps corresponding to each ADO and/or JDI within the bundle. Similarly, Adam may have the option to embed the whole bundle in his activity tree in one step, or he may choose to take individual actions with regard to each individual ADO and/or JDI in the bundle. For instance, Adam may further decide that he is not happy with the way that Max has organized nodes N1.21 to N1.26 of bundle 1460*b* and/or how Max has filled in the activity descriptors for those respective nodes. Adam may decide to rearrange the nodes and/or change the internal descriptions of those nodes within Adam's owned embedded version 1488 of the received clip 1460*c*. Adam may decide to use a different vocabulary in his embedded version 1488. Adam may decide he wants to add additional nodes and refinements within his version 1488. The owner for the revised or modified ADOs of section 1488 would be Adam.

However, Adam's ADOs within section 1488 might indicate that the Idea Expression Originator in IOUNA section 1223 (FIG. 12A) of the activity idea(s) (for the activity data objects Adam did not insert or create himself) was Max. Max might also be indicated in the user name component of the CIERs (1222, FIG. 12A) of the received foyered activity data objects and of the embedded ADOs. (This assumes that all of the activity ideas represented in bundle 1460*b* were originally created by Max. However, if that were not the case for any of the individual ADOs that Max sent Adam, then those ADOs might indicate some IOUNA other than Max.) This is indicated by the arrow 1462 pointing back to Max. Additionally, for the ADOs in the received bundle copies 1460*c*, the Idea Originator User Names 1223 might be Max, and the ADO Owner User Names 1224 (FIG. 12A) for the ADOs in the received bundle copies 1460*c* might also be Max, as indicated by arrow 1462*a*. The common-idea-tied embedded ADOs in bundle 1488 map to their respective and common-idea-tied foyered ADOs in 1460*c* since they respectively have the same Common Idea Expression References (CIER) 1223 (FIG. 12A). If Adam updates any of the newly embedded ADOs in section 1488, updates of these ADOs in 1488 might be sent back to Max by Adam's ACMAN system, since there may be a clear Idea Originator attribution, as is implied by arrow 1462. Foyered bundle copy 1460*c* meanwhile might be kept inside Adam's machine area. If Max later causes his machine to send updated copies of bundle 1460*b* to Adam's machine, Adam's ACMAN system might update Adam's bundle of foyered ADOs 1460*c* since Max is the updating owner, as indicated by arrow 1462*a*.

This scheme allows Adam to work locally without having to have a persistent connection over a network such as the Internet 1404*a* and 1404*b* to Max's computer. Adam may locally review and compare his descriptions of his nodes in section 1488 against those of the foyered clip 1460*c* that had been received from Max. In this way Adam has a translation dictionary and a mapping that shows Adam's interpretation of the descriptions provided by Max and showing how Adam views these alternate activity nodes 1488 from Adam's perspective. Referring briefly to FIG. 12A, Adam's different view of matters may include a change by Adam of the priorities (1241) assigned to any of his embedded activity data objects; a change in precedent and/or subsequent dependencies (1252); a change in due dates (1250); and a change in the sharing agreement indicated in the "Inbound Sharing Status" section (1244), and so forth.

After Adam has made his changes to nodes (and/or journal data items) in embedded region 1488, Adam may choose to send back to Max a copy of the so-modified region 1488. In one embodiment, the transmitting back of updates to Max would be completely automated by ACMAN and possibly even somewhat transparent to Adam. When the transmitted updates for bundle 1488 arrive at Max's machine, Max's machine would also need to verify the contents to ensure they had not been spoofed or tampered with. The ACMAN software on Adam's side (1401) should perform an authenticity verification step 1487*a*. The authenticating step 1487*a* may include the substep (not shown) of fetching Adam's public keys and/or certificates from a security management service such as 1475. The fetched public encryption key of Adam may be used along with the private key in ADO section 1255 (FIG. 12A) for unencrypting the ADOs in the received bundle 1488. If the received bundle is authenticated, then Max's ACMAN system may safely accept the received copy of bundle 1488 under his ACMAN software package and create a new foyered tree 1488*b* for Adam's ADOs or update Adam's existing foyered ADO tree 1488*b* accordingly. Max's machine will then treat the derived copy 1488*b* of 1488 as a foyered set of nodes which are owned and updated by Adam. Max may then be able to better understand what Adam is thinking. Just as Adam's system possesses the ADOs (and optionally JDIs) locally and can show Adam's view compared to Max's view of the same activity ideas, Adam's system is updating Max's system about his ADOs (and optionally JDIs) and changes to his ADOs (and optionally JDIs) in 1488. So Max also, without having a persistent connection over the internet 1404*a* and 1404*b* is able to see activities from his perspective and from Adam's perspective, even as those perspectives get updated.

FIG. 12B illustrates one embodiment of a state diagram for the generating of activity sharing agreements which will be described. In STATE-1, Max is working alone to develop a bundle of activities 1260. In his development process (STATE-1) Max may collect various journal data items and use them to modify his description and organization of Activity Data Objects within bundle 1260. Note that in this example, singular actions are shown to be taken with respect to an entire bundle of activity data objects. Max may use tools included in the ACMAN software to change the attributes of not only one activity data object, but a bundle of 'm' activity data objects with effectively one instruction rather than 'm' instructions. Alternatively, this example could just be scaled down to demonstrate the same concepts pertaining to the sharing of just a single activity idea expression and its associated activity data object copies. Or yet in another example, the different ADOs may have slightly different attribute settings. For example, different ADOs within the bundle could be given different priorities (1241 in FIG. 12A). But regardless of individual ADO differences, a set of ADOs may be bundled together for the benefit of simplifying any manual actions Max may want to take, such as sharing or setting the same priority level or privacy level, etc. Additionally, if one attribute value (for instance, 1241*m*-1) is illustrated in FIG. 12B as representing that attribute value over a bundle (for instance, 1260) of activity descriptions, then all the ADOs in that corresponding bundle, for the purpose of this illustrated example, possess the same illustrated attribute value.

Max next marks the activity status of all of the activity data object nodes in his bundle 1260 as "Active" (see entry 1242*m*-1). Max further indicates that the sharing agreement for each node within this bundle is "Not Shared" (see entry 1243*m*-1). Max designates each of the nodes in this bundle 1260 as being "High" Priority (see 1241*m*-1).

In STATE-2, Max has finished developing his activities bundle and is now ready to share and transmit the developed bundle to three (3) possible participants, Adam, Harry and Charlie. Max transmits the bundle copies 1260*a*, 1260*b* and 1260*c*, by way of email or otherwise. When Max sends these ADO bundle copies, he does not know whether each of the respectively transmitted bundles will get through to the intended recipient (Adam, Harry, Charlie) or whether the recipients will respond positively. In the example, the Internet connection 1204*a*1 to Adam is operative and Adam receives the activity sharing request from Max. The work sharing request indicates at entry point 1229-1' that the item has been sent to Adam with a request to WorkShare this bundle of activity data objects with Max. In practice, each ADO in this bundle may have its own attribute values such as 1241*m*-2, 1242*m*-2, and 1229-1'. But all of the ADOs within this specific bundle happen to have the shown attributes set identically. Furthermore, when Max's ACMAN system sends this bundle, it may optionally transmit additional data indicating that a particular set of ADOs represents a bundle that each recipient may choose to respond to as a bundle instead of individually. However, Adam might instead choose to accept only some ADOs within the bundle.

Note briefly that the ADO data structure field reference numbers in FIG. 12B correspond to the data structure elements in FIG. 12A. For instance 1242*m*-2 and 1229-1' in FIG. 12B correspond respectively to 1242 and 1229-1 in FIG. 12A. Note also that each of the copies of the ADO bundle that Max is sending to each of Adam, Harry, and Charlie (1260*a*, 1260*b*, and 1260*c*) could be nearly identical in their content. The table magnifications highlighting 1229-1', 1229-2, and 1229-3 do not imply that the ADOs sent to each participant must be different. Rather for purposes of illustration, only the respective field pertaining to each participant is shown. So, the fields 1229-1', 1229-2, 1229-3 that happen to be shown in this diagram, correspond to portions of the ADO Sharing Details as in FIG. 12A 1226 corresponding to participants Adam, Harry, and Charlie respectively.

In FIG. 12A, 1226 illustrates that an entire set of Participant Sharing Details, pertaining possibly to all the sharee participants for the given ADO, may be stored within each such ADO, and in this example, the value of "n" in 1226*a* might be "3". So section 1226 might store PID-1, PID-2, PID-3, as well as ShareType and ShareStatus information for each of the 3 respective participants. Finally, note that the Participant's Local ADO ID (PID) in 1229-1' (FIG. 12B) indicates a value of "Adam.?". The participant user name is Adam, but the ADO serial reference code is unknown at this point. Until Adam responds back with an acceptance or acknowledgement of receipt, and includes back indicating what his corresponding Local ADO ID serial reference code is, it remains as an undefined variable on Max's system.

Let's return back to the example in FIG. 12B where Max has just sent Adam an activity bundle. In response, Adam decides to accept Max's WorkSharing request, and as such, Adam embeds a copy of the received bundle (or parts of it) into his own activity tree. By default, since he accepted the WorkSharing request, Adam's activity statuses for the ADOs in the embedded bundle parts are initially "Active" as indicated at 1242*a*. Adam may manually cause his ACMAN system to change the activity statuses to "Pending" or "Forward to later date", etc. if he wishes to. Assuming Adam does not further change his inbound sharing status (e.g. Inbound Sharing Status field 1244 of FIG. 12A) from Accepted, his ACMAN system may automatically report this sharing agreement back to Max as indicated by 1244*a*. The embedded bundle of ADOs 1288*a* can be further modified by Adam. Adam might add two additional ADOs of his own as children to some of the ADOs in 1288*a* (see the two bottom-most darkened activity nodes in 1288*a*), and he might modify one of the existing activity descriptions in 1288*a* (see the top-most darkened activity node in 1288*a*). Since the parent ADO(s) of Adam's newly added child ADOs may contain Idea Originator User Name indications of Max, Adam's ACMAN system might send updates to Max of these child ADOs as well. In that way, Max will be able to monitor the status of the ADOs he shared with Adam as well as the additional, supporting child ADOs that Adam has chosen to initiate. This will be described in detail later in FIG. 18A and FIG. 18B. As another example of Adam's modifications, unlike Max, Adam considers the priority of the activity data objects in region 1288*a* to be medium (as indicated in 1241*a*). Attribution links 1217*a* extend from Adam's embedded copy 1288*a* (in Adam's machine area) to a copy in Adam's machine area of Max's sent bundle 1260*a* via the CIER data structure, 1222 (FIG. 12A). Note that the embedded ADO bundle on Adam's machine, 1288*a*, also includes references to Max's machine area copies of the ADOs, due to the CIER data structure 1222 (FIG. 12A) and possibly due to the optional IOUNA data structure 1223 (FIG. 12A). Additionally, note that the foyered ADO bundle on Adam's machine, 1260*a*, also includes references to Max's machine copy of the ADOs due to the CIER data structure 1222 (FIG. 12A), and possibly due to the optional IOUNA 1223 and/or the OUNA 1224 data structures (FIG. 12A). Adam's ACMAN system can automatically send via Internet connection 1204*b*1 a copy or updated copy of Adam's activity data objects 1288*a* back to Max at any time Adam is connected to the internet. When Max receives the update, Max's system might accordingly update the ADOs in his embedded ADOs for bundle 1260, such that the data structure field corresponding to 1229-1' might include Adam's ADO 10 serial reference code in place of the "?" in "Adam.?", and it might update the ShareStatus for Adam from "Sent" to "Active". In addition, Max's machine has received a foyered copy of the activity bundle 1288*a* from Adam's machine, and the OUNA 1224 (of FIG. 12A) for that bundle of activity data objects might indicate "Adam". Now Max's system can provide an indication to Max that Adam has received and accepted the requests from the originally sent bundle 1260*a*. Now Max will know that Adam has elected to accept the represented activities as WorkShare requests as indicated in region 1244*a*. Max will further know that Adam has given these items a medium priority as indicated in area 1241*a*.

Further in the example, Max has sent bundle 1260*b* to Harry with an indication that this is merely For Your Information (FYI), (see 1229-2). At some time in the future, Harry connects his computer to Internet network 1204*a*2 and receives the activity bundle 1260*b* by way of email or otherwise. Harry may review the received bundle of ADOs and decide he likes the represented activities and wants to actively participate in them, even though Max had only sent them to him as an FYI bundle. So Harry might integrated a derived copy 1288*h* of Max's bundle 1260*b* into Harry's embedded tree and modify the descriptions and/or organizations of the activity nodes to suit Harry's needs. In this example, Harry has also indicated the activity status for the activity descriptions in his clip 1288*h* as being active (see 1242*h*). In one embodiment, Harry can indicate that he has decided to accept this as a WorkShare activity with Max, even though Max only sent the activities bundle as FYI Shared, as indicated in area 1229-2. Additionally, like Max, Harry has decided that these activities require a high priority as indicated in area 1241*h*. Harry's ACMAN system transmits the update information by way of emailing 1204*b*2 or otherwise back to Max. When Max later connects his machine to the exchange server, Max will learn that Harry has received a copy of bundle 1260*b* and that Harry has opted to become a WorkSharing participant for the represented activity. Now Max and Harry will be able to asynchronously exchange updates to each other in the same manner that Max and Adam can.

Bundle copy 1260*c* shows that Max has sent an FYI informational ADO bundle to Charlie Chief. The informational bundle reached Charlie by way of connection 1204*a*3. Charlie reviewed the bundle 1260*c* that was transferred to Charlie's machine area. However, Charlie is a very busy CEO, and he is not going to get actively involved in the represented activity. So Charlie has not embedded a copy of received bundle 1260*c* in Charlie's activity tree. (In one embodiment, Charlie's machine may automatically message Max's machine to simply acknowledge that the transmission was received by Charlie's ACMAN system.) No embedded copy is kept on Charlie's activity tree—only a foyered copy (which may be updated occasionally by Max and in turn by an update transmission from Max's ACMAN system) is stored on Charlie's machine area. In one embodiment, at a later date Charlie may elect to be an active WorkSharing participant and embed a copy 1288*c* of some of the activities in bundle 1260*c* into Charlie's tree. This has not happened yet though.

The results of these activities or non-activities is shown briefly in STATE-4. Each of the ADOs in Max's embedded bundle 1260*d* in his own machine area may automatically be updated by Max's ACMAN system to record a sharing agreement summary status of WorkShared, as indicated in area 1243*m*-4, since for each of the ADOs in the bundle, at least one participant has agreed to the WorkSharing request. If any one specific ADO in the bundle happened not to have been accepted by any of the invited participants, it of course would not indicate WorkShared in its specific Outbound Sharing Status field 1243 (of FIG. 12A). As explained in FIG. 7, there is a more detailed sharing status presentation that Max's ACMAN system can present to Max so that he can see the Participant Sharing Details per each participant, but that is not shown explicitly in FIG. 12B. In addition to his embedded bundle of ADOs 1260*d*, Max's local machine area now includes common-idea-tied foyered ADO bundles, 1288*a*' and 1288*h*', which are update copies sent from Adam's and Harry's machines, respectively. As indicated by 1217*a*' and 1217*h*', there are embedded ADO to/from foyered ADO equivalency relationships from Max's embedded ADOs to/from the respective ADOs in Adam's foyered ADO tree copy and also to/from the respective ADOs in Harry's foyered ADO tree copy, and these are all possessed on Max's local machine area. Note that now, Adam's 1288*a*' and Harry's 1288*h*' owned bundles, resident on Max's machine as bundles of foyered ADOs, may not have the exact same hierarchical relationships as each other or as Max's embedded ADO bundle 1260*d*. This is because each of Adam and Harry modified their respective embedded bundles differently. For example, Adam caused his system to modify activity data object 1289*a* and to add two child activity data objects below it, while Harry caused his system to add a new activity data object 1289*h* and two new child nodes to his bundle 1288*h*'. Thus, in STATE-4, Max now has sharing agreements with both of Adam and Harry, and mappings to Adam's and Harry's perspectives of how the activities might be described and organized by Adam and Harry. Charlie knows what is happening but has declined to actively join the project at this point in time. In one embodiment, changes to the extra-journal linked JDIs are also updated among the various users, where the respective ADO ID related data structure elements (i.e. in FIG. 12A, 1222 through 1224) provide the necessary information to the respective ACMAN systems to tie together not only the relationships of foyered to embedded ADOs but also of their extra-journal linked JDIs.

Now that we have described possible data structures for ADOs and JDIs, as well as related activity sharing state diagrams, we will now demonstrate some useful examples of the sharing aspects of a system in accordance with the disclosure. As mentioned earlier in the description of FIG. 2, there may be several ways an ACMAN system can provide activity expression representations of other users to a first user. (1) One possible way is via invasive ghost viewing with a "live and persistent" connection between two machines. Adam may give permission to the machine of his supervisor, first user Max, so that Max's ACMAN system can remotely read and/or edit into Adam's stored activity tree and present these activity descriptions that Adam is engaged in (that are not set to a private level of access security). (2) A second possible way is via an emulation of a live persistent connection using asynchronous messaging of derived activity, data object copies and optionally also of derived journal data item copies. This second, or "asynchronous" way can easily enable sharing of ADOs across corporate boundaries. It can be broken down into possibly two subtypes of updates. (2a) One possible asynchronous subtype (we can call "supervisor sharing") might be based on setting relatively comprehensive supervisory permissions in one's ACMAN system so Adam's system can be set to always automatically message his supervisor(s), such as first user Max, with some or all of Adam's newly created and/or modified activity data objects (except those that are set to a private level of access security) and optionally their extra-journal linked JDIs. This could provide an easy and automated means for subordinates to benefit from supervisory monitoring and mentoring, since Adam would not need to explicitly indicate a sharing request for each of his activity descriptions. (2b) Another possible asynchronous subtype is based on explicit sharing of ADOs, and optionally their extra-journal linked JDIs. This could allow asynchronous activity sharing to be extremely flexible, i.e. by enabling activity sharing to be bi-directional, to cross departmental boundaries, and to be unconstrained by reporting hierarchy.

Development and execution of corporate MBOs provide a good example of how the latter described asynchronous subtype, explicit ADO (and optional JDI) sharing, may be used. FIG. 15 illustrates one embodiment of two users' hierarchical activity data objects displayed in one presentation area 1501. Here, Max Manager is displaying his embedded activities 1520 in a graphical display mode. There could be too many activities to display all of them comfortably in one presentation. So Max may apply selection-filters to view and/or enlarge only the activity nodes that he is interested in at a given time, while other activity nodes are minimized 1521 or even completely hidden. Alternatively, he may manually collapse various branches, minimize other nodes, expand, or drill down into a branch of activities that are interesting. Separately, Charlie Chief, Max's CEO, may have established some corporate MBOs 1500 together with his company management. Charlie may have explicitly shared these corporate MBOs on an FYI sharing basis with all of the employees in his company. (Charlie may optionally have another ACMAN software license, user name, and computer that he or his administrative assistant use for the corporate MBOs that is separate from his own license, user name, and computer. This could allow him to travel without possibly getting overloaded by a lot of corporate MBO updates from all the company employees.)

In this possible example, Max is travelling with his laptop computer. But since he recently exchanged his emails and ADOs (e.g. through a wireless hot spot at the airport), his local machine area (his laptop computer) possesses copies of the FYI-shared corporate MBOs that are stored as foyered ADOs. Max decides that he wants to plan his activities to be supportive of his company's goals. Since his ACMAN system has already stored the received, FYI shared Corporate MBOs, Max's ACMAN system can present his company's corporate level MBO activities 1500 within the same on-display presentation (recall 111 of FIG. 1) as his embedded activities 1520. Note that the graphical presentation of activity trees does not have to be vertical as in FIG. 8; it can be horizontally arranged as illustrated here in FIG. 15, or otherwise. In addition, it could be possible for Max to instruct his ACMAN system to display his activity tree along with any other activity tree or trees that his local machine area possesses. In this particular example, Max sees that the company is trying to establish 3 new distribution partners 1502. Max had already been informally talking to the VP of Marketing at Heinz™ about some joint advertising ideas, so Max decides to cause his system to add an activity data object described by "Heinz™ Marketing Partnership" 1523 to his owned set of embedded activities. For Max, this activity description related primarily to an advertising program, but he suddenly realizes there could be some real synergy with his corporate objectives if he can expand their relationship to become a marketing and distribution partnership as well. As such, Max drags his activity data object 1523 with his mouse over to corporate MBO 1502, thereby establishing 1523*a* the corporate MBO as a foyered parent ADO to his embedded child ADO. Max also realizes that in order to provide incentive to Heinz™ Max could incorporate one of Heinz™' tomato ingredients into his company's (IFWC's) new vegetable product line. So Max drags activity data object 1523 over to corporate MBO 1503. Note that Max's embedded ADO 1523 has more than one foyered parent ADO. In one embodiment, there may be one or more foyered parent ADOs for a given embedded ADO. In an alternative embodiment there may be one primary foyered parent ADO; and if there is one primary foyered parent ADO, there may also be one or more secondary foyered parent ADOs. Although ADO data structure attribute 1245 (FIG. 12A) illustrates the former embodiment, additional attributes could easily be added to support the alternative embodiment with secondary foyered parent ADOs. In FIG. 15, the alternative embodiment is shown—instead of two embedded child to foyered parent relationships, there is one primary relationship 1523*a* and one secondary relationship 1523*b*.

Next, Max thinks about his existing activity data object representation, to "Hire Veggie Product Mgr" 1524. He realizes that although he already had it planned, it should be associated as a child activity in support of the corporate MBO to "Develop 1$^{st}$ Vegetable Product" 1503. So he causes his system to record and present a parent/child relationship between the two activity data objects. Realizing the new importance this hire may have, Max gives the activity data object 1524 a higher priority setting.

The next time Max connects to the internet, his computer might send updates to Charlie's machine that originally shared the corporate MBO Activity Data Objects with the many company employees' ACMAN systems. Over time, Charlie's computer might get similar updates from many employees' machines throughout the company. Then Charlie might instruct his ACMAN system to present some or all of the representations of ADOs that others have associated as supporting children to the corporate MBOs. Furthermore, Charlie instructs his ACMAN system to present the ADO statuses of one or more of these foyered ADOs. With this information, Charlie can assess if the company is on track to achieving its objectives, who is involved, and if the right actions are being taken by the right people. If anything is not on track, Charlie can know to take corrective action as needed. The machine system may also automatically alert Charlie of off-track activities.

Now Max, realizing how important it is now going to be to hire the Veggie Product Manager 1524 decides he had better get some extra help from Harry Human Resources. So Max selects activity data object expression "Hire Veggie Product Mgr" 1524, and issues ACMAN a command to share this activity data object with other participants. FIG. 16A illustrates a possible activity sharing message that Max Manager then composes via his ACMAN system. In one embodiment, the activity sharing is received by recipients via their email client application, and the activity sharing message is incorporated into a normal email message, including a "To" and optionally "cc" and "subject" field section 1600 followed by a message body 1600*a*. That message body may include the main activity data object attributes 1601 as well as all the relevant additional activity data object attributes 1603, the type of sharing request Max is making 1602, the activity data object hierarchy 1604, any special message he wants to convey 1606, and optionally journal details 1605 associated with the activity data object. Nearly all of this information may be automatically included in the activity sharing message by Max's ACMAN system. All Max may need to manually specify here are what ADO(s) he wants to share (indicated by 1616), who he wants to share the activity data object(s) with (fields 1612 and 1613) and how he wants to share it (in this case, as a WorkSharing 1615 request). ACMAN can get the rest of the information from the activity data objects in Max's embedded and foyered activity trees and optionally from his extra-journal linked JDIs, which are stored on Max's machine area.

In one embodiment, the Activity Sharing 1602 of an ADO or ADO bundle can be either Delegated or WorkShared 1615, and optionally FYI Shared or not FYI Shared 1617. Each invited participant may be assigned one ShareType in the invitation. In an alternative embodiment, activity sharing can be done as any combination of Delegated and/or WorkShared and/or FYI Shared, and each respective participant may be assigned one respective ShareType. (It should be appreciated that a system in accordance with the present disclosure can be devised with different one or more types of sharing agreements and not limited by the types described herein; and these sharing types described herein are only a possible set of activity sharing types for which the ACMAN system is applicable.) In this example of FIG. 16A, Max is WorkSharing 1615 the activity data object(s) with Harry HR, and Max is also FYI Sharing 1617 the activity with Adam Assistant. By WorkSharing, Max be staying actively "engaged" in the represented underlying activity. If Max were instead to delegate the activity data object to Harry, he might be assigning full accountability to Harry, and thus Max might be disengaged from the represented underlying activity. In one embodiment, a user can either Delegate or WorkShare an activity data object, but not both. If Max were to Delegate an ADO to two (or more) people (for example, "Write your Weekly Status Report" to Adam and to Mary), ACMAN might also duplicate the single Activity Data Object into two (or more) distinct activity data objects, because each instance of the activity data object, one to Adam and one to Mary, might have its own accountability and status. Instead, by WorkSharing 1615 this activity data object 1616, Max and Harry both may be actively engaged in the represented underlying activity in whatever respective ways might be appropriate to their roles. In one embodiment, regardless of whether a given activity data object is Delegated or WorkShared however, any other user can be included as an FYI recipient, as indicated at 1617 and in "cc:" field 1613. Whoever is in the "To:" field 1612 might be a Delegate or WorkShare participant, and whoever is in the "cc:" field 1613 might be automatically deemed to be an FYI participant. An FYI participant does not necessarily get involved in the activity, but is sent the activity data object in order to be explicitly informed about the represented activity. Max in this case is causing his ACMAN system to send an FYI copy to Adam Assistant's machine area so that Adam can become aware that Max is trying to hire a vegetable product manager. Since Adam is informed of Max's activity idea, although he does not need to actively engage in the activity, he at least is informed about it so that if some opportunity happens to come up to help, he can. Or being informed may just help Adam to understand what his supervisor is doing so that they can work better as a team. For example, if Adam was planning on ordering office supplies for the department, just knowing about this represented activity 1616, Adam might modify his order to include some items so that they are prepared for the new employee.

Sections 1601 and 1603 do not have to be presented in exactly this manner. This is just one possible way to do so. 1601 might present on one line the most pertinent attributes of the activity data object, consistent with the attributes that happen to be shown in the structured activity listing presentation area in 610 (FIG. 6A). Since there are typically more attributes than might be appropriate to show in one line, the remaining activity data object attributes (see 1220*b* of FIG. 12A) may be shown in section 1603. (And there may even be some custom attributes such as 1256 of FIG. 12A that an ACMAN system may use that are shared and/or displayed in 1601 or 1603.) Of the ADO attributes previously described in 1220*b*, not all of them would necessarily need to be included in the transmission to other participants, and even some of those that are transmitted may not be viewed in a normal user mode. For example, in FIG. 12A, column 1220*c* illustrates just one embodiment of which ADO attributes might typically be included as part of a transmitted and derived copy of an ADO intended to be shared. "I" indicates that the contents of the transmitter's ADOs attribute would be Included in this embodiment; "M" indicates the contents in this embodiment would be transmitted but would typically be Modified in some way; "O" indicates the contents in this embodiment could be Optionally included; and "N" means the contents in this embodiment would Not be included. For instance, the Common Idea Expression Reference (CIER) 1222 might be included, while the address offsets 1257 of the elements of the shared activity data object copy would have to be modified somewhat from embedded copy on Max's machine area. ADO Sharing Details section 1226 might be modified by removing portions of this section from a transmitted ADO copy. For instance, if a first user wanted to share the ADO with two other users without the two other users knowing about each other, portions of section 1226 could be modified and/or removed to keep secret who else is participating in the represented activity. The extra-journal links 1240 may optionally not be included if the ACMAN system is designed to share ADOs but not JDIs with others, or if the transmitting user indicates to his system a desire not to share his journal data items. Finally, the Outbound Sharing Status 1243 and Inbound Sharing Status 1244 may not be relevant to the outbound sharing participants, so those contents may not need to be included. Of the attributes that are included in the derived and transmitted ADO copy, many may be included in the ADO transmission, but their values or contents may not be necessary to display to users. For instance, it might only confuse a user to have displayed the internal data structure attributes such as 1257 or 1221.

Returning back to FIG. 16A, section 1604 is a brief graphical presentation of the activity hierarchy, or context, in which the shared activity data object might reside in the transmitting user's activity hierarchy, if hierarchical relationships are recorded. When Max indicates to his ACMAN system an intention to share an ADO 1616, his ACMAN system may automatically include in the subsequent transmission, a derived copy of that ADO 1616 as well each respective primary parent ADO, progressively up to and including the root node of Max's embedded activity tree 1617. Optionally, some or all of the ADO's (1616) foyered parent(s) 1621 and their respective primary parent(s) 1622 possibly including up to the respective foyered root node(s) may also be automatically included (depending on privacy clearances). (Optionally, although not shown in this embodiment, the secondary parent ADOs, if any, to ADO 1616 could be included, as might any secondary parents of any foyered ADOs.) Note that since Max, in this example, is only indicating his intention to directly share the ADO "Hire Veggie Product Mgr" 1616, the various parent ADOs that his ACMAN system may automatically derive copies of and include in the transmission (1618, 1621 and further progenitors) may be modified in their transmitted derivations as indicating an FYI sharetype. The respective parent ADO copies stored on Max's machine area might not indicate FYI sharing with Adam, since Max did not manually indicate an explicit intention to share such parent ADOs, but rather his ACMAN system transmitted them automatically for contextual purposes. In this manner, Harry HR can receive the sharing request and understand the full context of the ADO 1616 expression, "Hire Veggie Product Mgr". Harry will understand that for Max, this is an addition to Max's own staff 1618, and Harry will also understand that this supports his company's bigger MBO of "Develop 1$^{st}$ Vegetable Product" 1622. Harry may give this a higher priority than he otherwise might have.

Section 1605 is optional, and includes a copy of the Journal Data Item(s) (1623 and 1624) that are associated via extra journal links to the ADO 1616 that is being shared. Max has the option to cause his system include such JDI copies or not in his shared transmission, or even to let the ACMAN system present a copy of his JDI(s) and then to selectively indicate (e.g. delete) whatever details he prefers not to share. If he wishes, Max can optionally also insert a special message 1606 for this specific transmission. The convenience in all this is that Max has to do almost no time consuming work to provide a full context of the activity expression that he wishes to share with Harry. The ACMAN system is able to look up and provide all this contextual information by utilizing all the ADO pointers and extra-journal links associated with Max's ADO(s).

FIG. 16A illustrates this activity sharing as if both Max and Harry have an email or other client with sophisticated viewing capability, e.g. HTML or some kind of rich format that supports graphical, textual presentations, and maybe even audio or other multimedia formats. That does not have to be the case. As will be shown in FIG. 17, a simple ASCII text rendition of the shared activity data object transmission might be included in the transmission in addition or instead, so that a recipient who may have a less advanced email or other client might still be able to understand at least basically what the sharing request is about. For instance, some of the transmitted message's key attributes within 1601, 1602, 1603, 1604, 1605, and/or 1606 might be presented in a human understandable text format. In Max's contact address table (as described in FIG. 3 319 and/or 332), which might map user names to their respective contact address(es), there may also be stored information about whether or not each other user has an ACMAN system installed, as well as, optionally, stored information about what format of messages their email client may accept. This information can be used by the ACMAN system to determine the content format of activity sharing messages to send.

Regardless of how the recipient is able to visualize the received activity data object sharing request within their email or other receiving client application, the shared activity data object(s) and supporting information may also, or alternatively, be contained in a structured, machine readable format. In one embodiment, the entire shared activity data object and supporting information, including sections 1600, 1601, 1602, 1603, 1604, 1605, and/or 1606, might also be included into a binary object attachment 1607. This binary object might be in a format that is parsable and understandable by the ACMAN software. A user might open their email message containing this attachment 1607, and indicate to their operating system to instruct the corresponding ACMAN system application to process the attachment, possibly by double clicking with one's mouse on the attachment. This binary object might be recognized by the receiver's system, or operating system, so that simply by the receiver double clicking on a presentation of the binary object, his ACMAN system could be called up to record the binary object in a receiving storage area and/or to the appropriate foyered activity description area on his machine area.

Figure 17:
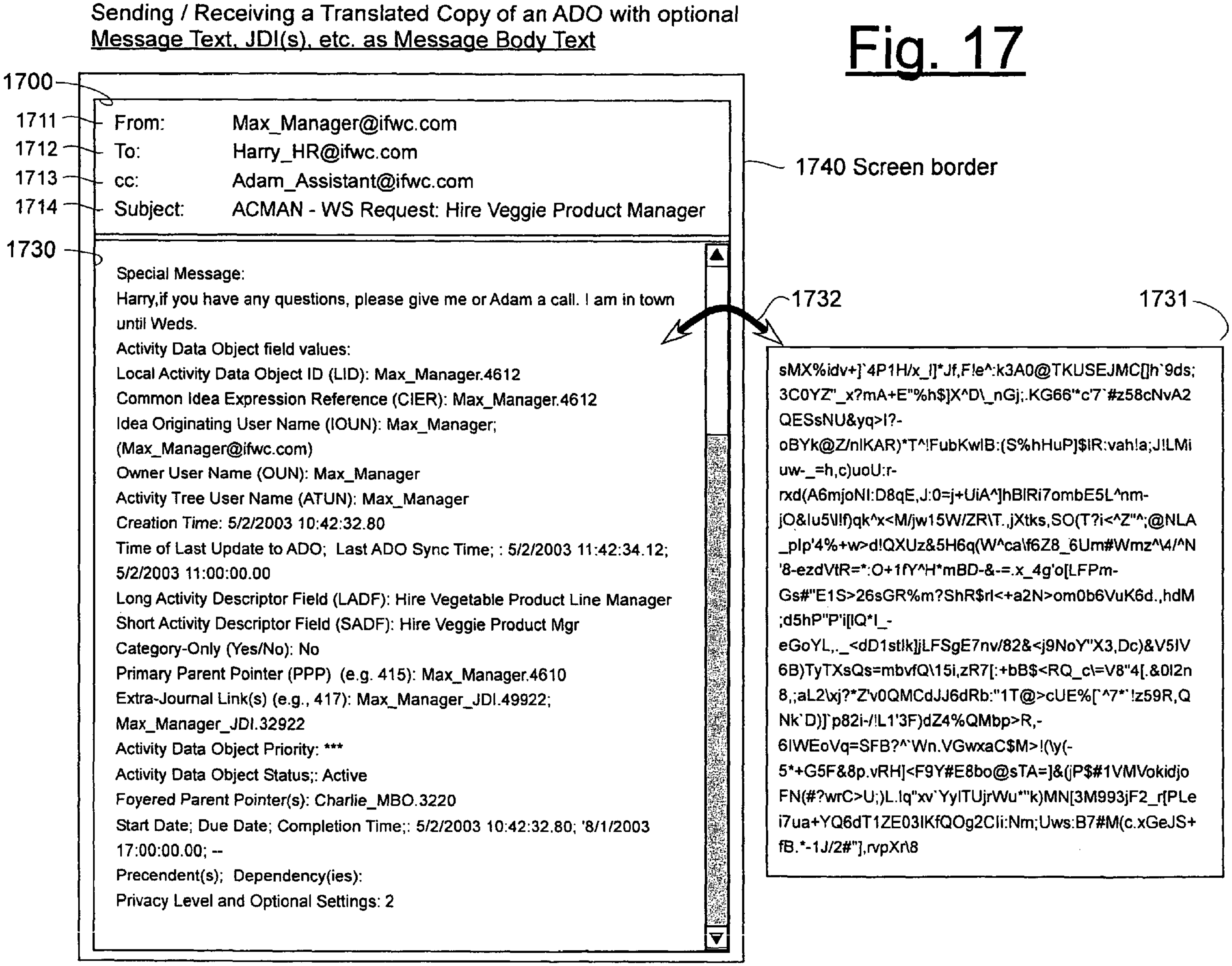
FIG. 17 is a diagram showing an email or other message container that may be used for messaging a derived copy of an activity data object and optionally a derived copy of it's a associated journal data item(s) to other users, where the activity information is provided as text and/or encrypted and/or compressed text in the body of the email or other message container.

In another embodiment, as briefly illustrated in FIG. 17, the attachment 1607 from FIG. 16A might be converted and included as parsable ASCII text 1730 (e.g. 7-bit US ASCII) embedded into the message body, in addition to or instead of as an encoded binary email attachment. Optionally, this text might further be compressed and/or encrypted 1732 into a long ASCII string as in 1731. By including the ACMAN formatted binary object from FIG. 16A (1607) instead as an ACMAN formatted or as an otherwise formatted ASCII message as part of the email body (1730 or 1731), this transmission can bypass corporate firewalls that often filter out unknown attachments from email or other message transmissions. Including the text in an ACMAN system parsable format would enable the transmitted message to bypass corporate firewalls, yet still be converted back into recorded ADO and/or JDI data structures that can be integrated back into a receiver's ACMAN system. Additionally, transmitting the message as plain ASCII text would make it possible for an ACMAN system user to communicate activity description expressions and/or journal item expressions to users of unalike machines. Unalike machines may not have full ACMAN capabilities but they should at least be able to receive and present text based activity and/or description expressions (such as 1740 or at least 1730) generated by an ACMAN system. Transmitting the message as plain ASCII text could include a more easily human readable first text section containing only basic portions of the activity expressing information (e.g. a simplified subset of 1730), in addition to or instead of a second text section containing a complete set of ACMAN system parsable text fields or parsably encrypted text fields (as in 1730 or 1731 respectively). By transmitting together the first text section and the second text section, a user either of an alike or of an unalike machine would be able to understand and possibly act upon the received transmitted message, yet the transmitting machine would not have to have knowledge of the type of machine at the receiving end. Yet other viable transmitting options would be to include in a transmission any combination of rich text/html; and/or one or more ACMAN interpretable encoded binary objects; and/or ASCII text or equivalent compressed/encrypted text in the message body.

Once Harry HR's machine receives the activity sharing request message from Max's machine, his ACMAN system can parse out the attachment 1607, or alternatively 1730 or 1731. Harry's ACMAN system can then incorporate the contained activity data object(s) and optional journal data item(s) into Harry's foyered activity tree(s), and optionally hold the remaining information such as special message 1606 and journal data items 1605 (FIG. 16A) in a temporary storage location, pending Harry's review. Harry can then review this and possibly any other recently received activity sharing requests that are waiting for him on his local machine, also possibly in some temporary storage location.

Figure 16B:
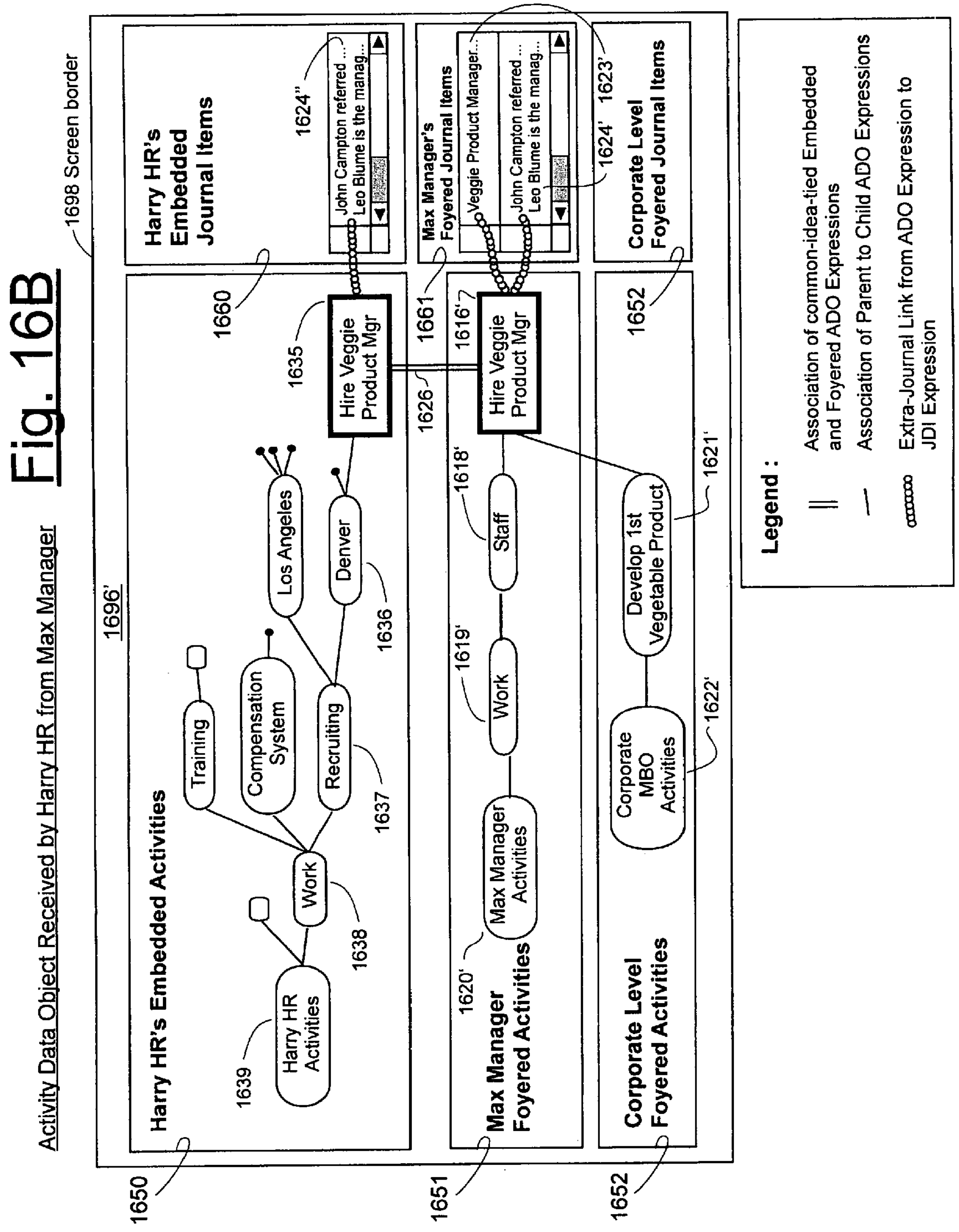
FIG. 16B is a diagram showing how an activity data object and optionally its associated journal data item(s) can be received into the foyered regions of a recipient's machine area (Harry's) and how the recipient may subsequently drag or otherwise integrate or embed a corresponding copy into an embedded activity tree owned by that recipient.

FIG. 16B illustrates one embodiment of what Harry might be presented with by his ACMAN system as he reviews the activity received from Max and possibly begins to incorporate it into his own embedded activity tree. This is not the only way in which Harry could be presented with this information. The ACMAN system could have presented Harry with a view very similar to FIG. 16A first, and then provide any number of means (graphical iconized tree with drag and drop, multiple window drag and drop, textual commands, menu commands, etc), by which Harry could incorporate the shared activity data object(s) into his embedded tree. This is only one possible example of how Harry might be able to view, organize, and plan his inclusion of the shared activity data object(s) into his own activity tree. Section 1651 and 1652 are the relevant portions of the foyered activity trees that Max may have transmitted to Harry, showing simple icons (1616', 1618', 1621', etc.) to indicate each ADO and parent ADO along the respective activity trees. The activity data object expression that Max has caused his system to transmit to Harry as a WorkShare request is 1616'. All the other activity data object expressions (1618', 1619', 1620', as well as 1621' and 1622') might be FYI shared (as opposed to WorkShared or Delegated) by default, since they may have been automatically included simply to provide contextual information about ADO 1616'. Harry may decide to accept involvement in the activity represented by the ADO of 1616' from Max by dragging it's representation 1616', possibly with his mouse or pointer, into his embedded activity tree representation 1650 and positioning it under his embedded ADO representation 1636. From Harry's perspective, it might make sense to think of this represented activity as a child activity to the "Denver" recruiting activity (represented by 1636). For Harry, the full activity data object hierarchy might then be "Harry HR Activities\Work\Recruiting\Denver\Hire Veggie Product Mgr", while for Max, the corresponding activity hierarchy might have been "Max Manager Activities\Work\Staff\Hire Veggie Product Mgr". Unlike for Max where this is Max's only staff hiring activity, for Harry, this is just one of many hiring activities he has to support, and he prefers to organize his recruiting by territory (Denver, Los Angeles, etc.).

Note in FIG. 16B that Max optionally transmitted some journal data items (1623' and 1624') that had been extra-journal linked to his shared activity data object 1616'. These derived copies have been received by Harry's ACMAN system, and recorded in Max's foyered area on Harry's machine area. When Harry dragged 1616' into his embedded tree to accept the sharing request and create an embedded activity description 1635, Harry's ACMAN system may have prompted Harry to automatically create further derived but embedded copies of the extra-journal linked JDIs that are stored in Max's foyered journal area of Harry's machine area. In this example, Harry has decided to embed the JDI 1624' into Harry's owned and embedded journal. Harry can now further edit the expression 1624" as desired.

At this point, Harry HR might have 1635 in his embedded activity tree. Foyered ADO 1616' and embedded ADO 1635 are common-idea-tied ADOs, since they have been associated by Harry as belonging to an exclusive group of ADOs corresponding to one common idea. As common-idea-tied ADOs, both of them would have the same Common Idea Expression Reference (CIER) 1222 (recall FIG. 12A), yet as separately stored copies of the same activity data object, they might have different Local ADO IDs (LIDs) 1221. Harry's machine area might possess foyered copies of the FYI shared ADOs in the foyered activity tree for Max 1651, including 1616', 1618', 1619', and 1620'. Optionally, Harry's machine area might also possess foyered copies of the FYI shared ADOs in the foyered Corporate MBO activity tree 1652, including ADOs 1622' and 1621'. Henceforth, any time Harry modifies his embedded activity description 1635, an ADO update might automatically be messaged to Max's machine area by Harry's ACMAN software. Also, any time Max modifies his own embedded copy of 1616' (specifically, the ADO instance 1524 from FIG. 15), an updated ADO might be automatically transmitted by Max's ACMAN software to Harry's machine area.

Note that if Charlie Chief had already FYI shared the company's Corporate MBO activities to Harry, Harry's machine area might already possess foyered copies of all the ADOs shown in area 1652. Any updates that Charlie Chief 403 (FIG. 4) might have sent already might have been already updated on Harry's machine before Harry received nearly identical copies of them from Max. By referencing the Common Idea Expression Reference (CIER) 1222 (see FIG. 12A) (and possibly the OUNA 1224 and/or the IOUNA 1223 and/or the ATUN 1225) of the various ADOs on his machine, Harry's ACMAN system can determine that Harry's machine area already possesses copies of some of these ADOs on his machine. Accordingly, ACMAN can look at the respective Last ADO Modification Time 1232 (FIG. 12A) of each possibly redundant activity data object, record attributes of the most up-to-date copy into Harry's foyered activity description(s), and discard the others.

Figure 16C:
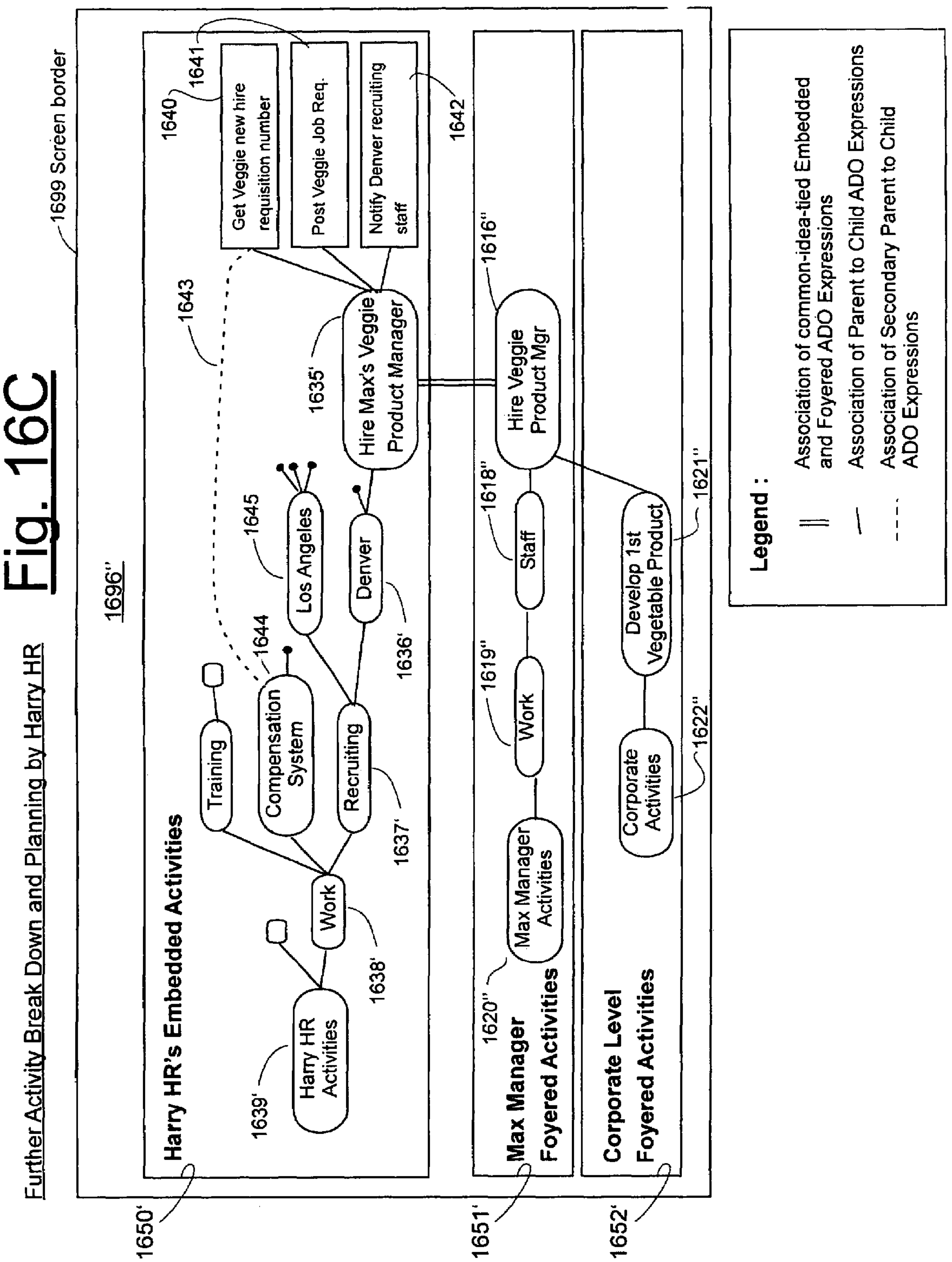
FIG. 16C is a diagram showing how the state of FIG. 16B may be advanced with the received and embedded activity object being altered by the recipient and expanded upon with addition of child ADO's in accordance with the recipient's perspective of the world.

Returning to Harry, Harry next decides to plan out ADO 1635 (from FIG. 16B) for his own needs. FIG. 16C illustrates one possible embodiment of the kinds of changes Harry might make. Harry first modifies the Short Activity Descriptor Field expression for the ADO 1635' from "Hire Veggie Product Mgr" to "Hire Max's Veggie Product Mgr" so that he doesn't get confused by the other veggie product position he is hiring for in Los Angeles 1645. Harry then causes his ACMAN system to create a few new activity data objects 1640, 1641, and 1642, as children of 1645. Since ADO expression 1640 "Get Veggie new hire requisition number" is also related to the company's compensation system 1644, Harry might create a secondary parent to child relationship 1643 by dragging ADO expression 1640 over to 1644 with his mouse or pointer. Since in this embodiment, the newly created ADOs (1640, 1641, and 1642) are child activity data objects to the activity data object 1635', which is common-idea-tied to the activity data object 1616" that Harry's machine area possesses in Max's activity tree, Harry's ACMAN system might automatically update Max with these new child activity data object expressions (1640, 1641, and 1642) as well. As a result, Max's system might be able to present to Max not only the status from Harry's perspective of Harry's ADO expression 1635', but also the supporting child activities that Harry is engaged in. For instance, Harry's ACMAN system might automatically update Max's system with ADO expression 1641 "Post Veggie Job Req". Max upon exchanging messages might be able to see the representation of this activity expression (which might be a foyered activity data object on Max's system). Max may then communicate to Harry to give him some specific guidance about how he wants the job posting to be done.

Figure 18A:
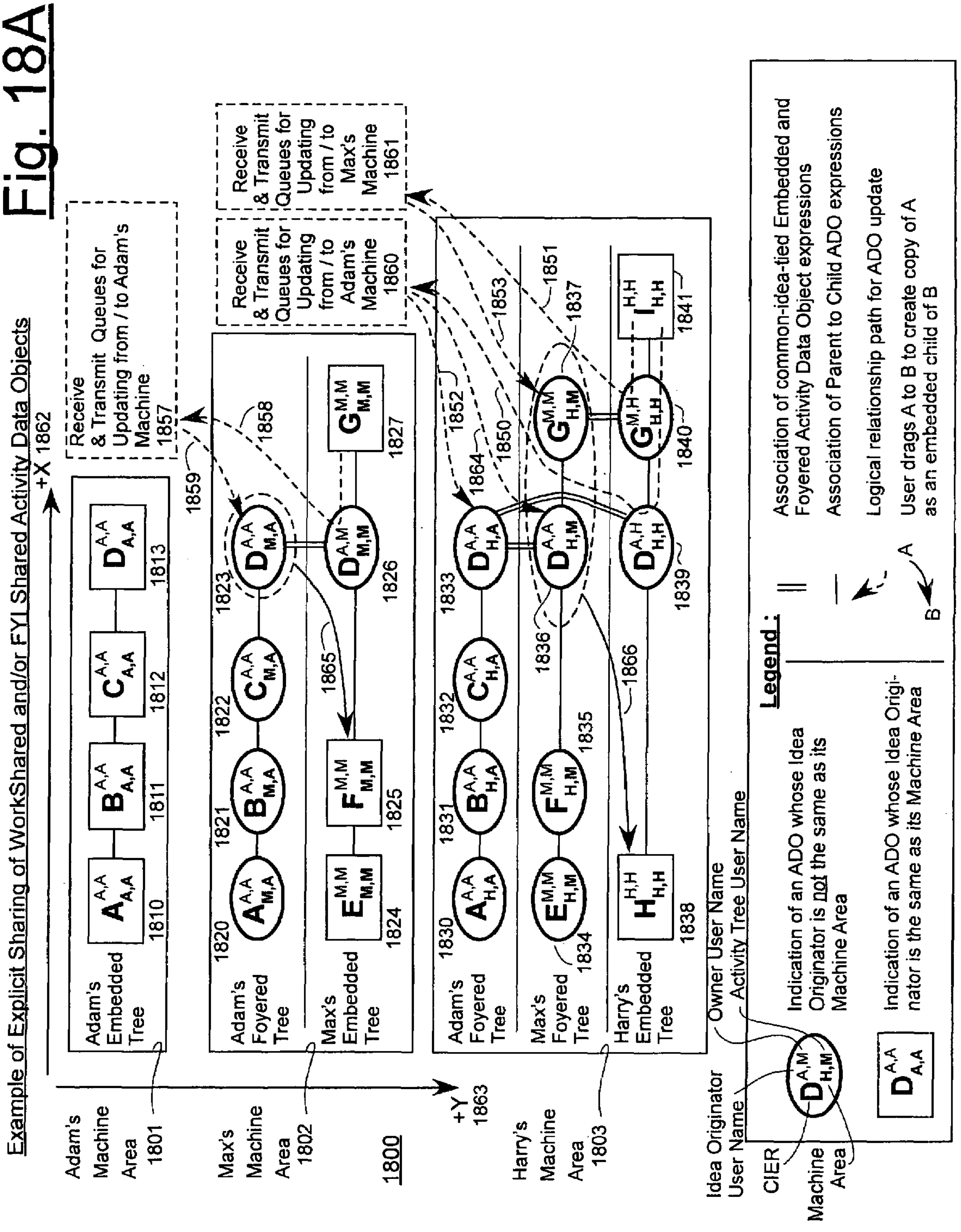
FIG. 18A is a schematic showing how explicitly shared activities and/or associated journal data items can be shared in a possible WorkShared and/or a possible FYI Shared mode, and how the different machine areas may contain various representations thereof.

FIG. 16C was used to illustrate explicit activity sharing, as opposed to supervisory activity sharing. FIG. 18A and FIG. 18B describe further embodiments of the ADO updating logic of this explicit activity sharing. With supervisor sharing, Harry's ACMAN system can automatically transmit to Harry's indicated supervisor(s) machine area, on a regular or other basis, the ones of Harry's ADOs whose privacy settings meet the privacy level rule(s) for his supervisor(s). But in the case of explicit ADO sharing, Harry's ACMAN system might only update specific ADOs (and optionally their various parent ADOs) to other people's machines on a per ADO basis, based on which other participant user(s) are explicitly listed for the given ADO(s). Although many of the descriptions herein focus on the ADO sharing aspects of the ACMAN system, it should be assumed that embedded JDIs may optionally be automatically and/or manually updated to other users accordingly, per the cross referencing extra journal links between the ones of ADOs to be shared and their respective JDIs.

FIG. 18A is a schematic illustration of an embodiment of an activity data object sharing and updating algorithm for WorkSharing and/or FYI Sharing sharetypes. Flowing from the top to the bottom of the diagram, this figure illustrates how an ADO and optionally its (parent) progenitor hierarchy(ies) might be shared from Adam's machine area to Max's machine area, and on again from Max's machine area to Harry's machine area. To begin, Adam's machine area, in this illustration, possesses a set of ADOs corresponding to activity idea expressions he originally authored. (Note that occasionally some of the figure legends and descriptions herein refer to an "idea originator", but this is a concise description, and more correctly, we are referring to an "idea expression originator", for instance corresponding to field 1223 of FIG. 12A.) These set of ADOs is shown as a branch of Adam's embedded activity tree on Adam's machine area 1801, and includes four ADOs, 1810, 1811, 1812, and 1813. (Adam may have many other activity data objects in his embedded tree, but they are not shown in this diagram.)

Each illustrated ADO represents one recorded activity description. For instance, ADO 1833 represents one recorded activity description. As the legend in FIG. 18A implies, this ADO 1833 is owned by Adam (top right "A"), is recorded on Harry's machine area (bottom left "H") as part of Adam's activity tree (bottom right "A"), indicates a Common Idea Expression Reference (CIER) for original activity idea expression "D", and indicates that the Idea Originator User Name (top left "A") (for its original activity idea expression) is Adam. Other illustrated ADOs, such as 1826 also show small "M"s, indicating user name of Max, as opposed to "A" for Adam or "H" for Harry.

In FIG. 18A, Adam causes his system to share and transmit this activity data object 1813 with Max, either as WorkSharing or FYI. When Adam causes his system to share and subsequently transmit this activity data object, his ACMAN system in one embodiment might also include in the transmission, copies or partial copies of the hierarchy of primary parent ADOs from Adam's embedded tree 1810, 1811, and 1812. When Max's ACMAN system initially receives this transmission onto Max's machine area 1802, these activity data objects might be first identified by Max's ACMAN system as belonging to Adam's activity tree. Since, in this example, no ADOs with matching CIERs were already recorded on Max's machine area, the received ADOs might be recorded in Adam's foyered activity tree (1820, 1821, 1822,1823) on Max's machine area. Suppose Max then accepts involvement in activity idea "D". He might indicate the ADO represented by 1823 to be set as a child activity to his own existing activity "F", represented by ADO 1825, by dragging a presented icon corresponding to ADO 1823 with his mouse or pointer to a position below an activity description representation corresponding to ADO 1825. At that point, activity data object 1826, which might be an embedded and derived copy of 1823, may be automatically created by Max's ACMAN system. Now Max would have two common-idea-tied ADOs corresponding to the original activity idea "D" on his machine, one foyered 1823 and one embedded 1826. Once an automatic acceptance acknowledgement from Max to Adam arrives on Adam's machine, Adam's machine may also create a foyered common-idea-tied ADO (not shown) representing Max's own expression 1826 of activity idea D, as well as foyered ADOs corresponding to the parent activity descriptions represented by "E" and "F" (1824 and 1825 respectively). At this point, any modifications Adam makes to his embedded ADO 1826 might be opportunistically updated 1858 (as updating opportunities present themselves, e.g. when Adam's system is coupled to a network) to Adam's machine area 1857, and those changes might be reflected in the foyered common-idea-tied ADO (not shown) on Adam's machine. The dashed arrow 1858 that touches ADOs 1827 and 1826 represents the logical connection that might allow Max's ACMAN system to know to send updates to Adam's machine area. In one embodiment, that logical connection can be identified by Max's ACMAN system because the Common Idea Expression Reference (CIER, 1222 of FIG. 12A) contained in ADO 1826 might indicate the unique user name of "Adam", and Max's ACMAN system might look up Adam's contact address in its contact address table to establish a internet reference location to which to transmit updates. In another embodiment, Max's possessed ADO 1826 might contain an Idea Originator User Name & Address (IOUNA, 1223 of FIG. 12A) indicating Adam and possibly Adam's contact address. These data items could be used by Max's ACMAN system to transmit ADO updates to Adam's machine area. Conversely, any changes Adam makes to his ADO 1813 might cause Adam's ACMAN system to automatically transmit 1859 an update of ADO 1813 to Max, because ADO 1813 might contain target participant details in section 1226 (FIG. 12A), which either alone or together with Adam's ACMAN system's contact address table, would enable Adam's ACMAN system to transmit this ADO updates to Max's machine area at Max's contact address. Those updates received on Max's machine area might then be reflected in the foyered common-idea-tied ADO 1823 on Max's machine area by Max's ACMAN system. Thus ACMAN system users who share one or more activity idea expressions can mutually update each other with updates of their corresponding and respective embedded ADO(s), and those updates might be recorded in the corresponding foyered ADO areas stored on each receiving participant's machine area.

Suppose for just a moment (in this paragraph only, to keep matters simple) that Max's activity "E" 1824 was set to public security level, while his activity "F" 1825 was set to a completely private security level (as explained in FIG. 11). In such a case, Max's system should not transmit activity description "F" to Adam's machine area. Thus Max's acceptance acknowledgement/update for activity "D" (1826) might not have included copies of activity hierarchy E-F-D, but rather only copies of an activity hierarchy of E-D instead. In other words, since the ADO represented by 1825 might be too private to share, updates of this ADO from Max's system might therefore be automatically skipped.

Now suppose Max decides to express his own original activity idea, say as activity description, "G" (1827), as a child ADO to his owned activity description "D" 1826. Adam might need to monitor Max's activities that are related to activity idea "D". So supporting child activity descriptions such as "G" 1827 are also going to be important for Adam to know about too. Max's ACMAN system needs a way to know to update Adam regarding Max's modifications of Max's owned activity data objects (like "G" 1827) that are children of activity data objects (like "D" 1826 or even 1823) corresponding to original activity idea expressions (like "D") for which Max is an invited participant. A possible simple rule for the ACMAN system to update an embedded activity data object "G" might be: progress up the activity data object's embedded hierarchy tree (in the "−X" direction) starting with itself (activity data object "G") and for each activity data object for which the Idea Originator is not the same as the embedded tree's owner (which is the same as the machine area's owner) and for which the activity data object is Work-Shared or FYI Shared, send updates of "G" to the Contact Address of the Idea Originator of the activity idea corresponding to that activity data object. The dashed arrow 1858 from 1827 to 1826 and upward represents one example of that logic. (This simple rule is described in the detailed flow chart of FIG. 20A and will be described more later.) As a result, Adam's system would be able to present to Adam representations of 1826 and/or any child activities of 1826 since readable copies of these might now be updated to Adam's machine area.

Now suppose further that Max decides to WorkShare his newly created activity data object "G" 1827 with Harry. Similar to the example illustrated in area 1604 of FIG. 16A, Max's ACMAN system might similarly provide FYI Shared copies of the parent activities E-F-D from his embedded tree (specifically 1824, 1825, and 1826 in FIG. 18A), and Max's ACMAN system might optionally also provide FYI Shared copies of A-B-C-D from Adam's foyered tree (specifically 1820, 1821, 1822, and 1823) that are possessed by Max's machine area. After receiving this WorkSharing request, Harry's ACMAN system may create on his machine area 1803 foyered trees for both Adam's and Max's related activity tree branches (see 1830 through 1837), although all of these foyered ADOs except for 1837 (WorkShared activity data object "G") might only be FYI Shared. In a typical case, Harry might decide just to accept involvement in the activity represented by "G". But in another optional case, Harry might decide he wants to accept and get actively involved not just in activity "G", but also in activity "D". This latter option is illustrated—Harry might select on-display expressions of both 1836 and 1837 and instruct his ACMAN system to set their ADOs as children to Harry's embedded activity "H" (1838). Harry might first instruct his ACMAN system to present both Max's foyered ADOs and Harry's embedded ADOs in a single screen presentation, and then Harry can drag the selected foyered ADO grouping with his mouse or pointer from the area representing Max's activity tree over to an area representing Harry's embedded activity tree, just underneath a graphical representation of ADO "H" 1838. This might result in new embedded ADOs 1839 and 1840 on Harry's machine area that are common-idea-tied ADOs to Max's foyered ADOs (1836 and 1827 respectively). Harry might then choose to create an original activity expression "I", 1841 of his own. At this point, there may be some more complex update logic, and many options to consider, especially since an activity idea "D" has now been shared from Adam to Max and on again from Max to Harry. However, one possible simplification is based on the fact that the Idea Originator of activity idea "D" in this example was really Adam, even though this activity might be WorkShared now between all three participants. In one embodiment, the CIER and IOUNA field indicators (1222 and 1223 from FIG. 12A) of all of the common-idea-tied "D" activity descriptions (1813, 1823, 1826, 1833, 1836, and 1839) indicate the same respective values. So, instead of updating 1839 to Max, or to both Adam and Max, Harry's system might, in one embodiment, just exchange updates for activity "D" with the idea originating user, which is Adam. While 1833, 1836 and 1839 may all be common-idea-tied ADOs since they share the same Common Idea Expression Reference (CIER), a double association line has only been drawn in this diagram between 1833 and 1839 to emphasize that logical updating association. In another embodiment, Harry's system might update only Max, or both Max and Adam. However, transmitting updates to the idea originating user simplifies messaging processes and requires a lower communications bandwidth. So again, the same possible simple rule for the ACMAN system to update a modified embedded activity data object "I" might be: progress up the activity data object's embedded hierarchy tree (in the "−X" direction) starting with itself (activity data object "I") and for each activity data object for which the Idea Originator is not the same as the embedded tree's owner (which is the same as the machine area's owner) and for which the activity data object is WorkShared or FYI Shared, send updates of "I" to the Contact Address of the Idea Originator of the activity idea corresponding to that activity data object. The dashed arrows 1851 and 1850 from 1841 upward to 1861 and to 1860, respectively, represent two examples of that logic. It can be seen by dashed arrow 1850 that Harry's ACMAN system might update 1839, and possibly 1840 and 1841, to Adam's machine; and Harry's ACMAN system might similarly update Max's machine with changes to 1840 and possibly 1841, as indicated by dashed arrow 1851.

The downward dashed arrows 1852 and 1864 indicate that, in one embodiment, updates in the converse direction, received from Adam's machine area, might update the common-idea-tied foyered activity data objects on Harry's machine area 1833 and 1836, respectively, and optionally (but not indicated with arrows) the respective parent ADOs of the foyered ADO 1833. Similarly, downward dashed arrow 1853 indicates that updates received from Max's machine area might update the common-idea-tied foyered activity data object on Harry's machine, 1837, and optionally the respective parents of the foyered ADO 1837 that indicate ownership by Max. Note that in one embodiment, illustrated here, Adam's machine might update 1864 the ADO 1836 even though it is on Max's activity tree. This is because Adam is the Idea Originator for the activity descriptions represented by "D", and since ADO 1836 might be WorkShared or FYI Shared among several people's machine areas, the best and typically most current source of updates related to this activity idea might be from a single source, Adam's machine. Although Max's machine may have initially provided Harry's machine with an ADO copy representing 1836, Harry's machine might in one embodiment modify the Owner User Name and Address (OUNA) of it's foyered ADO copy 1836 to be Adam, i.e., so that the Owner User Name indication matches the Idea Originator User Name for WorkShared and/or FYI Shared activity descriptions. Harry's ACMAN system might then also transmit a message to Adam's machine area indicating that Harry's machine area possesses a WorkShared or FYI Shared ADO corresponding to activity idea expression "D" (indicated by the CIER), so that Adam's ACMAN system might know to update Harry's machine in the future. As a result, such updates from Adam's machine area are applicable to the ADO 1836 even on Max's foyered tree, because the indicated owner user name of ADO 1833 is Adam. In an alternative embodiment (not shown), Harry's machine might leave the Owner User Name and Address for 1836 as Max, and subsequent updates corresponding to shared activity description "D" that Max's ACMAN system may transmit to Harry's machine area might be recorded into Harry's machine area ADO of 1836. (In this alternate example, not shown, dashed arrow 1864 would instead point from Max's machine area 1861.)

If Harry's machine area later receives ADO updates transmitted from other machine areas, Harry's machine area may possess multiple common-idea-tied ADOs in different (typically foyered) activity trees. So how might its ACMAN system determine which corresponding ADOs on Harry's local machine area to update? This can be relatively simple. Harry's ACMAN system might read the CIER of a received ADO, then search on Harry's machine area for any other ADOs with the same CIER. Then for such matching ADO(s), if their Owner User Name match(es) the transmitting user name of the received ADO(s), the received ADO attribute indicators (described in FIG. 12A) can be used to record modifications to the stored attributes of the respectively matching ADOs that were already on Harry's machine area. (This will be described later in the disclosure with a flow chart in FIG. 21.)

Further to FIG. 18A, which was based on WorkSharing and/or FYI Sharing, FIG. 18B illustrates an embodiment of a possible ADO updating logic for Delegated ADO sharing. In FIG. 18B, suppose that Adam delegates activity "D" (1813') to Max. Then suppose that Max further delegates activity "D" (1826') as well as Max's newly created activity "G" 1827' to Harry. In this scenario, Max can be considered to be acting as a subcontracting intermediary between Adam and Harry. Max has accepted the delegation agreement of activity "D" from Adam, so he is fully accountable. Yet he has further delegated this activity description to Harry. (In one embodiment, which is illustrated in FIG. 18B, if Max wants this subcontracting arrangement to be obvious to Harry, Max optionally could cause his ACMAN system to transmit to Harry, derived copies of Adam's foyered activity data objects along with Max's Delegation request, so that Harry's machine can receive foyered ADOs not only from Max's tree, 1834' through 1837', but also from Adam's tree, 1830' through 1833', as well.) So instead of Harry directly updating Adam regarding his embedded version of activity "D" 1839', it makes sense for Harry to update Max, and Max in turn to update Adam. This way, if Max needs to review Harry's work on activity "D" before it is reported back to Adam, he might have that option. Because Max is delegating activity "D" to Harry, although for foyered ADOs 1833' and 1836' the Idea Originator User Name (1223 from FIG. 12A) may be Adam, the Owner User Name (from field 1224) might be Max. So a possible, simple rule by which the ACMAN system can update a first embedded ADO such as "D" 1839' (and/or child ADOs such as 1840', 1841') might be: progress up the first ADO's embedded hierarchy tree (in the "−X" direction) starting with the first ADO (e.g. ADO "D" 1839') and for each ADO for which the Idea Originator is not the same as the embedded tree's owner (which is the same as the machine area's owner) and for which the activity's Inbound Sharing Status indicator's ShareType is Delegated, find any common-idea-tied foyered ADO(s) (i.e. with the same CIER) on the same machine area, and for each such found ADO, look up its Owner User Name & Address (OUNA) and transmit updates of the embedded activity data object to each such OUNA contact address (i.e. to that Owner's machine area). This will be further described in the flowchart of FIG. 20A.

It can be seen by dashed arrow 1856 that Harry's machine might transmit updates of modifications to 1839', and optionally 1840' and 1841', to Max's machine; and Harry's machine might similarly update Max's machine with changes to 1840' and optionally 1841', as indicated by dashed arrow 1851'. But Harry's machine might not update Adam's machine regarding any of the ADOs with CIERs of "D", "G", or "I" directly. Instead, Max's machine area could store foyered ADO copies (not shown in FIG. 18B) representing Harry's expressions of these activities (1839', 1840' and 1841' respectively). Max's machine in turn could transmit updates to Adam's machine area, of derived copies of Max's embedded expressions of "D" (1826') and "G" (1827') and/or optionally of foyered copies of Harry's activity expressions in Max's machine area (not shown) but corresponding to Harry's embedded activity expressions for "D", "G", and "I" (1839', 1840' and 1841' respectively). The downward dashed arrows 1855 and 1853' indicate that updates in the converse direction, transmitted from Max's machine area, might update the common-idea-tied foyered activity data objects on Harry's machine area 1836' and 1837', and optionally (but not indicated with arrows) the respective parent ADOs of these foyered ADOs on Harry's machine area. Furthermore, if Max wishes to have his subcontracting arrangement be visible, downward dashed arrow 1854 indicates that Max's machine might update Harry's machine on behalf of Adam with Max's foyered copies of ADOs from Adam's tree (i.e. a derived copy of ADO 1823' may be provided as an update transmission to Harry's machine area to update the ADO indicated by 1833') and optionally (but not indicated with arrows), the respective parents of this foyered ADO 1823'.

FIG. 20A illustrates an embodiment of the examples of FIG. 18A and FIG. 18B, in terms of a flowchart. This flow chart indicates a possible set of logical operations and machine-implemented actions that this ACMAN system might follow in order to automatically update other users of modifications a User-X might cause his/her ACMAN system to make to his embedded ADO(s). It does not attempt to describe updating means for ADOs in which the Outbound Sharing Status (section 1243 and related section 1226 in FIG. 12A) indicates User-X has explicitly shared his ADO to other users, because that logic might be relatively straightforward: If an embedded ADO has been explicitly shared by its owner, then it's "Outbound Sharing Status" (1243 FIG. 12A) and its "ADO Sharing Details" (1226 FIG. 12A) sections might indicate this, and these sections may fully contain the indications necessary for the owner's ACMAN system to determine what machine area address(es) to transmit further updates to. FIG. 20A also does not attempt to describe updating means for ADOs when possible asynchronous "supervisor sharing" might be used, since such ADO sharing has been described elsewhere in this disclosure and will be apparent to those skilled in the art. Rather, FIG. 20A focuses on how to determine update transmissions for ADOs in which User-X has accepted a request to participate in such ADOs; for example, explicit inbound sharing might be indicated in ADO section 1244 (the "Inbound Sharing Status" section from FIG. 12A), either for the given ADO or for one of its parent ADOs or both.

In FIG. 20A, a User-X's ACMAN system might, according to some automated rule or according to direct instruction from User-X, attempt to transmit activity description updates to other users' machine areas, for recently modified first ADOs that are part of User-X's embedded activity tree on User-X's machine area. Optionally, this transmission might also include JDIs that are extra-journal linked with the first ADOs, and furthermore, the first to-be-updated ADOs might also include second ADOs that have not been recently modified but for which the second ADOs are extra journal linked to JDIs that have recently been modified. This flow chart describes how the ACMAN system, in one embodiment, can determine where to transmit updates of any given first ADO (referred to as "ADO-A" in FIG. 20A), and optionally JDIs that are extra-journal linked to the given first ADO. Note that some of the flow chart blocks refer to acronyms described in this disclosure, and especially those referred to in FIG. 12A. (Accordingly, descriptions of FIG. 20A herein that indicate figure references beginning with "12xx" are referring to FIG. 12A.) FIG. 18A and FIG. 18B might also be handy references with which to refer to when reviewing FIG. 20A. Note that "ADO-X" and "ADO-Y" in FIG. 20A might simply be temporary variables that serve as references or pointers to a given ADO storage location. Also note that the "expanded updates option" referred to at 2017 is a possible option, mentioned earlier, in which an ACMAN system might transmit updates not only to the contact address of original idea expression users for WorkShared or FYI Shared activity descriptions, but also other known participants for the given activity idea indicated by "ADO-A".

Following is a brief description of one embodiment shown in the flow chart of FIG. 20A. Periodically, or when the number of modified but unupdated first ADOs reaches a certain number, or based on any other rule or the direct instruction from User-X, User-X's ACMAN system will setup a queue of update transmissions for an ADO-A. The ACMAN system might use this flow for one or more of the ADOs on User-X's embedded (owned) activity tree on User-X's machine area. If an ADO or optionally one or more of its extra-journal linked JDIs have been modified 2002 since its last update transmission time, or last ADO synchronization time, then the flow proceeds 2002. The ACMAN system looks up and adds to an "Embedded ADO Checklist" 2003 all the primary parent ADOs up to the root of User-X's embedded tree, and optionally secondary (embedded) parent ADOs of ADO-A and further primary (embedded) parent ADOs of any such secondary parent ADOs. The ACMAN system initiates a loop routine in which for each loop it assigns a temporary variable ADO-X 2005 to each subsequent ADO that is in this "Embedded ADO Checklist". If the CIER User Name (1222) or IOUN (1223) is not User-X 2006, then User-X was not the Activity Idea Expression Originator, so the loop proceeds.

If ADO-X refers to an activity description that was Delegated to User-X (2009, 2010), then this first logical flow (corresponding for instance to update paths 1851' and 1856 of FIG. 18B) is followed. Add to a "Foyered ADO CheckList" all foyered ADOs on User-X's machine area that are common-idea-tied to ADO-X 2011. For each of these 2013 first foyered common-idea-tied ADOs, if the privacy setting (1253) of ADO-A matches or is lower than that of the owner of each respective first foyered common-idea-tied ADO, then ADO-A together with the contact address of the owner of the respective first foyered common-idea-tied ADO is added to the update transmission queue.

If ADO-X refers to an activity description that was WorkShared or FYI Shared (2009), then this second logical flow (corresponding for instance to update paths 1851 and 1850 of FIG. 18A) is followed. If 2015 the privacy setting (1253) of ADO-A matches or is lower than that of the IOUN (1223) of ADO-X, then ADO-A together with the contact address of the IOUNA (1223) of ADO-X is added to the update transmission queue.

This second logical flow as described so far, provides updates to the idea expression originator for an ADO that has been shared to User-X. It is also possible that a third user could further WorkShare or FYI Share an activity description for which the third user was not the activity idea expression originator, or IOUN. Although this is only indirectly implied by 1836, this possibility was described earlier in the explanation of FIG. 18A. In one embodiment, it may be desirable to allow for so-called Expanded Updates for WorkShared and/or FYI Shared activity descriptions. In this embodiment, an ACMAN system would retain the Owner User Name of ADO 1836 as Max (unlike what has been illustrated in FIG. 18A). Updates would be sent not only to the activity idea expression originator (IOUN 1223) but also to owners of corresponding foyered ADOs. So if Expanded Updating is used 2017, then the ACMAN system would also go through a similar sub-loop routine starting at 2011 in which the ADO-A update transmission queue is appended 2019 with owner user names of foyered ADOs that share the same CIER as ADO-X.

As noted earlier, FIG. 20A does not describe all possible algorithms for determining what ADOs and optional JDIs should have updates transmitted or for determining to which respective contact address(es) such updates should be transmitted to. One additional scenario that merits a brief description is the possible scenario, as is illustrated in FIG. 15, in which User-X has created a foyered parent to embedded child ADO relationship. (I.e., Max has caused ADO expression 1523 to be a child to the foyered ADO expression 1502. The recorded ADO of 1523 might include a Foyered Parent Pointer (FPP) (1245) indicating ADO 1502 as the foyered parent.) In this example, Max has not have explicitly shared ADO expression 1523 from or to any other users, so Max's machine area would possess no other ADOs with the same CIER. But it would still be nice for Charlie Chief to receive automatic updates from Max about Max's supporting activity "Heinz Marketing Partnership" 1523 since that activity supports Charlie's Corporate MBO activity expression "Establish 3 New Distribution Partners" 1502. (Recall that Charlie Chief is the owner user 1224 indicated in ADO 1502.)

Figure 20B:
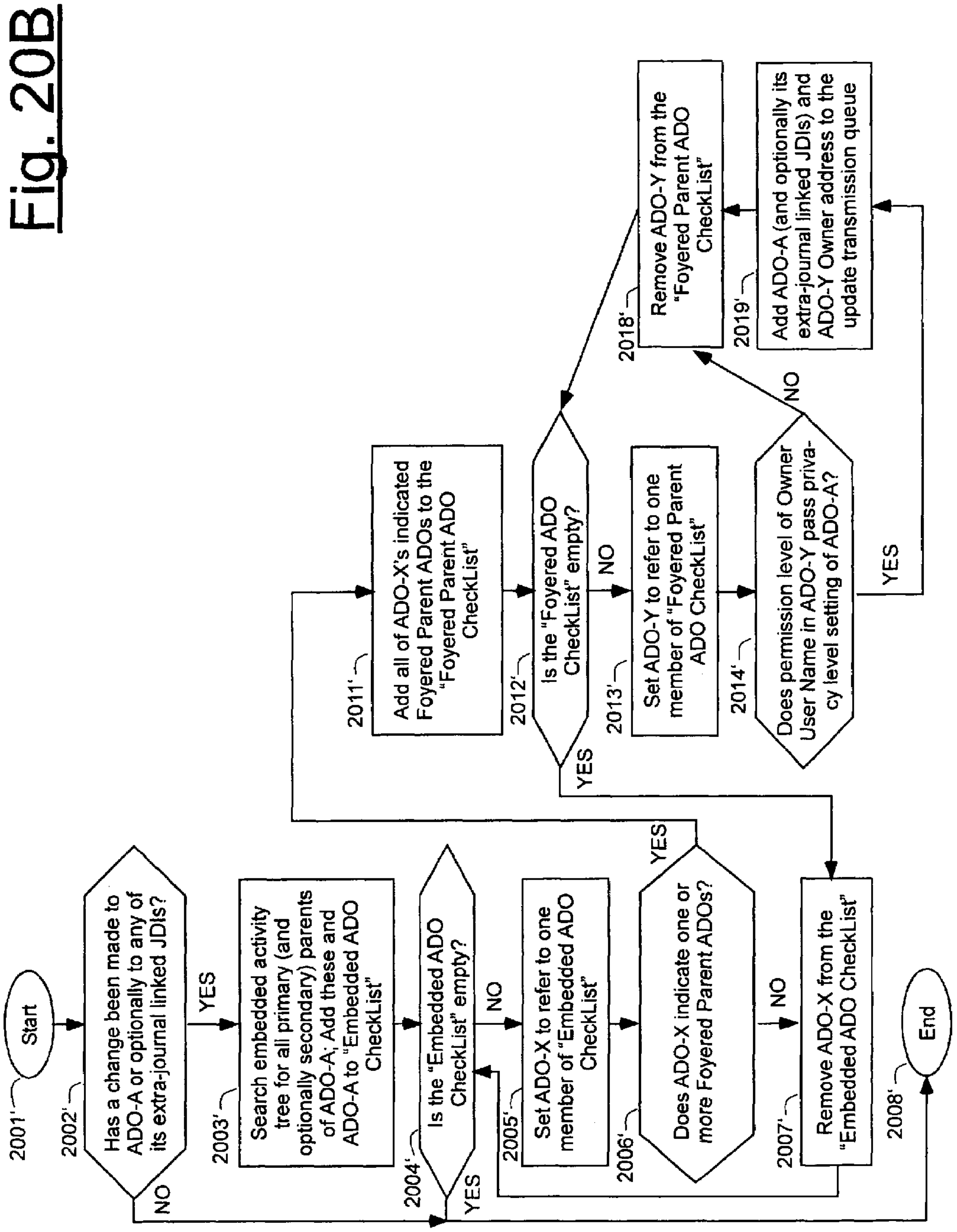
FIG. 20B is a flow chart diagram showing a machine-implemented process for determining which other users should receive update information when an activity data object (ADO) with foyered parent ADO(s) and/or a corresponding JDI has been modified by its owner.

Similar to FIG. 20A, FIG. 20B illustrates one embodiment of the situation described above, but unlike FIG. 20A, FIG. 20B focuses on a situation in which User-X's embedded ADO-A indicates one or more Foyered Parent ADOs. Note that the flow chart of FIG. 20B corresponds very closely to that of FIG. 20A. For instance, step 2002' of FIG. 20B is the same or at least analogous to the corresponding step 2002 of FIG. 20A. (Note that other similar or at least analogous steps in FIG. 20B also have the same reference numbers as in FIG. 20A, plus a prime symbol.) Since the flows are somewhat similar, it is reasonable to assume that one skilled in the art can reasonably understand FIG. 20B. So only a brief additional explanation is provided herein. Note in particular that 2006' varies from 2006 by considering Foyered Parent Pointers rather than CIER user names, and then the subsequent logical loop contains a subset of steps from FIG. 20A. Also, step 2011' adds Foyered Parent ADOs rather than CIER sharing ADOs to the temporary checklist.

In one embodiment, once the flows of FIG. 20A and/or FIG. 20B are completed (2008 and/or 2008' respectively) for one or more of User-X's embedded ADO-A's, User-X's ACMAN system might then transmit one or more of its queued transmission messages from the flow of FIG. 20A and/or from the flow of FIG. 20B and/or from any other update flow routines, provided of course that the system is coupled to an appropriate communications network. Otherwise the ACMAN system would need to wait until it was coupled appropriately. In another embodiment, the ACMAN system might further aggregate and process its queues of update transmissions and their respective transmission contact address(es), as is later described in FIG. 19.

Returning back to the example of FIG. 18B, if Harry's machine area receives transmitted ADO updates from other machine areas, since it may possess multiple common-idea-tied ADO copies in different (typically foyered) activity trees, how might it determine which corresponding ADO instances on Harry's machine area to update? In one embodiment, the rule could be the similar to that described earlier in the example of FIG. 18A. Harry's ACMAN system might read the CIER of a newly received ADO, then search on Harry's machine area for any foyered ADOs with the same CIER. Then for such matching ADO(s), if their Owner User Name match(es) the owner user name of the received ADO(s), the received ADO attribute indications can be used to update the attributes of the respective matching ADOs that were already stored on Harry's machine area. In a further embodiment, an Activity Tree User Name (ATUN) attribute (1225 of FIG. 12A) would also be compared between the received ADO and the already stored and foyered ADOs, such that the ATUNs instead of or in addition to the owner user names of the respective ADOs would need to match up for the received ADO to be used to update the already stored ADOs on Harry's machine area.

Note however, that in this case of Delegated ADOs, ADO 1833' might represent the state of ADO 1823', while ADO 1836' might represent the state of ADO 1826', and the respective states of these represented ADOs may in actuality have some small differences, for instance different priority level indications. As such, as the delegating intermediary between Adam's machine area and Harry's machine area, Max's ACMAN system might transmit updates to Harry's machine area of both Max's embedded ADO 1826' and of his foyered common-idea-tied ADO 1823'. So an instructing rule for the ACMAN system when updating a machine area with received, delegated ADOs, in an alternative embodiment, may be enhanced slightly from the description given with FIG. 18A (which was also repeated in the paragraph above). This can best be described using a flow chart.

Figure 21:
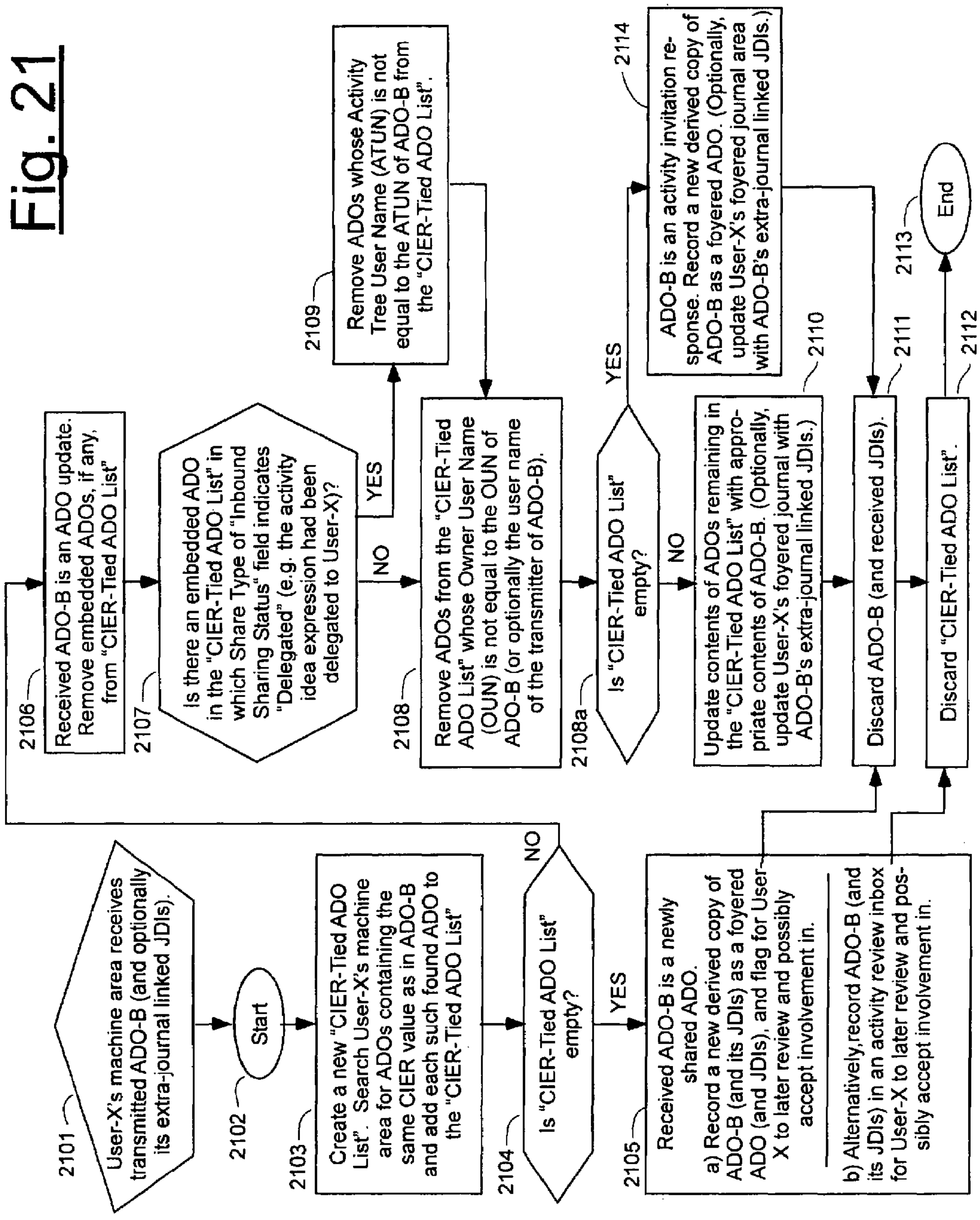
FIG. 21 is a flow chart diagram showing a machine-implemented process for determining which local machine area ADOs and/or JDIs possibly should be modified when a new or updating ADO and optionally its related JDIs are received from another user's machine area.

FIG. 21 is a flow chart of one embodiment describing a possible set of logic and actions that a User-X's ACMAN system might follow to determine what ADOs on User-X's machine area might need to be updated if an ADO, referred to in this figure as "ADO-B", is received from another user's machine area. FIG. 21 describes a possible updating means for ADOs received onto User-X's machine area, wherein User-X may or may not already be an explicit participant of the activity idea expression represented by "ADO-B", and wherein User-X may or may not be the Idea Originator of the corresponding activity idea expression (e.g. User-X might instead be an explicitly invited participant to the original activity idea expression). Furthermore, "ADO-B" in FIG. 21 might represent an activity idea expression that may have been WorkShared, FYI Shared, and/or Delegate Shared to and/or from User-X; or it might represent an activity idea expression that has been automatically transmitted to User-X on a supervisory activity sharing basis. 2101 in FIG. 21 indicates that User-X's machine area has received "ADO-B", and optionally any JDIs that might be extra journal linked to this ADO-B. Next, User-X's ACMAN system might "start" 2102 to determine what to do with this received transmitted signal. First User-X's ACMAN system might scan 2103 User-X's machine area to find any common-idea-tied ADOs (e.g. CIER-tied ADOs), which might be determined by finding ADOs with CIER values matching that of ADO-B. If none are found, then ADO-B might not be an update, but rather from User-X's perspective it might be a newly shared ADO expression 2105. User-X's ACMAN system might in one embodiment (a) record a slightly derived copy of ADO-B (and optionally it's extra-journal linked JDIs) in an appropriate foyered location on User-X's machine area and possibly flag it for later review. User-X might be able to set rules in his system to cause his system to determine whether to automatically flag such newly shared ADO's for review. For instance, if ADO-B was an explicit invitation for User-X to participate (e.g. WorkShare or Delegation) it might be desirable to automatically flag it for review, while if ADO-B was transmitted on an FYI sharing or an implicit supervisory sharing basis, it might not be desirable for User-X to review such ADOs. User-X's ACMAN system might in alternative embodiment (b) record ADO-B in a special review inbox, as opposed to immediately recording a derived copy of ADO-B in a foyered area. User-X could later review and possibly accept involvement for that activity.

Returning to 2104, otherwise, if at least one existing common-idea-tied ADOs has been found, then ADO-B might be an update 2106 to an existing one or more ADOs already on User-X's machine area. In an embodiment of the disclosed system wherein the ADO data structure includes an Activity Tree User Name field (ATUN, 1225 of FIG. 12A), steps 2107 and 2109 might be used to cause the ADO update to be applied only to ADOs on a specific activity tree. This might be useful for the specific scenario described earlier in FIG. 18B, where an update of 1833' may be distinguished from an update of 1836'. Otherwise, steps 2107 and 2109 may not be necessary. After removing from the "CIER-tied ADO List" any embedded ADOs and any foyered ADOs with non-matching Owner User Name indicators, then the list might contain only the ADOs that should be updated 2110, using the contents of ADO-B. (Typically, only foyered ADOs might meet these conditions). Note that while the contents of the received ADO-B may be used to update these remaining listed ADOs, the optional received JDIs that might be extra-journal linked to the received ADO-B might be used to update a possible foyered journal set of JDIs. Such foyered JDIs might similarly be owned by the owner of the received ADO-B.

Figure 19:
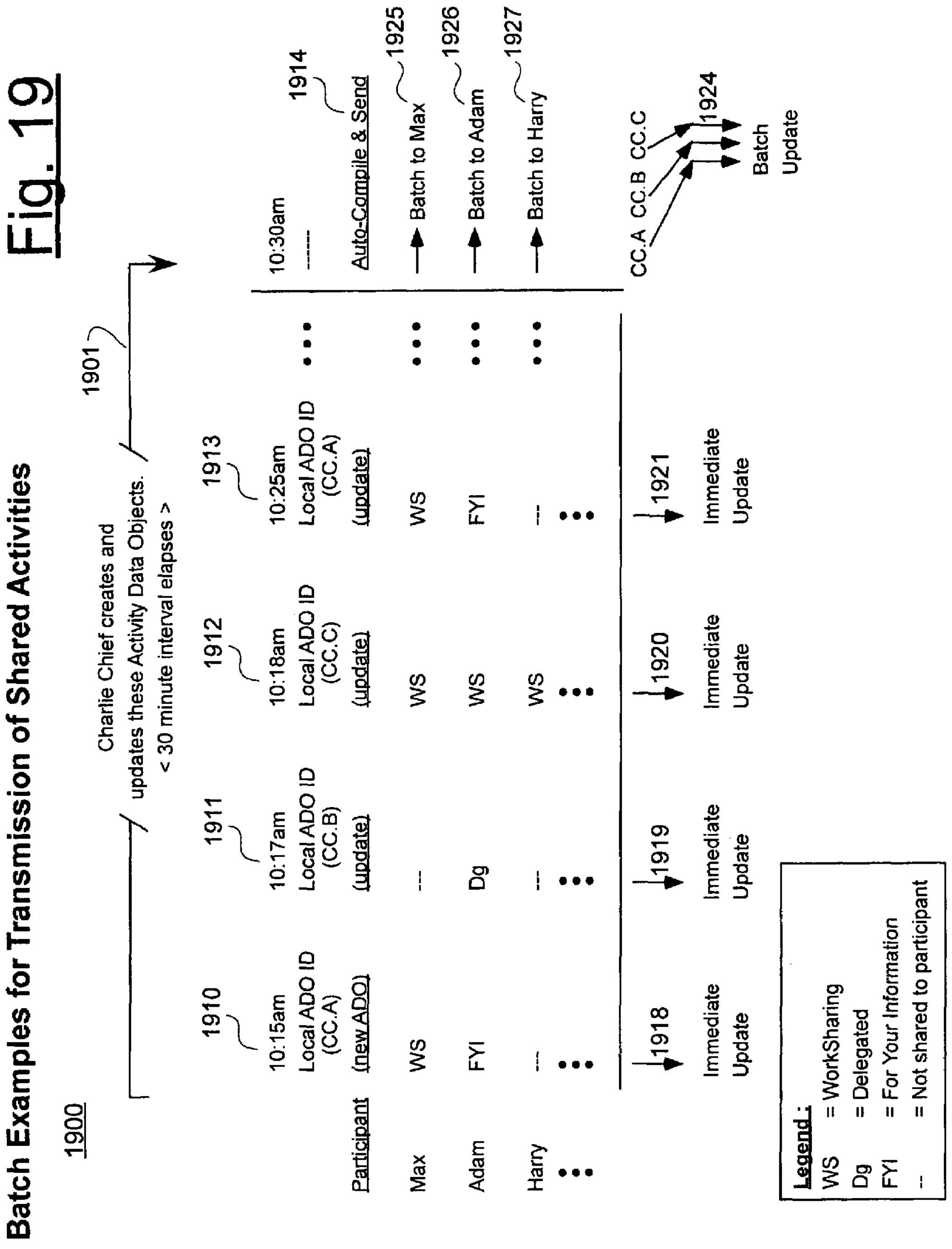
FIG. 19 is a diagram for explaining why it may be advantageous in different situations to transmit activity updates either in essentially real time, or in chronologically-accumulated batches, and/or in batched groupings on a per recipient basis.

As one can imagine, with possibly very many activity updates being messaged back and forth, the bandwidth requirements on a network or an individual's machine can increase rapidly. Instead of attempting to send incremental activity data object updates to other participants on a real time basis, as each change occurs, it might make sense to batch together update transmissions. FIG. 19 illustrates possible embodiments of batching schemes. In the example of FIG. 19, Charlie Chief causes his system to create 1910 a new first activity data object at 10:15 am (with Activity Data Object ID of "Charlie_Chief.A", abbreviated as "CC.A"). Charlie then causes his system to modify two other previously existing embedded activity data objects "CC.B" and "CC.C" (1911 and 1912) at 10:17 am and 10:18 am respectively. Then at 10:25 am, Charlie causes his system to modify 1913 his embedded copy of the first activity data object, "CC.A". Each of these three activity data objects happens to be Delegated, WorkShared, and/or FYI Shared with various participants, as indicated by the table. If Charlie's machine was to message each participant immediately after each ADO modification was made, this might result in at least 4 messages: 1918 at 10:15 am, 1919 at 10:17 am, 1920 at 10:18 am, and 1921 at 10:25 am. (If transmissions were done immediately as sub-portions of ADO modifications were made, such as when each ADO attribute was caused to be modified, then the number of transmission messages would be even much greater.) If the messaging needed to be messaged separately to each participant, for example if the action 1910 was then messaged to Max and to Adam separately, this might result in at least 2 messages; and thus the 4 actions 1910 through 1913 could possibly result in a total of at least 2+1+3+2=8 messages.

One possible alternative would be to wait for a predefined time interval 1901 to accumulate any updates, batch together the update messages for that time period, and then automatically send them out to the respective participants. In this example, since the same ADO, "CC.A", was modified twice during the interval 1901, such an approach would reduce the messages transmitted from 4 down to 3, as indicated by the batch update action 1924. If a user makes a lot of activity data object modifications during a time interval, this batching approach can dramatically reduce the number of messages that must be sent, thereby reducing bandwidth requirements. Furthermore, if Charlie is not able to access an internet connection for a period of time, this batching approach might be necessary, or at a minimum just very convenient. There might be no way to send immediate updates (1918 through 1921) to other participants if there is no immediate internet connection. Even if an asynchronously exchanging email system was available as a container to send update messages to other participants, during a single interval, there could be inefficiencies resulting from updates that supercede each other, such as 1910 and 1913. If Charlie was not able to access an Internet connection for a long time, several such pre-set intervals might pass by. So rather than storing several redundant updates that supercede each other, after some time interval, Charlie's machine might overwrite any of the prior update messages waiting to be sent with a more comprehensive set of update messages. In addition, ACMAN may provide Charlie with an option to force an update transmission before a possible pre-set time interval is complete. For example, if Charlie knew he was going on a long trip, he might want to cause his system to transmit the updates before he shuts down his machine, which might be before the interval period would have ended to trigger an automatic transmission sequence.

Note that this update messaging scheme is applicable to both ADOs and optionally to JDIs that may be extra-journal linked with ADOs. Note also that the nature of the ADO and the JDI data structures is such that a differential comparison may not be necessary in order to update other participants. As in 1910 and later 1913, the ACMAN system may not need to keep track of the differences between data structures as each user update occurs. Rather, it is sufficient to maintain the last modification time of each shared ADO can suffice. When a batch update event is triggered (1901 or manually by Charlie) simply checking if a given ADO has been modified since the last batch transmission time, and if so, messaging the current copy of the given ADO (and optionally extra journal linked JDIs) to the other participants. This is possible because both Charlie and his receiving participant machines may maintain both foyered and embedded copies of ADOs that are common to a shared activity idea that they are sharing (and optionally shared extra-journal linked JDI are further tied with their respective ADOs); or if another user is not actively participating (i.e. accepting involvement) but is simply receiving updates from Charlie, their machine area might just store a foyered copy of the most current received ADO from Charlie. As a result, simply sending the latest copy of an ADO (and optional JDI) may be sufficient. This could be accommodated by querying each relevant ADO and referencing the ADO data structure field 1232 (FIG. 12A, containing Last ADO Modification Time and Last ADO Sync Time) to determine for each ADO if it may be necessary to send updates to participants. Alternatively, a transactions table (such as 320 of FIG. 3) might maintain a record of batch update times and/or of ADO modification times, so that the transactions table can be searched to determine more quickly which ADOs (and optionally JDIs) should be accessed and transmitted as updates to other users. Similarly, if JDIs are optionally updated to each other, querying the JDIs' data structures 951*a* (FIG. 9A, containing Last Modification Time Stamp) may be sufficient for the ACMAN system to know which JDIs may be recently modified and may need to be sent to participants of the associated ADO(s). From a receiver's perspective, if Harry's ACMAN system was receiving an ADO update 1924 of ADO ID "CC.C" from Charlie, all his system may need to do is search the foyered ADOs on the receiver's (Harry's) machine area, and if a corresponding ADO is found with the same Common Idea Expression Reference (CIER, from FIG. 12A, 1222) and with "Charlie" as the Owner User Name (from OUNA field 1224), then Max's system can just overwrite attributes in the older copy with attribute values from the new one, or possibly with slight modifications of the contents of the new one. If no match is found on Max's machine area, then Max's system can add the received ADO to Max's machine area's foyered tree for Charlie, and possibly flag that ADO or add that ADO to Max's stack of not-yet-reviewed sharing requests.

Another possible way to efficiently update participants might be to batch and combine together the latest update copies of each recently modified and embedded ADO on a per-participant basis, as opposed to on a per-ADO basis. We can call this possible option "Auto-Compile & Send" 1914. "Auto-Compile & Send" suggests that the ACMAN system might, per each participant for the ADOs to be updated, aggregate the newly created ADOs and/or the updated ADOs (and optionally the JDIs for new and/or updated extra-journal linked JDIs); then compile these objects into one possibly compressed and/or encrypted text and/or binary file, and then automatically transmit each such compiled file to each respective participant, as indicated by 1925, 1926, and 1927. Each respective participant might then receive their batch update file, uncompress it, decrypt it and separate out each such received file into its respective one or more objects, and then update their possibly matching respective foyered activity tree objects (and optionally JDIs) accordingly. This scheme might reduce the number of messages greatly for small teams of closely working people, i.e. if the number of participants is low but the number of ADOs they are working on together is high. For instance, Charlie Chief may have a lot of ADOs and updates that are for Adam Assistant and nobody else. Imagine FIG. 19 as if Max and Harry were not participants in any of the ADOs shown. Then an "auto-compile & send" transmission to Adam 1926 might result in one message sent, as opposed to a regular batch update 1924 which might comprise three update messages transmitted from Charlie's machine area to Adam's machine area. Of course, if only a single update is made to an activity data object that is shared by 20 participants, it would then be more efficient to send this single update to 20 participants as one message (or email) with a 20 person recipient list. The more efficient method, or some intermediate variant thereof, might be chosen by the ACMAN system during run time.

FIG. 22 is a diagram showing a possible set of presented menu items, including a possible set of View related items, that a user may be able to select in order to cause his system to execute various presentation instructions. Such menu item selection methods can include clicking with a mouse or pointer, using shortcut keys (e.g. keyboard "Control" and/or "Alt" key combinations), voice commands, and other user interface menu selection methods that are familiar to those skilled in the art. A brief description of some of the View related menu items follows. For convenience, we'll assume the machine area owning user who is using the disclosed system in FIG. 22 (as well as in following FIG. 23, FIG. 24A, FIG. 24B, FIG. 25A, FIG. 25B, FIG. 26, and FIG. 27) is Max.

However, before describing user interface commands of FIG. 22, let's first look at what Max's screen might look like below the menu command area. FIG. 24A is a schematic diagram showing a user interface presentation in accordance with the disclosure which simultaneously presents to a given user his owned expressions of activity descriptions and/or associated journal data items, where presentation options are provided for presenting rows and/or columns of activity description expression values according to their or others' owned activity description expressions. In this illustration, Max had predefined meta-search, filter, and sort buttons 2442, 2443, and 2444, and he also indicated a name for those predefined presentation buttons—for instance he named 2442 as "Today's Priorities". Max then selected this button 2442, possibly by clicking it once with his pointer. As a result, his ACMAN system filtered and sorted his activities area 2410 to only present the possibly sorted activity description expressions whose ADOs met the filtering criteria Max specified, and which his system recorded. Max also selected the option 2427 to cause his system to present in the journal area 2420 expressions of only Max's owned 2419 JDIs that are extra-journal linked with the underlying ADOs whose expressions are currently presented in the activities area. In one embodiment, the option to have the journal area be automatically presented in "Standard Journal Mode" vs. "Selection-Filtered Journal Mode" would also be recorded as a user preference in the pre-programmed buttons, such as 2442.

Returning to FIG. 22, Max now wants to see what his same filtered activities look like from the viewpoint of Harry. FIG. 22 illustrates a portion of Max's screen after Max has clicked on the "View" item in the menu selection area (2402 of FIG. 24A). Other presentations could also, be on-display, such as portions of the Activities area and Journal area of FIG. 24A, but for ease of illustration, in FIG. 22 (as well as in FIG. 23, FIG. 26, and FIG. 27) only the menu and related command selection and/or sub-menu presentation areas are illustrated. Max has clicked "View" 2202, and then further clicked "View My Activities as . . . " 2212. This might cause a small pop-up selection window 2240 to be presented. Once the popup window 2240 appears, Max can use his mouse or pointer 2246 to indicate "Harry" 2242 as the user whose owned activities Max would like to have presented to himself (to Max). There may be a number of users that Max could choose from, including reverting back to just seeing his own activity expressions (2245). In one embodiment wherein Delegated sharing restricts sharing an owned activity to only one other user, the "Delegated-To participant(s)" option 2244 could be chosen instead. This would cause Max's system to present his owned activities from the viewpoint of the delegated to participant, even if respectively different activity expressions in the activities pane presentation area had underlying ADOs indicating respectively different Delegated-To participants. Anyway, returning to the situation shown specifically in FIG. 22, Max has selected "Harry" 2242, and this selection is presented in the top of the drop down list 2241. Max then can select "OK" 2246 to initiate the command to his ACMAN system to re-present the on-display presentation.

FIG. 24B is a schematic diagram showing a user interface presentation in accordance with the disclosure, similar to FIG. 24A, but showing the user interface after the just above described (in FIG. 22) machine instructions Max has issued to his ACMAN system—Max has indicated instructions to his machine to present Max's activities as Harry's activities. More specifically, Max's machine area has stored Max's embedded activity descriptions (which were on-display in FIG. 24A), and it also has stored Harry's foyered ADOs (i.e. owned by Harry), many of which are common-idea-tied respectively with the underlying ADOs whose expressions were on-display in the activities pane 2410 in FIG. 24A. These common-idea-tied ADOs might for instance share the same CIERs respectively as the ADOs whose expressions were on-display in the activities pane 2410 in FIG. 24A. FIG. 24B shows two activity description expressions owned by Harry. The owner of each on-display activity description expressions in this embodiment is indicated in the presentation area 2431'. Note that only two (the corresponding two that are on-display in FIG. 24B, 2451 and 2453) of the activity description expressions that were owned by Max were shared with Harry. Note further by comparing FIG. 24B with FIG. 24A, that the presented values of the respective underlying ADO attributes might vary between Max's embedded activities (FIG. 24A) versus the common-idea-tied, foyered activities of Harry (FIG. 24B). For instance, activity description expression 2453 shows that Harry has a different perception as well as a different relative organization of the common-idea-tied activity description than Max has. For Harry, this activity description, "Hire Max's Vegetable product line manger" (see column 2438' intersection with row 2453) is a child in a primary parent activity tree of "[Harry's Activities . . . ]\Work\Recruiting\Denver\" (see column 2432' intersection with row 2453). Note that in one embodiment, ADOs include primary parent pointers (as in 1236 in FIG. 12A) but not necessary complete primary path information; so the presentation of Harry's primary parent tree might be constructed by reading the parent pointer indicators of the ADO underlying the on-display activity description, as well as those of the respective parent, grandparent, and further progenitor ADOs up to Harry's primary tree root ADO.

The common-idea-tied activity description for Max, i.e. on Max's embedded ADO, may have some differently described attributes from Harry's foyered ADO. For instance, the corresponding primary parent activity description hierarchy path "My [Max's] Activities\Work\Staff" (see in column 2432. Also, Max's long activity descriptor indicates "Hire Product Manager for Vegetable product line" (in column 2438). There may be other differences as well. For Max, the priority is high (3 stars, as in 2414), while for Harry, the priority is lower, although Harry has given himself a due date (2 stars, and Aug. 1, 2003 due date as in 2414' and 2417' respectively). in one embodiment shown here, Harry's ADOs were updated to Max and included their respective extra-journal linked JDIs. So when Max modified the owner view from Max to Harry (FIG. 24A to FIG. 24B), since Max left the journal pane area in Selection-Filtered Journal Mode, the extra-journal linked journal data item expressions presented in the journal pane area might be re-presented to display Harry's foyered JDIs that might extra-journal linked with Harry's foyered ADOs.

Since Max's machine might store both the embedded and the foyered ADOs and respectively linked JDIs on Max's machine area, Max's machine could be completely uncoupled from any telecommunications or other networks, yet his system could still present these differently owned expressions to him, at least to the extent that Max's machine area has received and recorded updated derived copies of corresponding ADOs (and optionally JDIs) from other users' machine areas, such as Harry's. In the case of activity description expression 2451, Max's machine area may not have received any response yet from Harry's machine about that activity expression that Max's system transmitted to Harry's machine area. Notice that the Sharing Status (intersection of row 2451 and column 2416') shows "Waiting", which might indicate that Max's system sent a Sharing request to Harry, but Max's machine area has not yet received a response from Harry's machine area. (See FIG. 7 for further sharing state display options.) As a result, in one embodiment, Max's system may have already derived and recorded a corresponding foyered ADO for Harry, commonly-idea-tied to Max's ADO, although many of its attributes may be as yet unknown, or at best assumed. Max's system might not have any knowledge at all what the primary hierarchy path of Harry's common-idea-tied ADO (pertaining to "Write up cookie handling specification with quality group") 2451 might be. However, Max's system might assume, until it gets any updates from Harry's machine, that this foyered ADO expression should for now include the same values for at least its short activity descriptor indicator, priority indicator, due date, and long activity descriptor indicator attributes as Max has for his corresponding embedded activity description.

FIG. 23 is a diagram showing an embodiment of a user interface for a user, such as Max, to indicate his preferred set and order of activity description attributes, and to thereby cause his system to present a tabular or spreadsheet presentation of activity description expressions accordingly. Max might be able to modify these settings and cause his ACMAN system to record them on his machine area (for instance, recorded in section 317 in FIG. 3). Max might first select with his pointer the menu option 2218 in FIG. 22, "Select Fields to Present . . . ". Then a popup window 2311 such as is illustrated in FIG. 23 might be presented. On the left hand side of this popup window might be presented a set of possible tabular column, or field name, choices from which Max can choose to have on-display in his main activities pane area 2410. Max can use his pointer to select a one or more field names on the left. In the example of FIG. 23, Max has selected the "Long Activity Description" field name 2305, which is used to present expressions of the Long Activity Descriptor indicator for on-display ADOs. Max can move selected field names from the available list on the left 2301 over to the set of to-be-displayed field names on the right 2303 by clicking on the right (or conversely the left) directional arrow(s) with his pointer as shown 2302. As in this example, it can be seen that Max may have just included field name "Long Activity Description" 2310 into the right-hand section of to-be-displayed field names. (Note that the field names in FIG. 23 may or may not correspond exactly with the ADO attribute names of FIG. 12A. In some cases, a near literal representation of an ADO attribute expression may be appropriate. In other cases, for instance, the "Parent Activity(s)" field name, which might display the entire primary parent path for a given activity description, the presentations corresponding to the field name may be a derived representation of one or more indicated ADO attribute values. Also, this FIG. 23 is intended to portray what might be presented to an end user like Max, as opposed to a set of literal one to one correlations of ADO attribute names as embodied in FIG. 12A.) Max might be able to change the display order 2304 of the field names by selecting a field name such as 2310 and then clicking on the up or down arrows to modify the setting 2308 for a given field name. When complete, Max can select the "OK" button 2312 to cause his system to record and enable the indicated settings. Indeed, the field Max has chosen in the illustration of FIG. 23 are also shown in the on-display presentation of both FIG. 24A and FIG. 24B. By giving Max the flexibility to select which fields for his machine to present, Max can remove what he might consider to be clutter from his presented views, and/or focus on specific items in a way that works best for his custom way of managing his activities.

Further, although not shown directly in FIG. 23, Max could, in one embodiment, choose to cause his system to display two of the same field names as separate columns in one integrated presentation. Although that might seem wasteful, this might provide a useful tool for Max to monitor shared activities. For instance, although the field name "ADO Priority" is already included on the right hand side 2303 of to-be-displayed field names with field name presentation order 2304 of "4", Max could for instance select "ADO Priority" 2306 on the left hand side, click the right directional arrow again 2302 and cause "ADO Priority" to appear twice on the right hand side 2303. (This is not directly shown in FIG. 23.) He could conversely remove the "ADO Status" field name 2313 from the right hand side by clicking with his pointer on the left directional arrow 2314. He could then modify the field name ordering to his preference, and click "OK" 2312. This might cause his system to change the activity display pane area presentation from including the columns shown in FIG. 24B (2431' through 2438') to including the columns in FIG. 24C (2431" through 2438").

Figure 24C:
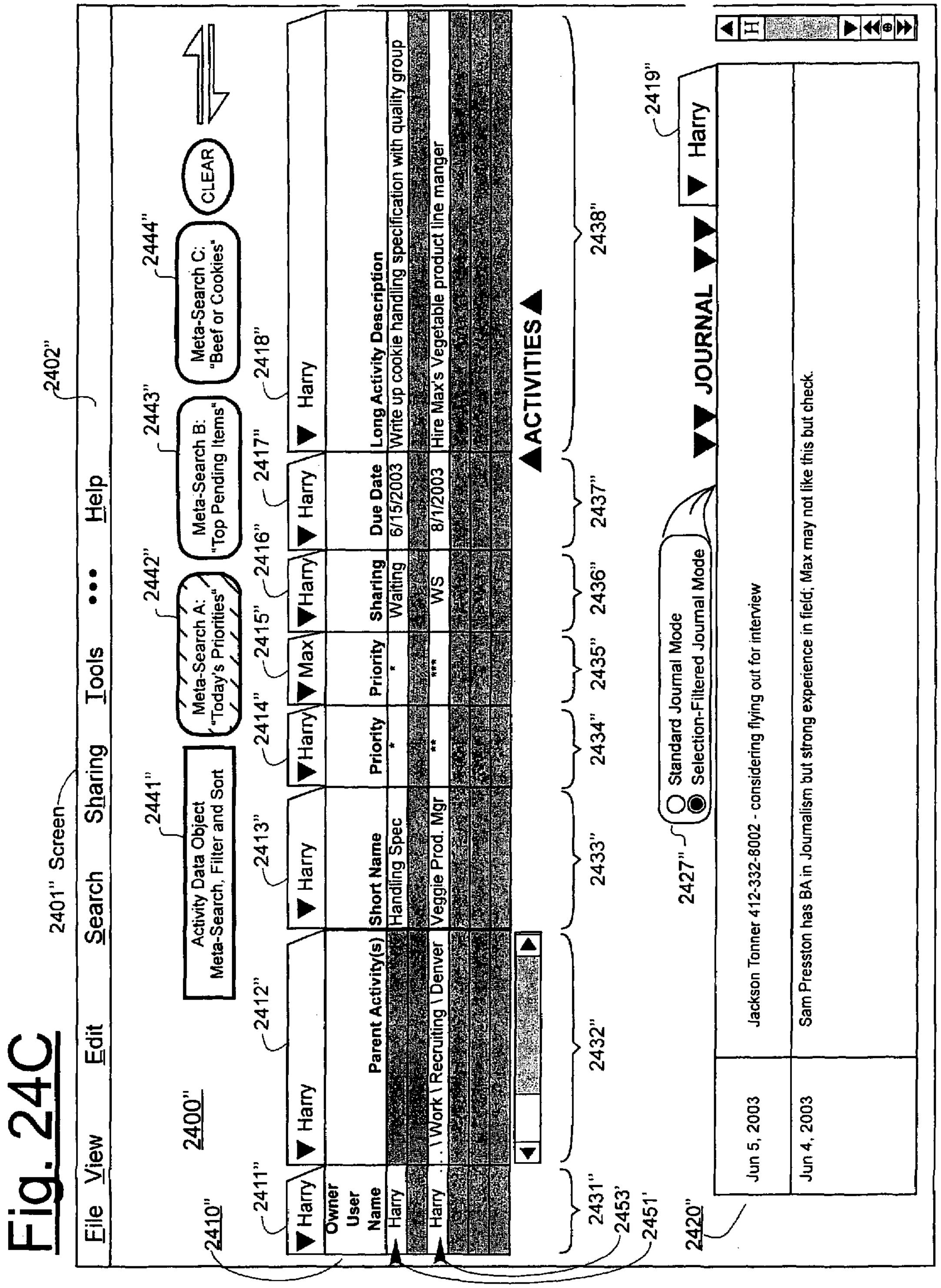
FIG. 24C is a schematic diagram showing a user interface presentation in accordance with the disclosure which simultaneously presents to a given user a combination of his and other user's expressions of activity descriptions and/or associated journal data items, where presentation options are provided for presenting rows and/or columns of activity description expression values according to their or others' owned activity description expressions.

FIG. 24C is a schematic diagram showing a user interface presentation in accordance with the disclosure which simultaneously presents to a given user, such as Max, a combination of his and other user's expressions of activity descriptions and/or associated journal data items, where presentation options are provided for presenting rows and/or columns of activity description expression values according to their or others' owned activity description expressions. First, it may help to observe in FIG. 24C (as well as FIG. 24A and FIG. 24B) that the top row of the 8-column wide activities pane area of the illustrated screen presentation shows user name tabs (2411" through 2418", and 2419"). In one embodiment, these tabs are an optional presentation option that a user can turn on or off. For example, see briefly FIG. 22—here that option is set to on, as indicated by the checked "View" 2202 option, "Enable View-By Field Tabs" 2215. Max could deselect this option, and these tabs might default to a setting to present only Max's embedded ADO expression values (as illustrated in area 610 of FIG. 6A, where there are no such tabs on-display). However, in FIG. 24C, Max has caused this option to be enabled. Furthermore, while the two presented activity description expressions reflect the attribute values corresponding to Harry's foyered ADO attributes, any column View-By tab (e.g. 2415" showing "Max") in which the user name is not the same as the "Owner User Name" View-By tab (e.g. 2411" showing "Harry") might cause the ACMAN system to present that column's (e.g. 2415") expressed values corresponding to the column's indicated ("Max") owned common-idea-tied ADO attributes. So FIG. 24C shows how Max can readily review the foyered activity descriptions that Harry is involved in and that correspond to Max's embedded, common-idea-tied activity descriptions. And furthermore, Max can see how Max's priority indications compare versus those of Harry. As Max can see in the illustration of FIG. 24C, Max's priority to hire the "Veggie Prod. Mgr" is 3 stars (column 2435"), while Harry's priority for Harry's expression of the common-idea-tied activity description is only 2 stars (column 2434"). After observing this, Max may decide he should talk to Harry to ensure that Harry understands the priority of this activity.

Max might not want to focus only on one participant's, Harry's, expressions of Max's common-idea-tied activity descriptions and optional JDIs. Max may want to consider a first shared activity (typically one of his embedded activity description expressions) and see the presented expressions of other participants for that activity. In one embodiment (see FIG. 18A), other alike machines whose owner users are participants in the given common-idea-tied activity, might have manually and/or automatically responded back to update Max's machine with their recent derived copies of their corresponding activity description expressions. Clicking his pointer on menu option 2213 of FIG. 22, "View participant versions of selected activity", provides Max with a means to instruct his machine to present his embedded and foyered ADO expressions in such a manner.

Figure 25A:
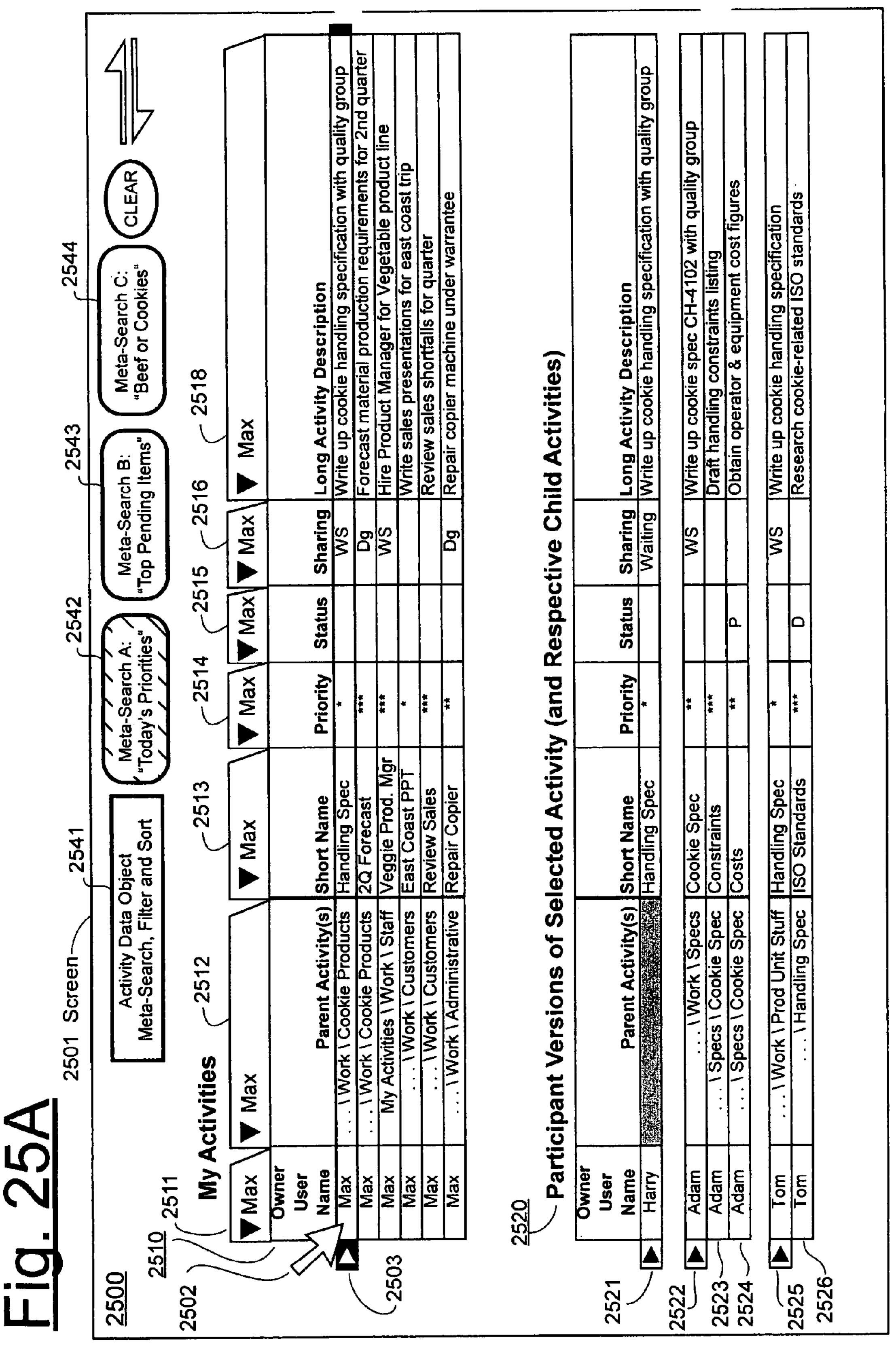
FIG. 25A is a schematic diagram showing a user interface presentation in accordance with the disclosure which simultaneously presents to a given user, in a tabular or spreadsheet format, expressions of his owned activity descriptions as well as expressions of respectively related activity descriptions owned by one or more other users.

FIG. 25A is a schematic diagram showing a user interface presentation in accordance with the disclosure which simultaneously presents to a given user, for instance Max, in a tabular or spreadsheet format, expressions of his owned activity descriptions as well as expressions of respectively related activity descriptions owned by one or more other users. In particular in FIG. 25A, Max might have selected 2502 the presented ADO expression of "Write up cookie handling specification with quality group" 2503. He might next have turned on the view option 2213 (in FIG. 22), causing a checkmark to appear by that menu option. (In FIG. 22, menu option 2213 is shown turned off; if it was turned on, a checkmark rather than an empty "( )" symbol might appear.) After selecting this menu option, the lower section 2520 of "Participant Versions of Selected Activity (and Respective Child Versions)" might be automatically presented. Conversely, Max could have turned on menu option 2213 and then selected the activity description expression 2503 to cause the lower section 2520 to appear instead. In any case, the ADOs underlying activity description expressions 2521, 2522, and 2525 might indicate some corresponding relationship with Max's embedded and selected activity description expression, as indicated by the black auto-selection indicators the left hand side of their on-display presentations. These three ADO expressions, 2521, 2522, and 2525, might correspond to foyered ADOs (of Harry, Adam, and Tom respectively) that are common-idea-tied to Max's selected and embedded ADO underlying expression 2503. With this automatic presentation, Max can monitor in an integrated presentation, the activity expressions of his as well as those of one or more other participants to understand what their respective perceptions might be. For instance, Max can see that Harry might not yet be aware of the sharing request (since his "Parent Activity(s)" field is blank), while Adam has augmented the Long Activity Descriptor indicator to include the specific specification number "CH-4102" that he might need to use, and Tom, who is a quality group member, has augmented his description to better fit his view of the world. Note that each owner, Max, Harry, Adam, and Tom can each have their own preferred expressions to describe the original common idea expression, possibly including different hierarchical organizations, short activity descriptor indicators, priorities, status, etc. Further, if any of them modify their expressions on their alike machine areas, their machines might automatically send Max's machine area an update transmission, which could cause Max's machine to further automatically update its corresponding stored foyered ADO. In turn, Max's machine might present such updated expressions to Max.

In addition, FIG. 25A illustrates an embodiment of the disclosed system, whose aspects were described in FIG. 18A, FIG. 20, and FIG. 21, in which ACMAN systems can automatically share and intercommunicate child activities of accepted shared activities. In the embodiment shown in FIG. 25A, Max may have selected an option to include in the automatic presentation the child ADO expressions, if any, (2523, 2524, and 2526) of the respectively foyered, common-idea-tied (relative to 2503) ADO expressions. For instance, Adam's machine area may have received a WorkSharing request corresponding to 2503, and then Adam may have accepted involvement and caused his system to integrate a derived copy with Adam's own corresponding expressions (a derived copy of which is expressed at 2522) into his, Adam's, owned embedded activities. Adam may then have created his own new child activities, or alternatively organized his existing activities as child activities to his newly owned "Cookie spec" activity. These child activities might be described by Adam as "Draft handling constraints listing" and "Obtain operator & equipment cost figures". Consequently, since Adam's privacy level settings may have been public enough for his system to automatically share these expressions to Max's machine area, Adam's machine might have transmitted derived ADO copies to Max's machine area, possibly on an FYI Sharing basis. In FIG. 25A, updated expressions of these respectively derived, child activity description copies that have been transmitted to Max's machine area and processed by Max's system, are presented as 2523 and 2524.

Figure 25B:
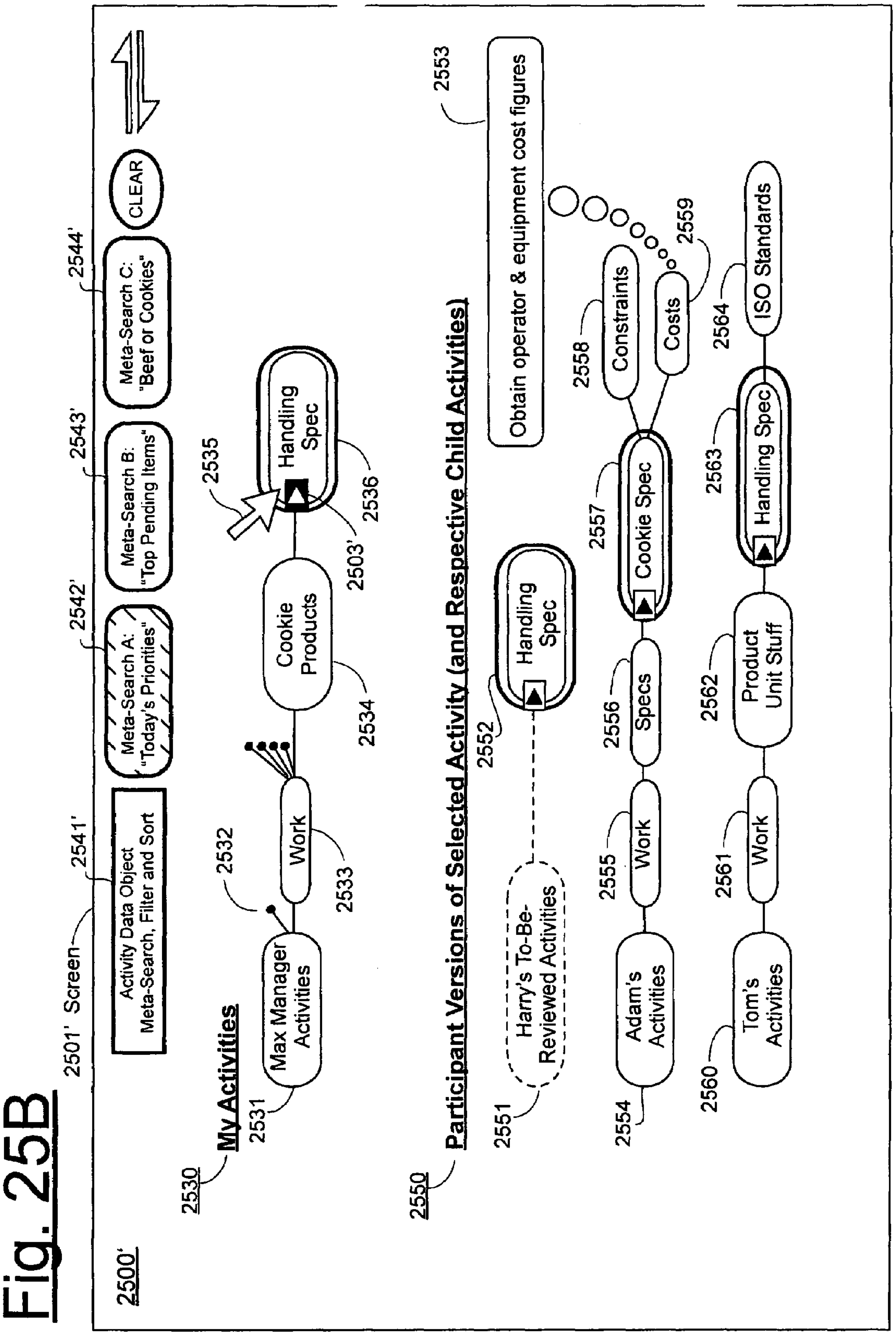
FIG. 25B is a schematic diagram showing a user interface presentation in accordance with the disclosure which simultaneously presents to a given user, in a graphical or icon-based format, expressions of his owned activity descriptions as well as expressions of respectively related activity descriptions owned by one or more other users.

Max might further wish to see the presentation of 25A modified from a tabular, for example spreadsheet, form, to a graphical, for example drawn hierarchical tree with icons, form. FIG. 25B is a schematic diagram showing a user interface presentation in accordance with the disclosure which simultaneously presents to a given user such as Max, in a graphical or icon-based format, expressions of Max's owned activity descriptions as well as expressions of respectively related, foyered activity descriptions owned by one or more other users. Max could instruct his system to change the presentation by selecting the menu option 2216 of FIG. 22, "Activity Area in Graphical Mode". Previously, for FIG. 25A, this possible feature was set as "Activity Area in Spreadsheet Mode" 2217 (FIG. 22). But Max can in one embodiment, toggle the presented views from one mode back and forth to the other. In FIG. 25B, a graphical icon mode is illustrated, corresponding to the presentation of FIG. 25A. Here, the activity description expression presentations may have less detail shown per ADO expression, but their hierarchical relationships might be more easily understandable since many of the individual ADO expressions are laid out graphically, in relation to each other in a tree-like structure. Note that in the embodiment shown, the icons in FIG. 25B correspond with the tabular or spreadsheet items in FIG. 25A. For instance, top and bottom areas 2530 and 2550 correspond respectively to top and bottom areas 2510 and 2520 of FIG. 25A. The set of Max's activity description expressions 2531 through 2533 correspond to the set of Max's activity description expressions in FIG. 25A in area 2510, and more specifically with 2503. The set of Harry's activity description expressions 2551 through 2552 correspond to the set of Harry's activity description expressions in FIG. 25A of 2521. The set of Adam's activity description expressions 2554 through 2559 correspond to the set of Adam's activity description expressions in FIG. 25A pertaining to 2522 through 2524. The set of Tom's activity description expressions 2560 through 2564 correspond to the set of Tom's activity description expressions in FIG. 25A pertaining to 2525 through 2526.

In FIG. 25B, Max's owned activity description expression "Handling Spec" 2536 is selected 2503' (FIG. 25B), and this corresponds to the selected item 2503 in FIG. 25A. Note that the icon text "Handling Spec" 2536 might correspond to the short activity descriptor field indicator of that corresponding underlying ADO, as can also be seen in FIG. 25A (at the intersection of row 2503 and column of 2513). In one embodiment, an ACMAN system may provide automatic and/or manual options to compress Max's tree presentation to a simple representation focussing on the activity or subset of activities Max indicates that he is specifically interested in. (Max might be able to click his pointer 2535 on the point at 2532 to expand, and on alternate clicks compress, that hidden branch of activity expressions.) Corresponding to the presentation of FIG. 25A, the common-idea-tied foyered ADO expressions, corresponding to Max's owned selected expression, are also auto-selected in FIG. 25B (2552, 2557, and 2563). Respective child ADO expressions, if any, might also correspondingly be presented as in 2558, 2559, and 2564. Their respective primary (and optionally secondary but not shown) parent activity trees might be presented as well. Icons 2556, 2555, and 2554 and connecting lines or other indicators might correspond to the primary parent activity tree, or path, indicated by the partially obscured presentation in FIG. 25A (at the intersection of row 2522 and column 2512). Also, if Max were to drag his pointer 2535 and hold it over ADO expression 2559, a popup box might be presented to indicate the long activity descriptor value "Obtain operator & equipment cost figures" 2553 for the given underlying ADO. If Max were to double-click his pointer on 2559, possibly other more detailed information about Adam's foyered activity description expression might be presented including some or all of the presentable field names that were described in the left-hand side of FIG. 23 (2301).

Returning to FIG. 22, we'll describe some of the other possible "View" 2202 menu commands that an ACMAN system may provide to a user such as Max. By clicking on "View My Activities" 2211, Max could cause his system to present only Max's owned (embedded) activity description expressions. 2212 and 2213 have already been described. Selecting option 2214 "Supervise Activities of (User x) . . . " might cause a popup window such as 2240 to be presented. By selecting another user name, such as "Harry", Max could cause Max's system to present the foyered activity description expressions of Harry's, which may be stored on Max's machine area. The resulting presentation might include Harry's activities whether or not they are common-idea-tied with any of Max's embedded ADOs. In other words, the resulting presentation might include foyered ADO expressions of Harry's for which Max has no correspondingly shared activity description. This mode of presentation would allow Max to monitor and/or supervise activity expressions of other users, to the extent that the other said users' machines have transmitted updates to Max's machine area. Menu options 2216 through 2218 have already been described. Selecting 2219 and 2220 might cause the ACMAN system to present back to previous views, or go forward, according to a possible stack of view instruction history that might be recorded in a transactions table (as in FIG. 3, 320). This go back or forward presentation function might be replicated by the buttons indicated by 618 in FIG. 6A. Menu option 2221 "Zoom . . . " might provide Max with a range of options for which to cause his system to automatically present a further magnified or de-magnified view of some portion or all of various ACMAN system presentations, including but not limited to 2400 of FIGS. 24A and 2500' of FIG. 25B. Menu items 2222 and 2223 have already been described. Menu item 2224 might cause Max's ACMAN system to present indications of activity-journal links, or extra-journal links, for instance as in FIG. 6D 631 between some or all presented and/or on-display activity description expressions in the activities area 610''', and their respectively extra-journal linked and presented and/or on-display journal data item expressions. In one embodiment, if 2224 is checkmarked to an on position but no activity description expressions or journal items are selected, then extra-journal link indications may be presented between each respectively presented and/or on-display activity description expression and journal item expression pairs for which extra-journal links have been recorded. Menu command options 2225 and 2226 ("Local Journal Data Items" and "Remote Journal Data Items" respectively) provide Max with the ability to instruct his machine to present any in a journal pane area, a possibly integrated combination of locally stored journal items (stored on Max's machine area) and externally stored journal items (stored on some external machine area not owned by Max, a web server, or other remote location not owned by Max). This was described earlier in the description of FIG. 9A, 914. But basically, presenting remote journal items might typically require an active coupling to a network or appropriate telecommunications system for which Max's ACMAN system could obtain the data to present. Also, option 2226 might only activate, in one embodiment, if Max had one or more activity description expressions selected, or some other indication, to indicate to Max's ACMAN system what network web forum or other online storage area should be referenced for presenting the appropriate journal item(s), if any. Finally, 2227 indicates that there might be other "View" 2202 menu options not shown or described herein.

FIG. 26 is a diagram showing a possible set of presented menu items, including a possible set of File management 2601, Search and Filtering 2604, and other Tools related items 2606 that a user may be able to select in order to cause his system to execute various instructions. Many other menu structures and variations are also possible. As one skilled in the art might recognize, it would be unusual for three top level menu structures ("File", "Search", and "Tools") to be selected and dropped down concurrently, as FIG. 26 could seem to indicate. Indeed, in practice, typically only one tree of menu structures might be dropped down at a given time, and this illustration is drawn with all three menu options dropped down concurrently just for the purpose of more concise illustration. (FIG. 27 will also be shown with two menu options dropped down concurrently, but similarly, that is also just for the purpose of more concise illustration.) A "File" menu option 2601 might include a sub-menu option to "Open . . . " 2611 a specific file, folder, and/or database including a user's machine area stored activity descriptions and/or journal data items, which might be embedded and/or foyered ones. For instance, Max could "Open . . . " and cause his ACMAN system to actively enable access to some or all of the recorded data that is included in FIG. 3 312. In one embodiment, a given person might have multiple ACMAN system user names, and the "Open . . . " option could be used to open for access more than one username's ACMAN system data, possibly even concurrently. The "Open" 2611 option could also allow a user, such as Max, to open an archived set of older activity descriptions and/or journal data items. "Close" 2612 could respectively close one or more user indicated files, folders and/or databases that had previously been opened. "Setup User Identity . . . " 2613 could be used to set a default user name identity in a machine installed ACMAN system, as well as, in one embodiment, to record for each user name setup in the machine installed ACMAN system, the machine area locations of files, folders or databases as described in the machine area of FIG. 3 312. By recording on an ACMAN system a default user name and associated default activities folder, journal folder, and other machine stored areas as illustrated in FIG. 3, 312, Max might be able to quickly startup his ACMAN software application, and then his relevant activities and journal items could automatically be appropriately presented immediately.

The "Archive" and "Save . . . " sub-menu option 2617 might provide Max with options to cause his machine to move specified activities and/or journal information, possibly according to some date ranges that Max might specify for archiving purposes, from his default machine area (FIG. 3 312) into one or more separate files, folders, and/or databases (FIG. 3 301). Note that in the embodiment shown, there is no "File" and "Save" menu option needed for Max to manually cause his ACMAN system to record Max's frequent ADO expression and/or JDI expression modifications to his machine area, because in that embodiment, the ACMAN system might periodically and automatically record (e.g. to some form of non-volatile storage) any such user modifications nearly immediately after each expression modification that Max causes through his machine user interface. The "Archive" and "Import . . . " sub-menu option 2618 might provide Max with a means to cause his system to copy archived stored activity and/or journal information into his user name default storage area 312 (FIG. 3), and/or possibly into another set of activity and/or journal files, folders, and/or databases. In so doing, Max could cause his machine to integrate archived ACMAN system data for one user name into the default ACMAN system data for another or the same user name, as desired. The "Print . . . " option 2616 might allow Max to cause his machine to print expressions of his machine area stored or otherwise stored data (including activity descriptions and/or journal items) onto a physically printed document, such as on paper, transparency, and/or to a postscript file, ".PDF" file, or otherwise. Print options could include a wide variety of options, but in principle, could provide Max with a means to transfer to printed matter expressions or portions of expressions as represented in 600 (FIG. 6A), 600' (FIG. 6B), 600" (FIG. 6C), 600'" (FIG. 6D), 2400 (FIG. 24A), 2400' (FIG. 24B), 2400" (FIG. 24C), 2500 (FIG. 25A), 2500' (FIG. 25B), 901 (FIG. 9A), the expressions within the screen border 1698 of FIG. 16B, and/or possibly any of the within-screen presentation areas of the figures in this disclosure. In addition, the print option might provide an option to provide user means to indicate and cause to print a filtered and/or sorted set of activity description expressions and correspondingly extra-journal linked journal item expressions, wherein the printed journal items are grouped by their respectively linked activity description expressions, and further sorted by their journal data item timestamp indicator(s). In such a way, Max could click his "Today's Priorities" 2442 (FIG. 24A), then select "Print . . . " 2614, and pick up from his printer a printed grouped listing of his top activity description expressions, each followed by the sorted, respective journal item expressions that are extra-journal linked to each such respective activity description expression. There might be other "File" 2601 sub-menu items 2615, not explicitly described here. Finally, the "Exit" option 2616 might cause Max's machine to close down and exit the ACMAN system application, and optionally to automatically record to Max's machine area any as of yet unrecorded ACMAN system related information.

The "Search" menu 2604 in one embodiment might include several sub-menu items, a portion of which are illustrated in FIG. 26. A "Selection-Filter" 2630 menu item might include several sub-menu items, such as "Create New . . . ", "Modify . . . ", and "Delete . . . " (2633, 2635, and 2634 respectively). Max's clicking on "Create new . . . " 2633 might cause his system to initiate the subroutine that clicking on button 2441 (FIG. 24A) might otherwise cause to execute, wherein Max can specify a set of search, filter, and/or sorting options to apply to his activity description and/or journal presentation panes. However, the "Create New . . . " 2633 option could also provide Max with a means to save these search, filter, and/or sort instructions as a predefined button, as in the examples of 2442, 2443, and 2444. The resulting predefined button settings might be recorded in machine area 317 of FIG. 3. "Modify . . . " 2635 might allow Max to select a predefined button (such as 2442 of FIG. 24A) and further modify and record to Max's machine area the predefined search, filter, and/or sort criteria of that button. "Delete . . . " might allow Max to select a predefined button and delete its stored button name and stored instructions and/or settings from Max's machine storage area 312 (FIG. 3).

The "Find . . . " menu option 2631 might provide Max with a means to cause his ACMAN system to find and present string-, string & wildcard-, other pattern-, and/or other translated pattern-matching activity descriptions or journal items within Max's on-display presentation. Such a find operation might also find matching item occurrences outside the on-display presentation but stored on Max's machine area, and/or even in an extra journal linked external journal item and/or web forum. In one embodiment, Max might enter in the "Find . . . " presented user interface, an expression "big car". Max's ACMAN system might translate this pattern into Spanish language ("auto grande"), and then find in Max's machine area or in Max's on-display presentation, occurrences of both or either of "big car" and "auto grande", and then present that data expression. In another possible example, Max might input handwritten scribble, Digital Ink, or other formats of digitally recorded handwriting, using a pointer or other means, and Max's ACMAN system might translate this pattern into ASCII text, or Unicode characters, or other structured character sets in order to then find and then present a matching pattern in Max's machine area, in Max's on-display presentation, and/or elsewhere. Max might instead choose to "Go To . . . " 2632 a certain date or date range of his journal presentation. By selecting this menu option, Max could cause his system to "Go To" and present at least a so-specified portion of his journal pane area (as in 620').

A possible "Tools" menu item 2606 might include several other possible sub-menu items. "Create & Register Custom Field . . . " 2650 might allow Max to create a custom ADO data structure attribute to suit his preferences. Then optionally, Max might be able to register that newly created attribute name and specification with a central service center so that other users participating with that central service might more easily be able to cause their ACMAN systems to share, present, and update respective activity description expressions with other users so as to support the data structure(s) of the custom attribute. This is described elsewhere in more detail. (See FIG. 12A 1256 and 1257.) Menu items "Create Extra-Journal Link", "Modify Extra-Journal Link . . . ", and "Remove Extra-Journal Links . . . " (2651, 2652, and 2653 respectively) might be tools to create, modify, and remove extra-journal links between activity descriptions and journal items. 2651 might provide Max with a dialogue box to indicate the items he wants to link, or if Max already has one or more activity description expressions and one or more journal item expressions selected concurrently, this menu option could cause Max's system to create appropriate links between the underlying ADOs and JDIs that are selected. In another embodiment of this menu item, selecting 2651 would change the mode of Max's pointer to enable a drag and link capability. Once the menu item is selected, Max can drag his mouse select one or to grab one or more selected activity description expressions, and drag this selection to one or more journal items in the journal pane area, thereby causing extra journal links to be created. 2652 might allow Max to cause his system to record modifications to presentation settings or other extra-journal link settings of a on-display and selected, or otherwise indicated extra journal link. 2653 might allow Max to cause his system to delete from storage within an ADO and/or its correspondingly linked JDI, a given extra-journal link indication. Possible menu items 2654 and 2655 might provide Max with means to cause his machine to record groupings or to delete grouping recordings of selected or indicated journal item expressions. This was described in FIG. 9A, 927, 916, FIG. 9B 909, and FIG. 10 1001*b*.

FIG. 27 is a diagram showing a possible set of presented menu items, including a possible set of Editing and Sharing related items, that a user may be able to select in order to cause his system to execute various instructions. The "Undo" and "Redo" (2711 and 2712 respectively) submenu options might provide means for Max to cause his machine to undo operations, or respectively redo undone operations, concerning modifications Max caused his machine to record on Max's machine area 312 (FIG. 3). As described in FIG. 3, a transactions table 320 might be recorded on Max's machine area to record a stack of recent modifications Max may have caused for instance to his activity descriptions (315), journal items (316), user profile (321), and/or other recorded items on his machine area (312). The "Undo" and "Redo" options might refer to this Transactions Table. The "Cut", "Copy", and "Paste" menu options (2713, 2714, and 2715 respectively) might provide Max with typical data manipulation capabilities regarding individually selected or groupwise selected on-display expressions, including activity description expressions, journal item expressions, or portions thereof, that are on-display. These possible operations (2713, 2714, and 2715) should be familiar to those skilled in the art. A "Paste Special . . . " 2716 option might be provided for Max to paste data items with special options, for instance, to paste a reference and/or hyperlink to an email or website or document, rather than the content of the selected and copied data items. Further, this 2716 could provide Max with a means to paste a language translation of some clipboard copied text, or possibly to paste a text translation of some clipboard copied digitally recorded handwriting. Menu option "New Activity" 2717 might include several sub-options for Max to cause his system to generate and record new activity descriptions.

In one embodiment, an ACMAN system may include a capability to warn a user, such as Max, if a newly entered activity description has a long activity descriptor field value that is identical to or similar to that of any current and/or completed activity description(s) stored on his machine area. Max might mistakenly try to record the same or a similar activity description into his activity plans, but it would only confuse his planning if he was to cause his system to record two very similar or overlapping instances of a possibly single actual activity idea. One way to detect such accidental duplication is for the ACMAN system to maintain a library of words, phrases, and/or expressions, together with an estimated word uniqueness rating. For instance, the words "call", "office", and "buy" might each have uniqueness ratings of 1 on a scale of 1 to 10—the word "call", the word "office", and the word "buy" might each be used very frequently and so have a low uniqueness rating. In contrast, the word "RJ-11" might have a high uniqueness rating of "10". In one embodiment, the ACMAN system could determine an aggregate uniqueness score for an ADO's long activity descriptor indication, and if that score is above a certain threshold value, it might alert Max and might possibly provide Max with a presentation of one or more activity description expressions that include some of the same words as the newly created activity description expression. Max could then review this to determine if his newly created activity is indeed redundant to other ongoing or completed activities. That aggregate uniqueness score might be computed as follows: Take the sum of the uniqueness ratings for the words of an ADO's long activity descriptor field expression divided by the number of words in that expression. For instance "Call office" might have an aggregate uniqueness score of $(1+1)/2=1$. On the other hand, "Buy RJ-11" might have a aggregate uniqueness score of $(1+10)/2=5.5$. If the threshold of aggregation uniqueness was set to "3", then the second ADO corresponding to "Buy RJ-11" would be reviewed by the ACMAN system. If in the machine area activities folder it found one or more other closely matching activity descriptions, the ACMAN system might automatically present Max with a brief warning. By closely matching, this might mean, find other ADO expressions wherein any words in their expressions match any of those in the newly created ADO, and sum up the uniqueness factors of the matching words within both respective expressions. If the sum is above a preset comparison threshold, then flag that for display to Max. For instance if an active other ADO expression indicated "call Ray about RJ-11", the matching word(s) versus "buy RJ-11" would be "RJ-11". The sum of matching words' aggregate uniqueness scores would be 10. If the matching threshold was 8, then the ACMAN system would flag Max regarding the possibly duplicate ADO corresponding to "call Ray about RJ-11", and might present this to Max to alert him to a possible duplicate activity that he or another user was already involved in. Max could then determine if he really does want to create the new ADO record corresponding to "buy RJ-11".

Returning back to the menu options of FIG. 27, Max might "Insert . . . " 2740 a new activity description in between an already recorded parent and child activity pair (as in FIG. 12A 1219). He might instead "Add . . . " 2741*a* new activity description below a selected activity description expression, as a child ADO (as in FIG. 12A 1227*a*). Or Max might "Create . . . " 2742 a new activity description and later determine how it might be related to his other activity description expressions. In one embodiment, if no primary parent ADO is identified by Max for a newly created ADO, then Max's root activity node is by default set as the primary parent for the newly created ADO.

There may also be several options for Max to "Modify Hierarchy of Selected Activity" 2720. For a selected Activity Description expression, Max can select "Insert as Child Under . . . " (2743), and this might cause Max's system to move and record the underlying selected ADO as the primary child of a second activity description expression that Max indicates. This might displace any previously recorded primary children of the second activity description expression to then become primary children of Max's initially selected ADO. By selecting option 2744 "Add as Child To . . . " Max might cause his system to move and record Max's selected activity description expression as a possibly added primary child to a second ADO that Max indicates, which could be an embedded or a foyered ADO. Max could instead choose "Remove Parent Relationships . . . " 2745. This might cause Max's system to delete certain specified primary, secondary, and or foyered parent ADO pointing references from the recorded instance of Max's currently selected ADO expression.

The next set of possible menu options are related to the journal presentation area and/or to journal data items. Option 2722 might allow Max to insert selected data, say a file, file reference, other reference or pointers, clipboard copied data, etc. into his journal area. Max might wish to directly edit in his journal, so he might select "Modify Journal" 2723 to make modifications and cause his machine to record those modifications on his machine area. Among the sub-options, Max might be able to "Edit Journal" 2746, possibly directly by using his mouse, microphone, digital camera, keyboard, and/or other input devices to make or modify recordings of journal items. Max might wish to "Merge" 2747 two or more selected journal items together to become one single JDI. Max might also cause his machine to "Split" 2748 a JDI into two or more separate JDIs. There may be several other 2724 "Edit" menu 2703 sub-options Max might be able to select in order to instruct his ACMAN system to execute specified instructions.

A possible "Sharing" menu item 2705 might provide Max with several activity description and optional journal item sharing capabilities. For instance, Max might select "Share Activities . . . " 2760. This might cause another popup window to appear (not shown) that might provide Max with several options, for instance to specify (if none of his activity expressions were already selected) what activity description(s) he wants to share, to what other user(s) (contact address/machine area) he wants to share them to, what type of sharing request to indicate, and/or what optional message Max may wish to provide. Once Max finishes specifying his preferences, his screen presentation may appear as inside 1697 (in FIG. 16A), and Max might then cause his system to transmit the derived activity description(s) and optionally the respectively derived and extra-journal linked journal item(s). Or he might just cause his system to hold the recorded information in a transmission queue for later transmission. If as in one embodiment, Max's system synchronizes (transmits and receives) shared activity descriptions and/or journal items on a pre-set interval, Max might pre-empt his transmitting system to immediately transmit and receive messages, by selecting "Synchronize Shared Activities" 2764.

Max might choose to cause his system to present to Max expressions of received activity descriptions and optional journal item expressions that he has not yet reviewed. Max could initiate this by selecting "Review Received Activities" 2761. Max might select one or more activity description expressions and decide he wants to accept involvement (e.g. according to the expressed sharing agreement request) in these one or more underlying activities. So he might select "Accept Received Activities . . . " 2762 and cause his system to embed derived copies of the activity descriptions and possible linked journal items into his embedded machine storage area(s) (315*a* and possibly 316*a* respectively in FIG. 3). Max may want to not accept or deny certain received activities, so he might select "Mark as Reviewed" to apply to any such received activities that Max may select. This might be particularly useful for an embodiment in which Max has supervisory privileges over a subordinate other user, and further in which that subordinate's machine transmits new supervisory shared derived activity description copies to Max. In one such embodiment, Max's system might flag each newly received activity description with an unrecognized common-idea-tying reference (e.g. CIER field) as unreviewed. Max might not have time or interest to review them all, so he might select one or more such expressions, and mark them as reviewed 2763. Max might also have an option to manage, including modify and/or read, his contacts listing (as in 319 and/or 332 of FIG. 3) by selecting possible option "Manage Contacts" 2765. Finally, there could be other "Sharing" sub-menu options available to Max that are not shown explicitly 2766 in this FIG. 27. There may also be other main menu headings that have not been shown (2707) in this figure as well.

The present disclosure is to be taken as illustrative rather than as limiting the scope, nature, or spirit of the subject matter claimed below. Numerous modifications and variations will become apparent to those skilled in the art after studying the disclosure, including use of equivalent functional and/or structural substitutes for elements described herein, use of equivalent functional couplings for couplings described herein, and/or use of equivalent functional steps for steps described herein. Such insubstantial variations are to be considered within the scope of what is contemplated here. Moreover, if plural examples are given for specific means, or steps, and extrapolation between and/or beyond such given examples is obvious in view of the present disclosure, then the disclosure is to be deemed as effectively disclosing and thus covering at least such extrapolations.

It is understood that the methods described herein can include use of a computer or another data processing machine to automatically and/or programmably carry out the functions described herein. A computer-readable medium or another form of a software product or machine-instructing means (including but not limited to, a hard disk, a compact disk, a flash memory stick, a downloading of manufactured instructing signals over a network and/or like software products) may be used for instructing an instructable machine to carry out such functions in accordance with the disclosure and to transmit and/or receive corresponding, manufactured data signals.

As such, it is within the scope of the disclosure to have an instructable machine carry out, and/to provide a software product adapted for causing an instructable machine to carry out a machine-implemented methods in accordance with the disclosure.

Secondary Summary

An Introductory Summary was provided at the beginning of this disclosure. In view of the extensive detailed description and detailed drawings provided, it may be worthwhile to provide here, a secondary summary which reviews and/or supplements the details in a nonlimiting manner as follows. (Note in the following, secondary summary, that bolded curly brackets embracing reference symbols, such as in the form {100}, may be used to provide nonlimiting, cross-referencing examples of support. The cross-references do not limit the scope of disclosure herein or the scope of subject matter that may be claimed herein or in continuations or divisionals.)

The aspects disclosed herein include: (as Sum2.1):

A manufactured instructing signal {**105*b*} for causing an instructable machine {120**} to carry out an activity description generating process, where the process caused by said instructing signal includes a recording of activity-describing data (AD data) where each respectively recorded instance of AD data comprises:

(a) one or both of a short activity descriptor field {1234} for providing a relatively short and/or abbreviated description of a corresponding activity of the instant AD data {ADO}, and a long activity descriptor field {1233} for providing a comparatively longer and/or more detailed description of the corresponding activity of the instant AD data;

(c) an AD owner and/or telecommunications contact address identifying field {1224} for identifying an owner-user and/or telecommunications contact address of said owner-user who has ownership and modification rights over the instant AD data for creating and/or modifying at least said short activity descriptor field and/or long activity descriptor field of the instant AD data; and (d) a uniqueness providing field {1222} for use alone or in combination with said AD owner and/or telecommunications contact address identifying field for providing the instant AD data with a unique identification so as to make the instant AD data uniquely identifiable respectively among other AD data owned by said owner-user of the instant AD data and/or among other AD data owned by a specifiable pool of other users with whom the owner-user of the instant AD data is sharing or may be sharing activity idea information.

The aspects disclosed herein further include (as Sum2.2):

A first data processing machine {120} that is couplable to and decouplable from {291} one or more communications networks {**115*c*} and that is usable by a first user {101} belonging to an expandable group of users {402-404} such that the first user can develop {550} expressions of ideas for one or more activities {410} and/or can organize {551} activity idea expressions relative to one another and/or can refine and/or reorganize {561} expressions of ideas for one or more activities and can share {567} selectable ones of the expressed and organized activity ideas with a selectable one or more other users of said expandable group of users by way of said data processing machine and by way of alike other data processing machines which are usable by the one or more other users, said first data processing machine {120**} comprising:

(a) a first storage area {312} that stores first data representing activity idea expressions owned by the first user, where the owned activity idea expressions are modifiable by the first user;

(b) a second storage area {316} that stores second data representing activity development and/or activity support data that can logically link to one or more of the owned activity idea expressions of the first user, where logical links between selectable portions of said second data and selectable parts of the first data can be created, modified or deleted by the first user;

(c) first idea sharing means for transmitting derived copies {**1260*a*} of outbound-intended ones of the activity idea expressions stored in the first storage area and owned by the first user to a selectable one or more of the other users of said expandable group if said first data processing machine {120} is coupled to an operable communications network that can provide communication to corresponding and alike machines of one or more of the selectable one or more other users; and (d) second idea sharing means for receiving inbound expression copies {1217*a*} derived from activity idea expressions owned by one or more of the other users if said first data processing machine {120**} is coupled to an operable communications network that provides communication from corresponding and alike machines of one or more of the other users.

The aspects disclosed herein further include (as subsidiary Sum2.2a): The first data processing machine {120} of Sum2.2 wherein said first data processing machine is a portable machine that can operate at various times including when mobile and when operatively decoupled from one or more or all of the communications networks to which said data processing machine is decouplably couplable to.

The aspects disclosed herein further include (Sum2.2b):

The first data processing machine {120} of Sum2.2 and further comprising:

(e) expression-support linking means {871} for enabling the first user to create and/or modify and/or delete logical links {**928*a*} between selectable portions {928*d*} of said second data and selectable parts of the first data {1220, 1228**}.

The aspects disclosed herein further include (Sum2.2c):

The first data processing machine {120} of Sum2.2 wherein:

(a.1) said first data of the first storage area {312} comprises a plurality of hierarchically-organized activity data objects (ADO's) {1220} where each given ADO in the first storage area includes at least:

(a.1a) first ADO information {1233-1234} for providing an expression of a corresponding activity covered by the given ADO;

(a.1b) second ADO information {1236,1238} for providing hierarchical primary linkage between the given ADO and either another ADO in the first storage area or a root node, if any; and (a.1c) third ADO information {1232} for providing an indication of a time when the given ADO was either created or last modified by the first user.

The aspects disclosed herein further include (Sum2.2d):

The first data processing machine {120} of Sum2.2 and further comprising:

(e) support-data insertion means {930} for enabling the first user to insert support and/or development data into the second storage area.

The aspects disclosed herein further include (Sum2.2e):

The first data processing machine {120} of Sum2.2 and further comprising:

(e) a third storage area {**315*b***} that stores third data representing activity idea expressions owned by one or more of the other users, where the activity idea expressions of the third storage area are updateable in response to update messages received from the corresponding one or more other users;

(f) alternate expression-presenting means {261,101"} for presenting to the first user the activity idea expressions {102c'} of one or more of the other users.

The aspects disclosed herein further include (as Sum2.3):

A system for creating shareable activity plans {551} comprising:

(a) formal expression means {565} for generating and storing first activity descriptions as hierarchically interrelated first data objects {1200};

(b) informal expression means {568} for collecting and storing first data items {921} in a format other than that used for the hierarchically interrelated first data objects;

(c) first expression linking means {916} for generating first logical links {928a,871} between selectable ones of the stored first data objects {871b,872b} and a corresponding one {823} or more of the stored first data items;

(d) presentation means {600} for presenting to a first user {101}, a first presentation {610} of two or more, first selectable expressions of said stored first data objects and for simultaneously presenting to the user a second presentation {620} of two or more, second selectable expressions of said stored first data items, the presentation means including:

(d.1) linkage visibility controlling means {2224} for selectably enabling and disabling visibility attributes of one or more of said first logical links such that corresponding expressions of said first logical links become visible or invisible in one or both of the first and second presentation {610, 620}; and (e) transmitting means {567, 2760, 2764} for allowing the first user to select desired ones of the stored first data objects and/or desired ones of the stored first data items and to transmit to a second user {102} copies of the stored and selected first data objects and/or stored and selected first data items.

The aspects disclosed herein further include (as Sum2.3a):

The activity plans sharing system of Sum2.3 and further comprising:

(f) receiving means {568, 2764} for allowing the first user to receive from one or more other users, copies of corresponding second data objects and/or second data items; and further wherein:

(d.1) the presentation means includes preview means {1651, 2761} for presenting to the first user, a third presentation {1651} of two or more, second selectable expressions of second data objects received by the receiving means and for simultaneously presenting to the first user a fourth presentation {1661} of two or more, third selectable expressions of second data items received by the receiving means.

The aspects disclosed herein further include (Sum2.3b):

The activity plans sharing system of Sum2.3a and further comprising:

(g) integrating means {2762} for allowing the first user to integrate into his own collections of said stored first data objects and/or stored first data items, respective copies {1635} of the second data objects received by the receiving means and/or respective copies {1624"} of the second data items received by the receiving means.

The aspects disclosed herein further include (Sum2.3c):

The activity plans sharing system of Sum2.3a and further wherein:

(g) the third respective, derived activity description copies contain the same CIER indication as is indicated by the CIER field {1222} of the said second activity data object.

The aspects disclosed herein further include (Sum2.3d):

The activity plans sharing system of Sum2.3a and further comprising:

(g) second expression linking means {916, 2654} for generating second logical links {927} between selectable ones of the stored first data items.

The aspects disclosed herein further include (Sum2.3e):

The activity plans sharing system of Sum2.3a and further comprising:

(e) second expression linking means {876} for generating second logical links {876} between selectable ones of the stored first data objects {871b,872b}, where said second logical links include primary parent-child links and secondary parent-child links; and further wherein:

(d.1) the presentation means includes linkage visibility controlling means {2224} for selectably enabling and disabling visibility attributes {631} of one or more of said second logical links such that corresponding expressions of said second logical links become visible or invisible in the first presentation {610}.

The aspects disclosed herein further include (Sum2.3f):

The activity plans sharing system of Sum2.3 wherein:

(b.1) said informal expression means {568} includes one or more of:

(b.1a) text inputting means {921,940,930} for generating text-containing ones of the first data items {921};

(b.1b) sound inputting means {931} for generating sound-containing ones of the first data items;

(b.1c) graphics inputting means {941a} for generating graphic-imagery-containing ones of the first data items;

(b.1d) email inputting means {960} for converting received email data into corresponding email data containing ones of the first data items;

(b.1e) language translating means {950} for converting first expressions provided in a first language to corresponding second expressions provided in a different second language and for storing the second, language-translated, expressions within the first data items;

(b.1f) format translating means {955} for converting first expressions provided in a first format to corresponding second expressions provided in a different second format and for storing the second, format-translated, expressions within the first data items; and (b.1g) an automated data acquisition agent {970} for automatically searching through data provided by remote data-providing means and for storing query-matching parts of the automatically searched through data within the first data items.

The aspects disclosed herein further include (Sum2.3 g):

The activity plans sharing system of Sum2.3 and further comprising:

(e) sharing proposal means {567, 1260a} for transmitting in conjunction with the transmitted copies of the stored and selected first data objects, development and/or deployment proposals corresponding to respective ones of the transmitted copies of the stored and selected first data objects.

The aspects disclosed herein further include (Sum2.3h):

The activity plans sharing system of Sum2.3 g and further comprising:

(f) sharing progress tracking means {569,1260d} for providing the first user with information from those of said other users who respond indicating whether the responding other users have accepted the transmitted development and/or deployment proposals corresponding to respective ones of the transmitted copies of the stored and selected first data objects.

The aspects disclosed herein further include (Sum2.3i):

The activity plans sharing system of Sum2.3h and further wherein:

(f.1) the sharing progress tracking means {569,1260d} includes progress updating means {1800} for providing the first user with updated information concerning how the responding other users have modified or further developed corresponding data objects derived from the transmitted copies of the stored and selected first data objects.

The aspects disclosed herein further include (as Sum2.4):

A machine-implemented method {600"} of cross-referencing expressions relating to activity plans defined within a machine area {312} of a given user, the cross-referencing method comprising:

(a) displaying a plurality of formalized activity descriptions {610"};

(b) displaying a plurality of informal journal items {620"}; and (c) displaying an indication of logical linkage {635} between at least one on-display member and another member of the cross-linkable group consisting of the displayed activity descriptions and the displayed journal items, where the displayed indication is other than that of a common linkage between all members of said cross-linkable group.

The aspects disclosed herein further include (Sum2.4a):

The machine-implemented cross-referencing method {600"} of Sum2.4 and further comprising:

(d) creating a logical linkage {635} between at least two on-display members of the cross-linkable group by dragging a cursor between a selected first of the at least two on-display members and a second of the at least two on-display members of the cross-linkable group.

The aspects disclosed herein further include (Sum2.4b):

The machine-implemented cross-referencing method {600"} of Sum2.4 and further wherein:

(a.1) one or more of the displayed, formalized activity descriptions is each represented by a recorded and corresponding activity data object (ADO) and the ADO includes:

(a.1a) first ADO information {1233-1234} for providing an expression of a corresponding activity covered by the given ADO;

(a.1b) second ADO information {1236, 1238} for providing hierarchical primary linkage between the given ADO and either another ADO in the first storage area or a root node, if any;

(a.1c) third ADO information {1232} for providing an indication of a time when the given ADO was either created or last modified by the first user.

The aspects disclosed herein further include (Sum2.4c):

The machine-implemented cross-referencing method {600"} of Sum2.4 and further wherein:

(b.1) one or more of the displayed, journal items is each represented by a recorded and corresponding journal data item (JDI) and the corresponding JDI includes:

(b.1a) first JDI information {621} for providing a journaling timestamp indicating when data of the corresponding journal item was first recorded into the machine area of the given user; and (b.1b) second JDI information comprising at least one of:

(b.1b1) text data {921} input by a user who is indicated within the machine area as owning said formalized activity descriptions;

(b.1b2) a hyperlink {924};

(b.1b3) digitized audio data {911};

(b.1b4) automatically transcribed audio information {930};

(b.1b5) graphic data {941*a*}; and (b.1b6) data downloaded from a network.

The aspects disclosed herein further include (as Sum2.5):

A user interface driving system {240} for presenting representations of activities to a respective user {101'}, the interface driving system comprising:

(a) a machine-implemented first presenter {246} which presents a first presentation {115'} of a hierarchical data structure {251} representing organized activities {101*a*-101*b*} and (b) a machine-implemented second presenter {247} which can simultaneously present a second presentation {117'} of relatively unorganized data items {252*a*} which may be grouped {927} with one another and/or which may be linked {928*a*, 1228} with one or more of said represented organized activities {1220].

The aspects disclosed herein further include (Sum2.5a):

The user interface driving system {240} of Sum2.5 wherein the second presentation {117} is simultaneously displayed in a same display area {111} as is the first presentation {115}.

The aspects disclosed herein further include (Sum2.5b):

The user interface driving system {240} of Sum2.5 wherein:

(a.1) the first presentation {116} includes a spreadsheet presentation of attributes of the organized activities or a graphical display of attributes of the organized activities; and (b.1) the second presentation {117} includes a chronologically sorted presentation of journal data items where the journal area may have items not linked to any activity data objects; or includes a journal area that has one or more items such that each may be linked to one or more than one different activity data objects; or includes a journal area that has more than one item linked to the same activity data object, and of these journal data items, one or more may also be linked to a different activity data object.

The integrated presentation area may display or otherwise present indicia of many to many links {635} between journal data items and ADOs.

The aspects disclosed herein further include (Sum2.5c):

The user interface driving system {240} of Sum2.5 and further comprising:

(c) linkage modifying means {248}, operatively coupled to storage {258} for the hierarchical data structure for allowing a user to create and/or modify links between one or more of said represented organized activities and to create and/or modify links between each unorganized data item and one or more of said represented organized activities.

The aspects disclosed herein further include (Sum2.5d):

The user interface driving system {240} of Sum2.5c and further comprising:

(d) linkage displaying means {631} for displaying linkage indicia showing the created and/or modified links between the one or more of said represented organized activities and showing the created and/or modified links between each unorganized data item and its respective one or more of said represented organized activities to which it is linked.

The aspects disclosed herein further include (as Sum2.6):

An integrated activities planning display {111'} which simultaneously displays:

(a) first indicia {115} representing organized activity data objects; and (b) second indicia {117} representing journal data items.

The aspects disclosed herein further include (Sum2.6a):

The integrated activities planning display {111'} of Sum2.6 wherein:

(a.1) the displayed first indicia {115} are filtered by first display selecting criteria that includes specification of journal data items to which the displayed first indicia are logically linked; and (b.1) the displayed second indicia {117} are filtered by second display selecting criteria that includes specification of Activity Data Objects to which the displayed second indicia are logically linked.

The aspects disclosed herein further include (as Sum2.7):

An integrated journal presentation {620"} that shows links {635*a*} to structured Activity Data Objects in a structured activity data object presentation; wherein JDIs can be created without links {624"}, and at any time later those same JDIs may be linked to one or more ADO's. Stated otherwise, there may be provided: A storage and presentation system {105} for presenting to a user, expressions of journaled data items {117} and/or of hierarchically organized activity descriptions {116} wherein the storage and presentation system comprises:

(a) journaling means {900} for recording in a user's journal area {316}, journal data items {921} obtained from a plurality of sources {931,960} and/or generated locally by local data-generating means {921,940}, wherein the journaling means includes:

(a.1) intra-journal linking means {927} for recording first logical links between two or more of the recorded journal data items;

(b) activity description recording means {1220*a*} for recording in an activity descriptions holding area {315}, of the user, hierarchically organizable activity descriptions [ADO's], wherein the activity description recording means includes:

(b.1) extra-journal linking means for recording second logical links {1211} between the recorded activity descriptions and the recorded journal data items; and (c) expressing means {600} for presenting to the user within an integrated presentation, expressions of one or more of the recorded journal data items and of the recorded activity descriptions, including optional expressions {635*a*,872} of one or more of the first and second logical links.

The aspects disclosed herein further include (Sum2.7a):

The storage and presentation system {105} of Sum2.7 wherein:

(a.2) said journaling means includes time-stamping means {926} for automatically attaching time stamps to journaled data items indicating when the journaled data items were recorded in the user's journal area; and (c.1) at least one presentation by the expressing means of the user's journaled data items is chronologically sortable according to said attached time stamps.

The aspects disclosed herein further include (Sum2.7b):

There is provided a Journal that can sort displayed JDIs based on chronological order of JDI timestamps {621} and be filtered based on a string search, based on one or more ADO selections {605, 620}, or based on both a string search combined with one or more ADO selections.

Stated otherwise, there may be provided:

The storage and presentation system {105} of Sum2.7 wherein:

(c.1) said expressing means {600} includes sorting and/or filtering means {627,617} for selectively presenting to the user in the integrated presentation, selectively sorted and/or selectively chosen ones of the expressions of the one or more of the recorded journal data items and of the recorded activity descriptions.

The aspects disclosed herein further include (Sum2.7c):

The storage and presentation system {105} of Sum2.7b wherein:

(c.2) said sorting and/or filtering means includes a string-based filtering means for causing the selectively chosen ones of said expressions to include expressions whose underlying recorded journal data items and/or recorded activity descriptions contain respective data and/or attributes satisfying one or more string search criteria.

The aspects disclosed herein further include (Sum2.7d):

The storage and presentation system {105} of Sum2.7b wherein:

(c.2) said sorting and/or filtering means includes an attributes-based filtering means for causing the selectively chosen ones of said expressions to include expressions whose underlying recorded journal data items and/or recorded activity descriptions contain attributes satisfying one or more attribute state criteria.

The aspects disclosed herein further include (Sum2.7e):

The storage and presentation system {105} of Sum2.7b wherein:

(c.2) said sorting and/or filtering means includes an attributes-based sorting means for causing the selectively sorted ones of said expressions to be presented according to a prespecified sorting based on one or more attributes of the underlying recorded journal data items and/or recorded activity descriptions.

The aspects disclosed herein further include (Sum2.7f):

There is provided the option of selecting a parent ADO and by that action implicitly selecting its child ADOs and filtering the journal to display only the JDIs linked to any of these selected ADOs {605};

Stated otherwise, there may be provided:

The storage and presentation system {105} of Sum2.7b wherein said activity descriptions are hierarchically organized at least as parent nodes and corresponding child nodes of a hierarchical tree, and further wherein:

(c.2) said sorting and/or filtering means includes a progeny-selecting means for causing an automatic selection of children activity descriptions and/or of further progeny activity descriptions of a chosen one or more of said presented expressions of underlying recorded activity descriptions.

The aspects disclosed herein further include (Sum2.7g):

The storage and presentation system {105} of Sum2.7 wherein:

said parent nodes and corresponding child nodes define at least respective primary parent nodes and primary child nodes where each primary child node has only one primary parent node as its respective primary parent and where each primary parent node can have none, or one or more of the primary child nodes as its respective primary children; and further wherein:

(b.2) said recorded activity descriptions include a plurality of activity data objects (ADO's) where each given ADO comprises:

(b.2a) at least one of a short activity descriptor field {1234} and long activity descriptor field {1233} for respectively providing a relatively short description and a comparatively longer and/or more detailed description of a corresponding activity of the given ADO;

(b.2b) an ADO owner identifying field {1224} for identifying an owner-user who has ownership and modification rights over the given ADO for creating and/or modifying at least said short description and/or comparatively longer and/or more detailed description of the corresponding activity of the given ADO;

(b.2c) a primary parent identifying field {1236} for identifying the one primary parent ADO of the given ADO unless the given ADO defines a root node of its corresponding, primary hierarchical tree;

(b.2d) one or more primary children identifying fields {1238} for identifying, alone or in combination, the one or more primary child ADO's, if any, of the given ADO; and (b.2e) one or more ADO naming fields {1221,1231} which, alone or in combination, uniquely identify the given ADO from amongst all other ADO's owned by said owner-user.

The aspects disclosed herein further include (Sum2.7h):

The storage and presentation system {105} of Sum2.7 g wherein:

said parent nodes and corresponding child nodes can further define respective secondary parent nodes and secondary child nodes where each secondary child node can have more than one activity node as its respective secondary parents, where each secondary parent node can have none, or one or more activity nodes as its respective secondary children, where same activity nodes can each function as both a primary child node and a secondary child and/or secondary parent node; and further wherein:

(b.2') each given ADO comprises:

(b.2f) one or more secondary children identifying fields {1239} for identifying, alone or in combination, the one or more secondary child ADO's, if any, of the given ADO; and (b.2g) one or more secondary parent identifying fields {1237} for identifying, alone or in combination, the one or more secondary parent ADO's, if any, of the given ADO.

The aspects disclosed herein further include (Sum2.7i):

The storage and presentation system {105} of Sum2.7 g and further wherein each given ADO comprises:

(b.2f) an owner-user contacting field {1224} for indicating a telecommunications contact address at which the owner-user may be telecommunications-wise contacted with regard to the given ADO. (Note that "telecommunications-wise" is intended to cover optical or quantum interference communication options as well as electronic, etc.)

The aspects disclosed herein further include (Sum2.7j):

The storage and presentation system {105} of Sum2.7g and further wherein each given ADO comprises:

(b.2f) an original activity idea identifying field {1222} for identifying an original activity idea expression for which the given ADO has been correspondingly created.

The aspects disclosed herein further include (Sum2.7k):

The storage and presentation system {105} of Sum2.7j wherein:

(c.3) said sorting and/or filtering means includes progeny-presenting means for presenting expressions of said automatically selected children activity descriptions and/or further progeny activity descriptions.

The aspects disclosed herein further include (Sum2.7l):

The storage and presentation system {105} of Sum2.7 wherein: (c.2) said sorting and/or filtering means includes first presentation-based filtering means for presenting in said integrated presentation the expressions of only underlying recorded journal data items that are logically linked to presented expressions of underlying recorded activity descriptions.

The aspects disclosed herein further include (Sum2.7m):

The storage and presentation system {105} of Sum2.7 wherein: (c.2) said sorting and/or filtering means includes second presentation-based filtering means for presenting in said integrated presentation the expressions of only underlying recorded activity descriptions that are logically linked to presented expressions of underlying recorded journal data items.

The aspects disclosed herein further include (Sum2.7n):

The situation where the filtered journal displays only the JDIs linked to any of these selected ADOs plus any JDIs that are not linked but are grouped with any of the linked ADOs {927}.

The aspects disclosed herein further include (Sum2.7o):

The storage and presentation system {105} of Sum2.7 wherein: (c.2) said sorting and/or filtering means includes third presentation-based filtering means for presenting in said integrated presentation the expressions of underlying first recorded journal data items {923} that are logically linked {928*b*} to in-presentation expressions of underlying recorded activity descriptions and for further presenting in said integrated presentation the expressions of underlying second recorded journal data items {922} that are logically linked {927} to the in-presentation expressions of the first recorded journal data items.

The aspects disclosed herein further include (Sum2.7p):

The providing of one or more buttons on the same presentation as the ADOs {618, 618*a*, 618*b*} that can be preset to filter the ADOs and optionally to sort them and optionally to set the journal as filtered/unfiltered with a single user mouse click or command.

The aspects disclosed herein further include (Sum2.7q):

The storage and presentation system {105} of Sum2.7 wherein: (c.1) said expressing means {600} provides expression-format control means {618-618*b*,850-858} within an area {800} of the integrated presentation for defining presentation formats of one or more of the presented expressions, if any, of the one or more of the recorded journal data items and/or the recorded activity descriptions and/or the expressions {635*a*, 872} of one or more of the first and second logical links.

The aspects disclosed herein further include (Sum2.7r):

The storage and presentation system {105} of Sum2.7q wherein: (c.2) said expression-format control means includes one or more, predefined sorting and/or filtering tools {617} for providing single-click or single-other-user-activation of a predefined combination of one or more of predefined presentation sorting and/or presentation filtering operations for thereby determining which expressions of respective recorded journal data items and/or recorded activity descriptions will be on-display, and if so, in what presentation order or other presentation organization relative to one another.

The aspects disclosed herein further include (Sum2.7s):

The providing of programmable settings for these buttons so they can provide an automatically filtering query using wildcards or any other means of data comparing (whether text, audio, image comparing).

The aspects disclosed herein further include (Sum2.7t):

The storage and presentation system {105} of Sum2.7r wherein: (c.3) one or more of said predefined sorting and/or filtering tools {617} provide wildcard searching capabilities for sorting and/or filtering according respective sort and filter criteria that include wildcard symbols.

The aspects disclosed herein further include (Sum2.7u):

The storage and presentation system {105} of Sum2.7r wherein: (c.3) one or more of said predefined sorting and/or filtering tools {617} provide data comparing capabilities for detecting specified similarities or differences between same-type data where the same-type data can include, but are not limited to, text-containing data types, sound-containing data types, and graphic image-containing data types.

The aspects disclosed herein further include (Sum2.7v):

The storage and presentation system {105} of Sum2.7r wherein (c.3) programmable settings are provided for these buttons such that one or more of the query (button) functions can be responsive to a Boolean sum of products expression for satisfying its conditions, (e.g. (condition A and condition B) or (condition C and not condition D)) {617}.

The aspects disclosed herein further include (Sum2.7w):

The storage and presentation system {105} of Sum2.7r wherein (c.3) one or more of said predefined sorting and/or filtering tools {617} provide data identifying capabilities for detecting data satisfying predefined, Boolean sum of products conditions or equivalents thereof.

The aspects disclosed herein further include (Sum2.7x):

The providing of programmable capabilities such that Activity Data Objects can be selectively displayed in spreadsheet mode {610} or in graphical mode {810} and such that editing, inserting, deleting, or otherwise modifying an ADO in one presentation mode can be reflected conversely when viewed in the other mode.

The aspects disclosed herein further include (Sum2.7y):

The storage and presentation system {105} of Sum2.7 wherein (c.1) said expressing means {600} includes presentation format control means for causing one or more of said expressions of the one or more of the recorded activity descriptions to selectively appear in tabular form or in graphical-icons form.

The aspects disclosed herein further include (Sum2.7z):

The storage and presentation system {105} of Sum2.7y wherein:

(c.1a) a user selectable tabular form for the presentation of the one or more recorded activity descriptions includes a spreadsheet presentation {610} wherein the spreadsheet presentation provides:

(c.1a1) a hierarchy path indication {611} indicating a position in a hierarchical tree where a corresponding node for a corresponding, given activity description resides; and (c.1a2) an activity description presentation {616} that provides at least part of a short or long description for the given activity that is being represented by the given activity description.

The aspects disclosed herein further include (Sum2.7aa):

The storage and presentation system {105} of Sum2.7z wherein:

(c.1b) a user selectable graphical-icons form for the presentation of the one or more recorded activity descriptions includes a graphical node and branches presentation {810} wherein the graphical node and branches presentation provides:

(c.1b1) a hierarchy path indication {876} indicating a position in one or more primary trees or other hierarchical branches where a corresponding node for a corresponding, given activity description resides; and (c.1b2) an activity description presentation {**871*b***} that provides graphical icons representing respective activity nodes, and that further provides, adjacent to or within the respective graphical icons of respective activity nodes, at least part of a short or long description for the given activity that is being represented by the given activity description.

The aspects disclosed herein further include (Sum2.7ab):

The storage and presentation system {105} of Sum2.7aa wherein:

(c.1b3) said provided graphical icons that represent respective activity nodes can be selectively presented with different ones of the icon attributes group consisting of: shape {874vs.878}, size, color, boundary texturing, fill texturing, boundary dashing, boundary thickness, and flash pattern.

The aspects disclosed herein further include (as Sum2.8):

The Storing of a shortened activity description {1234} in addition to a storing in the same ADO of a longer activity description {1233} in order to more easily display icons {873} in graphical mode or to display the hierarchy path conveniently {611} in the text hierarchy tree.

The aspects disclosed herein further include (as Sum2.9):

The production, transmission and/or use of a manufactured signal {1220} for defining a given one of a plurality of activity data objects (ADO's), where the given ADO is organizable to define a respective activity node in a hierarchical tree containing parent activity nodes and corresponding child activity nodes that are defined by further and alike ADO's, the manufactured signal for the given ADO comprising:

(a) a short activity descriptor field {1234} for providing a relatively short and/or abbreviated description of a corresponding activity of the given ADO;

(b) a long activity descriptor field {1233} for providing a comparatively longer and/or more detailed description of the corresponding activity of the given ADO;

(c) an ADO owner identifying field {1224} for identifying an owner-user who has ownership and modification rights over the given ADO for creating and/or modifying at least said short activity descriptor field and long activity descriptor field of the given ADO;

(d) a first parent identifying field {1236} for identifying a corresponding first parent ADO that serves in a respective first hierarchical tree as a parent of the given ADO;

(e) one or more first children identifying fields {1238} for identifying, alone or in combination, one or more first child ADO's, if any within the first hierarchical tree, of the given ADO; and (f) one or more ADO naming fields {1221,1231} which, alone or in combination, uniquely identify the given ADO from amongst all other ADO's owned by said owner-user and embedded in the first hierarchical tree.

The aspects disclosed herein further include (Sum2.9a):

The provision of the manufactured signal {1220} of Sum2.9 and in further combination with a machine system {110} that automatically fills in at least part of the long activity descriptor field {1233} using data obtained from the short activity descriptor field {1234}.

The aspects disclosed herein further include (Sum2.9b):

The provision of the manufactured signal {1220} of Sum2.9 and in further combination with a machine system that automatically fills in at least part of the short activity descriptor field using data obtained from the long activity descriptor field.

The aspects disclosed herein further include (Sum2.9c):

The provision of a combination of the machine system {110} and manufactured signal {1220} of Sum2.9b wherein said machine system includes:

a machine-readable, short-to-long cross referencing dictionary {263} for converting between predefined, short descriptors that are usable in the short activity descriptor field and predefined, comparatively longer descriptors that are usable in the long activity descriptor field. The combination of the machine system {110} and manufactured signal {1220} of Sum2.9b may further be provided wherein:

said cross referencing dictionary {263} provides cross referencing translations between predefined first terms used by said owner-user {101} and predefined second terms used by one or more other users.

The aspects disclosed herein further include (Sum2.9d):

The provision of the manufactured signal {1220} of Sum2.9 and further wherein:

(d.1) said first hierarchical tree defines a primary hierarchical tree whose activity nodes comprise respective primary parent nodes and primary child nodes where each primary child node has only one primary parent node as its respective primary parent and where each primary parent node can have none, or one or more of the primary child nodes as its respective primary children; and further wherein:

said first parent identifying field {1236} identifies the one primary parent ADO of the given ADO unless the given ADO defines a root node of its corresponding, primary hierarchical tree; and (e.1) said one or more first children identifying fields {1238} identify the one or more primary child ADO's, if any, of the given ADO.

The aspects disclosed herein further include (Sum2.9e):

The provision of the manufactured signal {1220} of Sum2.9 and further wherein: the activity node represented by said given ADO can simultaneously serve as a secondary node in a secondary hierarchical branch having further secondary activity nodes and where said manufactured signal further comprises:

(g) one or more secondary children identifying fields {1239} for identifying, alone or in combination, one or more secondary child ADO's, if any, of the given ADO.

The aspects disclosed herein further include (Sum2.9f):

The provision of the manufactured signal {1220} of Sum2.9e and further wherein the manufactured signal further comprises:

(h) one or more secondary parent identifying fields {1237} for identifying, alone or in combination, one or more secondary parent ADO's, if any, of the given ADO.

The aspects disclosed herein further include (Sum2.9g):

The provision of the manufactured signal {1220} of Sum2.9 and further wherein the manufactured signal comprises:

(g) an owner-user contacting field {1224} for indicating a telecommunications contact address at which the owner-user may be telecommunications-wise contacted with regard to the given ADO.

The aspects disclosed herein further include (Sum2.9h):

The provision of the manufactured signal {1220} of Sum2.9 and further wherein the manufactured signal comprises:

(g) an original activity idea identifying field {1222} for identifying an original activity idea expression for which the given ADO has been correspondingly created or is logically tied to.

The aspects disclosed herein further include (Sum2.9i):

The provision of the manufactured signal {1220} of Sum2.9 and further wherein the manufactured signal comprises:

(g) an originator of original activity idea identifying field {1223} for identifying an originator of an activity idea expression for which the given ADO has been correspondingly created or is logically tied to.

The aspects disclosed herein further include (Sum2.9j):

The provision of the manufactured signal {1220} of Sum2.9i and further wherein: (g.1) said originator of original activity idea identifying field {1223} includes originator contact information for indicating a telecommunications contact address at which the originator may be telecommunications-wise contacted with regard to the given ADO.

The aspects disclosed herein further include (Sum2.9 k):

The provision of the manufactured signal {1220} of Sum2.9 and further wherein the manufactured signal comprises:

(g) an embedded tree identifying field {1225} for identifying a hierarchical tree having an activity node embedded therein, where the embedded activity node is represented by said given ADO.

The aspects disclosed herein further include (Sum2.9l):

The provision of the manufactured signal {1220} of Sum2.9 and further wherein the manufactured signal comprises: (g) a last synchronization identifying field {1232} for identifying a most recent synchronization event where update data regarding the state of the given ADO was produced for sending to machine areas of one or more other users. (Note: in some machines, transmit data may be posted and/or accumulated into a thread and the thread may be activated at a later time for causing transmission. Accordingly, update data may be produced for later sending.)

The aspects disclosed herein further include (Sum2.9m):

The provision of the manufactured signal {1220} of Sum2.9 and further wherein the manufactured signal comprises: (g) a categorization identifying field {1235} for indicating whether the given ADO provides a categorization function for other ADO's.

The aspects disclosed herein further include (Sum2.9n):

The provision of the manufactured signal {1220} of Sum2.9 and further wherein the manufactured signal comprises: (g) an external data identifying field {1240} for identifying one or more data items outside of the given ADO that can provide support or other useful information for users of the given ADO.

The aspects disclosed herein further include (Sum2.9o):

The provision of the manufactured signal {1220} of Sum2.9n wherein the one or more outside data items outside include journaled data items that have been recorded with respective recordation time-stamps into a journal portion of machine area belonging to said owner-user.

The aspects disclosed herein further include (Sum2.9p):

The provision of the manufactured signal {1220} of Sum2.9 and further wherein the manufactured signal comprises: (g) a priority indicating field {1241} for indicating a priority assigned to the underlying activity of the given ADO by said owner-user.

The aspects disclosed herein further include (Sum2.9q):

The provision of the manufactured signal {1220} of Sum2.9 and further wherein the manufactured signal comprises: (g) a sharing status indicating field {1244} for indicating an idea or activity sharing state existing between the owner-user of the given ADO and one or more other users.

The aspects disclosed herein further include (Sum2.9r):

The provision of the manufactured signal {1220} of Sum2.9 and further wherein the manufactured signal comprises: (g) a dependency indicating field {1252} for indicating one or more of preceding or following dependencies assigned between the underlying activity of the given ADO and underlying activities of other ADO's.

The aspects disclosed herein further include (Sum2.9s):

The provision of the manufactured signal {1220} of Sum2.9 and further wherein the manufactured signal comprises: (g) a privacy-level indicating field {1253} for indicating one or more privacy states assigned by the owner-user of the given ADO to information provided by the given ADO.

The aspects disclosed herein further include (Sum2.9t):

The provision of the manufactured signal {1220} of Sum2.9 and further wherein the manufactured signal comprises: (g) a authenticity certifying field {1255} for providing certification of one or both of determinations that information provided by the given ADO has not been tampered with and that information provided by the given ADO originated from the owner-user identified in said ADO owner identifying field {1224}.

The aspects disclosed herein further include (as Sum2.10):

The Printing onto one page or one set of pages, with one print command, such a Boolean sum of products filtered set of ADOs in either graphical or text spreadsheet mode. Stated otherwise, there may be provided:

A machine-implemented method {240} for generating reports relating to hierarchically organized activity descriptions and/or activity-supporting information, the method comprising:

(a) first maintaining a recorded and logically linked plurality of activity data objects (ADO's) {251} which identify and/or represent respective activities and indicate interrelationships between the respective activities;

(b) second maintaining a recorded and logically linkable plurality of journal data items (JDI's) {252*a*,252*b*} which identify and/or represent respective items of supporting information for supporting current or future activities and indicate, if the JDI's are logically linked to one another and/or to other data, interrelationships between the respective JDI's and/or the other data;

(c) performing one or more filtering searches {246,247} through one or both of said maintained ADO's and JDI's for identifying one or more filtered subsets of said maintained ADO's and JDI's; and (d) presenting {115',117'} to a user {101'} at least one of said filtered subsets of the maintained ADO's and/or JDI's.

The aspects disclosed herein further include (Sum2.10a):

The machine-implemented method {240} of Sum2.10 wherein: (d.1) said presenting includes presenting an integrated presentation to the user, where the integrated presentation simultaneously provides a first expression {115'} of a filtered subset of, or an unfiltered expression of, the maintained ADO's and a second expression {117'} of a filtered subset of, or an unfiltered expression of, the maintained JDI's.

The aspects disclosed herein further include (Sum2.10b):

The machine-implemented method {240} of Sum2.10a wherein: (d.2) each one of said first and second presented expressions {115',117'} is selectively expressed in a respective one of a tabular form or a graphical-icons form.

The aspects disclosed herein further include (Sum2.10c):

The machine-implemented method {240} of Sum2.10 and further comprising:

(e) causing a print out to be generated of one or both of a first expression {115'} of a filtered subset of, or an unfiltered expression of, the maintained ADO's and a second expression {117'} of a filtered subset of, or an unfiltered expression of, the maintained JDI's.

2a. CROSS REFERENCE TO PATENTS . . . CONTINUED (B) U.S. Pat. No. 6,446,113 issued on Sep. 3, 2002 to Ozzie, et al. and entitled "Method and apparatus for activity-based collaboration by a computer system equipped with a dynamics manager".

(C) U.S. Pat. No. 6,311,191 issued on Oct. 30, 2001 to Retallick and entitled "Method and apparatus for improved contact and activity management and planning".

(D) U.S. Pat. No. 6,308,164 issued on Oct. 23, 2001 to Nummelin, et al. and entitled "Distributed project management system and method".

(E) U.S. Pat. No. 6,101,481 issued on Aug. 8, 2000 to Miller and entitled "Task management system".

(F) U.S. Pat. No. 6,092,048 issued on Jul. 18, 2000 to Nakaoka and entitled "Task execution support system".

(G) U.S. Pat. No. 6,006,215 issued on Dec. 21, 1999 to Retallick and entitled "Method and apparatus for improved contact and activity management and planning".

(H) U.S. Pat. No. 5,893,074 issued on Apr. 6, 1999 to Hughes, et al. and entitled "Network based task management".

(I) U.S. Pat. No. 5,721,913 issued on Feb. 24, 1998 to Ackroff, et al. and entitled "Integrated activity management system".

(J) U.S. Pat. No. 5,548,506 issued on Aug. 20, 1996 to Srinivasan and entitled "Automated, electronic network based, project management server system, for managing multiple work-groups".

(K) U.S. Pat. No. 5,530,861 issued on Jun. 25, 1996 to Diamant, et al. and entitled "Process enaction and tool integration via a task oriented paradigm".

(L) U.S. Application No. 20030061330 issued on Mar. 27, 2003 to Frisco, Lynn A.; et al. and entitled "Web-based collaborative project and process management solution".

(M) U.S. Application No. 20020078007 issued on Jun. 20, 2002 to Herrero, Carlos and entitled "Task management program".

(N) U.S. Pat. No. 6,640,241 issued on Oct. 28, 2003 to Ozzie, et al. and entitled "Method and apparatus for activity-based collaboration by a computer system equipped with a communications manager".

(O) U.S. Pat. No. 6,591,278 issued on Jul. 8, 2003 to Ernst and entitled "Project data management system and method".

(P) U.S. Pat. No. 6,578,006 issued on Jun. 10, 2003 to Saito, et al. and entitled "Project work management method and system".

(Q) U.S. Pat. No. 6,507,845 issued on Jan. 14, 2003 to Cohen, et al. and entitled "Method and software for supporting improved awareness of and collaboration among users involved in a task".

(R) U.S. Pat. No. 6,445,968 issued on Sep. 3, 2002 to Jalla and entitled "Task manager".

(S) U.S. Pat. No. 6,370,562 issued on Apr. 9, 2002 to Page, et al. and entitled "Trackpoint-based computer-implemented systems and methods for facilitating collaborative project development and communication".

(T) U.S. Pat. No. 6,314,430 issued on Nov. 6, 2001 to Chang and entitled "System and method for accessing a database from a task written in an object-oriented programming language".

(U) U.S. Pat. No. 6,289,317 issued on Sep. 11, 2001 to Peterson and entitled "Task-based classification and analysis system".

(V) U.S. Pat. No. 6,073,108 issued on Jun. 6, 2000 to Peterson and entitled "Task-based classification and analysis system".

(W) U.S. Pat. No. 5,799,297 issued on Aug. 25, 1998 to Goodridge, et al. and entitled "Task workflow management system and method including an external program execution feature".

(X) U.S. Pat. No. 5,671,360 issued on Sep. 23, 1997 to Hambrick, et al. and entitled "Project management tool implementing authority for a people oriented work environment tool".

(Y) U.S. Application No. 20030204538 issued on Oct. 30, 2003 to Keene, David Antony and entitled "Project management system".

(Z) U.S. Application No. 20030167281 issued on Sep. 4, 2003 to Cohen, Andrew L.; et al. and entitled "Method and software for supporting improved awareness of and collaboration among users involved in a task".

(AA) U.S. Application No. 20020156808 issued on Oct. 24, 2002 to Duffy, Catherine M.; et al. and entitled "Method and system for providing task information in a place".

(AB) U.S. Application No. 20020143594 issued on Oct. 3, 2002 to Kroeger, Dann E. and entitled "System, method and article of manufacture for alerting a manager of a critical outstanding task".

(AC) U.S. Application No. 20010001864 issued on May 24, 2001 to Page, John D.; et al. and entitled "Trackpoint-based computer-implemented systems and methods for facilitating collaborative project development and communication".

3. RESERVATION OF EXTRA-PATENT RIGHTS, RESOLUTION OF CONFLICTS, AND INTERPRETATION OF TERMS

After this disclosure is lawfully published, the owner of the present patent application has no objection to the reproduction by others of textual and graphic materials contained herein provided such reproduction is for the limited purpose of understanding the present disclosure of invention and of thereby promoting the useful arts and sciences. The owner does not however disclaim any other rights that may be lawfully associated with the disclosed materials, including but not limited to, copyrights in any computer program listings or art works or other works provided herein, and to trademark or trade dress rights that may be associated with coined terms or art works provided herein and to other otherwise-protectable subject matter included herein or otherwise derivable herefrom.

If any disclosures are incorporated herein by reference and such incorporated disclosures conflict in part or whole with the present disclosure, then to the extent of conflict, and/or broader disclosure, and/or broader definition of terms, the present disclosure controls. If such incorporated disclosures conflict in part or whole with one another, then to the extent of conflict, the later-dated disclosure controls.

Unless expressly stated otherwise herein, ordinary terms have their corresponding ordinary meanings within the respective contexts of their presentations, and ordinary terms of art have their corresponding regular meanings within the relevant technical arts and within the respective contexts of their presentations herein.

Given the above disclosure of general concepts and specific embodiments, the scope of protection sought is to be defined by the claims appended hereto. The issued claims are not to be taken as limiting Applicant's right to claim disclosed, but not yet literally claimed subject matter by way of one or more further applications including those filed pursuant to 35 U.S.C. §120 and/or 35 U.S.C. §251.

What is claimed is:

1. A method comprising:

storing, in a first area of a memory of a first computer system, a hierarchical data structure including a plurality of activity data items each representing an activity and each having a description and a status, wherein:

each activity data item other than a root activity data item is a child of a parent activity data item and represents a subtask of the task represented by the parent activity data item; and the status for each node is recorded in a data field associated with that node;

storing, in a second area of the memory of the first computer system, an unstructured set of activity data items each having a description;

receiving a user input instructing a processor of the first computer system to associate an activity data item from the unstructured set of activity data items with the hierarchical data structure as a child or parent of one of the activity data items of the hierarchical data structure;

receiving from a second computer system an additional activity data item; and storing the received additional activity data item in the second area.

2. The method of claim 1, further comprising receiving an input instructing the processor to associate the received additional activity data item with the hierarchical data structure as a child or parent of one of the activity data items of the hierarchical data structure.

3. The method of claim 2, further comprising transmitting, from the first computer system to the second computer system, information regarding at least one of the parent and child activity data items of the received additional activity data item following association of the received additional activity data item with the hierarchical data structure.

4. The method of claim 2, further comprising:

receiving a second input to the first computer system instructing the processor to perform a modification on the received additional activity data item; and transmitting the modification from the first computer system to the second computer system.

5. The method of claim 2, further comprising:

receiving a second input on the first computer system instructing the processor to perform a modification on one of a child activity data item and a parent activity data item of the received additional activity data item; and transmitting the modification from the first computer system to the second computer system.

6. The method of claim 2, wherein receiving the input instructing the processor to associate the received additional activity data item with the hierarchical data structure as a child or parent of one of the activity data items of the hierarchical data structure comprises associating the received additional activity data item with the hierarchical data structure as a child of a first parent activity data item; the method further comprising associating the received additional activity data item to the hierarchical data structure as a child of a second parent activity data item.

7. The method of claim 1, wherein receiving from the second computer system the additional activity data item comprises receiving the additional activity data item by way of a central server operable to translate at least one field of the received additional activity data item from a field that is not defined on the first computer system to a field that is defined on the first computer system.

8. The method of claim 1, wherein receiving the input instructing the processor of the first computer system to associate the additional activity data item from the unstructured set of activity data items with the hierarchical data structure as a child or parent of one of the activity data items of the hierarchical data structure comprises:

receiving the user input in a graphical user interface dragging and dropping a graphical representation of the activity data item from a graphical representation of the unstructured set of activity data items onto a graphical representation of the hierarchical data structure.

9. The method of claim 1, wherein at least a portion of the plurality of activity data items of the hierarchical data structure include a start date; and wherein the method further comprises refraining from displaying an activity data item having a start date prior to the start date thereof.

10. A non-transitory computer readable medium having instructions stored thereon that, if executed by a computing system, cause the computing system to perform operations comprising:

storing, in a first area of a memory of a first computer system, a hierarchical data structure including a plurality of activity data items each representing an activity and each having a description and a status, wherein:

each activity data item other than a root activity data item is a child of a parent activity data item and represents a subtask of the task represented by the parent activity data item; and the status for each node is recorded in a data field associated with that node;

storing, in a second area of the memory of the first computer system, an unstructured set of activity data items each having a description;

receiving a user input instructing a processor of the first computer system to associate an activity data item from the unstructured set of activity data items with the hierarchical data structure as a child or parent of one of the activity data items of the hierarchical data structure;

receiving from a second computer system an additional activity data item; and storing the received additional activity description in the second area.

11. The computer readable medium of claim 10, wherein the instructions are further operable to cause the computing system to perform operations comprising:

receiving an input instructing the processor to associate the received additional activity data item with the hierarchical data structure as a child or parent of one of the activity data items of the hierarchical data structure.

12. The computer readable medium of claim 11, wherein the instructions are further operable to cause the computing system to perform operations comprising:

transmitting, from the first computer system to the second computer system, information regarding at least one of the parent and child activity data items of the received additional activity data item following association of the received additional activity data item with the hierarchical data structure.

13. The computer readable medium of claim 11, wherein the instructions are further operable to cause the computing system to perform operations comprising:

receiving a second input on the first computer system instructing the processor to perform a modification on the received additional activity data item; and transmitting the modification from the first computer system to the second computer system.

14. The computer readable medium of claim 11, wherein the instructions are further operable to cause the computing system to perform operations comprising:

receiving a second input on the first computer system instructing the processor to perform a modification on one of a child activity data item and a parent activity data item of the received additional activity data item; and transmitting the modification from the first computer system to the second computer system.

15. The computer readable medium of claim 10, wherein receiving the user input instructing the processor of the first computer system to associate the activity data item from the unstructured set of activity data items with the hierarchical data structure as a child or parent of one of the activity data items of the hierarchical data structure comprises:

receiving the user input in a graphical user interface dragging and dropping a graphical representation of the activity data item from a graphical representation of the unstructured set of activity data items onto a graphical representation of the hierarchical data structure.

16. A computing device, comprising a processor and a memory, the memory storing instructions operable to cause the computing device to perform operations comprising:

storing, in a first area of a memory of a first computer system, a hierarchical data structure including a plurality of activity data items each representing an activity and each having a description and a status, wherein:

each activity data item other than a root activity data item being a child of a parent activity data item and representing a subtask of the task represented by the parent activity data item; and at least one of the activity data items is a leaf node in the hierarchical data structure;

storing, in a second area of the memory of the first computer system, an unstructured set of activity data items each having a description;

receiving a user input instructing a processor of the first computer system to associate an activity data item from the unstructured set of activity data items with the hierarchical data structure as a child or parent of one of the activity data items of the hierarchical data structure;

receiving from a second computer system an additional activity data item; and storing the received additional activity description in the second area.

17. The computing device of claim 16, wherein the instructions are further operable to cause the computing device to perform operations comprising:

receiving an input instructing the processor to associate the received additional activity data item with the hierarchical data structure as a child or parent of one of the activity data items of the hierarchical data structure.

18. The computing device of claim 16, wherein receiving the user input instructing the processor of the first computer system to associate the activity data item from the unstructured set of activity data items with the hierarchical data structure as a child or parent of one of the activity data items of the hierarchical data structure comprises:

receiving the user input in a graphical user interface dragging and dropping a graphical representation of the activity data item from a graphical representation of the unstructured set of activity data items onto a graphical representation of the hierarchical data structure.

* * * * *